(12) United States Patent
Tsukagoshi

(10) Patent No.: US 8,937,642 B2
(45) Date of Patent: Jan. 20, 2015

(54) STEREO IMAGE DATA TRANSMITTING APPARATUS AND STEREO IMAGE DATA RECEIVING APPARATUS

(75) Inventor: Ikuo Tsukagoshi, Tokyo (JP)

(73) Assignee: Sony Corporation (JP)

( * ) Notice: Subject to any disclaimer, the term of this patent is extended or adjusted under 35 U.S.C. 154(b) by 430 days.

(21) Appl. No.: 13/059,045

(22) PCT Filed: Jun. 22, 2010

(86) PCT No.: PCT/JP2010/060587
§ 371 (c)(1),
(2), (4) Date: Feb. 14, 2011

(87) PCT Pub. No.: WO2011/001859
PCT Pub. Date: Jan. 6, 2011

(65) Prior Publication Data
US 2011/0141235 A1    Jun. 16, 2011

(30) Foreign Application Priority Data

Jun. 29, 2009    (JP) .............................. P2009-153686
Mar. 16, 2010    (JP) .............................. P2010-060021

(51) Int. Cl.
*H04N 13/00* (2006.01)
*H04N 19/597* (2014.01)
(Continued)

(52) U.S. Cl.
CPC ....... *H04N 13/007* (2013.01); *H04N 19/00769* (2013.01); *H04N 21/236* (2013.01);
(Continued)

(58) Field of Classification Search
CPC ..................... H04N 13/007; H04N 2213/005
USPC ........................................................ 348/43
See application file for complete search history.

(56) References Cited

U.S. PATENT DOCUMENTS 6,462,746 B1    10/2002    Min et al.
2007/0236560 A1    10/2007    Lipton et al.
(Continued)

FOREIGN PATENT DOCUMENTS

JP    11-289555 A    10/1999
JP    2004-274125 A    9/2004
(Continued)

OTHER PUBLICATIONS

Office Action from Japanese Application No. 2009-248357, dated Feb. 26, 2013.
(Continued)

*Primary Examiner* — Christopher S Kelley
*Assistant Examiner* — Matthew Kwan
(74) *Attorney, Agent, or Firm* — Lerner, David, Littenberg, Krumholz & Mentlik, LLP

(57) ABSTRACT

[Object] To provide a data structure that allows transmission of disparity information for restricted use, such as closed caption information, and that is capable of being easily coordinated with the existing broadcast standards.
[Solution] A CC encoder 133 outputs CC data for displaying a caption with a closed caption. A disparity information creation unit 132 outputs disparity information related with each Window ID included in the CC data. A stream formatter 113*a* embeds the CC data and the disparity information in a user data area of a header portion of a video elementary stream so that the CC data and the disparity information can be identified by user data identification information. The disparity information has added thereto instruction information instructing which of the left eye and the right eye is to be subjected to shifting on the basis of the disparity information. Also, the disparity information is either configured to be commonly used in individual frames during a display period of closed caption information or configured to be sequentially updated during the individual periods, and has added thereto identification information thereabout.

14 Claims, 104 Drawing Sheets

(51) Int. Cl.
  *H04N 21/236* (2011.01)
  *H04N 21/434* (2011.01)
  *H04N 21/488* (2011.01)
  *H04N 21/81* (2011.01)
  *H04N 19/00* (2014.01)

(52) U.S. Cl.
  CPC ..... *H04N21/23614* (2013.01); *H04N 21/4348* (2013.01); *H04N 21/4884* (2013.01); *H04N 21/816* (2013.01); *H04N 19/00* (2013.01); *H04N 2213/005* (2013.01)
  USPC .......................................................... 348/43

(56) References Cited

U.S. PATENT DOCUMENTS

| | | | |
|---|---|---|---|
| 2008/0094525 A1 | 4/2008 | Song | |
| 2008/0192067 A1 | 8/2008 | Barenbrug et al. | |
| 2009/0142041 A1* | 6/2009 | Nagasawa et al. | 386/124 |
| 2009/0290637 A1* | 11/2009 | Lai et al. | 375/240.02 |
| 2010/0074594 A1 | 3/2010 | Nakamura et al. | |
| 2010/0157025 A1* | 6/2010 | Suh et al. | 348/51 |
| 2010/0303444 A1 | 12/2010 | Sasaki et al. | |
| 2011/0110583 A1* | 5/2011 | Zhang et al. | 382/154 |

FOREIGN PATENT DOCUMENTS

| | | |
|---|---|---|
| JP | 2005-006114 A | 1/2005 |
| JP | 2006-325165 A | 11/2006 |
| JP | 2006325173 A | 11/2006 |
| JP | 2008164367 A | 7/2008 |
| JP | 2009010557 A | 1/2009 |
| JP | 2009017198 A | 1/2009 |
| JP | 2009101822 A | 5/2009 |
| JP | 2009-135686 A | 6/2009 |
| JP | 2010510558 T | 4/2010 |
| WO | 2004021285 A1 | 3/2004 |
| WO | 2007116549 A1 | 10/2007 |
| WO | 2008044191 A2 | 4/2008 |
| WO | 2009008808 A1 | 1/2009 |
| WO | 2010064118 A1 | 6/2010 |
| WO | 2010095074 A1 | 8/2010 |

OTHER PUBLICATIONS

International Search Report, PCT/JP2010/060587, Dated Sep. 14, 2010.

Supplementary European Search Report EP Application No. 10794030, dated Dec. 4, 2012.

Office Action from China Application No. 201080009821.1, dated Aug. 29, 2013.

Office Action from Japanese Application No. 2009-246179, dated Sep. 10, 2013.

Office Action from China Application No. 201080002832.7, dated Jul. 24, 2013.

Office Action from China Application No. 201080009863.5, dated Jul. 17, 2013.

Office Action from Japanese Application No. 2009-288433, dated Sep. 10, 2013.

Office Action from Japanese Application No. 2010-010536, dated Sep. 10, 2013.

Office Action from Japanese Application No. 2009-248357, dated Jul. 30, 2013.

* cited by examiner

FIG. 3
EXAMPLE OF STEREO IMAGE DATA
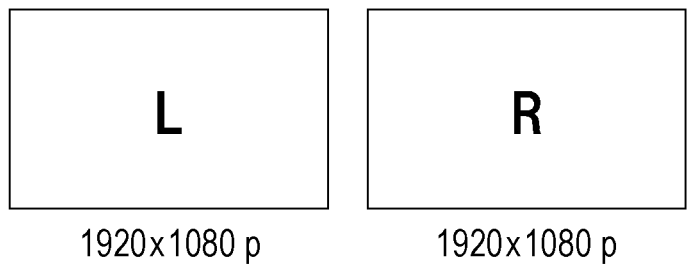
FIG. 4
(a) 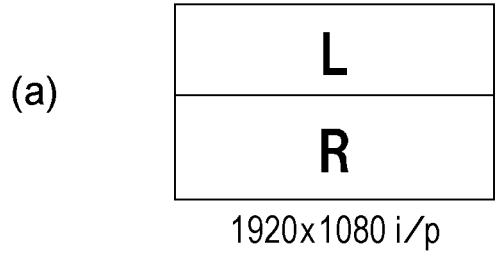
(b) 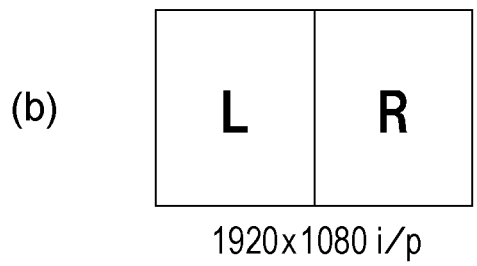
(c) 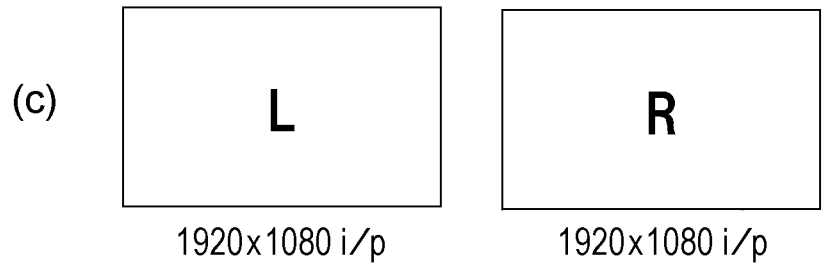

FIG. 7
EXAMPLE OF DISPARITY VECTOR
(a) 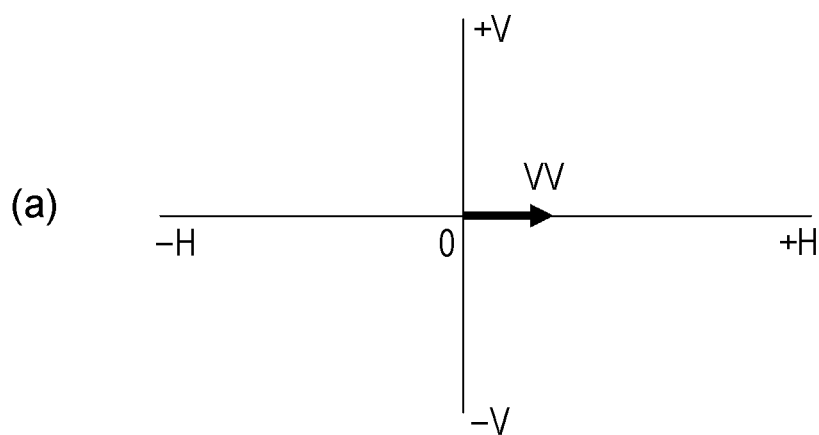
(b) 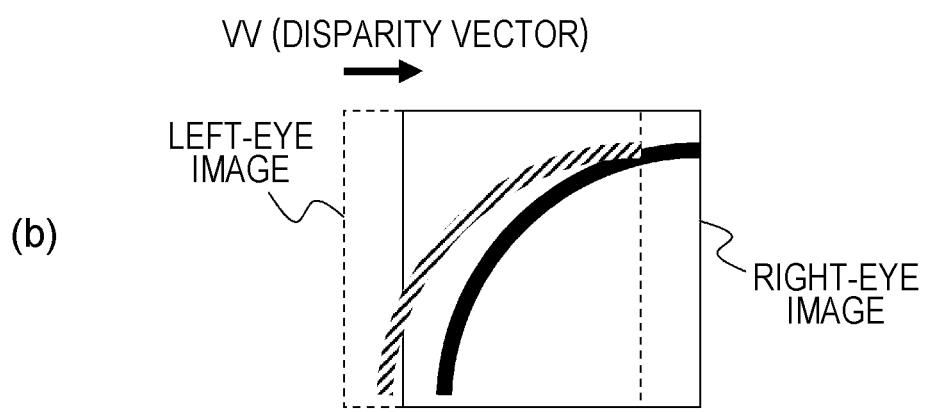

FIG. 8

TRANSMISSION CONTENT OF DISPARITY VECTOR

| | |
|---|---|
| Number_of_ViewBlocks N | 16 bits |
| For (i=0; i<N; i++) { | |
|     ID_Block(i) | 16 bits |
|     Vertical_Position | 16 bits |
|     Horizontal_Position | 16 bits |
|     View_Vector_Vertical | 16 bits |
|     View_Vector_Horizontal | 16 bits |
| } | |

FIG. 9

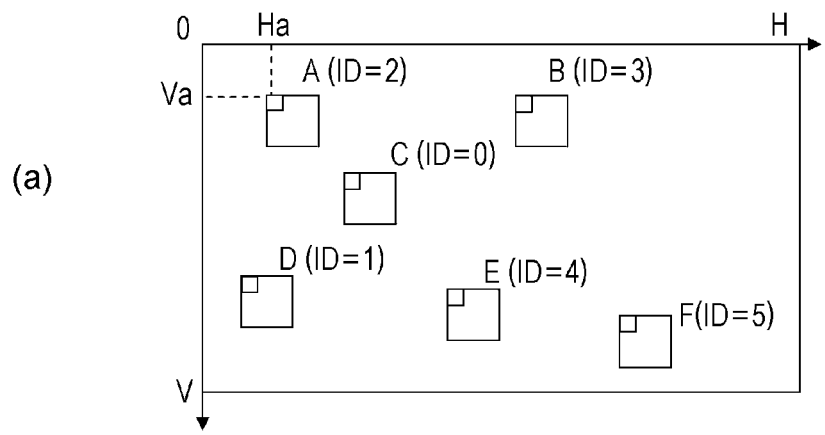

(a) COORDINATES OF POSITION OF DISPARITY DETECTION BLOCK (b)
```
ID2: Block_A:   (Ha, Va),   DISPARITY VECTOR a
ID3: Block_B:   (Hb, Vb),   DISPARITY VECTOR b
ID0: Block_C:   (Hc, Vc),   DISPARITY VECTOR c
ID1: Block_D:   (Hd, Vd),   DISPARITY VECTOR d
ID4: Block_E:   (He, Ve),   DISPARITY VECTOR e
ID5: Block_F:   (Hf, Vf),   DISPARITY VECTOR f
```

FIG. 10
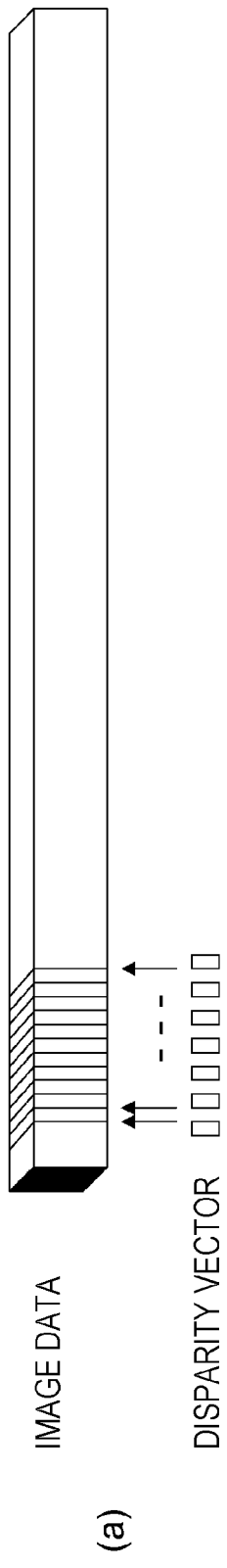
(a) (1) SYNCHRONIZATION WITH ENCODING OF PICTURES
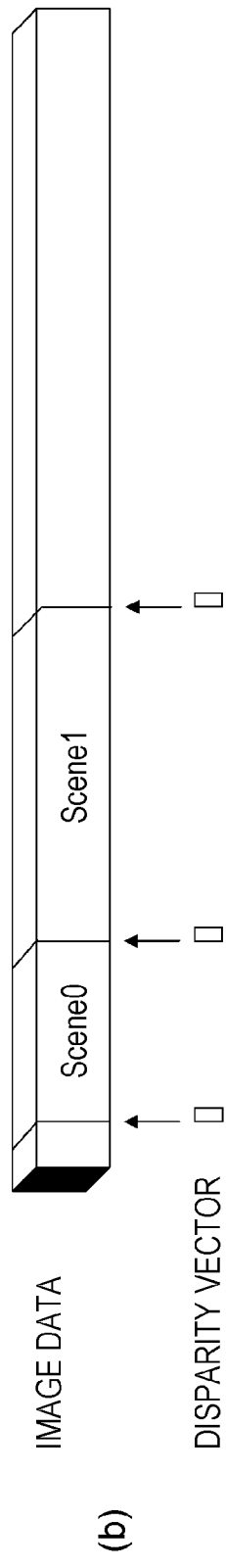
(b) (2) SYNCHRONIZATION WITH SCENES OF VIDEO
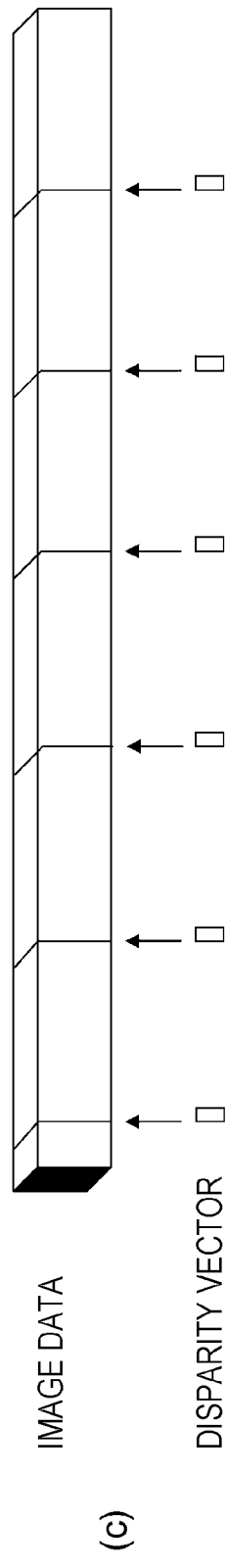
(c) (3) SYNCHRONIZATION WITH I-PICTURES OR GOPs OF ENCODED VIDEO

DISPARITY VECTOR (PIXEL-BY-PIXEL)

PICTURE

FIG. 25
DOWNSIZING PROCESS
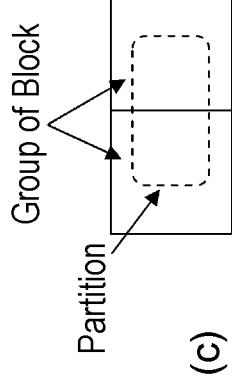
(a)
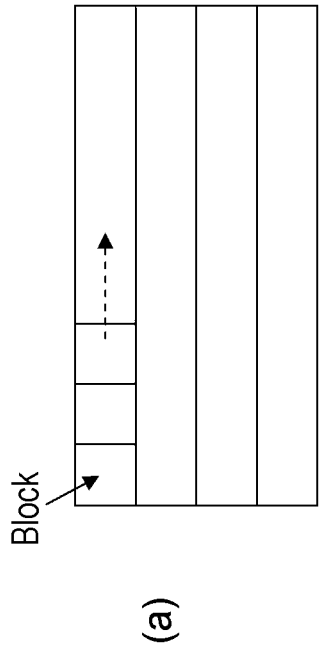
(b)
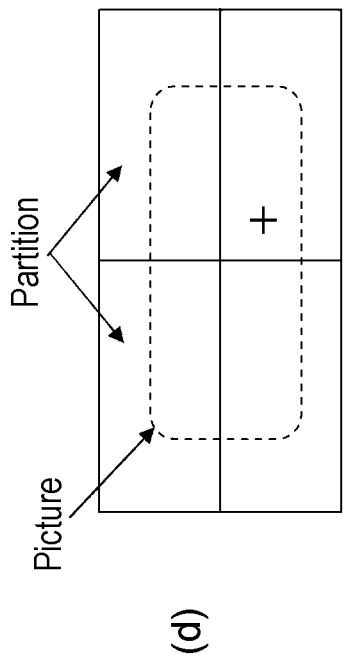
(c)
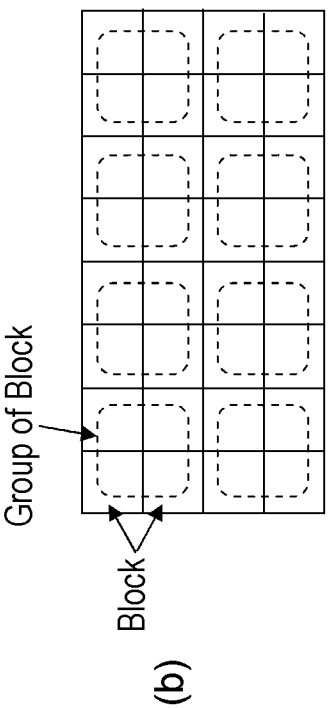
(d)

FIG. 27

| Disparity_Sequence_id | Description |
|---|---|
| 0 | Indicates disparity which is created from pre-assigned disparity archive for generic use. No need to associate with disparity_linkage_descriptor unless the corresponding disparity set is linked to any service component. |
| 1 TO 255 | Created for specific service with disparity_linkage_descriptor. |

FIG. 32

Component_Linked_Info

| Component_Element ID | Patition_Position_ID |
|---|---|
| Caption Window 0 | P7 |

FIG. 34

Component_Linkage_Info

| Component_Element ID | Partition_Position_ID |
|---|---|
| Caption Window 0 | P6 |
| Caption Window 0 | P7 |
| Caption Window 1 | P7 |
| Caption Window 1 | P8 |

FIG. 37

| Component_Element ID | Component_Linked_Info Pattition_Position_ID |
|---|---|
| Caption Window 0<br>Caption Window 1 | C0<br>C1 |

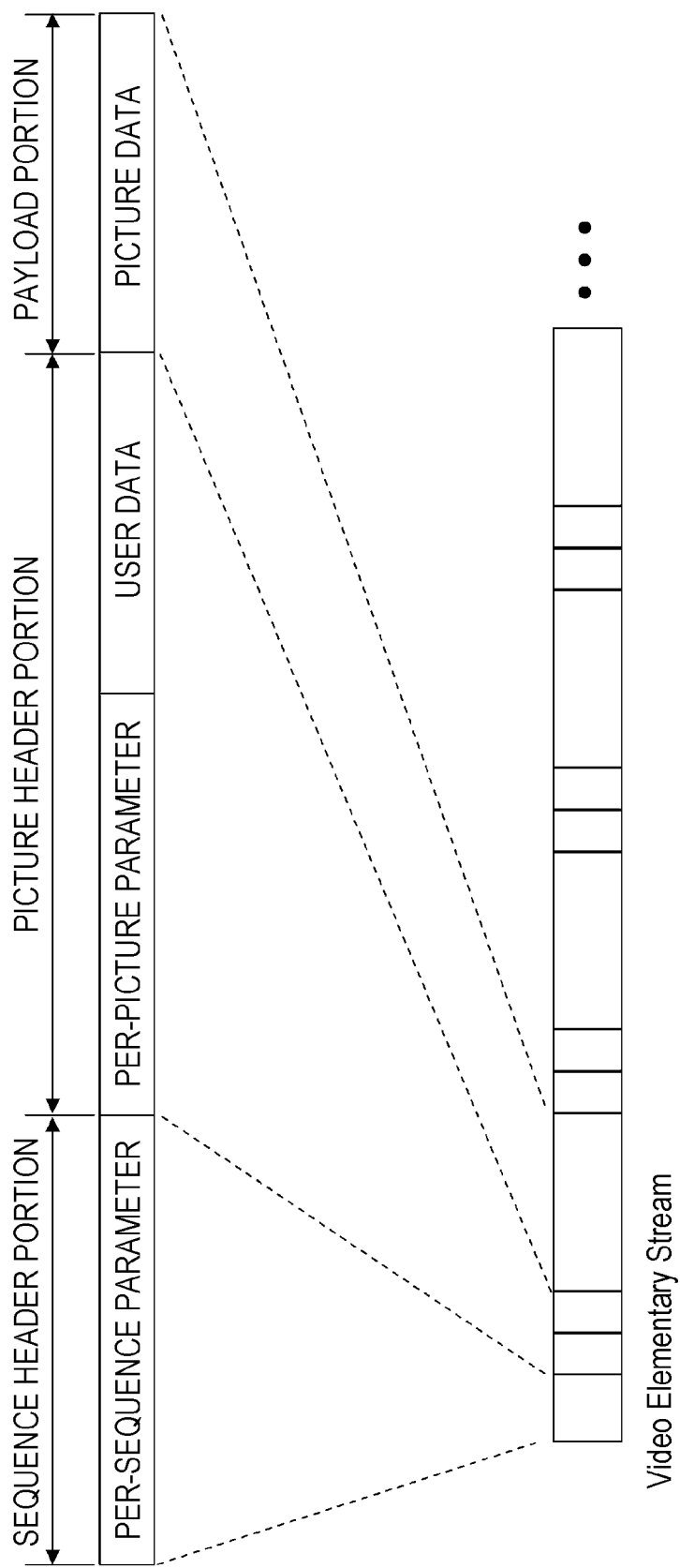

FIG. 42
CONFIGURATION OF USER DATA

MPEG2 video (a)
```
User_data(){
        user_data_start_code            32
        user_identifier                 32
        user_structure()
}
```

H.264 AVC video (b)
```
User_data_registered_itu_t_t35 (payloadSize){
        itu_t_t35_country_code          8
        itu_t_t35_provider_code         16
        user_identifier                 32
        user_structure()
}
or
user_data_unregistered( payloadSize ) {
        uuid_iso_iec_11578              128
        for( i = 16; i < payloadSize; i++ )
                user_identifier         32
                user_structure()
}
```

VC-1 video (c)
```
User_data(){
        VC1_user_data_start_code        32
        user_identifier                 32
        user_structure()
}
```

FIG. 43

```
Disparity_Linkage_descriptor() {
    descriptor_tag                                      8        0xD0
    descriptor_length                                   8        uimsbf
    reserved                                            3        '111'
    number_of_Linked_Streams                            5        uimsbf
    for (i=0; i< number_of_linked_Streams; i++) {
        ElementaryPID_of_disparity[i]                  13        uimsbf
        ElementaryPID_of_Service_Component[i]          13        uimsbf number_of_linked_sequences[i]                   5        uimsbf
        reserved                                        1        '1'
        Service_id[i]                                  32        uimsb
        Data_Type[i]                                    8        bslbf
        for (k=0; k< number_of_linked_sequences[i]; k++) {
            Disparity_Sequence_id[i,k]                  8        uimsbf
            Service_page_id[i,k]                        8        uimsbf
        }
    }
}
```

FIG. 44

Semantics descriptor_tag - An 8-bit field that identifies the type of descriptor.
For the Disparity_Linkage_descriptor() the value is 0xD0.

descriptor_length - An 8-bit count of the number of bytes following the descriptor_length itself.

number_of_Linked_Streams – An unsigned 5-bit integer in the range 0 to 31 that indicates the number of linked elementary streams that defines the linking of two streams in terms of disparity data.
ElementaryPID_of_disparity - A 13-bit field indicates PID of elementary stream that contains disparity data.
ElementaryPID_of_Service_Component - A 13-bit field indicates PID of elementary stream that contains service component, such as subtitles, or caption, text or graphics.

number_of_linked_sequences - An unsigned 5-bit integer in the range 0 to 15 that indicates the number of linked disparity information in the associated stream.

Disparity_Sequence_id - An 8-bit field specifies the service that utilizes disparity data to its components.

Service_id - A 32 bit field specifies unique word of service identifier.
(Ex) "0x47413934" is assigned for ATSC or DVB defined as user_identifier.

Data_Type - An 8 bit field that identifies the type of data under the specified service.
(Ex) "0x03" is assigned for Closed Caption data.

Service_page_id (8)
Specifies the service like Subtitle page id.

FIG. 45
Type A Insertion
(a)
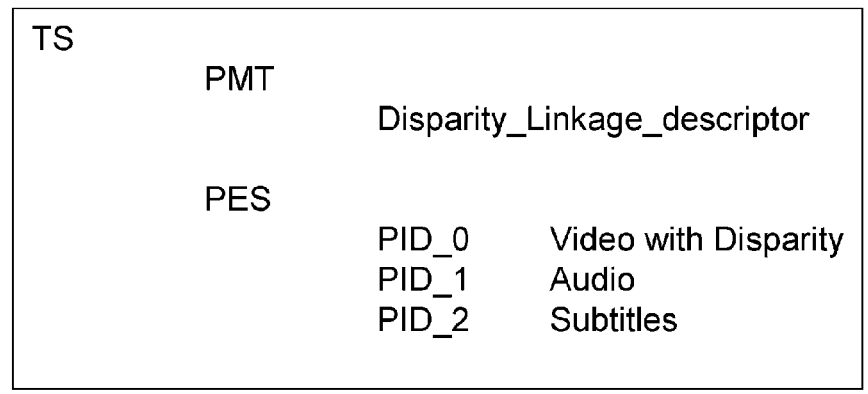
Type B Insertion
(b)
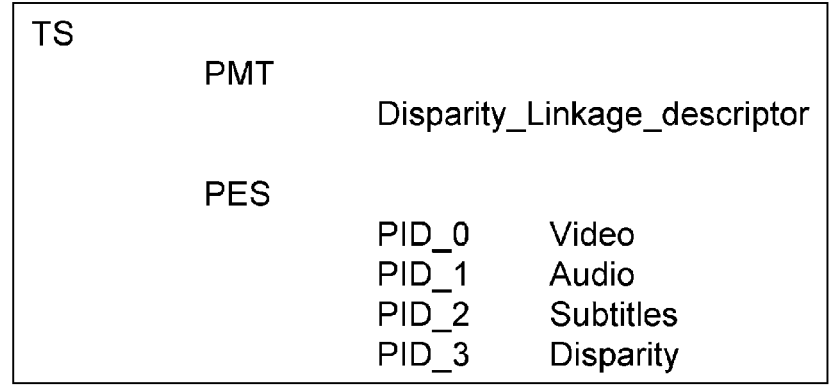

FIG. 51

Interface to Video stream user_data

```
user_data() {
    user_data_start_code                                            32
    Disparity_Information_identifier                                32
    while( nextbits() != '0000 0000 0000 0000 0000 0000 0000 0001' ) {
        Disparity_Information()
    }
    next_start_code()
}
```

FIG. 52

Syntax of Disparity Information Set (1)

```
Disparity_Information() {
    Disparity_Information_Data
}
```

FIG. 53

```
Disparity_Service_Link_Information()
{
    Disparity_Info_Length                          16 bits
    Disparity_Info_Type                             2 bits     "0x0"  Disparity Service Link Info (DSL)
    Reserved                                        1 bit      '1'
    number_of_Linked_Streams                        5                 uimsbf for (i=0; i< number_of_linked_Streams; i++) {
        ElementaryPID_of_disparity[i]              13                 uimsbf
        ElementaryPID_of_Service_Component[i]      13                 uimsbf
        number_of_linked_sequences                  5                 uimsbf
        Reserved                                    1                 "1"
        Service_id[i]                              32                 uimsb
        Data_Type[i]                                8                 bslbf for (k=0; k< number_of_linked_sequences; k++) {
            Disparity_Sequence_id[i,k]              8                 uimsbf
            Service_page_id[i,k]                    8                 uimsbf
        }
    }
}
```

FIG. 54    Disparity Header Information (DHI)

```
Disparity_Information()
{
    Disparity_Info_Length              16 bits
    Disparity_Info_Type                2 bits   "0x1" Disparity Header Information (DHI)
    Reserved                           3 bits
    Views_offset                       1 bit
    Disparity_precision                2 bits Disparity_Sequence_id              8 bits
    Service_Linked_flag                1 bit    "1" if there's disparity linked service in DSL
                                                "0" if there's no service linking the disparity.
    Target_Resolution_Type             2 bits
    Block_Size                         2 bits Link_source                        1 bit    "1" Link source is partitioned disparity.
                                                "0" Link source is disparity on
                                                    service component element.
    Reserved                           2 bits
    Partition                          3 bits
    Number_of_Component_Elements P     13 bits  // P is the number of either partitions or blocks,
                                                // or component elements in the linked service.

if( Service_Linked_flag == "1" ){
        Component_Linkage_Info()
    }
}
```

FIG. 55

Disparity Header Information (DHI) (continued)

```
Component_Linkage_Info()
{
    For (i=0; i<P i++) {
        Component_Element[i]              8 bits
        Element_Linkage_Length            8 bits
        Reserved                          4 bits
        number_of_mutiple_link[i]         4 bits
        for (m=0; m < number_of_mutiple_link[i]; m++ ){
            reserved                      3 bits
            Partition_Position_id[i][m]   13 bits
        }
    }
}
```

FIG. 56

Disparity Data Set ( DDS )

```
Disparity_Information()
{
    Disparity_Info_Length                    16 bits
    Disparity_Info_Type                       2 bits    "0x2" Disparity Data Set (DDS)
    Reserved                                  6 bits
    Disparity_Sequence_id                     8 bits
    Number_of_Component_Elements P           13 bits
                                                        // P is the number of either partitions or blocks,
                                                        // or component elements in the linked service.
    Reserved                                  3 bits    "111"
    Disparity_sets_in_period                  8 bits
    For (t=0; t < Disparity_sets_in_period; t++){
        Offset_Frame_In_disparity_set[t]      8 bits
        For (i=0; i<P; i++) {
            Disparity_Vector_Horizontal[t,i]  8 bits
        }
    }
}
```

FIG. 57

Semantics

Disparity_Info_Type (4)
Specifies the type of disparity information
"0x0"   Disparity Service Link Information (DSL)
"0x1"   Disparity Header Information (DHI)
"0x2"   Disparity Data Set (DDS)
Others  Reserved

Service_Linked_flag (1)
"1"  if there's disparity linked service in DSL
"0"  if there's no service linking the disparity.

Disparity_Sequence_id (8)
Identifier of the sequence of disparity

Target_Resolution_Type (2)
Specifies the resolution of the coded disparity data set to target video.
"0x0"   1920x1080
"0x1"   1440x1080
"0x2"   1280x 720
"0x3"   Reserved

Link_source (1)
"1"  Link source is partitioned disparity.
"0"  Link source is disparity on service component element.

FIG. 58

Semantics (continued)

Partition(3)
Specifies the picture partition pattern
- "0x0"  One disparity is sent for the entire picture
- "0x1"  Picture Divided into four partitions and disparity is sent each partition beginning from top-left to bottom-right.
- "0x2"  Picture Divided into nine partitions and disparity is sent each partition beginning from top-left to bottom-right.
- "0x3"  Picture Divided into sixteen partitions and disparity is sent each partition beginning from top-left to bottom-right.
- "0x7"  Picture Divided into blocks and disparity is sent each block beginning from top-left to bottom-right.

Other Value is reserved.

Block_Size (2)
Specifies the block size for disparity data in a picture
- "0x0"  16 x 16
- "0x1"  32 x 32
- "0x2"  64 x 64
- "0x3"  128x128

Number_of_Component_Elements P (13)
Specifies the number of component elements for the service or partition number, block number.

Component_Element (8)
Service Component Element is mapped to WindowID in Closed Caption, or region_id in DVB subtitling.

number_of_mutiple_link   (4)
Specifies the number of linked disparity data to the corresponding component element.

FIG. 59

Semantics (continued)

Partition_Position_id (13)
 Specifies the linking of n-th partition disparity defined by Partition and Block_Size.
Disparity_sets_in_period (8)
 Specifies the number of offset disparity sets in the target display period.
  "1" being only 1 disparity is allocated in the corresponding display period.

Offset_Frame_In_disparity_set (8)
 Specifies the frame count offset from the first picture display timing.
  (Offset_frame_in_disparity_set = 0 means thet disparity set for the 1st picture)
  (Offset_frame_in_disparity_set = 1 means the disparity set for the 2nd picture)
  (Offset_frame_in_disparity_set = 0xE means the disparity set for the 15th picture)
Disparity_Vector_Horizontal(8)
 Specifies the pixel precision disparity between the stereo view rendering.
 8 bit Signed Integer Value.
Service_page_id (8)
 Specifies the service like Subtitle page id or closed caption service.

FIG. 60

Semantics (continued)

Views_offset (1)
"1" denotes that disparity is applied for both views with different directions directed by sign-bit.
"0" denotes that disparity is only applied for the second view.

Disparity_precision (2)
"0" denotes disparity vector value is on ½ pixel on Target_Resolution_Type
"1" denotes disparity vector value is on a pixel on Target_Resolution_Type.
"2" denotes disparity vector value is on a two-pixel-pair on Target_Resolution_Type.
"3" denotes disparity vector value is on a three-pixel-pair on Target_Resolution_Type.

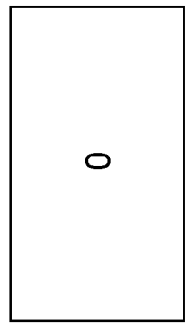

FIG. 61

(a) "0x0"  One disparity is sent for the entire picture (b) "0x1"  Picture Divided into four partitions and disparity is sent each partition beginning from top-left to bottom-right.

(c) "0x2"  Picture Divided into nine partitions and disparity is sent each partition beginning from top-left to bottom-right.

(d) "0x3"  Picture Divided into sixteen partitions and disparity is sent each partition beginning from top-left to bottom-right.

FIG. 64

Interface to Video stream user_data

```
user_data() {
    user_data_start_code                                      32  (lsbf)
    ATSC_identifier                                           32  (lsbf)
    user_data_type_code                                        8  (msbf)
    while( nextbits() != '0000 0000 0000 0000 0000 0000 0000 0001' ) {
        caption_disparity_data()
    }
    next_start_code()
}
```

FIG. 65

| Semantics | |
|---|---|
| user_data_start_code (32 bits) | "0x000001B2" |
| ATSC_identifier (32 bits) | "0x47413934" |
| user_data_type_code (8 bits) | "0x07" (= caption_disparity_data) |
| | Used to be only defined |
| | 0x03 = cc_data, |
| | 0x06 = bar_data, |
| | others currently reserved for future use) |

FIG. 66

Syntax of caption_disparity_data

```
caption_disparity_data()
{
    service_number                                          6 bits
    select_view_shift                                       2 bits
    reserved                                                5 bits '1 1111'
    number_of_caption_windows                               3 bits
    for (i=0; i< number_of_caption_windows; i++)
    {
        caption_window_id[i]                                3 bits
        temporal_extension_flag                             1 bit
        reserved                                            4 bits '1111'
        disparity[i]                                        8 bits
        if (temporal_extension_flag)
        {
            number_of_frame_set                             8 bits
            for (k=0; k< number_of_frame_set, k++)
            {
                offset_precision                            1 bit
                reserved                                    1 bit '1'
                offset_sequence_0[i,k]                      2 bits
                offset_sequence_1[i,k]                      2 bits
                offset_sequence_2[i,k]                      2 bits
                offset_sequence_3[i,k]                      2 bits
                offset_sequence_4[i,k]                      2 bits
                offset_sequence_5[i,k]                      2 bits
                offset_sequence_6[i,k]                      2 bits
                offset_sequence_7[i,k]                      2 bits
                offset_sequence_8[i,k]                      2 bits
                offset_sequence_9[i,k]                      2 bits
                offset_sequence_10[i,k]                     2 bits
            }
        }
    }
}
```

FIG. 67

```
Semantics of caption_disparity_data service_number (6 bits)
    Specifying Caption Channel Services. For the disparity data, the service number is
    the association to CEA-708 caption service.
    Service_number =0 is the special mode in which single disparity is shared
    with all the caption windows.
select_view_shift (2 bits)
    Specifying the target view to execute shifting
    "00" = Reserved
    "01" = Shift left view: Left view is shifted by the amount given in disparity[i]
                (left for negative values, right for positive values). Right view is not shifted.
    "10" = Shift right view: Right view is shifted by the amount given in disparity[i]
                (left for negative values, right for positive values). Left view is not shifted.
    "11" = Shift both views (in opposite directions):
                For even values of disparity[i]:
                    Left view is shifted by (disparity[i]/2)
                        (left for negative values, right for positive values)
                    Right view is shifted in the opposite direction by (disparity[i]/2)
                For odd values of disparity[i]:
                    Left view is shifted by ((disparity[i]+1)/2)
                        (left for negative values, right for positive values)
                    Right view is shifted in the opposite direction by ((disparity[i]-1)/2)
temporal_extension_flag (1 bit)
    1 = Specify the existence of extended data to indicate
        the frame by frame temporal update of disparity value
    0 = No extension is followed
number_of_caption_windows (3 bits)
    Specifying the number of closed caption windows which links the disparity
caption_window_id (3 bits)
        Identifying CEA-708 caption window[0..7]
disparity (8 bits)
        Specifying a signed integer pixel precision value [-128..127]
```

FIG. 68

Semantics of caption_disparity_data *continued* offset_precision (1 bit)
    Specifying the precision of the value in offset_sequence
    '0' means that the offset_sequence shows in single pixel
    '1' means that the offset_sequence is in two-pixel-pair
number_of_frame_set (8 bits)
    Specifying the period of time that the disparity value is updated in frames by indicating the number of set of eleven-frames in the period.
offset_sequence (2 bits)
    Specifying the frame to frame offset updates to the previous stage of disparity data.
    '00' means no updates to the former stage.
    '01' means one offset_precision positively updated to the former stage
    '10' means one offset_precision negatively updated to the former stage
    '11' means no frame is assigned for the offset_sequence.

FIG. 69

Caption_disparity_data size is estimated on top of CEA-708:

(1) Simple Support (no support of frame updates)
  (1-1) Maximum 8 windows
    18 Bytes = 2 {header} + (2 {data} * 8 windows) per caption.
  (1-2) 1 window or single disparity shared with 8 windows
    4 Bytes = 2 {header} + 2 {data} per caption (2) Frame Update Support (full feature)
  (2-1) Maximum 8 windows
    362 Bytes = 2 {header} + (3 {header} + 3 * 14 {11 frame sets} ) * 8 windows per caption in case the caption continues to display over 5 seconds.

FIG. 77
(a) CC INFORMATION
(b) TWO-DIMENSIONAL DISPLAY
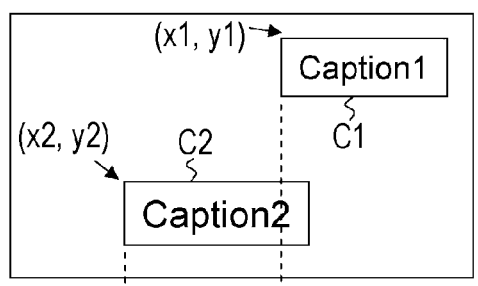
(C) LEFT-EYE IMAGE
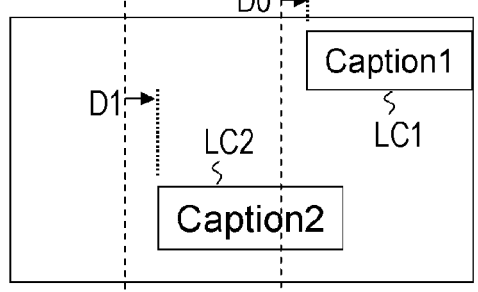
(d) RIGHT-EYE IMAGE
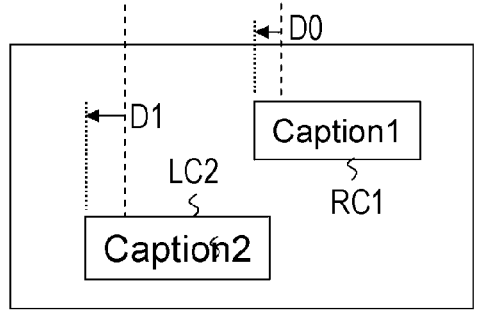
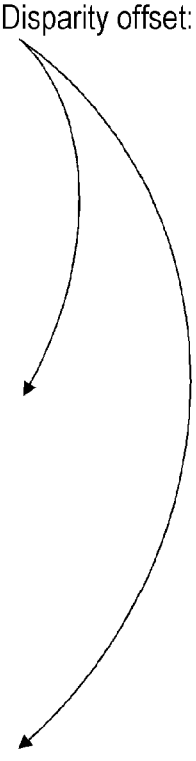
Disparity offset: D0, D1

FIG. 99
TMDS TRANSMISSION DATA (1920x1080)
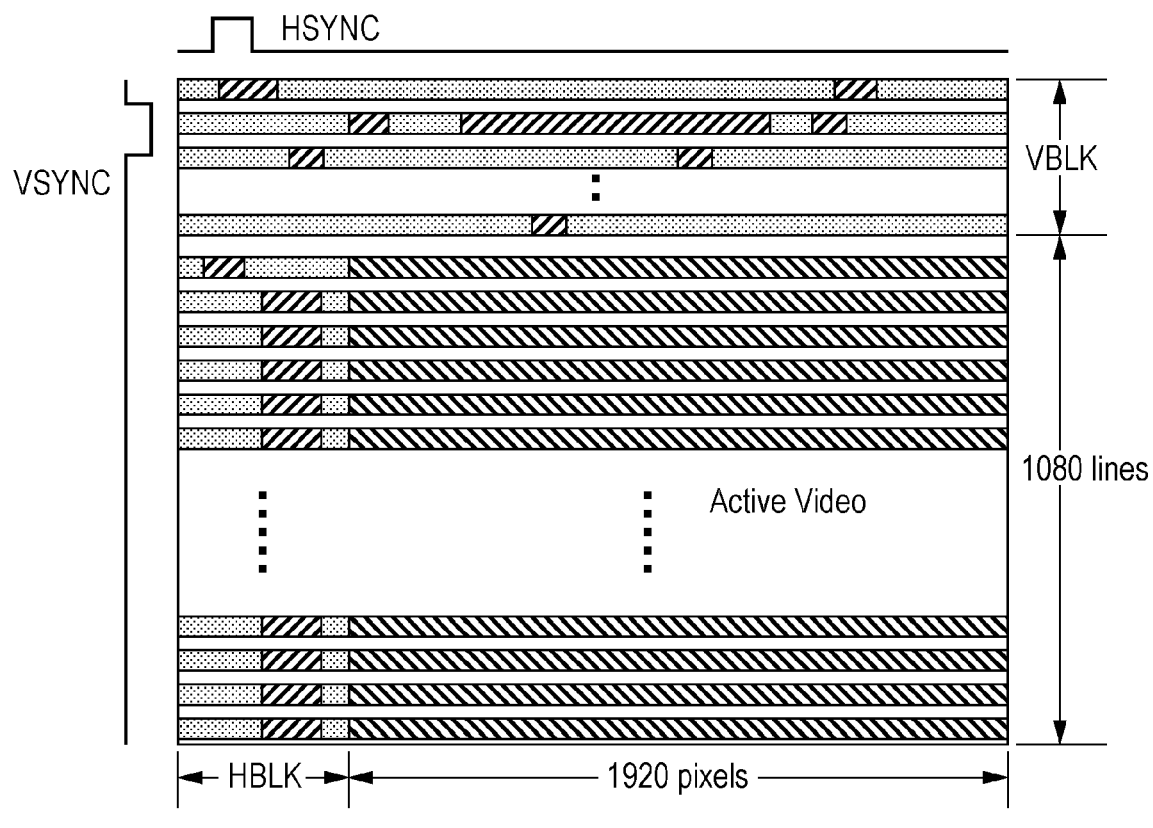
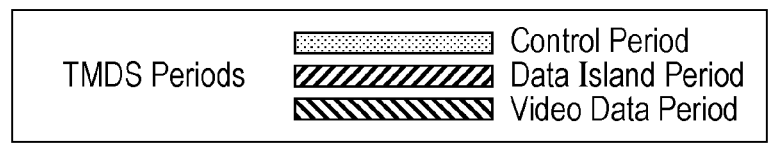

FIG. 100

HDMI PIN ARRAY (IN CASE OF Type-A)

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Utility/HEAC+ |
| 15 | SCL | 16 | SDA |
| 17 | DDC/CEC Ground/HEAC Shield | 18 | +5 V Power |
| 19 | Hot Plug Detect/HEAC− | | |

HDMI EDID DATA STRUCTURE

FIG. 102

Vendor Specific Data Block

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1 | 24-bit IEEE Registration Identifier (0x000C03) (least significant byte first) | | | | | | | |
| 2 | | | | | | | | |
| 3 | | | | | | | | |
| 4 | A | | | | B | | | |
| 5 | C | | | | D | | | |
| 6 | Supports_AI | DC_48bit | DC_36bit | DC_30bit | DC_Y444 | Rsvd (0) | Rsvd (0) | DVI_Dual |
| 7 | Max_TMDS_Clock | | | | | | | |
| 8 | Latency_Fields_Present | I_Latency_Fields_Present | HDMI_Video_present | Rsvd (0) | Rsvd (0) | Rsvd (0) | Rsvd (0) | Rsvd (0) |
| (9) | Video_Latency | | | | | | | |
| (10) | Audio_Latency | | | | | | | |
| (11) | Interlaced_Video_Latency | | | | | | | |
| (12) | Iterlaced_Audio_Latency | | | | | | | |
| (13) | 3D_present | Rsvd (0) | Rsvd (0) | Rsvd (0) | Rsvd (0) | Rsvd (0) | Rsvd (0) | Rsvd (0) |
| (14) | HDMI_VIC_LEN | | | HDMI_3D_LEN | | | | |
| ...N | ... | | | | | | | |

3D Video Format
(Frame packing)

3D Video Format
(Line alternative)

3D Video Format (Side-by-Side(Full))

STEREO IMAGE DATA TRANSMITTING APPARATUS AND STEREO IMAGE DATA RECEIVING APPARATUS

CROSS-REFERENCE TO RELATED APPLICATIONS

The present application is a national phase entry under 35 U.S.C. § 371 of International Application No. PCT/JP2010/060587 filed Jun. 22, 2010, published on Jun. 1, 2011 as WO 2011/001859 A1, which claims priority from Japanese Patent Application No. JP 2009-153686 filed in the Japanese Patent Office on Jun. 29, 2009 and Japanese Patent Application No. JP 2010-060021 filed in the Japanese Patent Office on Mar. 16, 2010.

TECHNICAL FIELD

The present invention relates to a stereo image data transmitting apparatus and a stereo image data transmitting method, and particularly relates to a stereo image data transmitting apparatus or the like capable of favorably performing display of superimposition information (such as a menu and a program table).

BACKGROUND ART

For example, in PTL 1, a transmission method of stereo image data using television broadcast airwaves is proposed. In this case, stereo image data including left-eye image data and right-eye image data is transmitted, and a television receiver performs stereo image display utilizing binocular disparity.

FIG. 108 illustrates a relationship in stereo image display utilizing binocular disparity between display positions of left and right images of an object on a screen and a reproduction position of a stereoscopic image. For example, for an object A of which a left image La and a right image Ra are displayed shifted to the right and to the left, respectively, on a screen in the manner as illustrated in the figure, the reproduction position of a stereoscopic image is located in front of the surface of the screen because left and right lines of sight intersect in front of the surface of the screen. DPa represents a disparity vector of the object A in the horizontal direction.

Also, for example, for an object B of which a left image Lb and a right image Rb are displayed at the same position on the screen in the manner as illustrated in the figure, the reproduction position of a stereoscopic image is located on the surface of the screen because left and right lines of sight intersect on the surface of the screen. Furthermore, for example, for an object C of which a left image Lc and a right image Rc are displayed shifted to the left and to the right, respectively, on the screen in the manner as illustrated in the figure, the reproduction position of a stereoscopic image is located behind the surface of the screen because left and right lines of sight intersect behind the surface of the screen. DPc represents a disparity vector of the object C in the horizontal direction.

CITATION LIST

Patent Literature

PTL 1: Japanese Unexamined Patent Application Publication No. 2005-6114

SUMMARY OF INVENTION

Technical Problem

As described above, in stereo image display, in general, a viewer perceives the perspective of a stereo image by utilizing binocular disparity. It is desired that superimposition information to be superimposed on an image, such as, for example, closed caption information, subtitle information, graphics information, or text information, be rendered in association with the stereo image display not only in terms of two-dimensional space but also in terms of three-dimensional depth feeling.

For example, in a case where a caption that is closed caption information or subtitle information is to be superimposed and displayed (overlay displayed) on an image, if the caption is not displayed in front of the closest object in the image in terms of perspective, the viewer may feel inconsistency in perspective. Also, it is desired that also in a case where other graphics information or text information is to be superimposed and displayed on an image, disparity adjustment be performed in accordance with the perspective of each object in the image to maintain the consistency in perspective.

It is an object of the present invention to maintain the consistency in perspective, in the display of superimposition information such as closed caption information, subtitle information, graphics information, or text information, between the superimposition information and each object in an image.

Solution to Problem

A concept of the present invention resides in a stereo image data transmitting apparatus including:

a stereo image data output unit that outputs stereo image data including left-eye image data and right-eye image data;

a superimposition information data output unit that outputs data of superimposition information to be superimposed on an image that is based on the left-eye image data and the right-eye image data;

a disparity information output unit that outputs disparity information for giving disparity by shifting the superimposition information to be superimposed on the image that is based on the left-eye image data and the right-eye image data; and a transmitting unit that transmits a video elementary stream including, in a payload portion, the stereo image data output from the stereo image data output unit and including, in a user data area of a header portion, the data of the superimposition information output from the superimposition information data output unit and the disparity information output from the disparity information output unit, wherein the data of the superimposition information and the disparity information included in the user data area of the header portion of the video elementary stream is configured to be identifiable by user data identification information.

In the present invention, stereo image data including left-eye image data and right-eye image data is output by a stereo image data output unit. Also, data of superimposition information to be superimposed on an image that is based on the left-eye image data and the right-eye image data is output by a superimposition information data output unit. Here, the superimposition information means information to be superimposed on an image, such as closed caption information or subtitle information for displaying a caption. Also, disparity information for giving disparity by shifting the superimposition information to be superimposed on the image that is based on the left-eye image data and the right-eye image data is output by a disparity information output unit.

Then, a video elementary stream including, in a payload portion, the stereo image data described above and including, in a user data area of a header portion, the data of the superimposition information described above and the disparity information described above is transmitted by a transmitting unit. In this manner, the data of the superimposition information and the disparity information that are transmitted in a state of being included in the user data area of the header portion of the video elementary stream is configured to be identifiable by user data identification information.

In this manner, in the present invention, stereo image data including left-eye image data and right-eye image data for displaying a stereo image is transmitted in a state of being included in the payload portion of the video elementary stream, and, additionally, the data of the superimposition information and the disparity information are transmitted in a state of being included in the user data area of the header portion of the video elementary stream in an identifiable manner. Thus, on the receiving side, the stereo image data can be acquired and, in addition, the data of the superimposition information and the disparity information can be acquired from the video elementary stream.

On the receiving side, appropriate disparity can be given to the same superimposition information (such as closed caption information or subtitle information) to be superimposed on a left-eye image and a right-eye image using disparity information. Thus, in the display of superimposition information, the consistency in perspective between the superimposition information and each object in an image can be maintained to an optimum state.

In the present invention, for example, the disparity information may have added thereto shift target specification information specifying superimposition information to be shifted on the basis of the disparity information among superimposition information to be superimposed on an image that is based on the left-eye image data and superimposition information to be superimposed on an image that is based on the right-eye image data. With the shift target specification information, it is possible to shift only superimposition information to be superimposed on a left-eye image, shift only superimposition information to be superimposed on a right-eye image, or shift superimposition information to be superimposed on both the left-eye image and the right-eye image.

Also, in the present invention, for example, the disparity information may be disparity information that is sequentially updated in individual frames during a period of a predetermined number of frames during which the superimposition information is displayed. In this case, on the receiving side, disparity is given to superimposition information using disparity information that is sequentially updated in individual frame during a period of a predetermined number of frames during which the superimposition information is displayed, thus making it possible to dynamically change the disparity to be given to the superimposition information in accordance with the change in the content of the image.

Also, in the present invention, for example, the disparity information that is sequentially updated in individual frames may include disparity information about the first frame during the period of the predetermined number of frames, and offset information about the second and subsequent frames with respect to disparity information about preceding frames. In this case, it is possible to suppress the amount of data of the disparity information.

Also, in the present invention, for example, the disparity information may be disparity information that is commonly used in individual frames during a period of a predetermined number of frames during which the superimposition information is displayed. In this case, it is possible to greatly suppress the amount of data of the disparity information.

Also, in the present invention, for example, the disparity information may be disparity information that is commonly used in individual frames during a period of a predetermined number of frames during which the superimposition information is displayed, or disparity information that is sequentially updated in individual frames in a period of a predetermined number of frames during which the superimposition information is displayed, and the disparity information may have added thereto flag information indicating the disparity information that is commonly used in the individual frames or the disparity information that is sequentially updated in the individual frames. In this case, it is possible to selectively transmit the disparity information that is commonly used in the individual frames or the disparity information that is sequentially updated in the individual frames in accordance with, for example, the content of the image. That is, in a case where the movement of the image is large, the disparity information that is sequentially updated in the individual frames is transmitted, so that, on the receiving side, disparity to be given to the superimposition information can be dynamically changed in accordance with the change in the content of the image. Also, in a case where the movement of the image is small, the disparity information that is commonly used in the individual frames is transmitted, thus allowing suppression of the amount of data of the disparity information.

Also, another concept of the present invention resides in a stereo image data receiving apparatus comprising:

a receiving unit that receives a video elementary stream, the video elementary stream including, in a payload portion, stereo image data including left-eye image data and right-eye image data and including, in a user data area of a header portion, data of superimposition information to be superimposed on an image that is based on the left-eye image data and the right-eye image data and disparity information for giving disparity by shifting the superimposition information to be superimposed on the image that is based on the left-eye image data and the right-eye image data, the data of the superimposition information and the disparity information included in the user data area of the header portion being configured to be identifiable by user data identification information;

a stereo image data acquisition unit that acquires the stereo image data from the payload portion of the video elementary stream received by the receiving unit;

a superimposition information data acquisition unit that acquires the data of the superimposition information from the user data area of the header portion of the video elementary stream received by the receiving unit;

a disparity information acquisition unit that acquires the disparity information from the user data area of the header portion of the video elementary stream received by the receiving unit; and an image data processing unit that gives disparity to the same superimposition information to be superimposed on a left-eye image and a right-eye image using the left-eye image data and the right-eye image data included in the stereo image data acquired by the stereo image data acquisition unit, the data of the superimposition information acquired by the superimposition information data acquisition unit, and the disparity information acquired by the disparity information acquisition unit, and that obtains data of the left-eye image on which the superimposition information has been superimposed and data of the right-eye image on which the superimposition information has been superimposed.

In the present invention, a video elementary stream is received by a receiving unit. The video elementary stream contains, in a payload portion, a stereo image including left-eye image data and right-eye image data. Also, the video elementary stream contains, in a user data area of a header portion, data of superimposition information and disparity information so as to be identifiable by user data identification information.

Then, the stereo image data is acquired by a stereo image data acquisition unit from the payload portion of the video elementary stream described above. Also, the data of the superimposition information is acquired by a superimposition information data acquisition unit from the user data area of the header portion of the video elementary stream described above. Also, the disparity information is acquired by a disparity information acquisition unit from the user data area of the header portion of the video elementary stream described above. As described above, the data of the superimposition information and the disparity information are included in the user data area so as to be identifiable by user data identification information. Thus, disparity information can be favorably acquired, together with the data of the superimposition information, from the user data area on the basis of user data identification information.

The left-eye image data, the right-eye image data, the data of the superimposition information, and the disparity information are used by an image data processing unit, disparity is given to the same superimposition information to be superimposed on a left-eye image and a right-eye image, and data of the left-eye image on which the superimposition information has been superimposed and data of the right-eye image of which the superimposition information has been superimposed are obtained.

In this manner, in the present invention, appropriate disparity can be given to superimposition information (such as closed caption information or subtitle information) to be superimposed on a left-eye image and a right-eye image using disparity information suitable for the superimposition information. Therefore, in the display of superimposition information, the consistency in perspective between the superimposition information and each object in an image can be maintained to an optimum state.

Also, another concept of the present invention resides in a stereo image data transmitting apparatus including:

a stereo image data output unit that outputs stereo image data including left-eye image data and right-eye image data;

a disparity information output unit that outputs disparity information for giving disparity by shifting superimposition information to be superimposed on an image that is based on the left-eye image data and the right-eye image data; and a transmitting unit that transmits the stereo image data output from the stereo image data output unit and the disparity information output from the disparity information output unit, wherein the disparity information has added thereto shift target specification information specifying superimposition information to be shifted on the basis of the disparity information among superimposition information to be superimposed on an image that is based on the left-eye image data and superimposition information to be superimposed on an image that is based on the right-eye image data.

In the present invention, stereo image data including left-eye image data and right-eye image data is output by a stereo image data output unit. Also, disparity information for giving disparity by shifting superimposition information to be superimposed on an image that is based on the left-eye image data and the right-eye image data is output by a disparity information output unit. Here, the superimposition information means information to be superimposed on an image, such as closed caption information or subtitle information for displaying a caption.

Then, the stereo image data output from the stereo image data output unit and the disparity information output from the disparity information output unit are transmitted by a transmitting unit. In this manner, disparity information to be transmitted together with stereo image data has added thereto shift target specification information specifying superimposition information to be shifted on the basis of the disparity information among superimposition information to be superimposed on an image that is based on the left-eye image data and superimposition information to be superimposed on an image that is based on the right-eye image data.

In this manner, in the present invention, disparity information is transmitted together with left-eye image data and right-eye image data for displaying a stereo image. Thus, on the receiving side, appropriate disparity can be given to the same superimposition information (such as closed caption information or subtitle information) to be superimposed on a left-eye image and a right-eye image using disparity information. Thus, in the display of superimposition information, the consistency in perspective between the superimposition information and each object in an image can be maintained to an optimum state.

Also, in the present invention, the received disparity information has added thereto shift target specification information. Thus, on the receiving side, with the shift target specification information, it is possible to shift only superimposition information to be superimposed on a left-eye image, shift only superimposition information to be superimposed on a right-eye image, or shift superimposition information to be superimposed on both the left-eye image and the right-eye image.

Also, another concept of the present invention resides in a stereo image data receiving apparatus including:

a receiving unit that receives stereo image data including left-eye image data and right-eye image data, and disparity information for giving disparity by shifting superimposition information to be superimposed on an image that is based on the left-eye image data and the right-eye image data, the disparity information having added thereto shift target specification information specifying superimposition information to be shifted on the basis of the disparity information among superimposition information to be superimposed on an image that is based on the left-eye image data and superimposition information to be superimposed on an image that is based on the right-eye image data; and an image data processing unit that gives disparity to the same superimposition information to be superimposed on a left-eye image and a right-eye image using the left-eye image data and the right-eye image data included in the stereo image data received by the receiving unit, the disparity information received by the receiving unit, and the shift target specification information added to the disparity information, and that obtains data of the left-eye image on which the superimposition information has been superimposed and data of the right-eye image on which the superimposition information has been superimposed.

In the present invention, a stereo image including left-eye image data and right-eye image data, and disparity information are received by a receiving unit. The disparity information is designed to give disparity by shifting superimposition information to be superimposed on an image that is based on the left-eye image data and the right-eye image data. The disparity information has added thereto shift target specification information specifying superimposition information to be shifted on the basis of the disparity information among superimposition information to be superimposed on an image that is based on the left-eye image data and superimposition information to be superimposed on an image that is based on the right-eye image data.

The left-eye image data, the right-eye image data, and the disparity information are used by an image data processing unit, disparity is given to the same superimposition information to be superimposed on a left-eye image and a right-eye image, and data of the left-eye image on which the superimposition information has been superimposed and data of the right-eye image on which the superimposition information has been superimposed are obtained. In this case, shifting of only superimposition information to be superimposed on the left-eye image, shifting of only superimposition information to be superimposed on the right-eye image, or shifting of superimposition information to be superimposed on both the left-eye image and the right-eye image is performed on the basis of the shift target specification information.

In this manner, in the present invention, appropriate disparity can be given to superimposition information (such as closed caption information or subtitle information) to be superimposed on a left-eye image and a right-eye image using disparity information (with shift target specification information) suitable for the superimposition information. Therefore, in the display of superimposition information, the consistency in perspective between the superimposition information and each object in an image can be maintained to an optimum state.

Also, another concept of the present invention resides in a stereo image data transmitting apparatus including:

a stereo image data output unit that outputs stereo image data including left-eye image data and right-eye image data;

a disparity information output unit that outputs disparity information for giving disparity by shifting superimposition information to be superimposed on an image that is based on the left-eye image data and the right-eye image data; and a transmitting unit that transmits the stereo image data output from the stereo image data output unit and the disparity information output from the disparity information output unit, wherein the disparity information is disparity information that is sequentially updated in individual frames during a period of a predetermined number of frames during which the superimposition information is displayed.

In the present invention, stereo image data including left-eye image data and right-eye image data is output by a stereo image data output unit. Also, disparity information for giving disparity by shifting superimposition information to be superimposed on an image that is based on the left-eye image data and the right-eye image data is output by a disparity information output unit. Here, the superimposition information means information to be superimposed on an image, such as closed caption information or subtitle information for displaying a caption.

Then, the stereo image data output from the stereo image data output unit and the disparity information output from the disparity information output unit are transmitted by a transmitting unit. In this manner, disparity information transmitted together with stereo image data serves as disparity information that is sequentially updated in individual frame during a period of a predetermined number of frames during which the superimposition information is displayed.

In this manner, in the present invention, disparity information is transmitted together with left-eye image data and right-eye image data for displaying a stereo image. Thus, on the receiving side, appropriate disparity can be given to the same superimposition information (such as closed caption information or subtitle information) to be superimposed on a left-eye image and a right-eye image using disparity information. Thus, in the display of superimposition information, the consistency in perspective between the superimposition information and each object in an image can be maintained to an optimum state.

Also, in the present invention, the received disparity information serves as disparity information that is sequentially updated in individual frames during a period of a predetermined number of frames during which the superimposition information is displayed. Thus, on the receiving side, disparity can be given to superimposition information using disparity information that is sequentially updated in individual frames during a period of a predetermined number of frames during which the superimposition information is displayed. Therefore, it is possible to dynamically change disparity to be given to superimposition information in accordance with the change in the content of the image.

In the present invention, for example, the disparity information that is sequentially updated in the individual frames may include disparity information about the first frame during a period of a predetermined number of frames, and offset information about the second and subsequent frames with respect to disparity information about the preceding frames. In this case, it is possible to suppress the amount of data of the disparity information.

Also, another concept of the present invention resides in a stereo image data receiving apparatus including:

a receiving unit that receives stereo image data including left-eye image data and right-eye image data, and disparity information for giving disparity by shifting superimposition information to be superimposed on an image that is based on the left-eye image data and the right-eye image data, the disparity information being disparity information that is sequentially updated in individual frames during a period of a predetermined number of frames during which the superimposition information is displayed; and an image data processing unit that gives disparity to the same superimposition information to be superimposed on a left-eye image and a right-eye image using the left-eye image data and the right-eye image data included in the stereo image data received by the receiving unit and the disparity information received by the receiving unit, and that obtains data of the left-eye image on which the superimposition information has been superimposed and data of the right-eye image on which the superimposition information has been superimposed.

In the present invention, a stereo image including left-eye image data and right-eye image data, and disparity information are received by a receiving unit. The disparity information is designed to give disparity by shifting superimposition information to be superimposed on an image that is based on the left-eye image data and the right-eye image data. The disparity information serves as disparity information that is sequentially updated in individual frames during a period of a predetermined number of frames during which the superimposition information is displayed.

The left-eye image data, the right-eye image data, and the disparity information are used by an image data processing unit, disparity is given to the same superimposition information to be superimposed on a left-eye image and a right-eye image, and data of the left-eye image on which the superimposition information has been superimposed and data of the right-eye image on which the superimposition information has been superimposed are obtained.

In this manner, in the present invention, appropriate disparity can be given to superimposition information (such as closed caption information or subtitle information) to be superimposed on a left-eye image and a right-eye image using disparity information (with shift target specification information) suitable for the superimposition information. Therefore, in the display of superimposition information, the consistency in perspective between the superimposition information and each object in an image can be maintained to an optimum state. Also, in the present invention, disparity can be given to superimposition information using disparity information that is sequentially updated in individual frames during a period of a predetermined number of frames during which the superimposition information is displayed. Therefore, it is possible to dynamically change disparity to be given to superimposition information in accordance with the change in the content of the image.

Also, another concept of the present invention resides in a stereo image data transmitting apparatus including:

a stereo image data output unit that outputs stereo image data including left-eye image data and right-eye image data;

a disparity information output unit that outputs disparity information for giving disparity by shifting superimposition information to be superimposed on an image that is based on the left-eye image data and the right-eye image data; and a transmitting unit that transmits the stereo image data output from the stereo image data output unit and the disparity information output from the disparity information output unit, wherein the disparity information is disparity information that is commonly used in individual frames during a period of a predetermined number of frames during which the superimposition information is displayed, and wherein the disparity information has added thereto information indicating the disparity information that is commonly used in the individual frames or the disparity information that is sequentially updated in the individual frames.

In the present invention, stereo image data including left-eye image data and right-eye image data is output by a stereo image data output unit. Also, disparity information for giving disparity by shifting superimposition information to be superimposed on an image that is based on the left-eye image data and the right-eye image data is output by a disparity information output unit. Here, the superimposition information means information to be superimposed on an image, such as closed caption information or subtitle information for displaying a caption.

Then, the stereo image data output from the stereo image data output unit and the disparity information output from the disparity information output unit are transmitted by a transmitting unit. In this manner, disparity information transmitted together with stereo image data serves as disparity information that is commonly used in individual frames during a period a predetermined number of frames during which the superimposition information is displayed.

In this manner, in the present invention, disparity information is transmitted together with left-eye image data and right-eye image data for displaying a stereo image. Thus, on the receiving side, appropriate disparity can be given to the same superimposition information (such as closed caption information or subtitle information) to be superimposed on a left-eye image and a right-eye image using disparity information. Thus, in the display of superimposition information, the consistency in perspective between the superimposition information and each object in an image can be maintained to an optimum state.

Also, in the present invention, the received disparity information serves as disparity information that is commonly used in individual frames during a period of a predetermined number of frames during which the superimposition information is displayed. Thus, it is possible to greatly suppress the amount of data of the disparity information.

Also, another concept of the present invention resides in a stereo image data receiving apparatus including:

a receiving unit that receives stereo image data including left-eye image data and right-eye image data, and disparity information for giving disparity by shifting superimposition information to be superimposed on an image that is based on the left-eye image data and the right-eye image data, the disparity information being disparity information that is commonly used in individual frames during a period of a predetermined number of frames during which the superimposition information is displayed; and an image data processing unit that gives disparity to the same superimposition information to be superimposed on a left-eye image and a right-eye image using the left-eye image data and the right-eye image data included in the stereo image data received by the receiving unit and the disparity information received by the receiving unit, and that obtains data of the left-eye image on which the superimposition information has been superimposed and data of the right-eye image on which the superimposition information has been superimposed.

In the present invention, a stereo image including left-eye image data and right-eye image data, and disparity information are received by a receiving unit. The disparity information is designed to give disparity by shifting superimposition information to be superimposed on an image that is based on the left-eye image data and the right-eye image data. The disparity information serves as disparity information that is commonly used in individual frames during a period of a predetermined number of frames during which the superimposition information is displayed.

The left-eye image data, the right-eye image data, and the disparity information are used by an image data processing unit, disparity is given to the same superimposition information to be superimposed on a left-eye image and a right-eye image, and data of the left-eye image on which the superimposition information has been superimposed and data of the right-eye image on which the superimposition information has been superimposed are obtained.

In this manner, in the present invention, appropriate disparity can be given to superimposition information (such as closed caption information or subtitle information) to be superimposed on a left-eye image and a right-eye image using disparity information (with shift target specification information) suitable for the superimposition information. Therefore, in the display of superimposition information, the consistency in perspective between the superimposition information and each object in an image can be maintained to an optimum state. Also, in the present invention, disparity information that is commonly used in individual frames during a period of a predetermined number of frames during which the superimposition information is displayed is used. Thus, the processing load can be reduced, and the capacity of a memory that stores the disparity information can be suppressed.

Also, another concept of the present invention resides in a stereo image data transmitting apparatus comprising:

a stereo image data output unit that outputs stereo image data including left-eye image data and right-eye image data;

a disparity information output unit that outputs disparity information by shifting superimposition information to be superimposed on an image that is based on the left-eye image data and the right-eye image data; and a transmitting unit that transmits the stereo image data output from the stereo image data output unit and the disparity information output from the disparity information output unit, wherein the disparity information is disparity information that is commonly used in individual frames during a period of a predetermined number of frames during which the superimposition information is displayed, or disparity information that is sequentially updated in individual frames during a period of a predetermined number of frames during which the superimposition information is displayed, and wherein the disparity information has added thereto flag information indicating the disparity information that is commonly used in the individual frames or the disparity information that is sequentially updated in the individual frames.

In the present invention, stereo image data including left-eye image data and right-eye image data is output by a stereo image data output unit. Also, disparity information for giving disparity by shifting superimposition information to be superimposed on an image that is based on the left-eye image data and the right-eye image data is output by a disparity information output unit. Here, the superimposition information means information to be superimposed on an image, such as closed caption information or subtitle information for displaying a caption.

Then, the stereo image data output from the stereo image data output unit and the disparity information output from the disparity information output unit are transmitted by a transmitting unit. In this manner, disparity information transmitted together with stereo image data serves as disparity information that is commonly used in individual frames during a period of a predetermined number of frames during which the superimposition information is displayed, or disparity information that is sequentially updated in individual frames during a period of a predetermined number of frames during which the superimposition information is displayed. Then, the disparity information has added thereto flag information indicating the disparity information that is commonly used in the individual frames or the disparity information that is sequentially updated in the individual frames.

In this manner, in the present invention, disparity information is transmitted together with left-eye image data and right-eye image data for displaying a stereo image. Thus, on the receiving side, appropriate disparity can be given to the same superimposition information (such as closed caption information, subtitle information) to be superimposed on a left-eye image and a right-eye image using disparity information. Thus, in the display of superimposition information, the consistency in perspective between the superimposition information and each object in an image can be maintained to an optimum state.

Also, in the present invention, it is possible to selectively transmit the disparity information that is commonly used in the individual frames or the disparity information that is sequentially updated in the individual frames in accordance with, for example, the content of the image. That is, in a case where the movement of the image is large, the disparity information that is sequentially updated in the individual frames is transmitted, and, on the receiving side, disparity to be given to the superimposition information can be dynamically changed in accordance with the change in the content of the image. Also, in a case where the movement of the image is small, the disparity information that is commonly used in the individual frames is transmitted, thus allowing suppression of the amount of data of the disparity information.

Also, another concept of the present invention resides in a stereo image data receiving apparatus comprising:

a receiving unit that receives stereo image data including left-eye image data and right-eye image data, and disparity information for giving disparity by shifting superimposition information to be superimposed on an image that is based on the left-eye image data and the right-eye image data, the disparity information being disparity information that is commonly used in individual frames during a period of a predetermined number of frames during which the superimposition information is displayed, or disparity information that is sequentially updated in individual frames during a period of a predetermined number of frames during which the superimposition information is displayed, the disparity information having added thereto flag information indicating the disparity information that is commonly used in the individual frames or the disparity information that is sequentially updated in the individual frames; and an image data processing unit that gives disparity to the same superimposition information to be superimposed on a left-eye image and a right-eye image using the left-eye image data and the right-eye image data included in the stereo image data received by the receiving unit, the disparity information received by the receiving unit, and the flag information added to the disparity information, and that obtains data of the left-eye image on which the superimposition information has been superimposed and data of the right-eye image on which the superimposition information has been superimposed.

In the present invention, a stereo image including left-eye image data and right-eye image data, and disparity information are received by a receiving unit. The disparity information is designed to give disparity by shifting superimposition information to be superimposed on an image that is based on the left-eye image data and the right-eye image data. The disparity information is disparity information that is commonly used in individual frames during a period of a predetermined number of frames during which the superimposition information is displayed, or disparity information that is sequentially updated in individual frames during a period of a predetermined number of frames during which the superimposition information is displayed, and the disparity information has added thereto flag information indicating the disparity information that is commonly used in the individual frames or the disparity information that is sequentially updated in the individual frames.

The left-eye image data, the right-eye image data, and the disparity information are used by an image data processing unit, disparity is given to the same superimposition information to be superimposed on a left-eye image and a right-eye image, and data of the left-eye image on which the superimposition information has been superimposed and data of the right-eye image on which the superimposition information has been superimposed are obtained. In this manner, in the present invention, appropriate disparity can be given to superimposition information (such as closed caption information or subtitle information) to be superimposed on a left-eye image and a right-eye image using disparity information suitable for the superimposition information. Therefore, in the display of superimposition information, the consistency in perspective between the superimposition information and each object in an image can be maintained to an optimum state.

Also, in the present invention, disparity information that is commonly used in individual frames or disparity information that is sequentially updated in individual frames is received. Which of them has been received can be determined using flag information. Then, in a case where the received disparity information is the disparity information that is sequentially updated in the individual frames, it is possible to dynamically change disparity to be given to superimposition information in accordance with the change in the content of the image. Also, in a case where the received disparity information is the disparity information that is commonly used in the individual frames, the processing load can be reduced, and, additionally, the capacity of a memory that stores the disparity information can be suppressed.

Advantageous Effects of Invention

According to the present invention, appropriate disparity can be given to superimposition information (such as closed caption information, subtitle information, graphics information, or text information) to be superimposed on a left-eye image and a right-eye image using a disparity information set suitable for the superimposition information, and, in the display of the superimposition information, the consistency in perspective between the superimposition information and each objet in an image can be maintained to an optimum state.

BRIEF DESCRIPTION OF DRAWINGS

FIG. 3 is a diagram illustrating image data of a 1920× 1080p pixel format.

FIG. 4 includes diagrams describing the "Top & Bottom" method, the "Side By Side" method, and the "Frame Sequential" method that are transmission methods of stereo image data (3D image data).

FIG. 7 includes diagrams illustrating an example of a disparity vector VV at a predetermined position in an image, which is detected by a disparity vector detection unit.

FIG. 8 is a diagram illustrating the transmission content of disparity vectors.

FIG. 9 includes diagrams illustrating an example of disparity detection blocks and the transmission content of disparity vectors in this case.

FIG. 10 includes diagrams describing an example of the timing for detecting and transmitting disparity vectors.

FIG. 25 includes diagrams illustrating an example of a downsizing process performed in a disparity information set creation unit of a transmission data generation unit.

FIG. 27 is a diagram describing a disparity sequence ID (Disparity_Sequence_id).

FIG. 29 is a diagram illustrating that a set of a plurality of disparity information sets (Packed Disparity Set) corresponding to image data of each certain period of the image data is collectively transmitted in the case (1), and the like.

FIG. 31 is a diagram illustrating that a set of a plurality of disparity information sets (Packed Disparity Set) corresponding to image data of each certain period of the image data is collectively transmitted in the case (2), and the like.

FIG. 32 is a diagram illustrating an example of information (Component_Linked_Info) for association between a component element ID and a disparity vector.

FIG. 33 is a diagram illustrating that a set of a plurality of disparity information sets (Packed Disparity Set) corresponding to image data of each certain period of the image data is collectively transmitted in the case (2), and the like.

FIG. 34 is a diagram illustrating an example of information (Component_Linked_Info) for association between a component element ID and a disparity vector.

FIG. 36 is a diagram illustrating that a set of a plurality of disparity information sets (Packed Disparity Set) corresponding to image data of each certain period of the image data is collectively transmitted in the case (3), and the like.

FIG. 37 is a diagram illustrating an example of information (Component_Linked_Info) for association between a component element ID and a disparity vector.

FIG. 39 is a diagram illustrating that a set of a plurality of disparity information sets (Packed Disparity Set) corresponding to image data of each certain period of the image data is collectively transmitted in the case (4), and the like.

FIG. 41 is a diagram schematically illustrating an example structure of a video elementary stream.

FIG. 42 includes diagrams illustrating an example configuration of user data in the MPEG2, H.264 AVC, and VC-1 encoding methods.

FIG. 43 is a diagram illustrating an example configuration of a disparity linkage descriptor (Disparity_Linkage_Descriptor) that associates a disparity sequence ID (Disparity_Sequence_id) with a service.

FIG. 44 is a diagram illustrating the content of each piece of information in the disparity linkage descriptor (Disparity_Linkage_Descriptor).

FIG. 45 includes diagrams illustrating an example of PIDs in a case where a disparity information set is sent to the receiving side in a state of being inserted in a user data area of an image data stream and in a case where a disparity-vector elementary stream (PES) including a disparity information set is multiplexed with other streams and is transmitted to the receiving side.

FIG. 51 is a diagram illustrating an example of the detailed configuration of user data including disparity information (Disparity_Information).

FIG. 52 is a diagram illustrating an example configuration of disparity information (Disparity_Information).

FIG. 53 is a diagram illustrating the configuration of DSL (Disparity_Information_Link_Information) included in disparity information data (Disparity_Information_Data).

FIG. 54 is a diagram illustrating the configuration of DHI (Disparity_Header_Information) included in disparity information data (Disparity_Information_Data).

FIG. 55 is a diagram illustrating the configuration of DHI (Disparity_Header_Information) included in disparity information data (Disparity_Information_Data).

FIG. 56 is a diagram illustrating the configuration of DDS (Disparity Data Set) included in disparity information data (Disparity_Information_Data).

FIG. 57 is a diagram illustrating the content of each piece of information in DSL, DHI, and DDS.

FIG. 58 is a diagram illustrating the content of each piece of information in DSL, DHI, and DDS.

FIG. 59 is a diagram illustrating the content of each piece of information in DSL, DHI, and DDS.

FIG. 60 is a diagram illustrating the content of each piece of information in DSL, DHI, and DDS.

FIG. 61 includes diagrams describing information "Partition" included in DHI.

FIG. 64 is a diagram illustrating an example of the detailed configuration of user data including disparity information.

FIG. 65 is a diagram illustrating the content of each piece of information in the detailed configuration of user data including disparity information.

FIG. 66 is a diagram illustrating an example of the detailed configuration of disparity information.

FIG. 67 is a diagram illustrating the content of each piece of information in the detailed configuration of disparity information.

FIG. 68 is a diagram illustrating the content of each piece of information in the detailed configuration of disparity information.

FIG. 69 is a diagram illustrating a calculation example of the amount of data (data size) in the configuration of disparity information.

FIG. 77 includes diagrams describing that a disparity vector corresponding to its superimposed position among disparity vectors detected at a plurality of positions in an image is used as a disparity vector.

FIG. 99 is a diagram illustrating an example structure of TMDS transmission data (in a case where image data having 1920 pixels in the horizontal direction and 1080 lines in the vertical direction is transmitted).

FIG. 100 is a diagram illustrating a pin array (type A) of HDMI terminals of the source device and the sink device between which an HDMI cable is connected.

FIG. 102 is a diagram illustrating an example data structure of a Vender Specific area (HDMI Vendor Specific Data Block).

DESCRIPTION OF EMBODIMENTS

Hereinafter, a mode for carrying out the invention (hereinafter, referred to as an "embodiment") will be described. Note that the description will be given in the following order.

1. Embodiment
2. Example modifications

<1. Embodiment>

[Example Configuration of Stereo Image Display System]

Figure 1:
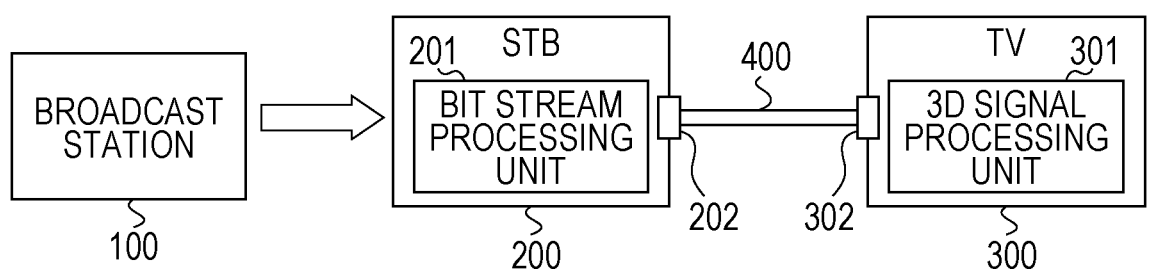
FIG. 1 is a block diagram illustrating an example configuration of a stereo image display system as an embodiment of the present invention.

FIG. 1 illustrates an example configuration of a stereo image display system 10 as an embodiment. The stereo image display system 10 includes a broadcast station 100, a set-top box (STB: Set Top Box) 200, and a television receiver 300.

The set-top box 200 and the television receiver 300 are connected to each other via an HDMI (High Definition Multimedia Interface) cable 400. The set-top box 200 is provided with an HDMI terminal 202. The television receiver 300 is provided with an HDMI terminal 302. One of the HDMI cable 400 is connected to the HDMI terminal 202 of the set-top box 200, and the other end of the HDMI cable 400 is connected to the HDMI terminal 302 of the television receiver 300.

[Description of Broadcast Station]

The broadcast station 100 transmits bit stream data carried on a broadcast wave. The bit stream data contains stereo image data including left-eye image data and right-eye image data, audio data, and superimposition information data, and also contains disparity information (disparity vectors) and the like. Here, the superimposition information data is closed caption data, subtitle data, graphics data, text data, or the like.

[Example Configuration of Transmission Data Generation Unit]

Figure 2:
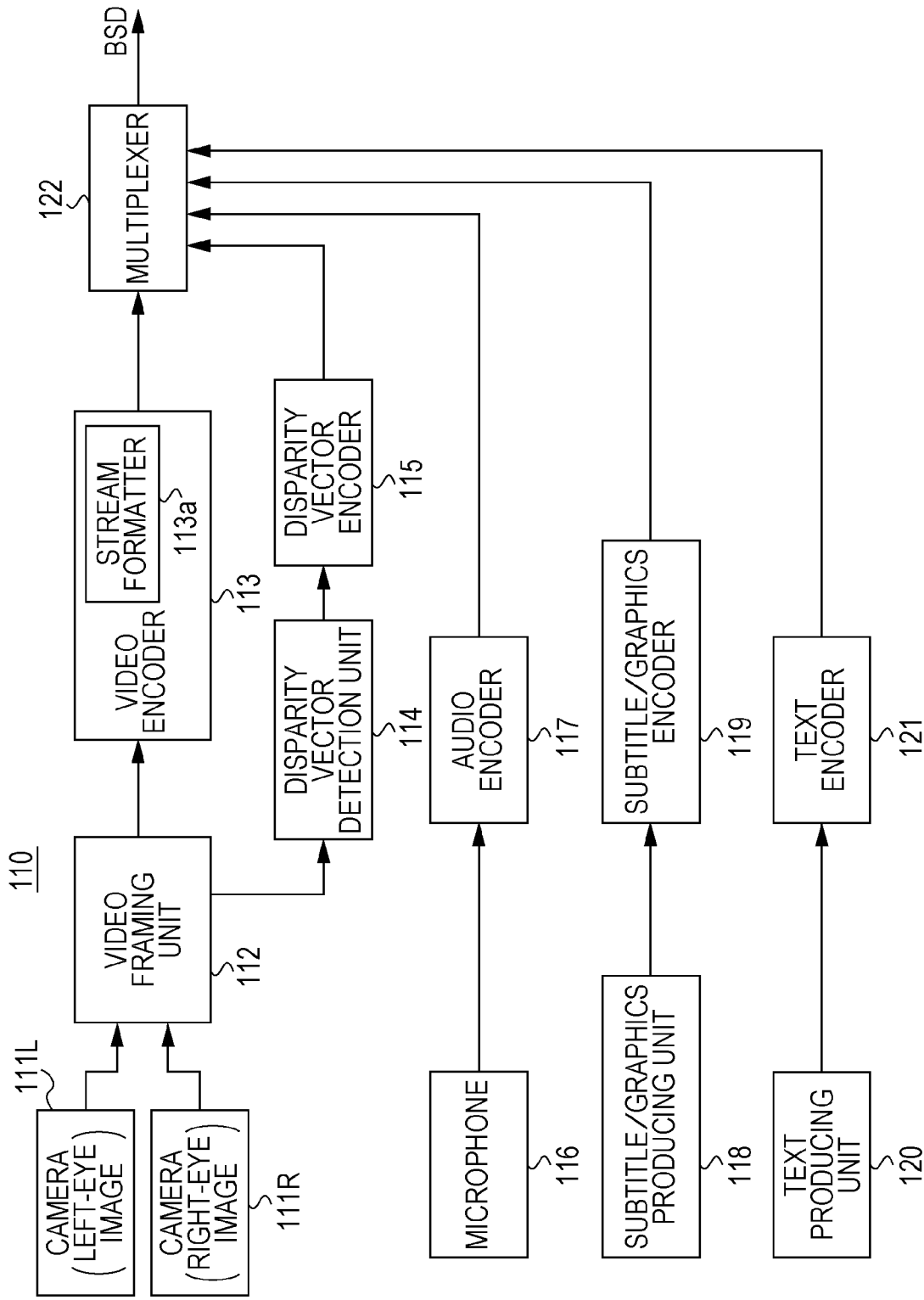
FIG. 2 is a block diagram illustrating an example configuration of a transmission data generation unit in a broadcast station.

FIG. 2 illustrates an example configuration of a transmission data generation unit 110 in the broadcast station 100 that generates the bit stream data described above. This example configuration is an example of transmitting a disparity vector as numerical information. The transmission data generation unit 110 includes cameras 111L and 111R, a video framing unit 112, a video encoder 113, a disparity vector detection unit 114, and a disparity vector encoder 115.

Also, the transmission data generation unit 110 includes a microphone 116, an audio encoder 117, a subtitle/graphics producing unit 118, a subtitle/graphics encoder 119, a text producing unit 120, a text encoder 121, and a multiplexer 122. Note that in this embodiment, it is assumed that the text producing unit 120 also functions as a closed caption data producing unit. The closed caption data is text data for caption display of a closed caption.

The camera 111L captures a left-eye image and obtains left-eye image data for stereo image display. The camera 111R captures a right-eye image and obtains right-eye image data for stereo image display. The video framing unit 112 modifies and processes the left-eye image data obtained by the camera 111L and the right-eye image data obtained by the camera 111R into a state according to the transmission method.

[Example of Transmission Method of Stereo Image Data]

While the following first to third methods are given here as transmission methods of stereo image data (3D image data), any other transmission method may be used. The description will be given here in the context of a case where, as illustrated in FIG. 3, image data for each of the left eye (L) and the right eye (R) is image data having a determined resolution, for example, a 1920×1080p pixel format, by way of example.

A first transmission method is the "Top & Bottom" method that is a method in which, as illustrated in FIG. 4(a), data of each line of the left-eye image data is transmitted in the first half in the vertical direction and data of each line of the left-eye image data is transmitted in the second half in the vertical direction. In this case, since the lines of the left-eye image data and right-eye image data are decimated to ½, the vertical resolution is one half that of the original signal.

A second transmission method is the "Side By Side" method that is a method in which, as illustrated in FIG. 4(b), pixel data of the left-eye image data is transmitted in the first half in the horizontal direction and pixel data of the right-eye image data is transmitted in the second half in the horizontal direction. In this case, the pixel data in the horizontal direction of each of the left-eye image data and the right-eye image data is decimated to ½. The horizontal resolution is one half the current signal.

A third transmission method is the "Frame Sequential" method that is a method in which, as illustrated in FIG. 4(c), the left-eye image data and the right-eye image data are transmitted while being sequentially switched every field.

Referring back to FIG. 2, the video encoder 113 performs encoding using MPEG4-AVC, MPEG2, VC-1, or the like on the stereo image data modified and processed by the video framing unit 112 to obtain encoded video data. Also, the video encoder 113 includes a stream formatter 113a in the rear stage thereof. The stream formatter 113a allows the generation of an elementary stream of video including the encoded video data in the payload portion.

The disparity vector detection unit 114 detects a disparity vector that is disparity information about one of a left-eye image and a right-eye image with respect to the other at a predetermined position in an image on the basis of the left-eye image data and the right-eye image data. Here, a predetermined position in an image includes all pixel positions, a representative position of each area formed of a plurality of pixels, a representative position of an area where superimposition information, here, graphic information or text information, is to be superimposed, or the like.

[Detection of Disparity Vector]

Figure 5:
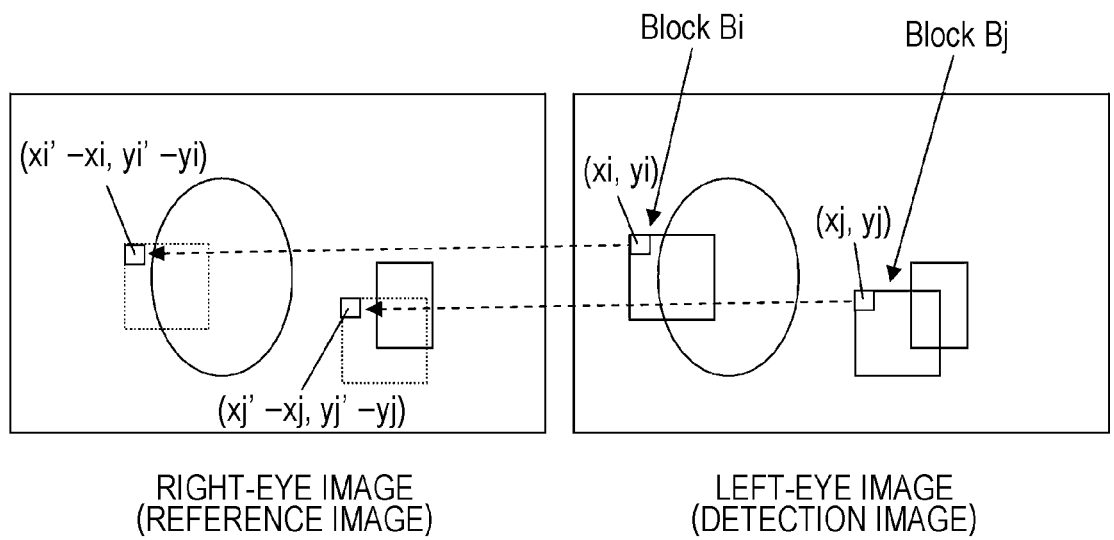
FIG. 5 is a diagram describing an example of detecting a disparity vector of a right-eye image with respect to a left-eye image.

An example of detection of a disparity vector will be described. The description will be given here of an example of detecting a disparity vector of a right-eye image with respect to a left-eye image. As illustrated in FIG. 5, it is assumed that the left-eye image is a detection image and the right-eye image is a reference image. In this example, disparity vectors at positions (xi, yi) and (xj, yj) are detected.

A case where a disparity vector at the position (xi, yi) is detected will be described by way of example. In this case, for example, an 8×8 or 16×16 pixel block (disparity detection block) Bi whose upper left pixel is at the position (xi, yi) is set in the left-eye image. Then, a pixel block that matches the pixel block Bi is searched for in the right-eye image.

In this case, a search range centered on the position (xi, yi) is set in the right-eye image, and, for example, an 8×8 or 16×16 comparison block, which is similar to the pixel block Bi described above, is sequentially set using each of the pixels in the search range as the pixel of interest.

Figure 6:
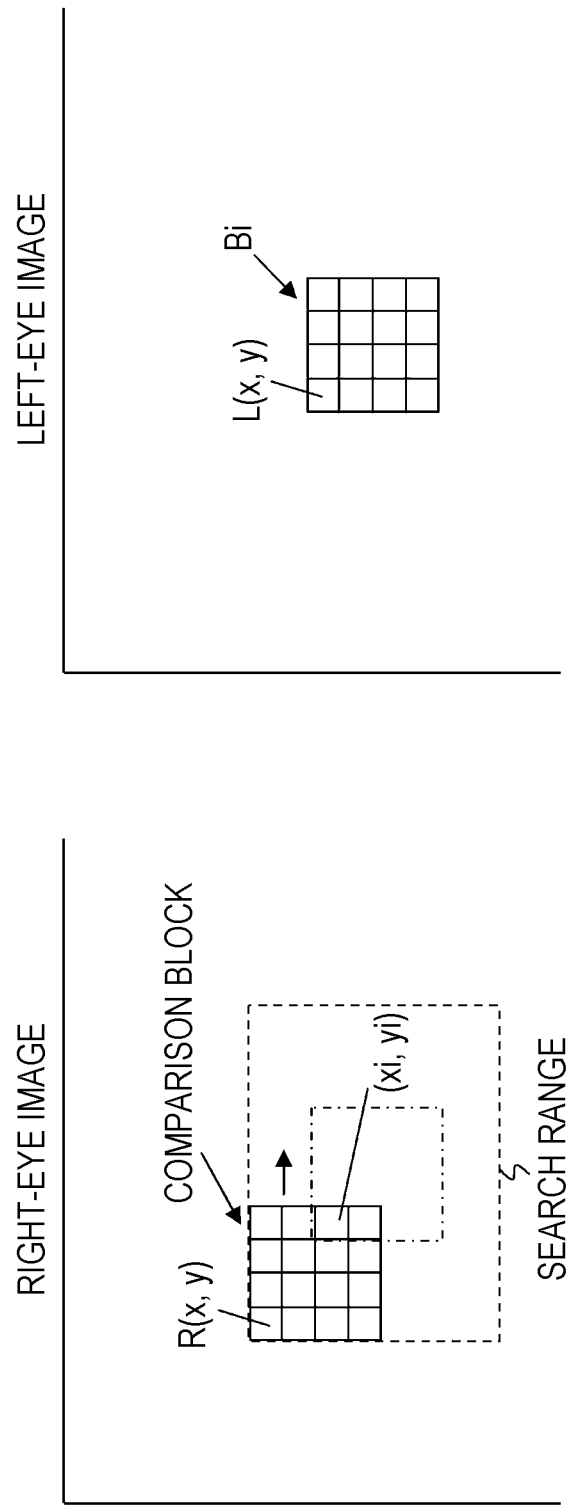
FIG. 6 is a diagram describing that a disparity vector is determined using a block matching method.

The sum total of the absolute difference values between the pixel block Bi and each of the comparison blocks sequentially set is determined for each corresponding pixel. Here, as illustrated in FIG. 6, when a pixel value of the pixel block Bi is denoted by L(x, y) and a pixel value of a comparison block is denoted by R(x, y), the sum total of the absolute difference value between the pixel block Bi and a certain comparison block is represented by $\Sigma |L(x, y) - R(x, y)|$.

When a search range set in the right-eye image includes n pixels, n sum totals S1 to Sn are finally determined, and the minimum sum total 5 min among them is selected. Then, the position of (xi', yi') the upper left pixel of the comparison block for which the sum total 5 min is obtained is obtained. Accordingly, the disparity vector at the position (xi, yi) is detected in a manner such as (xi'−xi, yi'−yi). The disparity vector at the position (xj, yj) is also detected using similar processing steps by setting in the left-eye image, for example, an 8×8 or 16×16 pixel block Bj whose upper left pixel is at the position (xj, yj) although the detailed description is omitted.

FIG. 7(a) illustrates an example of a disparity vector VV at a predetermined position in an image, which is detected by the disparity vector detection unit 114. This case means that, as illustrated in FIG. 7(b), at the predetermined position in the image, the left-eye image (detection image) which is shifted by the disparity vector VV overlaps the right-eye image (reference image).

Referring back to FIG. 2, the disparity vector encoder 115 generates a disparity-vector elementary stream including the disparity vector detected by the disparity vector detection unit 114 and the like. Here, a disparity-vector elementary stream includes the following content. That is, an ID (ID_Block), vertical position information (Vertical_Position), horizontal position information (Horizontal_Position), and a disparity vector (View_Vector) are set as one set. Then, this set is repeated N times, the number of which is equal to the number of disparity detection blocks.

FIG. 8 illustrates the transmission content of disparity vectors. A disparity vector includes a vertical direction component (View_Vector_Vertical) and a horizontal direction component (View_Vector_Horizontal). Note that the vertical and horizontal positions of a disparity detection block are offset values in the vertical direction and the horizontal direction from the upper left origin of the image to the upper left pixel of the block. The ID of a disparity detection block is assigned to the transmission of each disparity vector in order to ensure a link to the pattern of superimposition information to be superimposed and displayed on the image, such as closed caption information, subtitle information, graphics information, or text information.

Note that in the example of FIG. 8, horizontal and vertical disparity vectors (disparity information) are represented by 16-bit information. However, the number of bits of the disparity vectors (disparity information) is not to be limited to 16 bits. An appropriate number of bits, such as 8 bits, described below, can be used in accordance with the display size, the disparity to be given, or the like.

For example, as illustrated in FIG. 9(a), when disparity detection blocks A to F are present, as illustrated in FIG. 9(b), the transmission content includes the IDs of the disparity detection blocks A to F, vertical and horizontal position information, and disparity vectors. For example, in FIG. 9(b), for the disparity detection block A, ID 2 indicates the ID of the disparity detection block A, (Ha, Va) indicates the vertical and horizontal position information of the disparity detection block A, and disparity vector a indicates the disparity vector of the disparity detection block A.

Here, the timing for detecting and transmitting disparity vectors will be described. Regarding the timing, for example, the following first to fourth examples are conceivable.

In the first example, as illustrated in FIG. 10(a), the timing is synchronized with the encoding of pictures. In this case, the disparity vectors are transmitted in units of pictures. The unit of picture is the smallest unit for the transmission of disparity vectors. In the second example, as illustrated in FIG. 10(b), the timing is synchronized with the scenes of video. In this case, the disparity vectors are transmitted in units of scenes.

Figure 11:
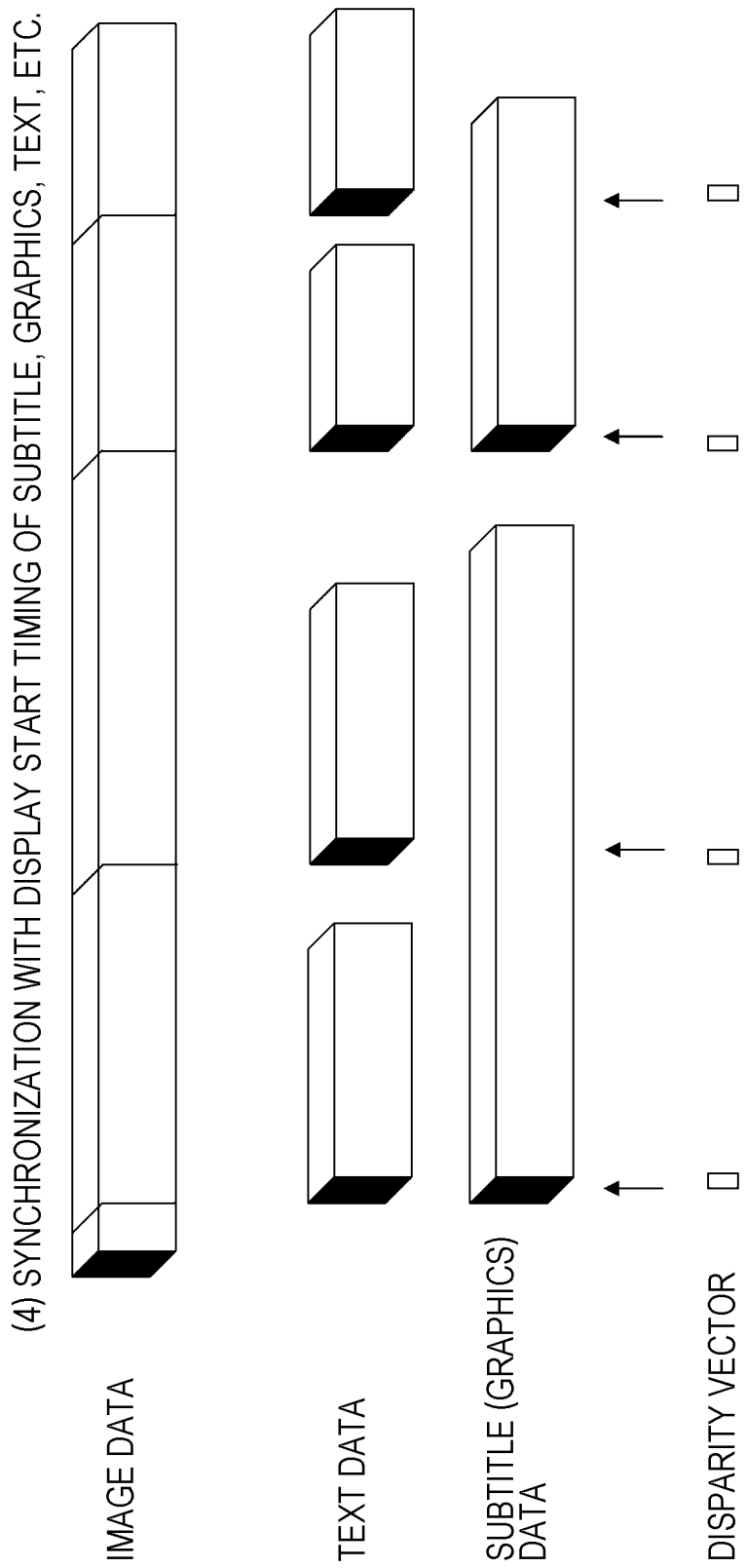
FIG. 11 is a diagram describing an example of the timing for detecting and transmitting disparity vectors.

In the third example, as illustrated in FIG. 10(c), the timing is synchronized with the I-pictures (Intra pictures) or GOPs (Groups Of Pictures) of encoded video. In the fourth example, as illustrated in FIG. 11, the timing is synchronized with the timing at which the display of subtitle information, graphics information, text information, or the like to be superimposed and displayed on an image is started.

Referring back to FIG. 2, the microphone 116 detects audio corresponding to images photographed using the cameras 111L and 111R, and obtains audio data. The audio encoder 117 performs encoding using MPEG-2 Audio AAC or the like on the audio data obtained by the microphone 116, and generates an elementary stream of audio.

The subtitle/graphics producing unit 118 produces data of subtitle information or graphics information (subtitle data, graphics data) to be superimposed on the image. The subtitle information is, for example, a caption. Also, the graphics information is, for example, a logo or the like. The subtitle data and the graphics data are bitmap data. The subtitle data and the graphics data have added thereto idling offset information indicating the superimposed position on the image.

The idling offset information indicates offset values in the vertical direction and horizontal direction from, for example, the upper left origin of the image to the upper left pixel at the superimposed position of the subtitle information or the graphics information. Note that the standard by which caption data is transmitted as bitmap data has been standardized as DVB_Subtitling by DVB, which is a digital broadcast standard in Europe, and is in operation.

The subtitle/graphic encoder 119 receives, as an input, the data of subtitle information or graphics information (subtitle data, graphics data) produced by the subtitle/graphics producing unit 118. Then, the subtitle/graphic encoder 119 generates an elementary stream including these pieces of data in the payload portion.

The text producing unit 120 produces data of text information (text data) to be superimposed on the image. The text information is, for example, an electronic program guide, the content of broadcast teletext, or the like. Similarly to the graphics data described above, the text data has added thereto idling offset information indicating the superimposed position on the image. The idling offset information indicates, for example, offset values in the vertical direction and horizontal direction from the upper left origin of the image to the upper left pixel at the superimposed position of the text information. Note that examples of the transmission of text data include EPG that is in operation for program reservation, and CC_data (Closed Caption) in ATSC, which is a digital terrestrial standard in the U.S.

The text encoder 121 receives, as an input, the text data text produced by the producing unit 120. Then, the text encoder 121 generates an elementary stream including these pieces of data in the payload portion.

The multiplexer 122 multiplexes packetized elementary streams output from the encoders 113, 115, 117, 119, and 121. Then, the multiplexer 122 outputs bit stream data (transport stream) BSD as transmission data.

The operation of the transmission data generation unit 110 illustrated in FIG. 2 will be described briefly. In the camera 111L, a left-eye image is photographed. Left-eye image data for stereo image display, which is obtained by the camera 111L, is supplied to the video framing unit 112. Also, in the camera 111R, a right-eye image is photographed. Right-eye image data for stereo image display, which is obtained by the camera 111R, is supplied to the video framing unit 112. In the video framing unit 112, the left-eye image data and the right-eye image data are modified and processed into a state according to the transmission method, and stereo image data is obtained (see FIGS. 4(a) to 4(c)).

The stereo image data obtained by the video framing unit 112 is supplied to the video encoder 113. In the video encoder 113, encoding using MPEG4-AVC, MPEG2, VC-1, or the like is performed on the stereo image data, and a video elementary stream including the encoded video data is generated. The video elementary stream is supplied to the multiplexer 122.

Also, the left-eye image data and the right-eye image data obtained by the cameras 111L and 111R are supplied to the disparity vector detection unit 114 through the video framing unit 112. In the disparity vector detection unit 114, a disparity detection block is set at a predetermined position in an image on the basis of the left-eye image data and the right-eye image data, and a disparity vector that is disparity information about one of a left-eye image and a right-eye image with respect to the other is detected.

A disparity vector at a predetermined position in an image, which is detected by the disparity vector detection unit 114, is supplied to the disparity vector encoder 115. In this case, the ID of a disparity detection block, the vertical position information of the disparity detection block, the horizontal position information of the disparity detection block, and a disparity vector are passed as one set. In the disparity vector encoder 115, a disparity vector elementary stream including the transmission content of disparity vectors (see FIG. 8) is generated. The disparity vector elementary stream is supplied to the multiplexer 122.

Also, in the microphone 116, audio corresponding to the images photographed using the cameras 111L and 111R is detected. Audio data obtained by the microphone 116 is supplied to the audio encoder 117. In the audio encoder 117, encoding using MPEG-2 Audio AAC or the like is performed on the audio data, and an audio elementary stream including the encoded audio data is generated. The audio elementary stream is supplied to the multiplexer 122.

Also, in the subtitle/graphics producing unit 118, data of subtitle information or graphics information (subtitle data, graphics data) to be superimposed on an image is produced. This data (bitmap data) is supplied to the subtitle/graphic encoder 119. The subtitle/graphics data has added thereto idling offset information indicating the superimposed position on the image. In the subtitle/graphics encoder 119, predetermined encoding is performed on the graphics data, and an elementary stream the encoded data is generated. The elementary stream is supplied to the multiplexer 122.

Also, in the text producing unit 120, data of text information (text data) to be superimposed on the image is produced. The text data is supplied to the text encoder 121. Similarly to the graphics data described above, the text data has added thereto idling offset information indicating the superimposed position on the image. In the text encoder 121, predetermined encoding is performed on the text data, and an elementary stream including the encoded data is generated. The elementary stream is supplied to the multiplexer 122.

In the multiplexer 122, the packets of the elementary streams supplied from the respective encoders are multiplexed, and bit stream data (transport stream) BSD serving as transmission data is obtained.

Figure 12:
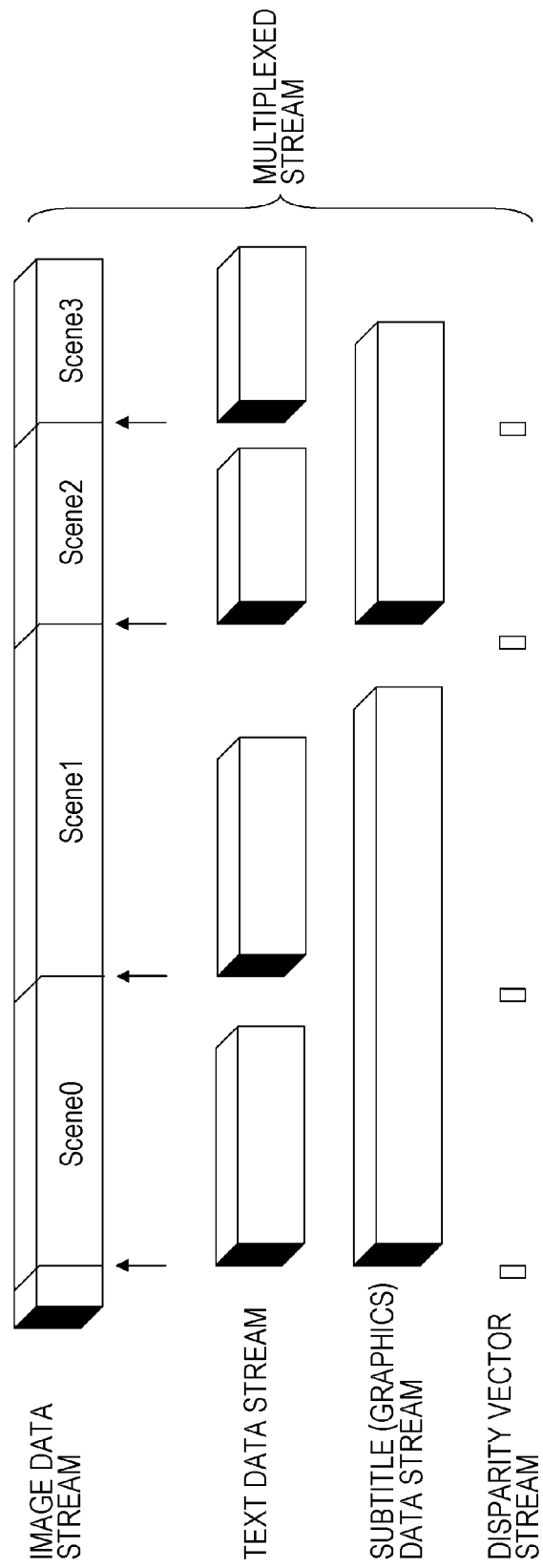
FIG. 12 is a diagram illustrating an example of data streams that are multiplexed in a transmission data generation unit.

FIG. 12 illustrates an example of the respective data streams that are multiplexed in the transmission data generation unit 110 illustrated in FIG. 2. Note that this example indicates a case where disparity vectors are detected and transmitted in units of scenes of video (see FIG. 10(*b*)). Note that a time stamp for synchronized display is added to the packets of each stream, and it is possible to control, on the receiving side, the timing at which subtitle information, graphics information, text information, or the like is superimposed on an image.

"Another Example Configuration of Transmission Data Generation Unit"

Note that the transmission data generation unit 110 illustrated in FIG. 2 described above is configured to transmit the transmission content of disparity vectors (see FIG. 8) to the receiving side as an independent elementary stream. However, it is also conceivable that the transmission content of disparity vectors is transmitted in a state of being embedded in another stream. For example, the transmission content of disparity vectors is transmitted in a state of being embedded in a stream of video as user data. Also, for example, the transmission content of disparity vectors is transmitted in a state of being embedded in a stream of subtitle, graphics, or text.

Figure 13:
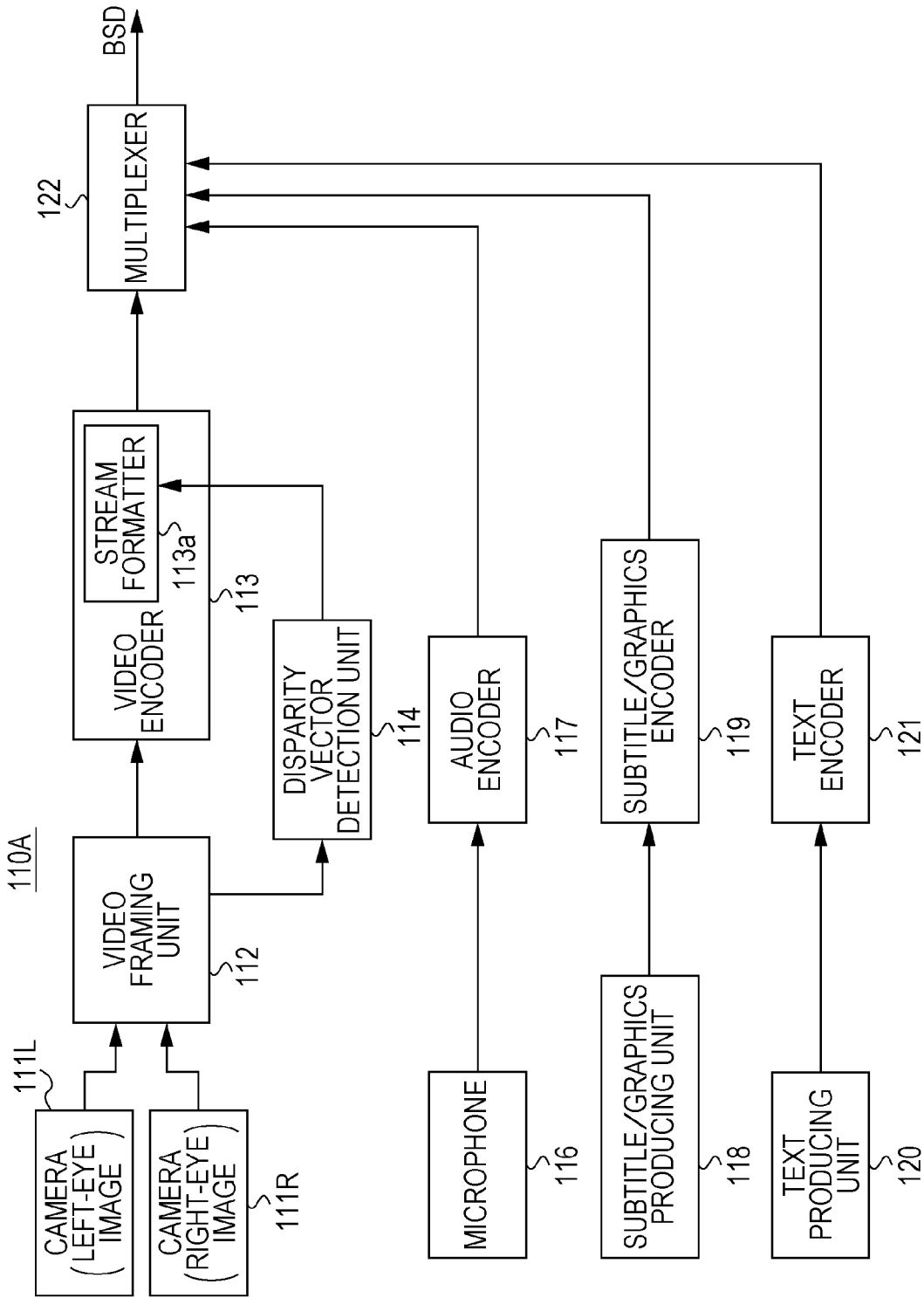
FIG. 13 is a block diagram illustrating another example configuration of the transmission data generation unit in the broadcast station.

FIG. 13 illustrates an example configuration of a transmission data generation unit 110A. This example is also an example of transmitting a disparity vector as numerical information. The transmission data generation unit 110A is configured to transmit the transmission content of disparity vectors in a state of embedding it in a stream of video as user data. In FIG. 13, portions corresponding to those in FIG. 2 are assigned the same numerals, and the detailed description thereof is omitted.

In the transmission data generation unit 110A, a disparity vector at a predetermined position in an image, which is detected by the disparity vector detection 114, is supplied to the stream formatter 113*a* in the video encoder 113. In this case, the ID of a disparity detection block, the vertical position information of the disparity detection block, the horizontal position information of the disparity detection block, and a disparity vector are passed as one set. In the stream formatter 113*a*, the transmission content of disparity vectors (see FIG. 8) is embedded in a stream of video as user data.

The other elements of the transmission data generation unit 110A illustrated in FIG. 13 are configured in a manner similar to those of the transmission data generation unit 110 illustrated in FIG. 2 although the detailed description is omitted.

Figure 14:
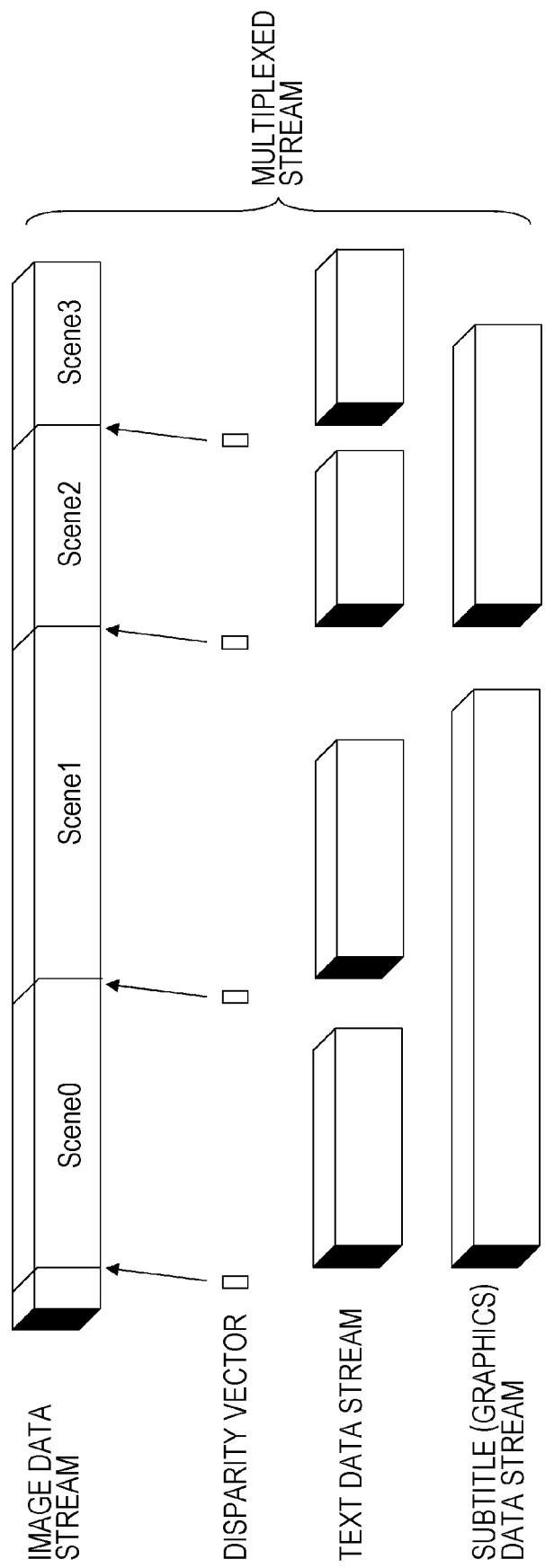
FIG. 14 illustrates an example of individual streams that are multiplexed in the transmission data generation unit in the broadcast station.

FIG. 14 illustrates an example of an image data stream, a subtitle or graphics data stream, and a text data stream that are multiplexed in the transmission data generation unit 110A illustrated in FIG. 13. Disparity vectors (disparity information) are transmitted in a state of being embedded in the image data stream.

"Another Example Configuration of Transmission Data Generation Unit"

Figure 15:
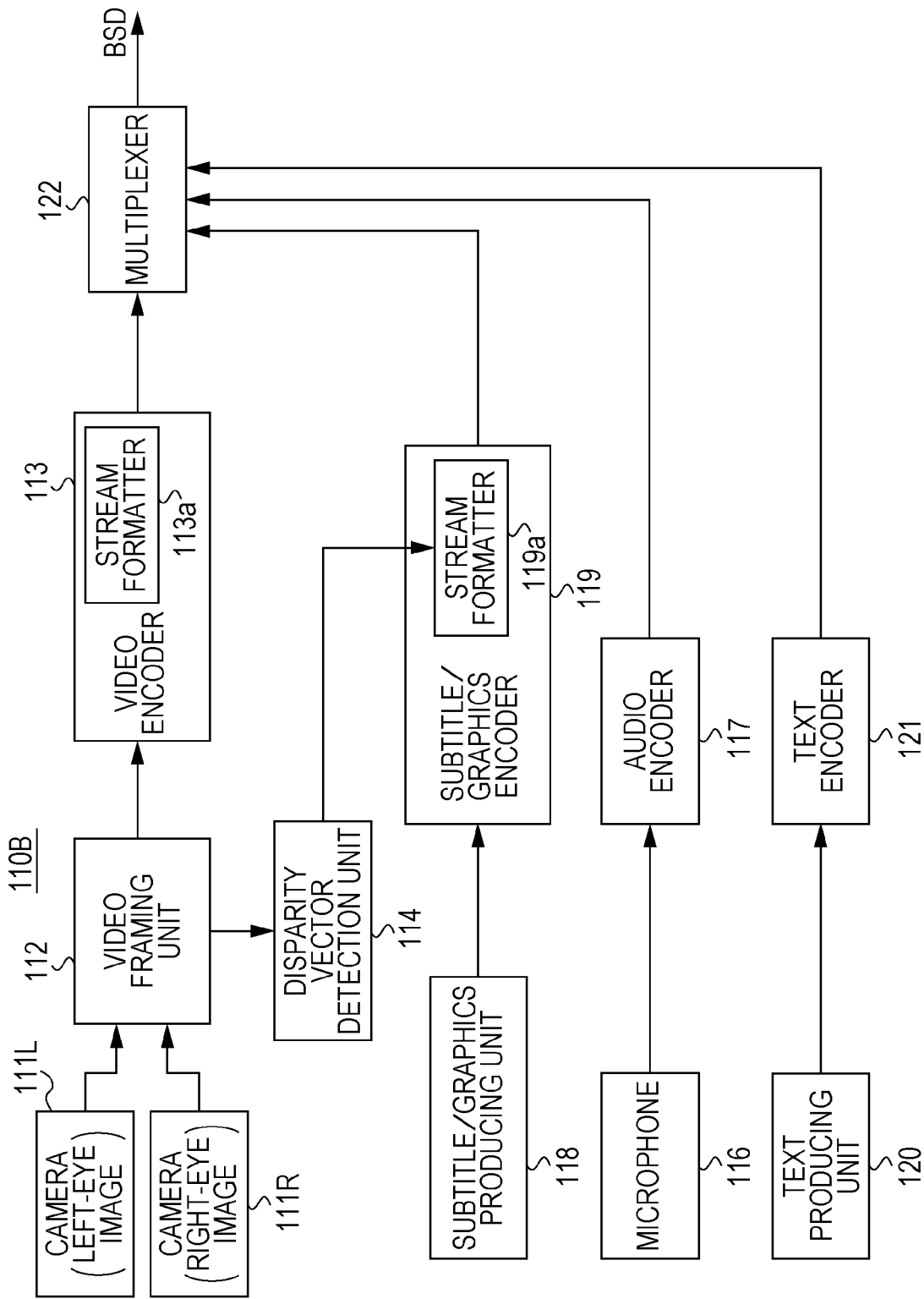
FIG. 15 is a block diagram illustrating another example configuration of the transmission data generation unit in the broadcast station.

FIG. 15 illustrates an example configuration of a transmission data generation unit 110B. This example is also an example in which a disparity vector is transmitted as numerical information. The transmission data generation unit 110B is configured to transmit the transmission content of disparity vectors in a state of embedding it in the subtitle or graphics data stream. In FIG. 15, portions corresponding to those in FIG. 2 are assigned the same numerals, and the detailed description thereof is omitted.

In the transmission data generation unit 110B, a disparity vector at a predetermined position in an image, which is detected by the disparity vector detection 114, is supplied to a stream formatter 119*a* in the subtitle/graphics encoder 119. In this case, the ID of a disparity detection block, the vertical position information of the disparity detection block, the horizontal position information of the disparity detection block, and a disparity vector are passed as one set. In the stream formatter 119*a*, the transmission content (see FIG. 8) of disparity vectors is embedded in the subtitle or graphics data stream.

The other elements of the transmission data generation unit 110B illustrated in FIG. 15 are configured in a manner similar to those of the transmission data generation unit 110 illustrated in FIG. 2, and operate in a similar manner although the detailed description is omitted.

Figure 16:
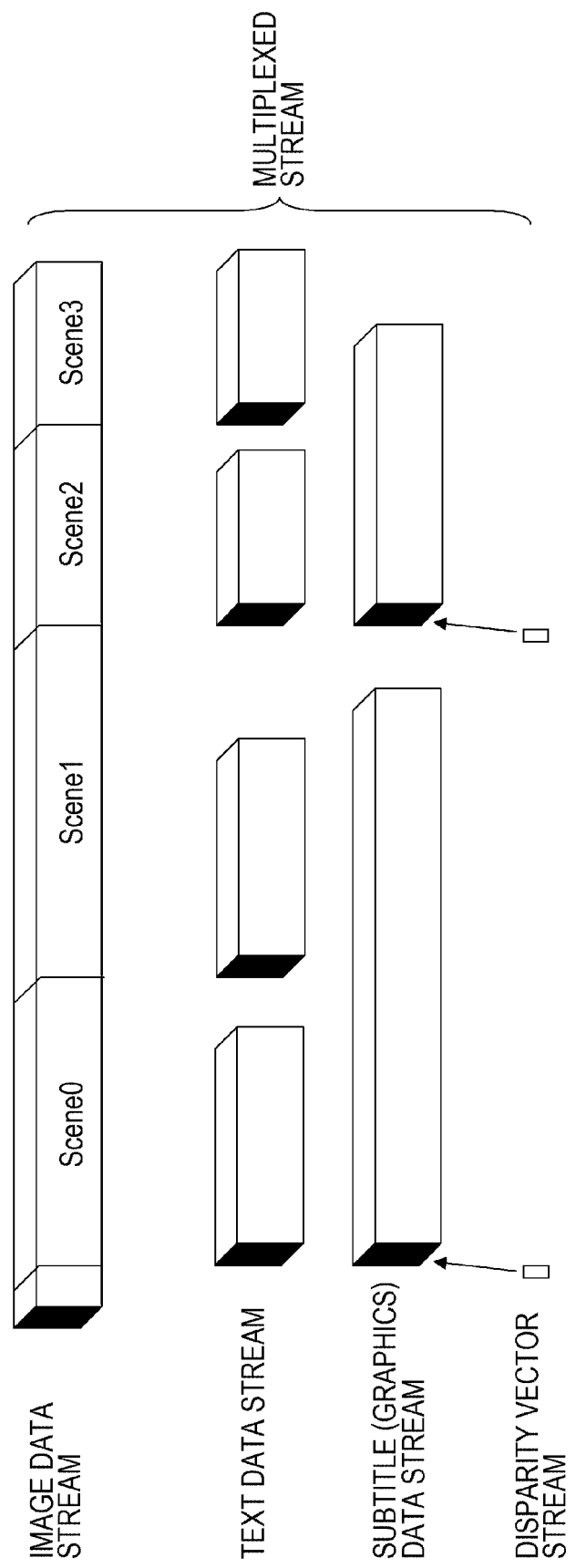
FIG. 16 illustrates an example of individual streams that are multiplexed in the transmission data generation unit in the broadcast station.

FIG. 16 illustrates an example of an image data stream, a subtitle or graphics data stream, and a text data stream that are multiplexed in the transmission data generation unit 110B illustrated in FIG. 15. Disparity vectors (disparity information) are transmitted in a state of being embedded in the subtitle or graphics data stream.

"Another Example Configuration of Transmission Data Generation Unit"

Also, the transmission data generation units 110, 110A, and 110B illustrated in FIGS. 2, 13, and 15 described above transmit a disparity vector as numerical information (see FIG. 8). However, it is also conceivable that, instead of a disparity vector being transmitted as numerical information, disparity information is transmitted on the transmitting side while being reflected in advance in data of superimposition information (such as, for example, subtitle information, graphics information, or text information) to be superimposed on an image.

For example, in a case where disparity information is reflected in data of graphics information, graphics data corresponding to both left-eye graphics information to be superimposed on a left-eye image and right-eye graphics information to be superimposed on a right-eye image is generated on the transmitting side. In this case, the left-eye graphics information and the right-eye graphics information are the same graphics information. However, the display position of, for example, the right-eye graphics information in the image is configured to be shifted in the horizontal direction by the horizontal direction component of the disparity vector corresponding to the display position with respect to the left-eye graphics information.

For example, a disparity vector corresponding to its superimposed position among disparity vectors detected at a plurality of positions in an image is used as a disparity vector. Also, for example, a disparity vector at the position recognized to be the closest in terms of perspective among disparity vectors detected at a plurality of positions in an image is used as a disparity vector. Note that similarity applies in a case where disparity information is reflected in data of subtitle information or graphics information although the detailed description is omitted.

Figure 17:
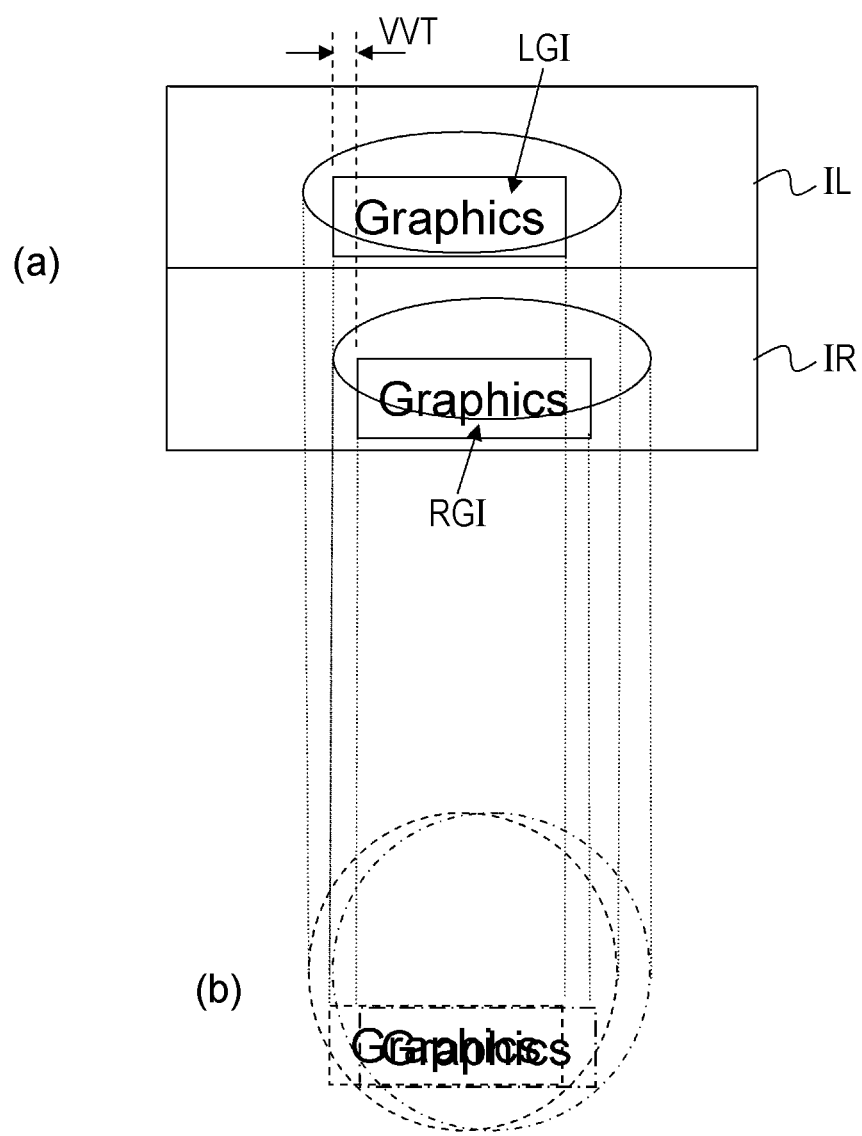
FIG. 17 includes diagrams describing superimposed positions and the like of left-eye graphics information and right-eye graphics information in a case where the transmission method is a first transmission method ("Top & Bottom" method).

FIG. 17(a) illustrates superimposed positions of left-eye graphics information and right-eye graphics information in a case where the transmission method is the first transmission method described above ("Top & Bottom" method). The left-eye graphics information and the right-eye graphics information are the same information. However, right-eye graphics information RGI to be superimposed on a right-eye image IR is configured to be at a position shifted in the horizontal direction by a horizontal direction component VVT of a disparity vector with respect to left-eye graphics information LGI to be superimposed on a left-eye image IL.

As illustrated in FIG. 17(a), graphics data is generated so that the pieces of graphics information LGI and RGI are superimposed on the images IL and IR, respectively. Accordingly, as illustrated in FIG. 17(b), a viewer can observe the pieces of graphics information LGI and RGI with disparity, together with the images IL and IR, and is able to also perceive the perspective of the graphics information.

Figure 18:
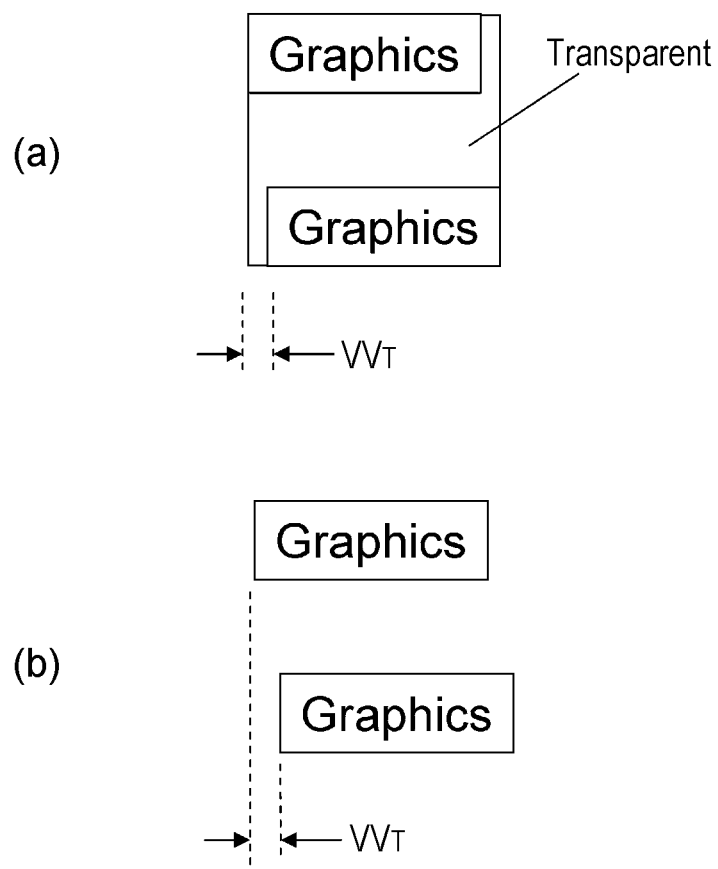
FIG. 18 includes diagrams describing a method for generating left-eye graphics information and right-eye graphics information in a case where the transmission method is the first transmission method ("Top & Bottom" method).

For example, as illustrated in FIG. 18(a), graphics data of the pieces of graphics information LGI and RGI are generated as data of a single area. In this case, data in the portion other than the pieces of graphics information LGI and RGI may be generated as transparent data. Also, for example, as illustrated in, FIG. 18(b), the graphics data of the pieces of graphics information LGI and RGI are generated as data of different areas.

Figure 19:
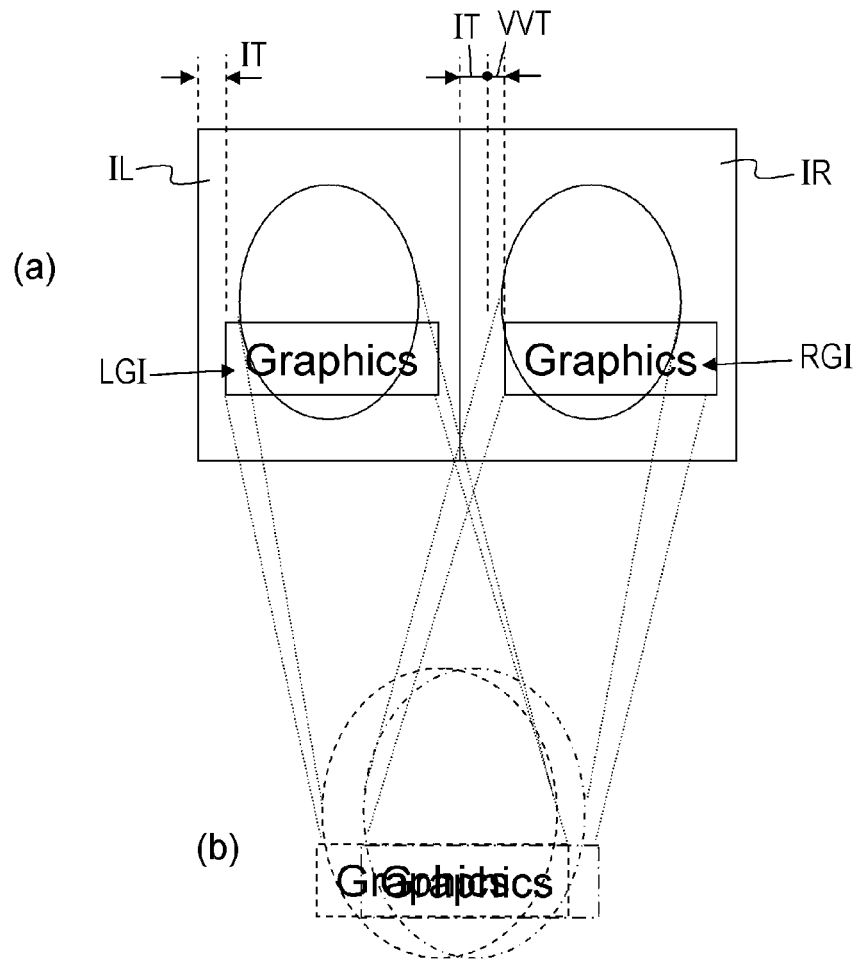
FIG. 19 includes diagrams describing a method for generating left-eye graphics information and right-eye graphics information in a case where the transmission method is a second transmission method ("Side By Side" method).

FIG. 19(a) illustrates superimposed positions of left-eye graphics information and right-eye graphics information in a case where the transmission method is the second transmission method described above ("Side By Side" method). The left-eye graphics information and the right-eye graphics information are the same information. However, right-eye graphics information RGI to be superimposed on a right-eye image IR is configured to be at a position shifted in the horizontal direction by a horizontal direction component VVT of a disparity vector with respect to left-eye graphics information LGI to be superimposed on a left-eye image IL. Note that IT is an idling offset value.

Graphics data is generated so that, as illustrated in FIG. 19(a), the pieces of graphics information LGI and RGI are superimposed on the images IL and IR, respectively. Accordingly, as illustrated in FIG. 19(b), a viewer can observe the pieces of graphics information LGI and RGI with disparity, together with the images IL and IR, and is able to also perceive the perspective of the graphics information.

Figure 20:
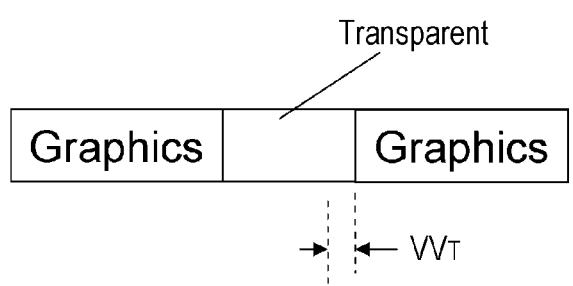
FIG. 20 is a diagram describing a method for generating left-eye graphics information and right-eye graphics information in a case where the transmission method is the second transmission method ("Side By Side" method).

For example, as illustrated in FIG. 20, graphics data of the pieces of graphics information LGI and RGI are generated as data of a single area. In this case, data in the portion other than the pieces of graphics information LGI and RGI may be generated as transparent data.

Figure 21:
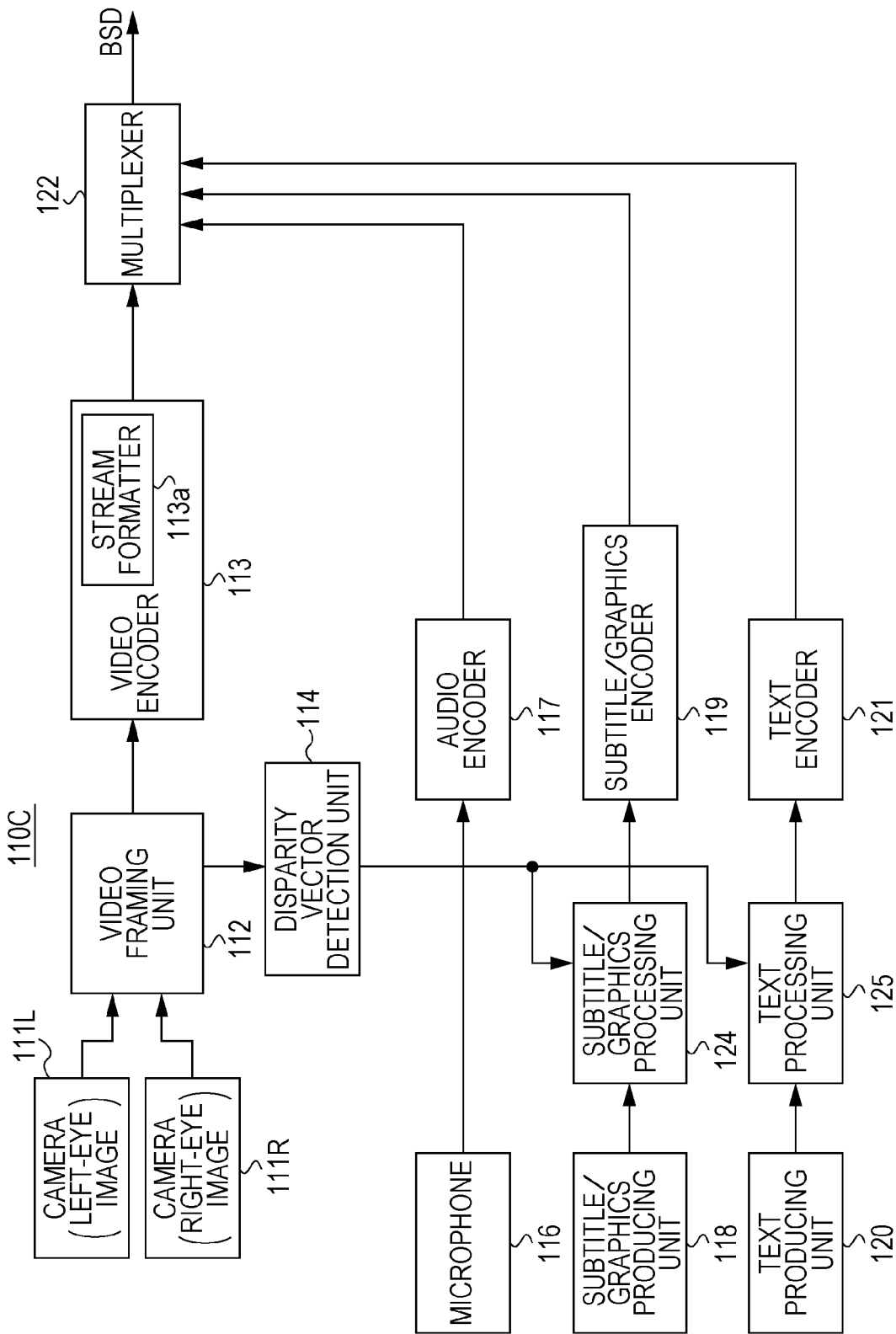
FIG. 21 is a block diagram illustrating another example configuration of the transmission data generation unit in the broadcast station.

FIG. 21 illustrates an example configuration of a transmission data generation unit 110C. The transmission data generation unit 110C is configured to transmit disparity information while reflecting the disparity information in data of superimposition information such as closed caption information, subtitle information, graphics information, or text information. In FIG. 21, portions corresponding to those in FIG. 2 are assigned the same numerals, and the detailed description thereof is omitted.

In the transmission data generation unit 110C, a subtitle/graphics processing unit 124 is inserted between the subtitle/graphics producing unit 118 and the subtitle/graphic encoder 119. Also, in the transmission data generation unit 110C, a text processing unit 125 is inserted between the text producing unit 120 and the text encoder 121. Then, a disparity vector at a predetermined position in an image, which is detected by the disparity vector detection unit 114, is supplied to the subtitle/graphics processing unit 124 and the text processing unit 125.

In the subtitle/graphics processing unit 124, data of left-eye and right-eye subtitle or graphics information items LGI and RGI to be superimposed on a left-eye image IL and a right-eye image IR are generated. In this case, the subtitle or graphics information items are produced on the basis of subtitle data or graphics data produced by the subtitle/graphics producing unit 118. The left-eye and right-eye subtitle information items or graphics information items are the same information. However, the superimposed position of, for example, the right-eye subtitle information or graphics information in the image is configured to be shifted in the horizontal direction by the horizontal direction component VVT of the disparity vector with respect to the left-eye subtitle information or graphics information (see FIGS. 17(a) and 19(a)).

The subtitle data or graphics data generated by the subtitle/graphics processing unit 124 in this manner is supplied to the subtitle/graphic encoder 119. Note that the subtitle data or graphics data has added thereto idling offset information indicating the superimposed position on the image. In the subtitle/graphic encoder 119, an elementary stream of the subtitle data or graphics data generated by the subtitle/graphics processing unit 124 is generated.

Also, in the text processing unit 125, data of left-eye text information to be superimposed on the left-eye image and data of right-eye text information to be superimposed on the right-eye image are generated on the basis of the text data produced by the text producing unit 120. In this case, the left-eye text information and the right-eye text information are the same text information. However, the superimposed position of, for example, the right-eye text information in the image is configured to be shifted in the horizontal direction by the horizontal direction component VVT of the disparity vector with respect to the left-eye text information.

The text data generated by the text processing unit 125 in this manner is supplied to the text encoder 121. Note that the text data has added thereto idling offset information indicating the superimposed positions on the image. In the text encoder 121, an elementary stream of the text s data generated by the text processing unit is generated.

The other elements of the transmission data generation unit 110C illustrated in FIG. 21 are configured in a manner similar to those of the transmission data generation unit 110 illustrated in FIG. 2 although the detailed description is omitted.

"Another Example Configuration of Transmission Data Generation Unit"

In the transmission data generation units 110, 110A, and 110B illustrated in FIGS. 2, 13, and 15, in the disparity vector detection unit 114, a disparity vector (disparity information) at a predetermined position in an image is detected on the basis of left-eye image data and right-eye image data. The transmission data generation units 110, 110A, and 110B are configured to transmit disparity information at a predetermined position in an image, which is detected by the disparity vector detection unit 114, to the receiving side as it is.

However, for example, it is conceivable that a downsizing process is performed on a pixel-based disparity vector that is recorded in association with image data on a data recording medium and that a disparity information set including disparity information belonging to one or a plurality of areas obtained by sectioning a screen by a predetermined size is created. In this case, the size of each area is selected on the basis of, for example, the requirements of the receiving side, such as the spatial density of the disparity vector or the transmission band.

Also, a general-purpose disparity information set and a specific-service-use disparity information set are conceived to be used as disparity information sets. Examples of specific-service use include closed caption use and subtitle use. Then, the following cases are conceivable for a disparity information set to be transmitted to the receiving side.

(1) Only a general-purpose disparity information set is sent (in a case where there is no relation with a specific service)

(2) Only a general-purpose disparity information set is sent (in a case where there is a relation with a specific service)

Figure 22:
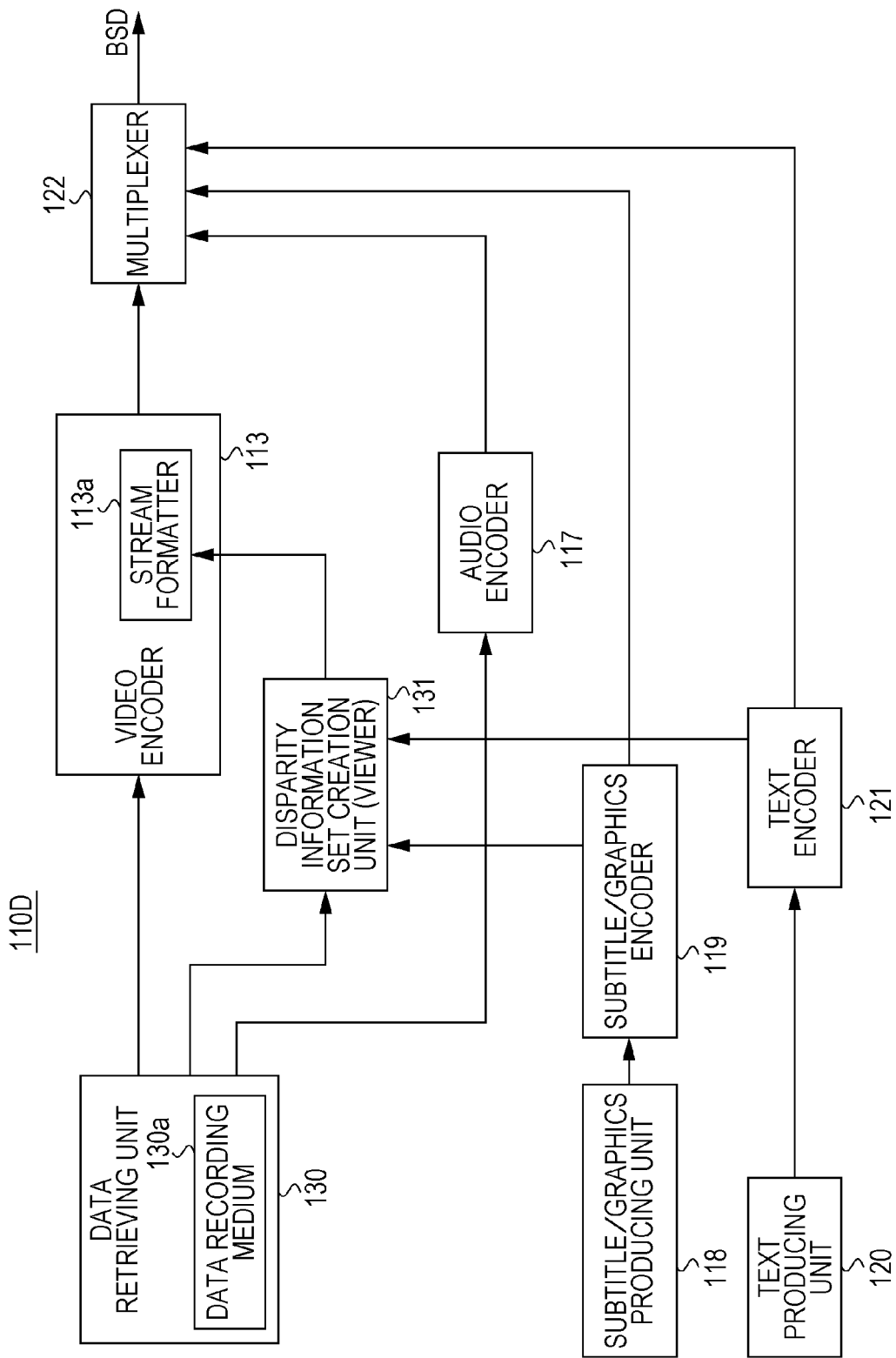
FIG. 22 is a block diagram illustrating another example configuration of the transmission data generation unit in the broadcast station.

(3) Both a general-purpose disparity information set and a specific-service-use disparity information set are sent (4) Only a specific-service-use disparity information set is sent FIG. 22 illustrates an example configuration of a transmission data generation unit 110D. The transmission data generation unit 110D is configured to create a predetermined set of disparity information sets corresponding to one of the cases (1) to (4) described above, and to transmit the predetermined set of disparity information sets to the receiving side. In FIG. 22, portions corresponding to those in FIG. 2 are assigned the same numerals, and the detailed description thereof is omitted, as appropriate.

The transmission data generation unit 110D includes a data retrieving unit (archive unit) 130, a disparity information set creation unit 131, a video encoder 113, and an audio encoder 117. Also, the transmission data generation unit 110D includes a subtitle/graphics producing unit 118, a subtitle/graphics encoder 119, a text producing unit 120, a text encoder 121, and a multiplexer 122.

A data recording medium 130a is attached to the data retrieving unit 130 in, for example, a removable manner. Audio data and disparity vectors are recorded on the data recording medium 130a so as to correspond to each other, together with stereo image data including left-eye image data and right-eye image data. The data retrieving unit 130 retrieves stereo image data, audio data, a disparity vector, and the like from the data recording medium 130a, and outputs them. The data recording medium 130a is a disk-shaped recording medium, a semiconductor memory, or the like.

Here, the stereo image data recorded on the data recording medium 130a is designed to correspond to stereo image data obtained by the video framing unit 112 of the transmission data generation unit 110 illustrated in FIG. 2. Also, the disparity vectors recorded on the data recording medium 130a are, for example, pixel-based disparity vectors that form an image.

The disparity information set creation unit 131 has a viewer function. The disparity information set creation unit 131 performs a downsizing process on a disparity vector output from the data retrieving unit 130, that is, a pixel-based disparity vector, and generates disparity vectors belonging to a predetermined area.

Figure 23:
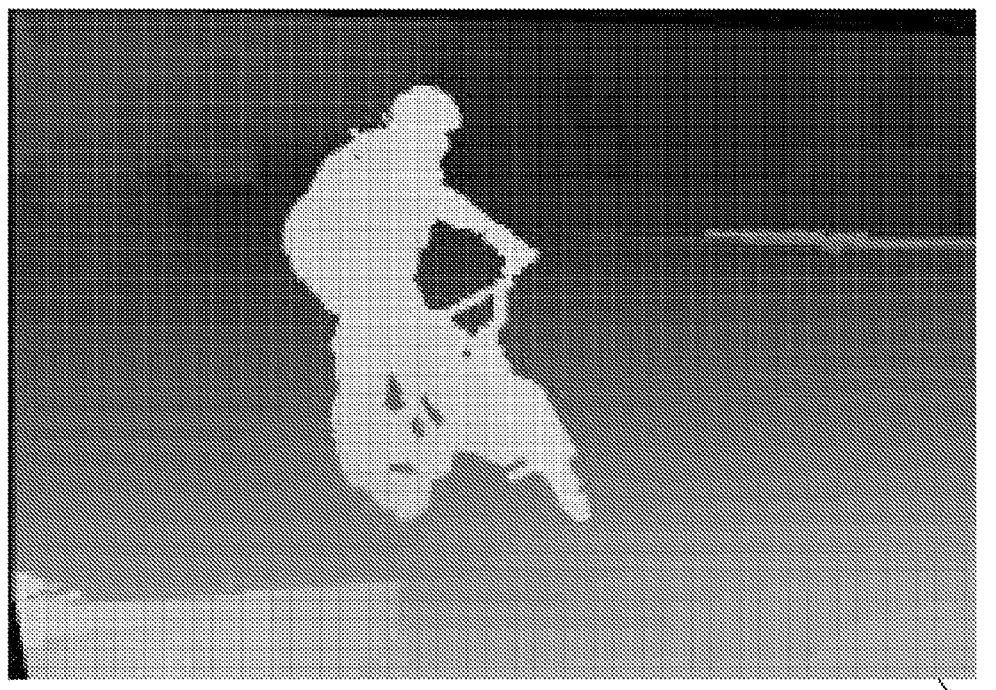
FIG. 23 is a diagram illustrating an example image in a case where the value of a pixel-based disparity vector is used as the luminance value of an individual pixel.

FIG. 23 illustrates an example of data in the relative depth direction, which is given as luminance values of individual pixels. Here, it is possible to handle the data in the relative depth direction as a disparity vector for each pixel through predetermined conversion. In this example, the person part has high luminance values. This means that the values of the disparity vectors of the person part are large, and therefore means that the person part is perceived to be in a floating state in stereo image display. Also, in this example, the background part has low luminance values. This means that the values of the disparity vectors of the background part are small, and therefore means that the background part is perceived to be in a sunken state in stereo image display.

Figure 24:
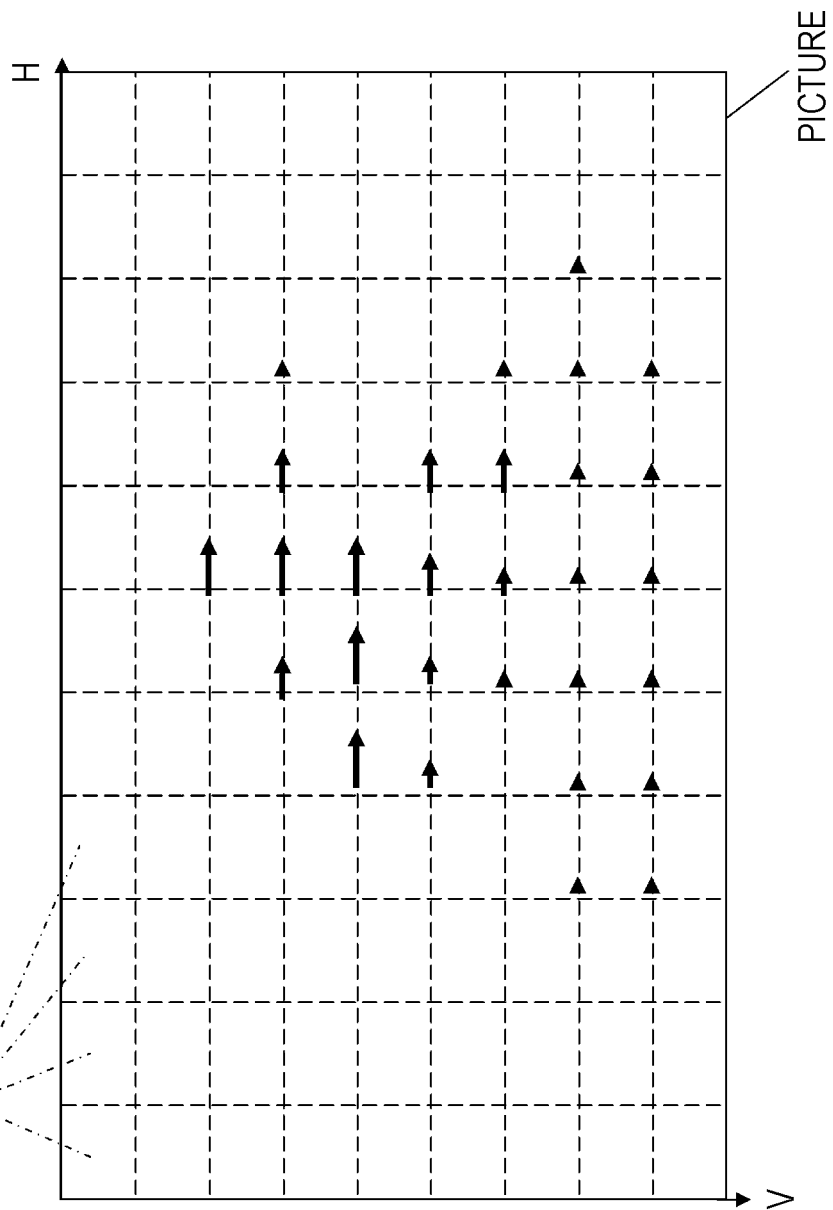
FIG. 24 is a diagram illustrating an example of block-based disparity vectors.

FIG. 24 illustrates an example of block-based disparity vectors. A block corresponds to an upper layer above pixels located in the bottom layer. Blocks are formed by dividing an image (picture) area by a predetermined size in the horizontal direction and the vertical direction. A disparity vector of each block is obtained by, for example, selecting the disparity vector having the largest value among the disparity vectors of all the pixels present in the block. In this example, a disparity vector of each block is indicated by an arrow, and the length of the arrow corresponds to the magnitude of the disparity vector.

FIG. 25 illustrates an example of a downsizing process performed by the disparity information set creation unit 131. First, as illustrated in FIG. 25(*a*), the disparity information set creation unit 134 determines a block-based disparity vector using the pixel-based disparity vectors. As described above, a block corresponds to an upper layer above pixels located in the bottom layer, and is formed by dividing an image (picture) area by a predetermined size in the horizontal direction and the vertical direction. Then, a disparity vector of each block is obtained by, for example, selecting the disparity vector having the largest value among the disparity vectors of all the pixels present in the block.

Next, as illustrated in FIG. 25(*b*), the disparity information set creation unit 131 determines a group (Group Of Block)-based disparity vector using the block-based disparity vectors. A group corresponds to an upper layer above blocks, and is obtained by collectively grouping a plurality of adjacent blocks. In the example of FIG. 25(*b*), each group is composed of four blocks bracketed by a broken line frame. Then, a disparity vector of each group is obtained by, for example, selecting the disparity vector having the largest value among the disparity vectors of all the blocks in the group.

Next, as illustrated in FIG. 25(*c*), the disparity information set creation unit 131 determines a partition-based disparity vector using the group-based disparity vectors. A partition corresponds to an upper layer above groups, and is obtained by collectively grouping a plurality of adjacent groups. In the example of FIG. 25(*c*), each partition is composed of two groups bracketed by a broken line frame. Then, a disparity vector of each partition is obtained by, for example, selecting the disparity vector having the largest value among the disparity vectors of all the groups in the partition.

Next, as illustrated in FIG. 25(*d*), the disparity information set creation unit 131 determines a disparity vector of an entire picture (entire image) located in the top layer using the partition-based disparity vectors. In the example of FIG. 25(*d*), an entire picture includes four regions bracketed by a broken line frame. Then, a disparity vector of the entire picture is obtained by, for example, selecting the disparity vector having the largest value among the disparity vectors of all the regions included in the entire picture. In this case, in addition to the disparity vector of the entire picture, information about the position of the original pixel) from which the disparity vector is obtained (indicated by "+" in the figure) may be determined and used as additional information of the disparity vector. This is similar also when disparity vectors of a block, a group, and a partition, described above, are determined.

Accordingly, the disparity information set creation unit 131 can determine disparity vectors of the respective areas in the respective layers, namely, blocks, groups, partitions, and an entire picture by performing a downsizing process on a disparity vector for each pixel located in the bottom layer. Note that in the example of the downsizing process illustrated in FIG. 25, finally, disparity vectors in four layers other than the layer of pixel, i.e., blocks, groups, partitions, and an entire picture, are determined. However, the number of layers, how to section each layer into areas, and the number of areas are not to be limited to those above.

The disparity information set creation unit 131 creates, through the downsizing process described above, a disparity information set including a disparity vector for each area having a predetermined size. The disparity information set is added with information indicating a screen area to which each piece of disparity information belongs. For example, information indicating the number of divisions on a screen, such as, for example, 0 divisions, 4 divisions, 9 divisions, or 16 divisions, is added as information indicating a screen area. Also, for example, information indicating the size of an area (block size), such as 16×16, 32×32, or 64×64, is added as information indicating a screen area.

If individual pieces of disparity information in a disparity information set are arranged in scan order, a screen area to which each piece of disparity information belongs can be grasped using information indicating the number of divisions on a screen or information indicating the size of an area. In this sense, information indicating the number of divisions on a screen and information indicating the size of an area becomes information indicating a screen area to which each piece of disparity information belongs.

Also, the disparity information set creation unit 131 creates a specific-service-use disparity information set in accordance with necessity. For example, a disparity information set for closed caption use, subtitle use, specific application (widget) graphics use, or the like is created in accordance with necessity. In this case, a disparity vector belonging to one or a plurality of screen areas respectively corresponding to one or a plurality of display areas of superimposition information (such as closed caption information, subtitle information, or graphics information) is created through the downsizing process described above.

Figure 26:
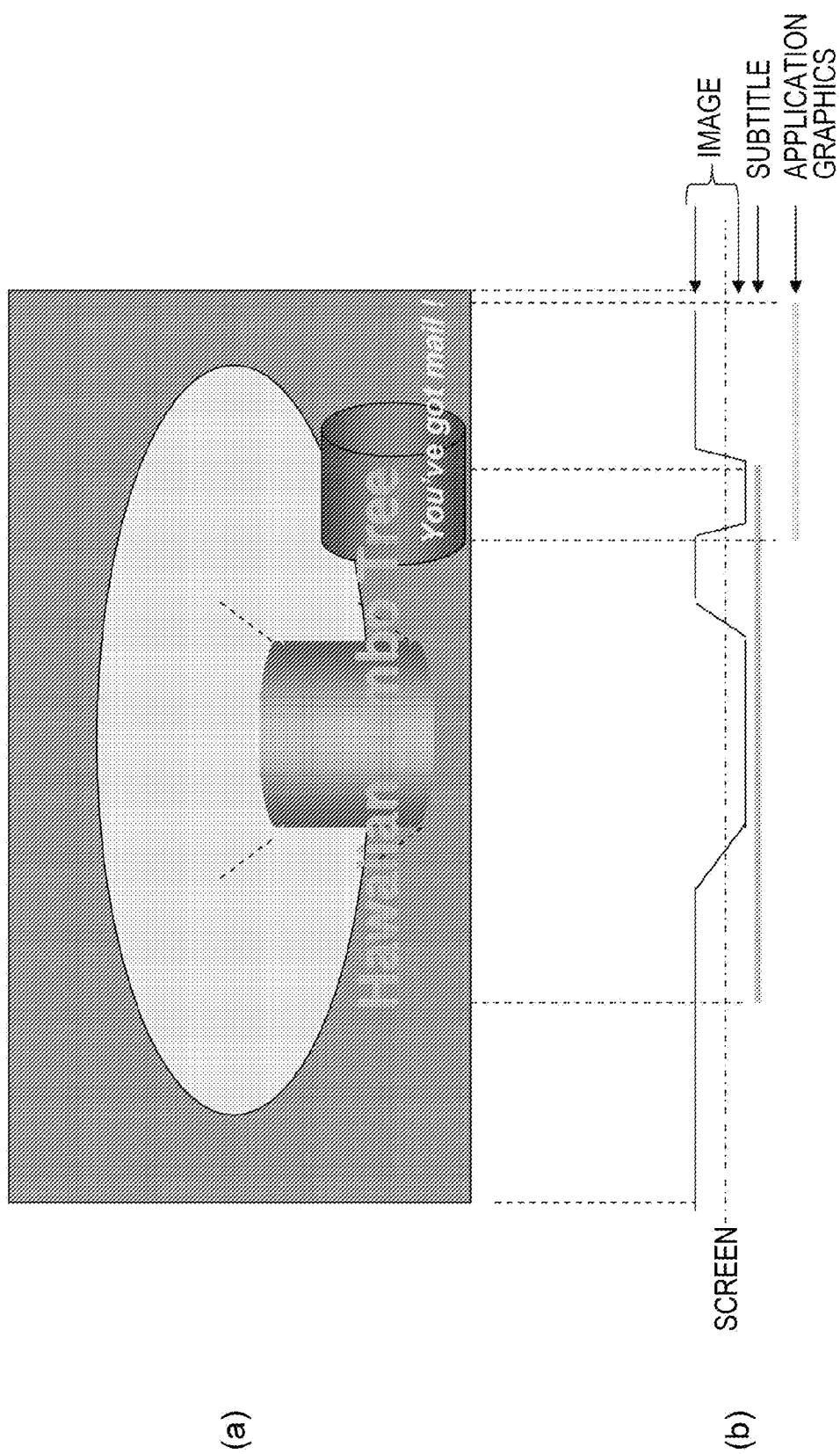
FIG. 26 is a diagram illustrating a display example of a subtitle and application graphics on an image, and the perspective thereof.

FIG. 26(a) illustrates a display example of a subtitle and application graphics on an image. FIG. 26(b) illustrates the perspective of the image, the subtitle, and the application graphics. For example, as illustrated in the figure, it is desired that the subtitle which is displayed in a center area in the lower half of the screen be recognized to be further in front of the closest position in the image. In this case, in the disparity information set creation unit 131, a disparity vector for giving disparity to the subtitle is created from the display area of the subtitle and the disparity vectors of the corresponding image area.

Also, for example, as illustrated in the figure, it is desired that the application graphics which is displayed in the lower right end area of the screen be recognized to be further in front of the subtitle. In this case, in the disparity information set creation unit 131, a disparity vector for giving disparity to the application graphics is created from the display area of the application graphics and the disparity vectors of the corresponding image area.

Here, as described above, the disparity information set creation unit 131 has a viewer function. In the disparity information set creation unit 131, a stereo image as illustrated in FIG. 26(a) is actually displayed. Thus, stereo image data (left-eye image data, right-eye image data) output from the data retrieving unit 130 is supplied to the disparity information set creation unit 131. Also, subtitle data or graphics data produced by the subtitle/graphics producing unit 118, and text data (including closed caption data) produced by the text producing unit 120 are supplied to the disparity information set creation unit 131.

Each set of disparity information sets that is created by the disparity information set creation unit 131 and that is transmitted together with the stereo image data is added with a disparity sequence ID (Disparity_Sequence_id). The disparity sequence ID is identification information indicating the kind of superimposition information for which disparity information included in a disparity information set is to be used. With the disparity sequence ID, whether the disparity information set is a general-purpose disparity information set or a specific-service-use disparity information set is identified. Also, with the identification information, what kind of service-use disparity information set the specific-service-use disparity information set represents is identified.

As illustrated in FIG. 27, Disparity_Sequence_id=0 indicates a general-purpose disparity information set. This disparity information set is created on the basis of disparity information recorded in advance. In a case where this disparity information has no association with a specific service, it is not necessary to associate it with a specific service using, for example, a disparity linkage descriptor (Disparity_Linkage_Descriptor) or the like. Also, Disparity_Sequence_id=1 to 255 indicates a specific-service-use disparity information set associated using, for example, a disparity linkage descriptor or the like.

[Disparity Information Set]

A disparity information set created by the disparity information set creation unit 131 will be further described in the context of each of the cases (1) to (4) described above.

"Case (1)"

As described above, case (1) is a case where only a general-purpose disparity information set is sent. In the case (1), only a general-purpose disparity information set is created. Note that in the case (1), disparity information included in the disparity information set has no relation with a specific service.

Figure 28:
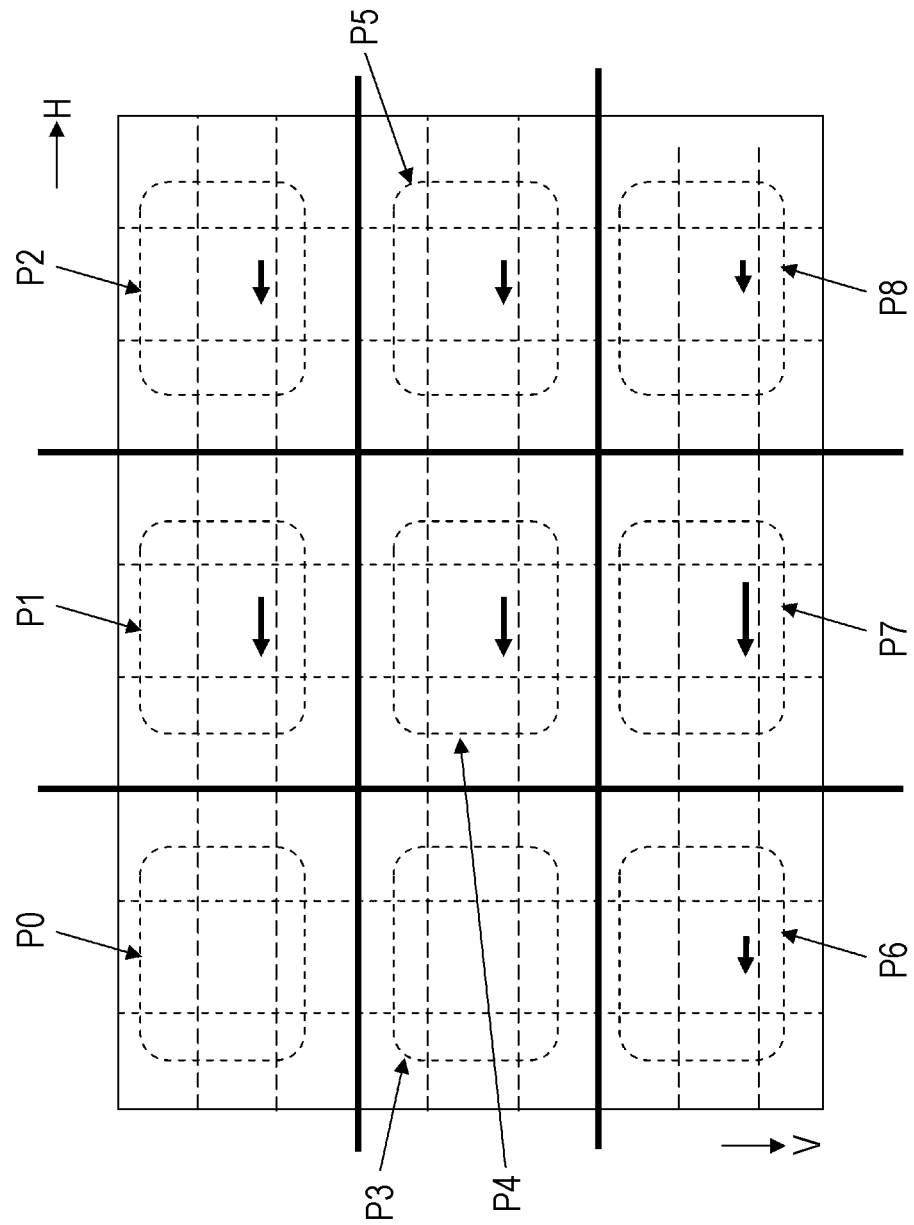
FIG. 28 is a diagram illustrating an example of a disparity information set created in case (1) (where only a general-purpose disparity information set is sent (in a case where there is no relation with a specific service)).

FIG. 28 illustrates an example of the disparity information set created in the case (1). In this example, the disparity information set contains disparity vectors (horizontal disparity vectors) P0 to P8 belonging to individual screen areas obtained by dividing the screen into nine sections. The disparity vectors P0 to P8 are determined through the downsizing process described above using, for example, pixel-based disparity vectors. In FIG. 28, an arrow indicates a disparity vector, and the length of the arrow corresponds to the magnitude of the disparity vector.

Figure 29:
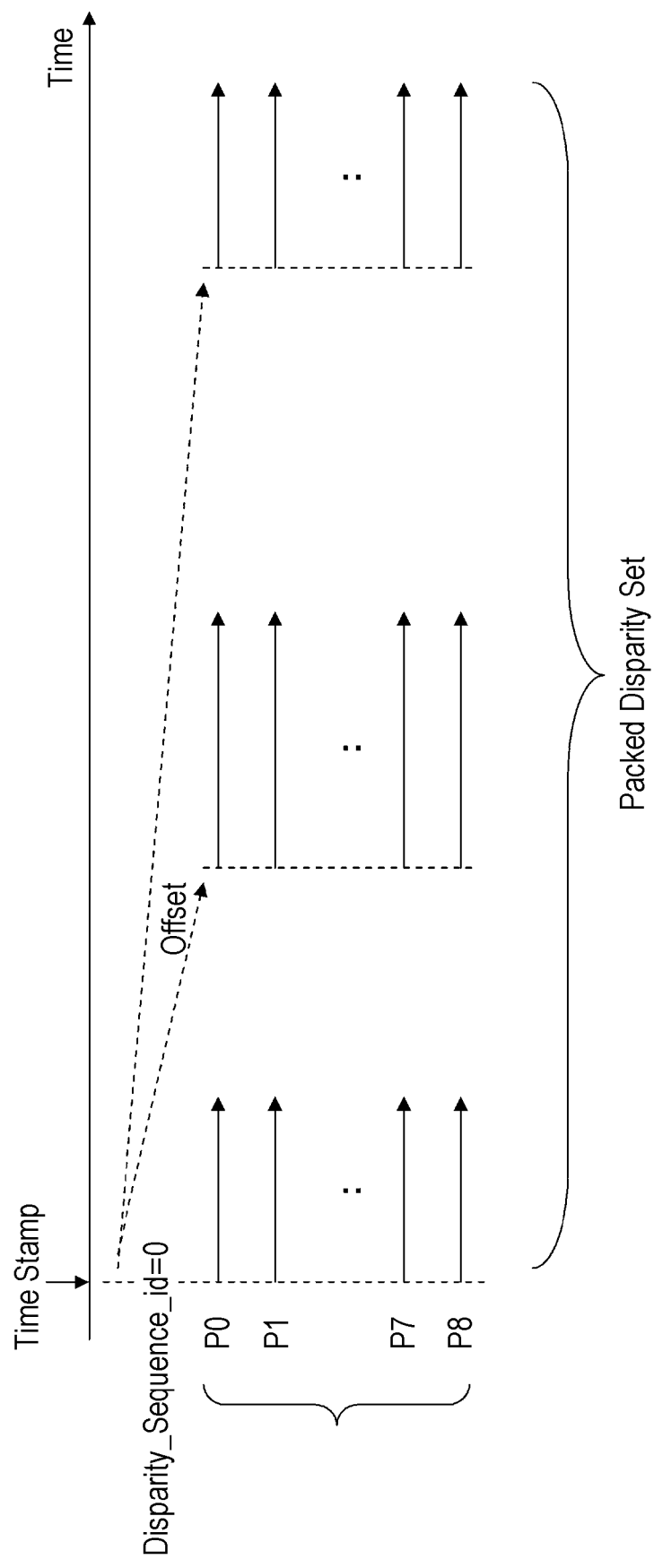

This disparity information set is a general-purpose disparity information set. Thus, as illustrated in FIG. 29, the identification information "Diparity_Sequence_id" added to this disparity information set is set to "0", which indicates a general-purpose disparity information set.

Here, the general-purpose disparity information set is a disparity information set for each predetermined unit of image data, for example, for each picture of encoded video. As described below, image data is sectioned into certain periods, and a set of a plurality of disparity information sets (Packed Disparity Sets) corresponding to image data of each certain period is transmitted prior to the transmission of the image data of the certain period. Thus, as illustrated in FIG. 29, a disparity information set for each predetermined unit is added with an offset (Offset) as time information indicating the timing at which the disparity information set is used. The offset added to each disparity information set represents the time from the use time of the first disparity information set, which is indicated by a time stamp (Time Stamp).

"Case (2)"

As described above, case (2) is a case where only a general-purpose disparity information set is sent. In the case (2), only a general-purpose disparity information set is created. Note that in the case (2), disparity information included in a disparity information set has a relation with a specific service.

Figure 30:
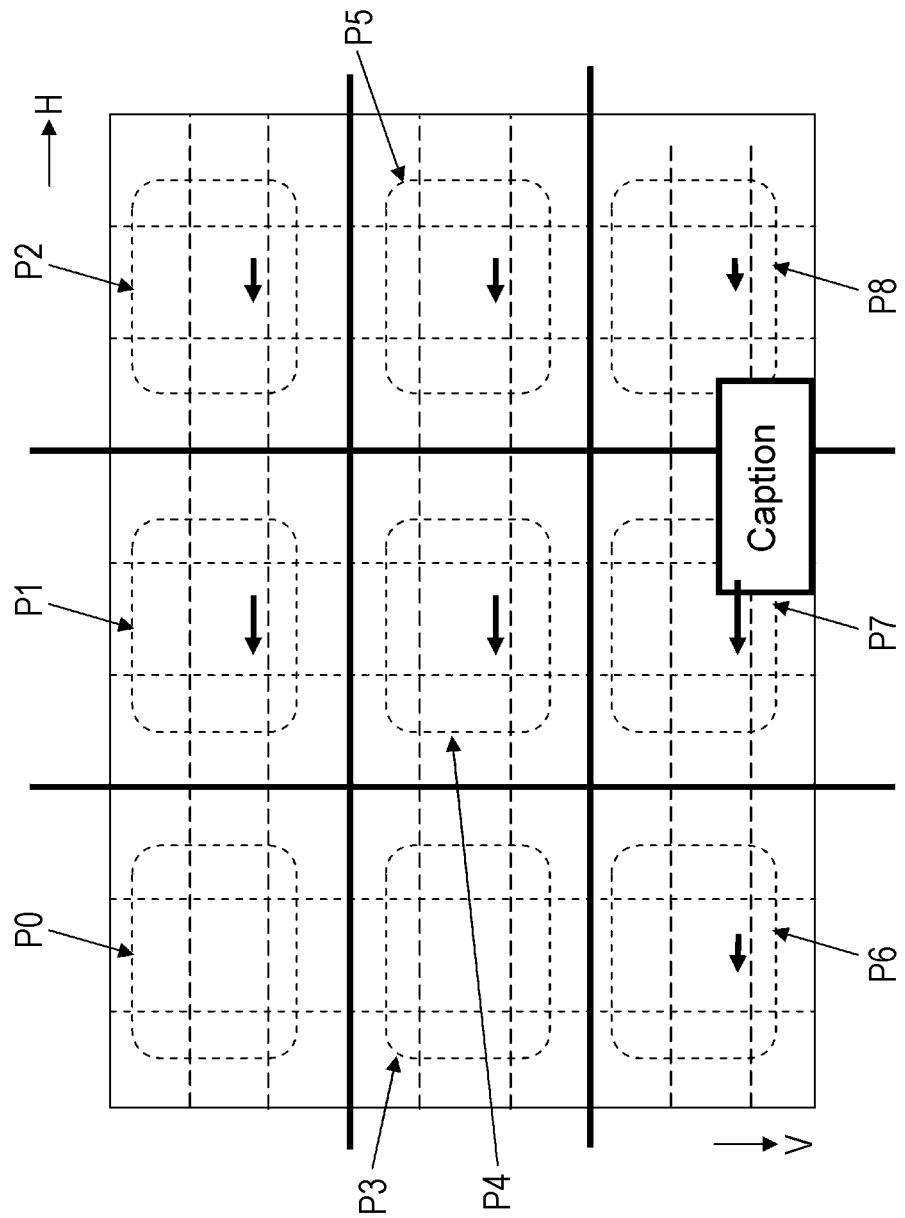
FIG. 30 is a diagram illustrating an example of a disparity information set created in case (2) (where only a general-purpose disparity information set is sent (in a case where there is a relation with a specific service)).

FIG. 30 illustrates an example of the disparity information set created in the case (2). In this example, the disparity information set contains disparity vectors (horizontal disparity vectors) P0 to P8 belonging to individual screen areas obtained by dividing the screen into nine sections. The disparity vectors P0 to P8 are determined through the downsizing process described above using, for example, pixel-based disparity vectors. In FIG. 30, an arrow indicates a disparity vector, and the length of the arrow corresponds to the magnitude of the disparity vector.

Figure 31:
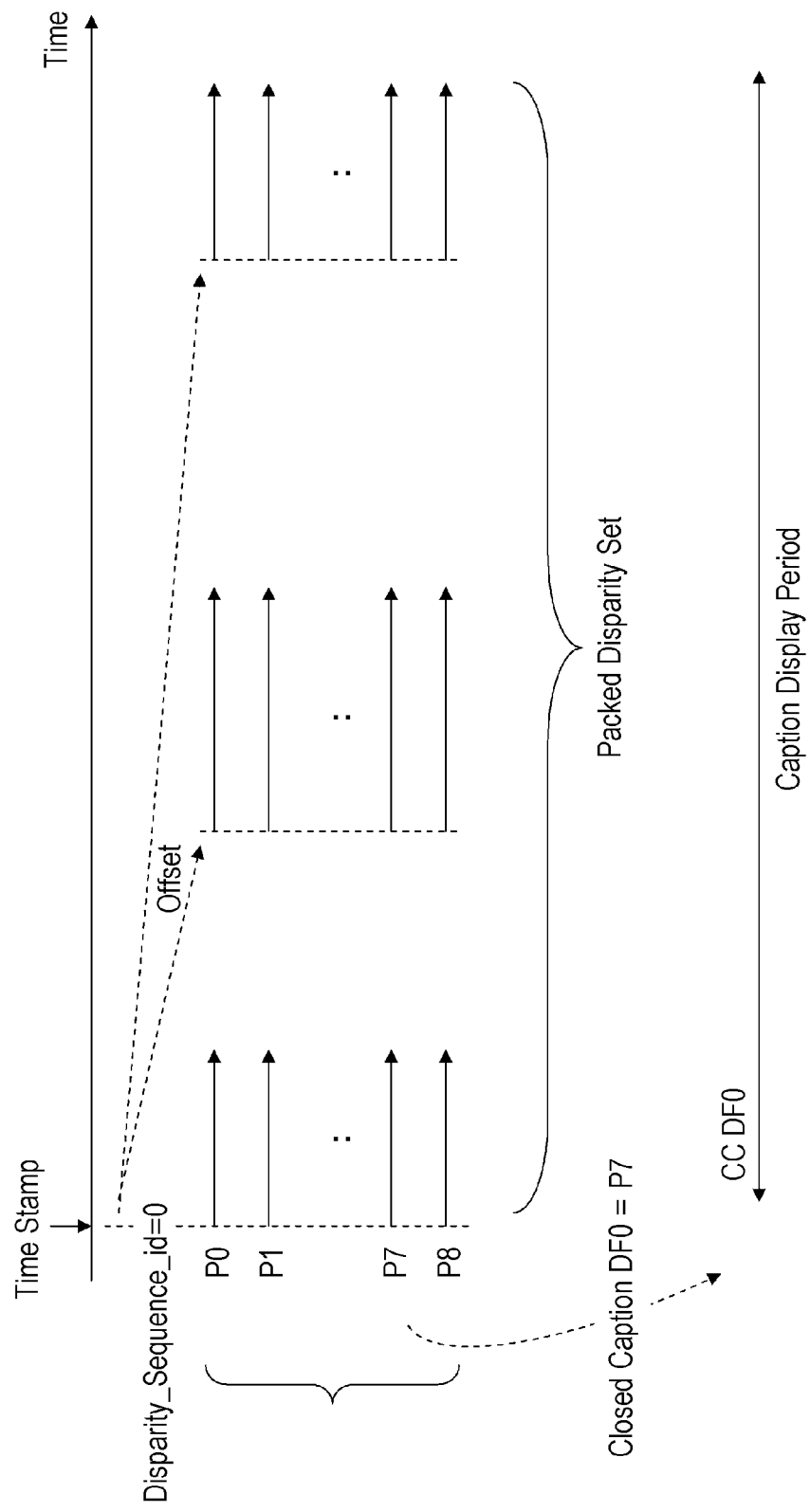

This disparity information set is a general-purpose disparity information set. Thus, as illustrated in FIG. 31, the identification information "Diparity_Sequence_id" added to this disparity information set is set to "0", which indicates a general-purpose disparity information set.

Here, the general-purpose disparity information set is a disparity information set for each predetermined unit of image data, for example, for each picture of encoded video. As described below, image data is sectioned into certain periods, and a set of a plurality of disparity information sets (Packed Disparity Sets) corresponding to image data of each certain period is transmitted prior to the transmission of the image data of the certain period. Thus, as illustrated in FIG. 31, a disparity information set for each predetermined unit is added with an offset (Offset) as time information indicating the timing at which the disparity information set is used. The offset added to each disparity information set represents the time from the use time of the first disparity information set, which is indicated by a time stamp (Time Stamp).

As described above, in the case (2), disparity information included in the disparity information set has a relation with a specific service. FIG. 31 illustrates an example in which the disparity vector P7 and closed caption data DF0 are associated with each other. Note that, as illustrated in FIG. 30, closed caption information that is based on the closed caption data DF0 is displayed in the screen area to which the disparity vector P7 belongs. In this case, the component element ID (Component_Element ID) indicating the screen area in which the closed caption information is displayed and the disparity vector P7 are associated with each other.

FIG. 32 illustrates an example of an association table (Component_Linked_Info) between component element IDs and disparity vectors in this case. In this case, the target position of a disparity vector is specified by a partition position ID (Partition_Position_ID). The partition position ID indicates which screen area among a plurality of screen areas specified by the number of divisions or the block size.

Note that the example illustrated in FIG. 31 illustrates an example in which one piece of disparity information is associated with one piece of closed caption data. However, it is also conceivable that a plurality of pieces of disparity information are associated with one piece of closed caption data. In this manner, in a case where a plurality of pieces of disparity information are associated with one piece of closed caption data, on the receiving side, a certain piece of disparity information can be selected and used in order to give disparity to closed caption information that is based on the piece of closed caption data.

Figure 33:
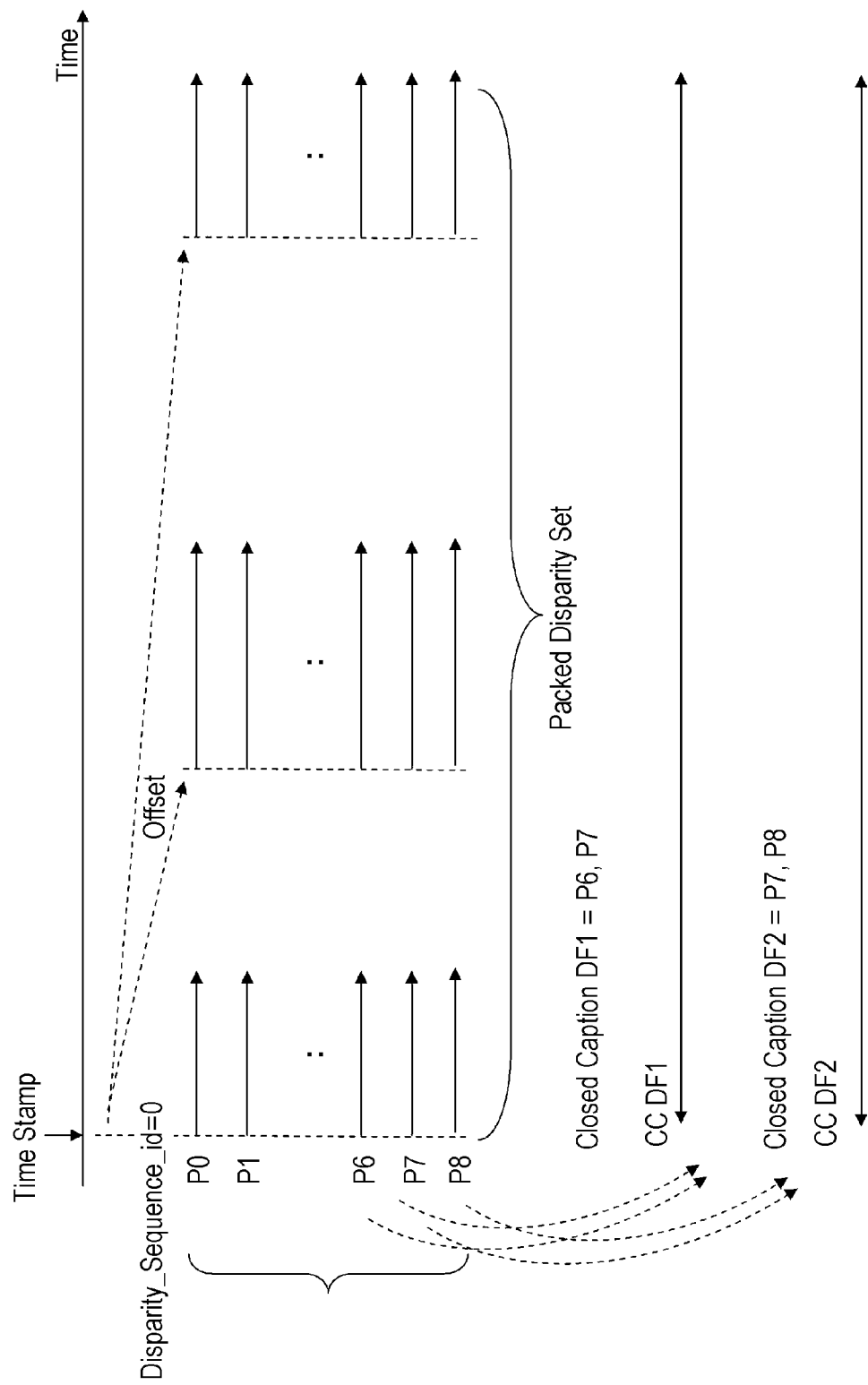

FIG. 33 illustrates an example of the association between the disparity vectors P6 and P7 and closed caption data DF1 and further the association between the disparity vectors P7 and P8 and closed caption data DF2. In this case, the association between the component element ID indicating the screen area in which the closed caption information based on the closed caption data DF1 is displayed, and the disparity vectors P6 and P7 is performed. Also, similarly, the association between the component element ID indicating the screen area in which the closed caption information based on the closed caption data DF2 is displayed, and the disparity vectors P7 and P8 is performed.

FIG. 34 illustrates an association table (Component_Linked_Info) between component element IDs and disparity vectors in this case. In this case, a disparity vector is specified by a partition position ID (Partition_Position_ID). The partition position ID indicates which screen area among a plurality of screen areas specified by the number of divisions or the block size.

"Case (3)"

As described above, case (3) is a case where both a general-purpose disparity information set and a specific-service-use disparity information set are sent. In the case (3), both a general-purpose disparity information set and a specific-service-use disparity information set are created. In this case, the identification information (Disparity_Sequence_id) added to the general-purpose disparity information set is set to "0". Also, the identification information (Disparity_Sequence_id) added to the specific-service-use disparity information set is set to a value other than "0". The association between identification information (Disparity_Sequence_id) and services is performed by, for example, as described above, inserting the information into user data. Alternatively, this association is performed using, for example, as described above, a disparity linkage descriptor (Disparity_Linkage_Descriptor).

Figure 35:
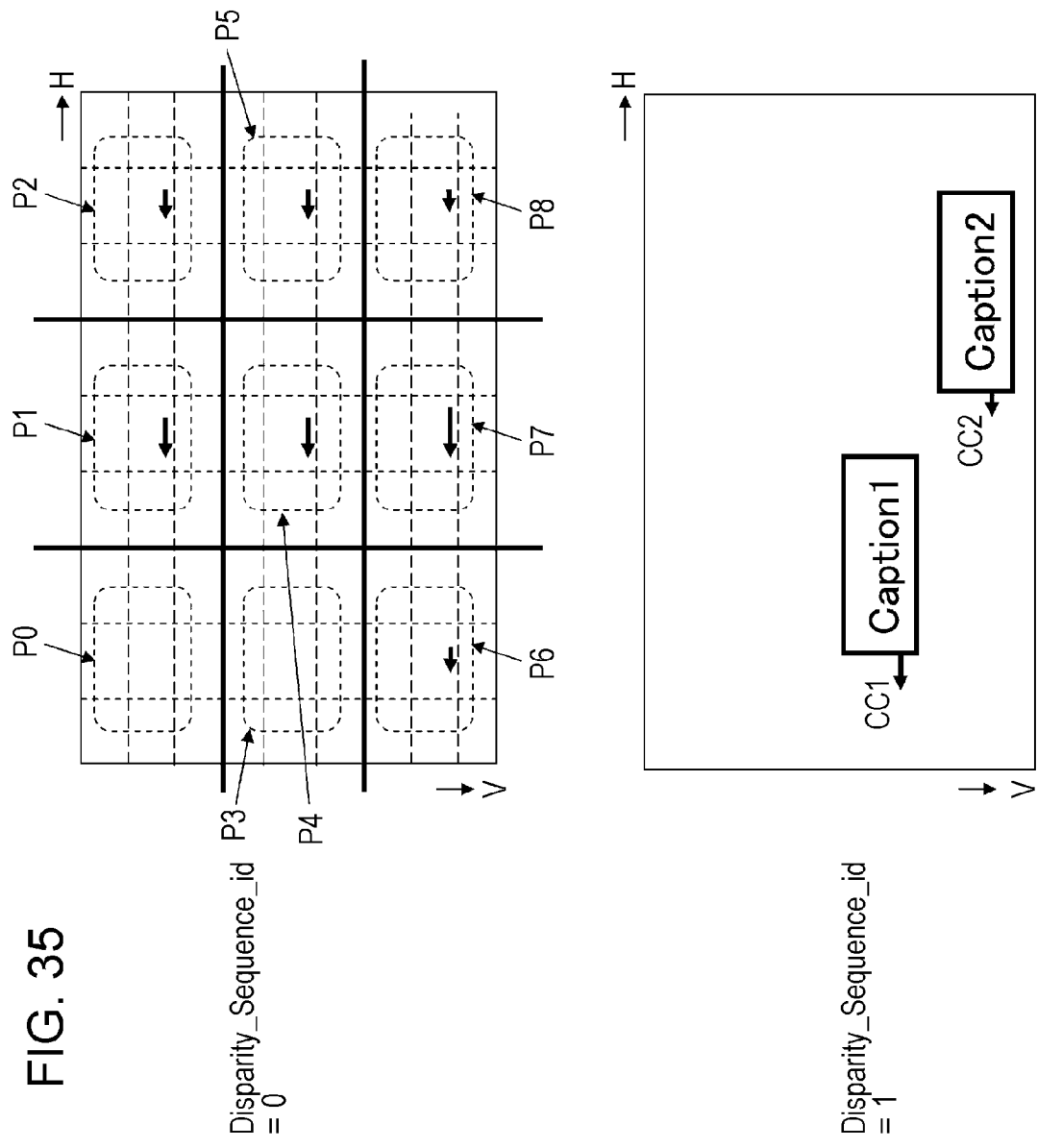
FIG. 35 is a diagram illustrating an example of a disparity information set created in case (3) (where both a general-purpose disparity information set and a specific-service-use disparity information set are sent).

FIG. 35 illustrates an example of the disparity information set created in the case (3). In this example, the general-purpose disparity information set contains disparity vectors (horizontal disparity vectors) P0 to P8 belonging to individual screen areas obtained by dividing the screen into nine sections. The disparity vectors P0 to P8 are determined through the downsizing process described above using, for example, pixel-based disparity vectors. In FIG. 35, an arrow indicates a disparity vector, and the length of the arrow corresponds to the magnitude of the disparity vector.

Also, a disparity information set for closed caption use is created as a specific-service-use disparity information set. The disparity information set for closed caption use contains a disparity vector CC1 corresponding to closed caption information "Caption1", and a disparity vector CC2 corresponding to closed caption information "Caption2".

Figure 36:
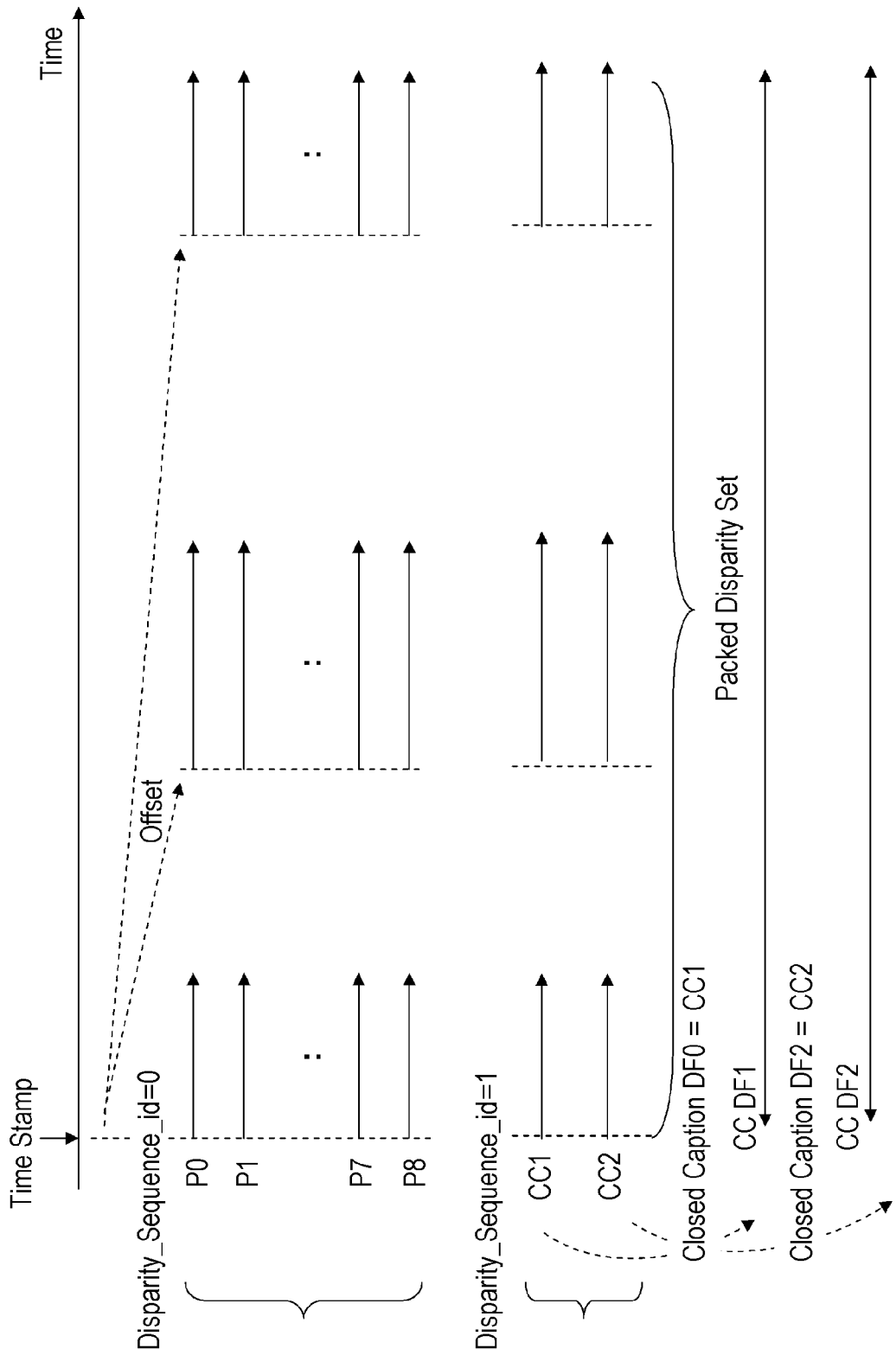

Here, the disparity information set is a disparity information set for each predetermined unit of image data, for example, for each picture of encoded video. As described below, image data is sectioned into certain periods, and a set of a plurality of disparity information sets (Packed Disparity Sets) corresponding to image data of each certain period is transmitted prior to the transmission of the image data of the certain period. Thus, as illustrated in FIG. 36, a disparity information set for each predetermined unit is added with an offset (Offset) as time information indicating the timing at which the disparity information set is used. The offset added to each disparity information set represents the time from the use time of the first disparity information, which is indicated by a time stamp (Time Stamp).

As described above, the specific-service-use disparity information set is a disparity information set for closed caption use. FIG. 35 illustrates an example of the association between the disparity vector CC1 and the closed caption data DF1 and further the association between the disparity vector CC2 and the closed caption data DF2. In this case, the association between the component element ID (Component_Element ID) indicating the screen area in which the closed caption information is displayed, and the disparity vectors CC1 and CC2 is performed.

FIG. 37 illustrates an association table (Component_Linked_Info) between component element IDs and disparity vectors in this case. In this case, the target position of a disparity vector is specified by a partition position ID (Partition_Position ID). The partition position ID indicates which screen area among a plurality of screen areas specified by the number of divisions or the block size.

"Case (4)"

As described above, case (4) is a case where only a specific-service-use disparity information set is sent. In the case (4), only a specific-service-use disparity information set is created. In this case, the identification information (Disparity_Sequence_id) added to the specific-service-use disparity information set is set to a value other than "0". For example, the association between identification information (Disparity_Sequence_id) and services is performed by, as described above, inserting the information into user data. Alternatively, this association is performed using, for example, as described above, a disparity linkage descriptor (Disparity_Linkage_Descriptor).

Figure 38:
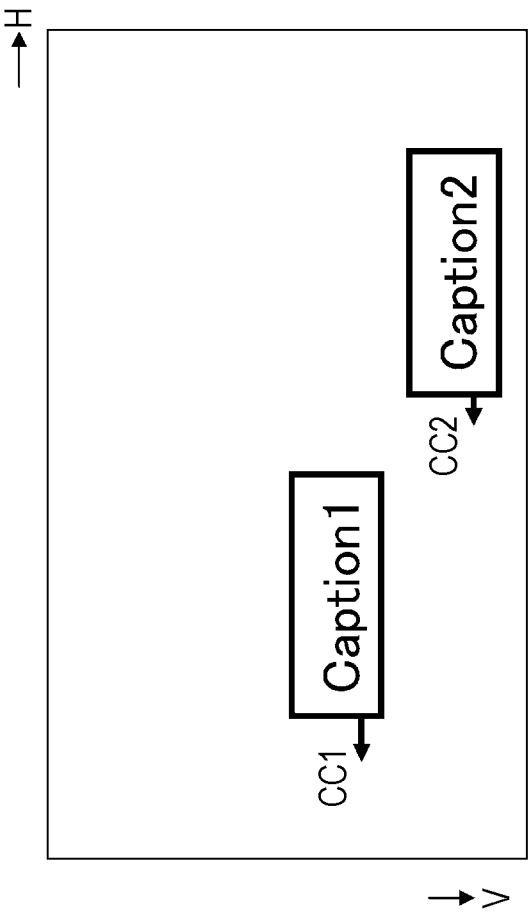
FIG. 38 is a diagram illustrating an example of a disparity information set created in case (4) (where only a specific-service-use disparity information set is sent).

FIG. 38 illustrates an example of the disparity information set created in the case (4). In this example, a disparity information set for closed caption use is created as a specific-service-use disparity information set. The disparity information set for closed caption use contains a disparity vector CC1 corresponding to closed caption information "Caption1", and a disparity vector CC2 corresponding to closed caption information "Caption2".

Figure 39:
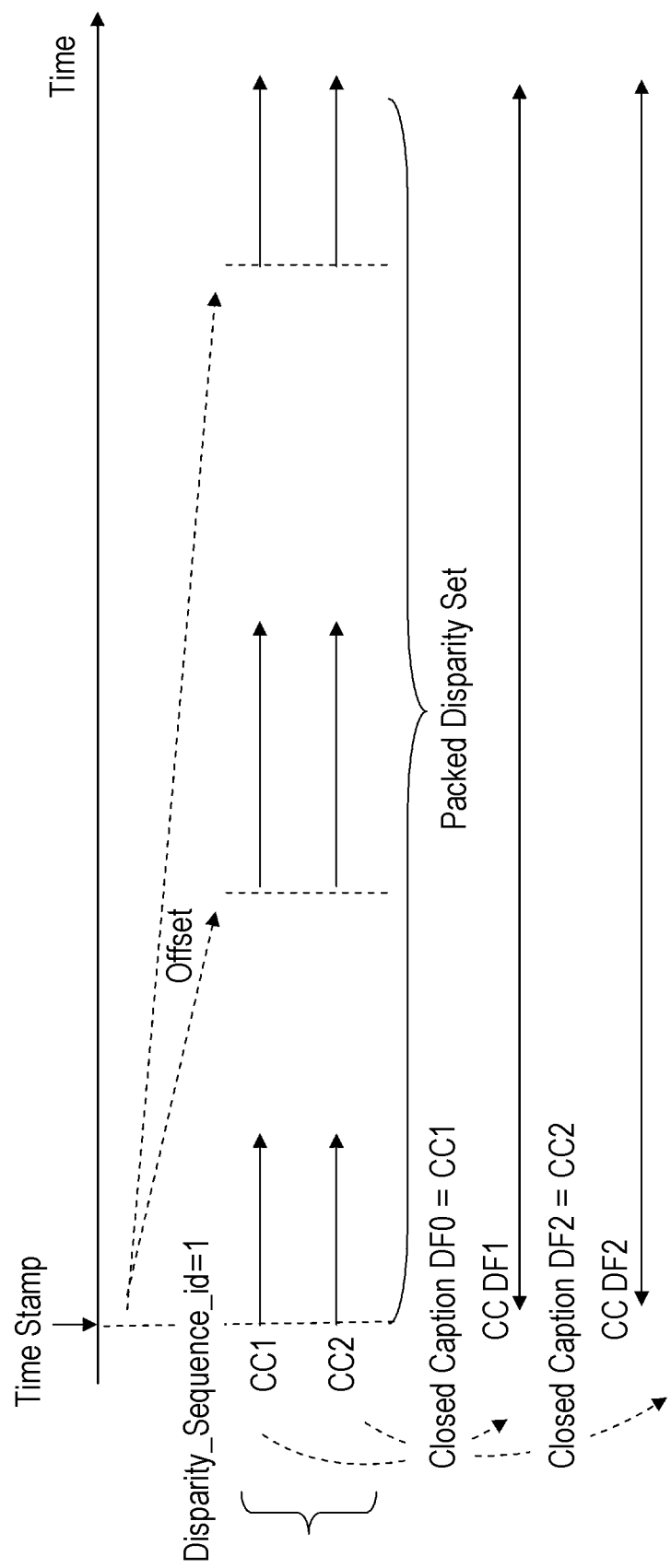

Here, the disparity information set is a disparity information set for each predetermined unit of image data, for example, for each picture of encoded video. As described below, image data is sectioned into certain periods, and a set of a plurality of disparity information sets (Packed Disparity Sets) corresponding to image data of each certain period is transmitted prior to the transmission of the image data of the certain period. Thus, as illustrated in FIG. 39, a disparity information set for each predetermined unit is added with an offset (Offset) as time information indicating the timing at which the disparity information set is used. The offset added to each disparity information set represents the time from the use time of the first disparity information set, which is indicated by a time stamp (Time Stamp).

As described above, the specific-service-use disparity information set is a disparity information set for closed caption use. FIG. 39 illustrates an example of the association between the disparity vector CC1 and the closed caption data DF1 and further the association between the disparity vector CC2 and the closed caption data DF2. In this case, the association between the component element ID (Component_Element ID) indicating the screen area in which the closed caption information is displayed, and the disparity vectors CC1 and CC2 is performed (see FIG. 37).

Note that in FIGS. 32, 34, and 37, an example in which an association table between component element IDs and disparity vectors, in which the component element ID is the window ID (Window ID) of a closed caption is illustrated. For example, in the case of a DVB subtitle, the component element ID is the region ID (Region_id) of the DVB subtitle.

Figure 40:
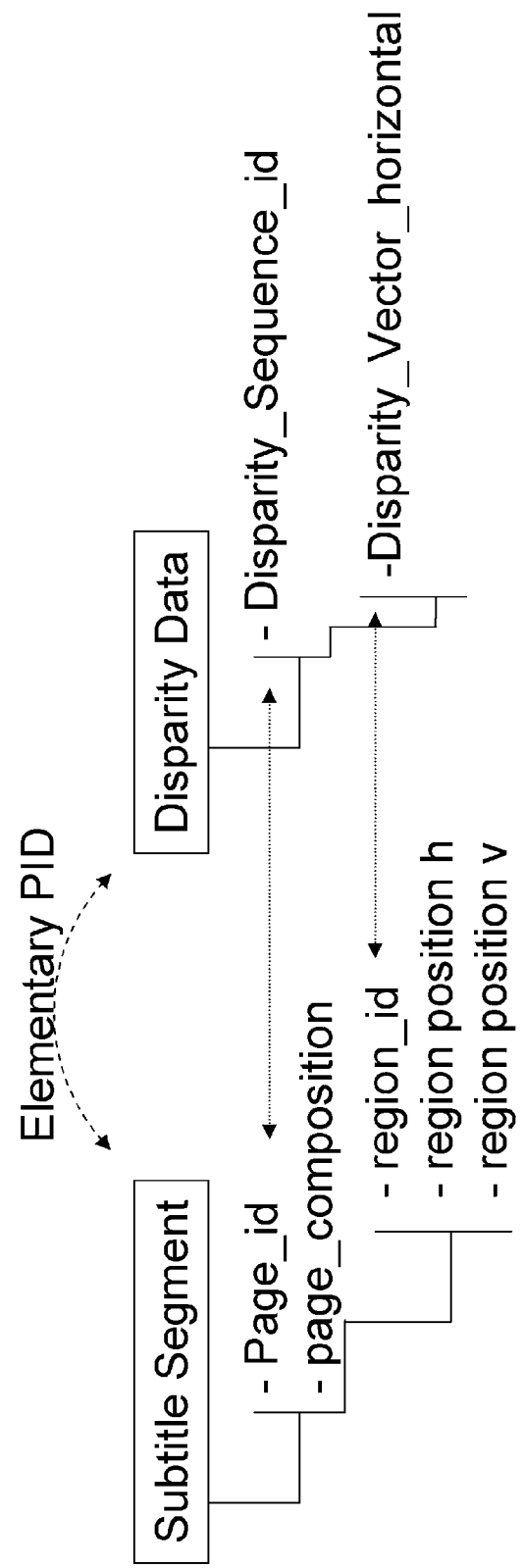
FIG. 40 is a diagram describing the association between a subtitle segment (Subtitle Segment) and disparity vector data (Disparity Data) using an elementary PID (Elementary PID) in the case of a DVB subtitle.

In the case of a DVB subtitle, for example, as illustrated in FIG. 40, the association between a subtitle segment (Subtitle Segment) and disparity vector data (Disparity Data) is performed using an elementary PID (Elementary PID). Then, a page ID (Page_id) in the subtitle segment and identification information (Disparity_Sequence_id) of the disparity vector data are related with each other. Furthermore, a region ID Region ID) and a disparity vector (Disparity_Vector_horizontal) are related with each other.

The video encoder 113 performs encoding using MPEG4-AVC, MPEG2, VC-1, or the like on the stereo image data supplied from the data retrieving unit 130 to obtain encoded video data. Also, the video encoder 113 generates, using a stream formatter 113a provided in the rear stage thereof, a video elementary stream including encoded video data in a payload portion. As described above, a predetermined set of disparity information sets created by the disparity information set creation unit 131 is supplied to the stream formatter 113a in the video encoder 113. The stream formatter 113a embeds, as user data, the predetermined set of disparity information sets in a video stream.

FIG. 41 schematically illustrates an example structure of a video elementary stream (Video Elementary Stream). In the video elementary stream, a sequence header portion including a per-sequence parameter is arranged at the beginning. A picture header including a per-picture parameter and user data is arranged subsequent to the sequence header portion. A payload portion including picture data is arranged subsequent to the picture header portion. Subsequently, the picture header portion and the payload portion are repeatedly arranged.

The disparity information set described above is embedded in, for example, the user data area in the picture header portion. FIG. 42 illustrates an example configuration of user data. FIG. 42(a) illustrates the configuration of user data in a case where the encoding method is MPEG2. FIG. 42(b) illustrates the configuration of user data in a case where the encoding method is H.264 AVC (MPEG4-AVC). Furthermore, FIG. 42(c) illustrates the configuration of user data in a case where the encoding method is VC-1.

The configurations of user data in the respective methods are substantially similar although the detailed description is omitted. That is, a code indicating the start of the user data is arranged at the beginning, identifier "user_identifier" indicating the kind of the data is arranged thereafter, and data body "user_structure" is further arranged thereafter. The detailed configuration of user data including disparity information (Disparity_Information) will be described below.

The audio encoder 117 performs encoding using MPEG-2 Audio AAC or the like on the audio data supplied from the data retrieving unit 130, and generates an audio elementary stream. The multiplexer 122 multiplexes packetized elementary streams output from the encoders 113, 117, 119, and 121. Then, the multiplexer 122 outputs bit stream data (transport stream) BSD serving as transmission data.

The other elements of the transmission data generation unit 110D illustrated in FIG. 22 are configured in a manner similar to those of the transmission data generation unit 110 illustrated in FIG. 2.

The operation of the transmission data generation unit 110D illustrated in FIG. 22 will be described briefly. Stereo image data output from the data retrieving unit 130 is supplied to the video encoder 113. In the video encoder 113, encoding using MPEG4-AVC, MPEG2, VC-1, or the like is performed on the stereo image data, and a video elementary stream including the encoded video data is generated. The video elementary stream is supplied to the multiplexer 122.

Also, the pixel-based disparity vectors output from the data retrieving unit 130 are supplied to the disparity information set creation unit 131. In the disparity information set creation unit 131, a downsizing process and the like are performed on the disparity vectors, and a predetermined set of disparity information sets to be transmitted is created (cases (1) to (4)). The predetermined set of disparity information sets created by the disparity information set creation unit 131 is supplied to the stream formatter 113a in the video encoder 113. In the stream formatter 113a, the predetermined set of disparity information sets is embedded as user data in a video stream.

Also, the audio data output from the data retrieving unit 130 is supplied to the audio encoder 117. In the audio encoder 117, encoding using MPEG-2 Audio AAC or the like is performed on the audio data, and an audio elementary stream including the encoded audio data is generated. The audio elementary stream is supplied to the multiplexer 122.

Also, an elementary stream including encoded data regarding the subtitle data or graphics data is supplied from the subtitle/graphics encoder 119 to the multiplexer 122. Furthermore, an elementary stream including encoded data regarding the text data is supplied from the text encoder 121 to the multiplexer 122. Then, in the multiplexer 122, packets of the elementary streams supplied from the respective encoders are multiplexed, and bit stream data (transport stream) BSD serving as transmission data is obtained.

[Association Between Service Component and Disparity Information for Each Stream, Association Between Disparity Information Set Identification Information and Service]

The association between service components and disparity information in respective associated streams is performed using a disparity linkage descriptor (Disparity_Linkage_Descriptor). Also, the association between disparity information set identification information (Disparity_Sequence_id) and services in respective streams is also performed using the disparity linkage descriptor. The disparity linkage descriptor is arranged in the header area of a multiplexed stream or in a descriptor table such as PMT in a multiplexed stream.

FIG. 43 illustrates an example configuration of a disparity linkage descriptor in this case. FIG. 44 illustrates the content of each piece of information in the configuration illustrated in FIG. 43. "descriptor_tag" is 8-bit data indicating the type of the descriptor. Here, "0xD0" is set, which indicates a disparity linkage descriptor. "descriptor_length" is 8-bit data indicating the length of the information (size).

"number_of_Linked_Streams" is 5-bit data indicating the number of elementary streams for which the relation between two streams is defined in terms of disparity information data (Disparity Data) and the streams are associated.

"ElementaryPID_of_disparity" is 13-bit data indicating the PID (program ID) of an elementary stream (PES) including the disparity information data (Disparity Data). "ElementaryPID_of_Service_Component" is 13-bit data indicating the PID (program ID) of an elementary stream (PES) including a service component such as subtitle, caption, text, or graphics. With the two PIDs, the association between disparity information and a service component is performed for each of associated elementary streams.

"number_of_linked_sequences" is 5-bit data indicating the number of disparity information sets (Disparity information) associated so as to correspond to each of the associated elementary streams. "Service_id" is 32-bit data indicating a unique word for identifying a service. For example, "0x47413934" is assigned for ATSC. "Data_Type" is 8-bit data indicating the data type in the service identified by the "Service_id". For example, "0x03" indicates closed caption data.

Disparity sequence IDs "Disparity_Sequence_id" and service page IDs "Service_page_id", the number of which corresponds to the value indicated by "number_of_linked_sequences", are arranged. "Disparity_Sequence_id" is 8-bit data that is identification information for identifying each service. "Service_page_id" is 8-bit data specifying a service such as a subtitle page. Accordingly, a predetermined number of disparity sequence IDs and service page IDs are associated with predetermined "Service_id(i)" and "Data_Type(i)".

A specific example of each item in the example configuration of the disparity linkage descriptor illustrated in FIG. 43 will be described. FIG. 45(a) illustrates an example of a PID in a case where, as with the transmission data generation unit 110D in FIG. 22, a disparity information set is inserted into the user data area of an image data stream and is sent to the receiving side. In this example, the disparity linkage descriptor (Disparity_Linkage_Descriptor) is arranged in a PMT in a multiplexed stream (TS).

Then, in this example, the PID of a video (image data) elementary stream (PES) including the disparity information data (Disparity Data) included in the multiplexed stream (TS) is set to "PID_0". Also, in this example, the PID of the audio elementary stream (PES) included in the multiplexed stream (TS) is set to "PID_1". Furthermore, in this example, the PID of a subtitle elementary stream (PES) included in the multiplexed stream (TS) is set to "PID_2".

Figure 62:
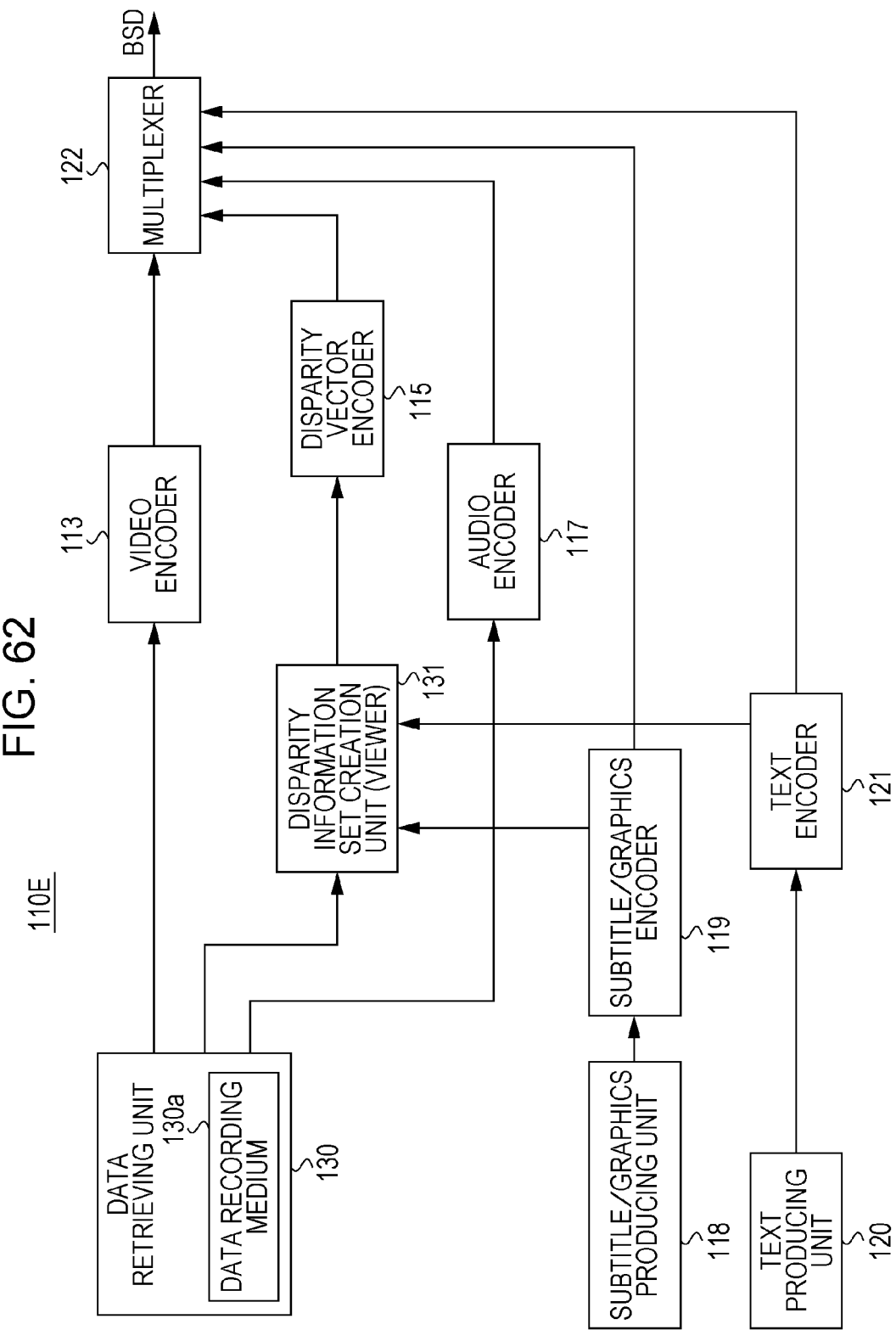
FIG. 62 is a block diagram illustrating another example configuration of the transmission data generation unit in the broadcast station.

FIG. 45(b) illustrates an example of a PID in a case where, as with a transmission data generation unit 110E in FIG. 62 described below, a disparity-vector elementary stream (PES) including a disparity information set is generated, and this independent stream is multiplexed with another stream and is transmitted to the receiving side. In this example, the disparity linkage descriptor (Disparity_Linkage_Descriptor) is arranged in a PMT of a multiplexed stream (TS).

Then, in this example, the PID of a video (image data) elementary stream (PES) included in the multiplexed stream (TS) is set to "PID_0". Also, in this example, the PID of an audio elementary stream (PES) included in the multiplexed stream (TS) is set to "PID_1". Also, in this example, the PID of a subtitle elementary stream (PES) included in the multiplexed stream (TS) is set to "PID_2". Also, in this example, the PID of a disparity-vector elementary stream (PES) included in the multiplexed stream (TS) is set to "PID_3".

Figure 46:
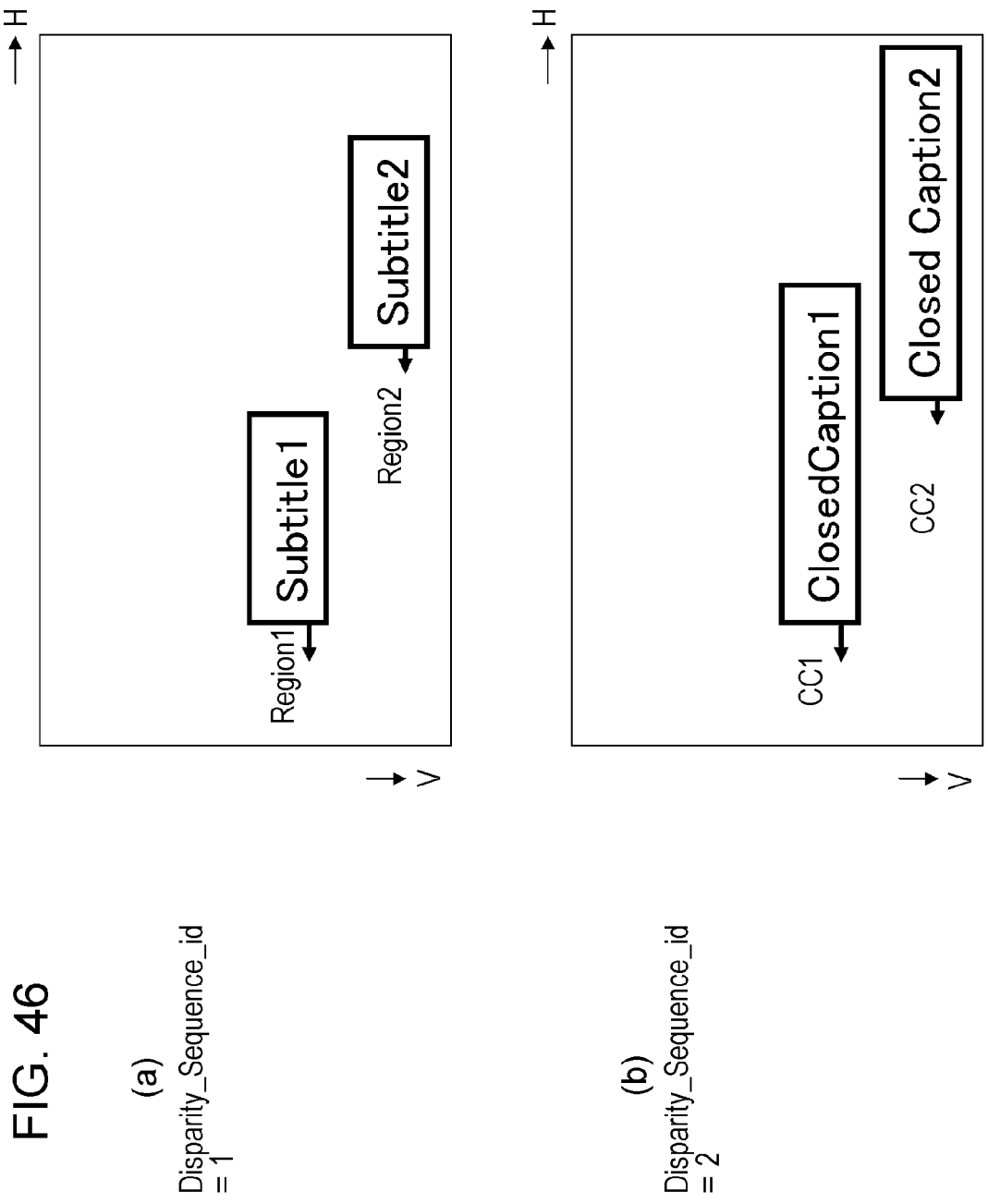
FIG. 46 includes diagrams illustrating an example in which a disparity information set added with "Disparity_Sequence_id=1" is associated with (linked to) subtitles, and an example in which a disparity information set added with "Disparity_Sequence_id=2" is associated with (linked to) closed captions.

FIG. 46(a) illustrates an example in which a disparity information set added with "Disparity_Sequence_id=1" is associated with (linked to) subtitles. In this example, the disparity information set contains a disparity vector "Region1" corresponding to subtitle information "Subtitle1", and a disparity vector "Region2" corresponding to subtitle information "Subtitle2". FIG. 46(b) illustrates an example in which a disparity information set added with "Disparity_Sequence_id=2" is associated with (linked to) closed captions. In this example, the disparity information set contains a disparity vector "CC1" corresponding to closed caption information "Caption1", and a disparity vector "CC2" corresponding to closed caption information "Caption2".

Figure 47:
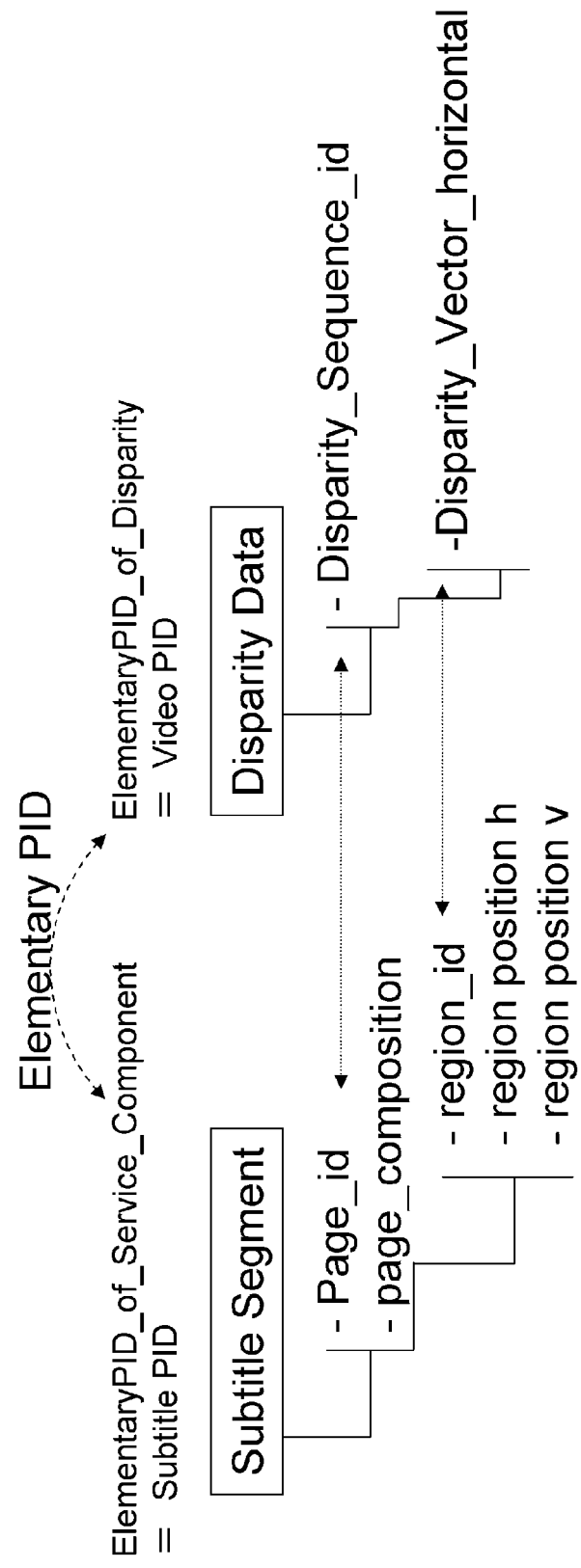
FIG. 47 is a diagram illustrating a case where a disparity information set is associated with a subtitle.

FIG. 47 illustrates a case where in the case of FIG. 45(a) described above, a disparity information set is associated with a subtitle. In this case, "ElementaryPID_of_Service_Component" is set to the PID of the subtitle elementary stream (Subtitle PID). Also, in this case, "ElementaryPID_of_disparity" is set to the PID of the video elementary stream (Video PID).

Figure 48:
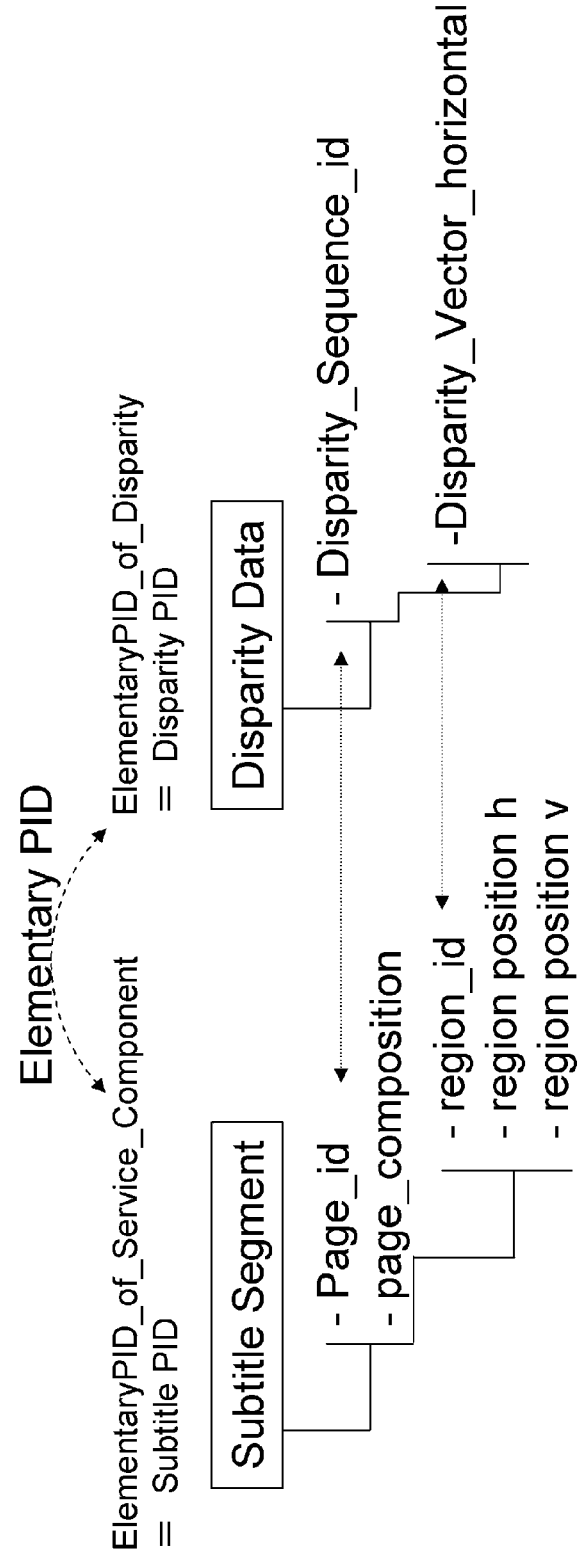
FIG. 48 is a diagram illustrating a case where a disparity information set is associated with a subtitle.

FIG. 48 illustrates a case where in the case of FIG. 45(b) described above, a disparity information set is associated with a subtitle. In this case, "ElementaryPID_of_Service_Component" is set to the PID of the subtitle elementary stream (Subtitle PID). Also, in this case, "ElementaryPID_of_disparity" is set to the PID of the disparity vector elementary stream (Disparity PID).

Figure 49:
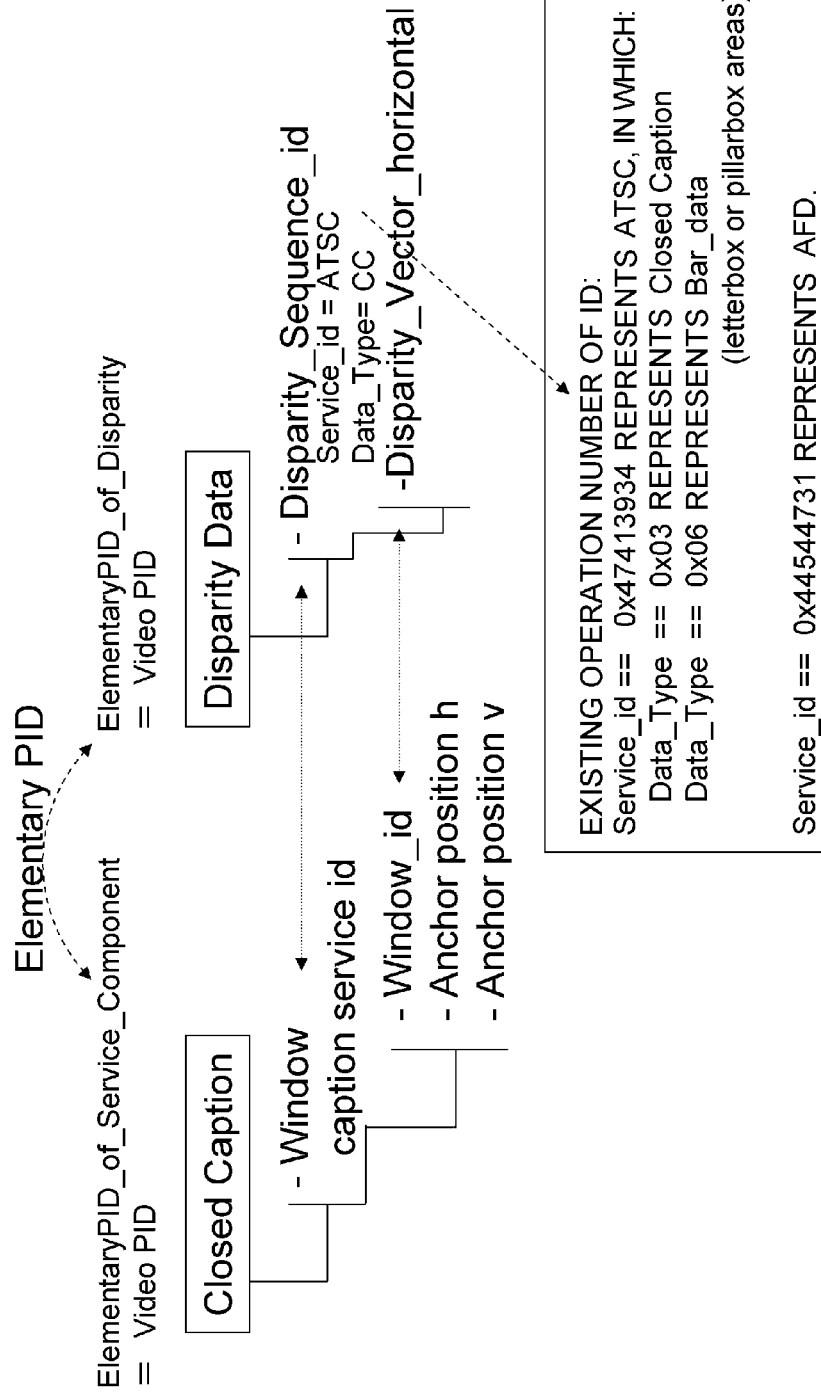
FIG. 49 is a diagram illustrating a case where a disparity information set is associated with a closed caption (where closed caption data is sent to the receiving side in a state of being inserted in a user data area of an image data stream).

FIG. 49 illustrates a case where in the case of FIG. 45(a) described above (where closed caption data is sent to the receiving side in a state of being inserted in the user data area of the image data stream), a disparity information set is associated with a closed caption. Here, "Service_id" represents ATSC, and "Data_Type"=closed caption (CC) is represented. In this case, "ElementaryPID_of_Service_Component" is set to the PID of the video elementary stream (Video PID). Also, in this case, "ElementaryPID_of_disparity" is also set to the PID of the video elementary stream (Video PID).

Note that, for example, the existing operation numbers of the IDs are as follows although the detailed description is omitted: "Service_id=0x47413934" represents "ATSC", in which "Data_Type=0x03" represents "closed caption" and "Data_Type=0x06" represents "Bar_data (letterbox or pillarbox areas)". Also, "Service_id=0x44544731" represents "AFD".

Figure 50:
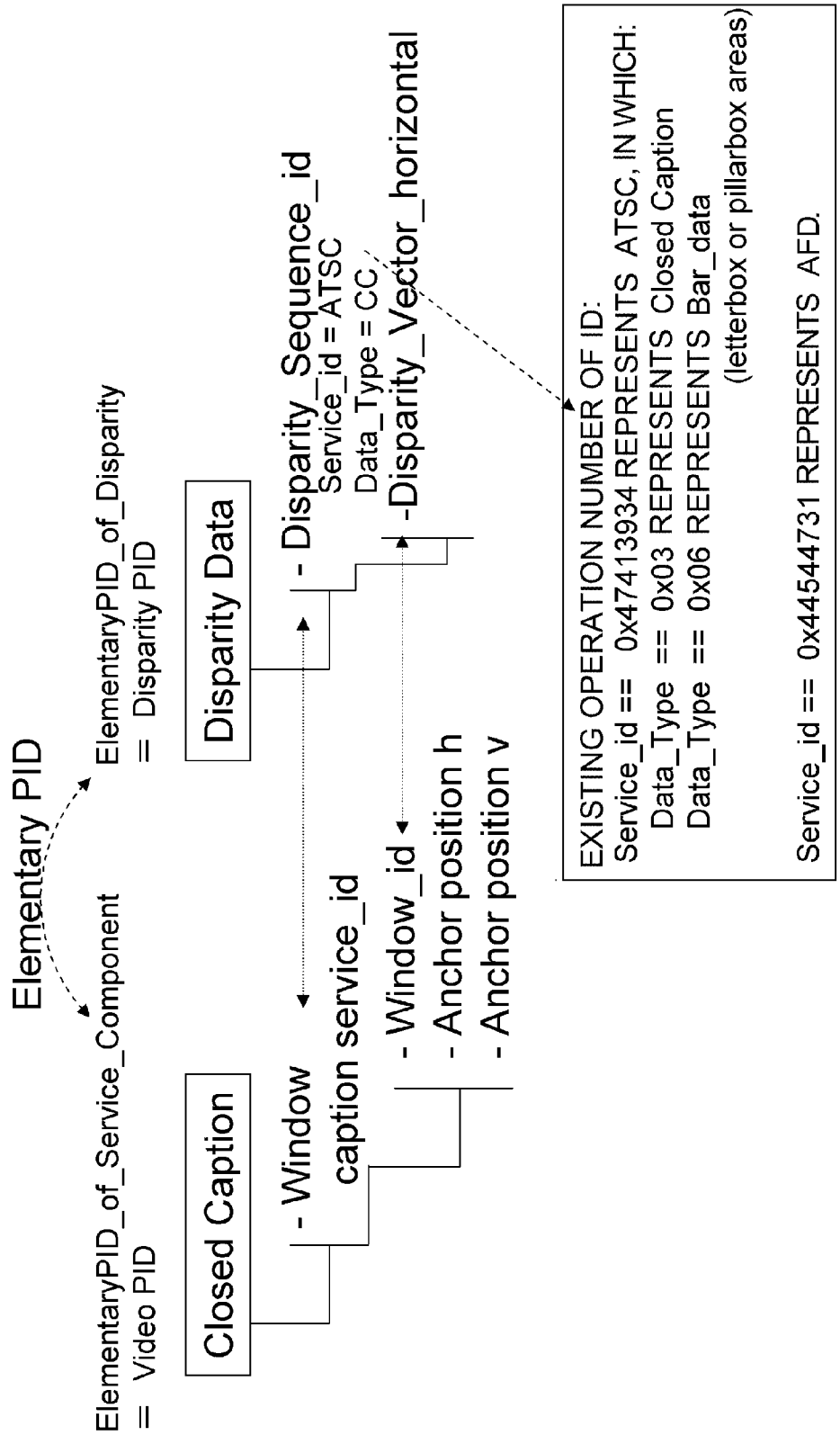
FIG. 50 is a diagram illustrating a case where a disparity information set is associated with a closed caption (where closed caption data is sent to the receiving side in a state of being inserted in a user data area of an image data stream).

FIG. 50 illustrates a case where in the case of FIG. 45(b) described above (where closed caption data is sent to the receiving side in a state of being inserted in the user data area of the image data stream), a disparity information set is associated with a closed caption. Here, "Service_id" represents ATSC and "Data_Type"=closed caption (CC) is represented. In this case, "ElementaryPID_of_Service_Component" is set to the PID of the video elementary stream (Video PID). Also, in this case, "ElementaryPID_of_disparity" is set to the PID of the disparity vector elementary stream (Disparity PID).

[Detailed Configuration of User Data Including Disparity Information (Disparity_Information)]

FIG. 51 illustrates an example of the detailed configuration of user data including disparity information (Disparity_Information). This example of an example in a case where the encoding method is MPEG2. When a data identifier that follows the start code (user_data_start_code) is a disparity information identifier (Disparity_Information_identifier), disparity information (Disparity_Information) is arranged as the data body that follows the data identifier.

FIG. 52 illustrates the configuration of disparity information (Disparity_Information), and disparity information data (Disparity_Information_Data) is arranged therein. The disparity information data can have information similar to that of the disparity linkage descriptor (Disparity_Linkage_Descriptor) in FIG. 43 described above. In this case, the disparity information data contains DSL (Disparity_Information_Link_Information) having a configuration illustrated in FIG. 53. Also, the disparity information data contains DHI (Disparity_Header_Information) having a configuration illustrated in FIGS. 54 and 55. Furthermore, the disparity information data contains a DDS (Disparity Data Set) having a configuration illustrated in FIG. 56. FIGS. 57 to 60 illustrate the content of the individual pieces of information in the configuration illustrated in FIGS. 53 to 56.

The DSL will be described with reference to FIG. 57. The DSL is information for associating a disparity sequence ID (Disparity_Sequence_id) with a service. "Disparity_Info_Length" is 16-bit data indicating the length (size) of the information. "Disparity_Info_Type" is 2-bit data indicating the type of the information, and is set to "0x0" here, which indicates that the information is "DSL".

Although the detailed description is omitted, the items "number_of_Linked_Streams", "ElementaryPID_of_disparity", "ElementaryPID_of_Service_Component", "number_of_linked_sequences", "Service_id", "Data_Type", and "Disparity_Sequence_id" are those as described with FIG. 43.

The DHI will be described with reference to FIGS. 54 and 55. The DHI also contains information for associating each service component and a partition position ID (Partition_Position_ID) specifying the disparity vector to be used for the component. "Disparity_Info_Length" is 16-bit data indicating the length (size) of the information. "Disparity_Info_Type" is 2-bit data indicating the type of the information, and is set to "0x1" here, which indicates that the information is "DHI".

"Views_offset" is 1-bit data indicating whether an extension of the offset is applied to "second view", for example, only the right-eye image or to "both views", that is, each of the left-eye image and the right-eye image. In the case of "1", the application to "both views" is indicated. In the case of "0", the application to "second view" is indicated. "Disparity_precision" is 2-bit data indicating the degree to which superimposition information is to be shifted with respect to a disparity vector. In the case of "0", shifting by an amount corresponding to one half the disparity vector is indicated. In the case of "1", shifting by an amount corresponding to the disparity vector is indicated.

In the case of "2", shifting by a unit value corresponding to the disparity vector, where one unit equals two pixels, is indicated. For example, if the disparity vector is "7", shifting by 2×7=14 pixels is performed. In the case of "3", shifting by a unit value corresponding to the disparity vector, where one unit equals to three pixels, is indicated. For example, if the disparity vector is "7", shifting by 3×7=21 pixels is performed.

"Disparity_Sequence_id" is 8-bit data that is identification information for identifying each service. "Service_Linked_flag" is 1-bit data indicating whether or not there is a disparity vector (disparity information) associated with the service in the DSL described above. In the case of "1", it is indicated that there is a disparity vector associated with the service. In contrast, in the case of "0", it is indicated that there is no disparity vector associated with the service.

"Target_Resolution_Type" is 2-bit data for specifying the resolution of an encoded disparity information set with respect to target video. In the case of "0x0", a resolution of 1920×1080 is indicated. In the case of "0x1", a resolution of 1440×1080 is indicated. In the case of "0x2", a resolution of 1280×720 is indicated.

"Block_Size" is 2-bit data for specifying a block size. The "Block_Size" is information indicating the size of an area forming information indicating a screen area. In the case of "0x0", a block size of 16 pixels×16 pixels is indicated. In the case of "0x1", a block size of 32 pixels×32 pixels is indicated. In the case of "0x2", a block size of 64 pixels×64 pixels is indicated. Furthermore, in the case of "0x3", a block size of 128 pixels×128 pixels is indicated.

"Link_source" indicates whether a disparity information set (source) is a general-purpose disparity information set or a specific-service-use disparity information set. When "1" is set, it is indicated that the disparity information set is a general-purpose disparity information set having disparity vectors of screen areas obtained by dividing a screen. When "0" is set, it is indicated that the disparity information set is a specific-service-use disparity information set having a disparity vector corresponding to a service component element.

"Partition" indicates a pattern in which a screen is divided. The "Partition" is information indicating the number of divisions on a screen that forms information indicating screen areas. In the case of "0x0", as illustrated in FIG. 61(*a*), it is indicated that the image (picture) area is not divided, and one disparity vector (disparity information) representative of this image (picture) area is transmitted. In the case of "0x1", as illustrated in FIG. 61(*b*), it is indicated that the image (picture) area is divided into four sections and that four disparity vectors (disparity information) representative of the individual sub-areas are transmitted. In this case, the disparity vectors are arranged in such a manner that the disparity vector of the upper left area becomes the first and the disparity vector of the lower right area becomes the last in the order of 0 to 3 in FIG. 61(*b*)).

In the case of "0x2", as illustrated in FIG. 61(*c*), it is indicated that the image (picture) area is divided into nine sections and that nine disparity vectors (disparity information) representative of the individual sub-areas are transmitted. In this case, the disparity vectors are arranged in such a manner that the disparity vector of the upper left area becomes the first and the disparity vector of the lower right area becomes the last (in the order of 0 to 8 in FIG. 61(*c*)). In the case of "0x3", as illustrated in FIG. 61(*d*), it is indicated that the image (picture) area is divided into 16 sections and that 16 disparity vectors (disparity information) representative of the individual sub-areas are transmitted. In this case, the disparity vectors are arranged in such a manner that the disparity vector of the upper left area becomes the first and the disparity vector of the lower right area becomes the last (in the order of 0 to 15 in FIG. 61(*d*)).

In the case of "0x7", it is indicated that the image (picture) area is divided into a plurality of blocks and that a plurality of disparity vectors (disparity information) representative of the individual sub-areas are transmitted. In this case, the disparity vectors are arranged in such a manner that the disparity vector of the upper left area becomes the first and the disparity vector of the lower right area becomes the last.

"Number_of_Component_Elements" is 13-bit data indicating the number of screen areas specified by the "Partition" or "Block_Size" described above, or indicating the number of component elements in the associated service.

Then, in a case where the "Service_Linked_flag" described above is "1", component linkage information (Component_Linkage_Info), the amount of which corresponds to the number of services (number of service) associated with the disparity vectors (disparity information) in the disparity information set, is arranged. In the component linkage information, as illustrated in FIG. 55, information, for the number of component elements, about the correspondence between the component elements and disparity vectors are arranged.

"Component_Element" is 8-bit data indicating a component element ID. A component element ID is, for example, the window ID (Window ID) of a closed caption, the region ID (region_idga) of a DVB subtitle, or the like. "Element_Linkage_Length" is 8-bit data indicating the length (size) of the information. "number_of_multiple_link" indicates the number of disparity vectors to be associated with the component element ID. "Partition_Position_id" is 13-bit information specifying the disparity vectors. The "Partition_Position_id" indicates which screen area among a plurality of screen areas specified by the "Partition" or "Block_Size" described above.

The DDS will be described with reference to FIG. 56. The DDS contains information about disparity vectors included in each disparity information set. "Disparity_Info_Length" is 16-bit data indicating the length (size) of the information. "Disparity_Info_Type" is 2-bit data indicating the type of the information, and is set to "0x2" here, which indicates that the information is "DID". "Disparity_Sequence_id" is 8-bit data for identifying a general-purpose disparity information set or a specific-service-use disparity information set and for identifying a service in the case of specific service use.

"Number_of_Component_Elements" is 13-bit data indicating the number of screen areas specified by the "Partition" or "Block_Size" described above, or the number of component elements in associated services. The values of P disparity vectors included in a disparity information set that is used in each frame during a certain period of video data, for example, a period of 15 frames, are arranged. "Disparity_sets_in_period" is 8-bit data indicating the number of disparity vector (disparity information) sets for providing an offset included in the certain period of video data.

"Offset_Frame_In_disparity_set" is time information indicating the timing at which each disparity information set is used. The time information indicates the time (the number of frames) from the use time of the first disparity information set, which is indicated by a time stamp (Time Stamp). "Disparity_Vector_Horizontal(i)" indicates the value of a horizontal disparity vector that is the value of the i-th disparity vector.

Note that in the foregoing description, an example in which information for associating a disparity sequence ID (Disparity_Sequence_id) with a service is arranged as DSL in disparity information (Disparity_Information) serving as user data has been illustrated. However, it is also conceivable that the association between a disparity sequence ID and a service is performed using a disparity linkage descriptor (Disparity_Linkage_Descriptor). The disparity linkage descriptor DLD is arranged in, for example, a PMT table in a multiplexed stream (bit stream data BSD).

In the transmission data generation unit 110D illustrated in FIG. 22, a predetermined set of disparity information sets each having added thereto identification information indicating the kind of superimposition information for which disparity information is to be used is transmitted together with stereo image data including left-eye image data and right-eye image data for displaying a stereo image. Thus, on the receiving side, appropriate disparity can be given to the same superimposition information (such as closed caption information, subtitle information, graphics information, or text information) to be superimposed on a left-eye image and a right-eye image using a disparity information set suitable for the kind of the superimposition information.

Note that in the foregoing description of the transmission data generation unit 110D illustrated in FIG. 22, it has been described that the disparity information set creation unit 131 performs a downsizing process on a disparity vector for each pixel in the bottom layer to determine a disparity vector of each area in each layer. However, a disparity vector of each area in each layer may be recorded on the data recording medium 130a, and the disparity information set creation unit 131 may utilize it.

"Another Example Configuration of Transmission Data Generation Unit"

Also, the transmission data generation unit 110D illustrated in FIG. 22 is configured to send a predetermined set of disparity information sets created by the disparity information set creation unit 131 to the receiving side in a state of being inserted in an image data stream. However, a configuration can also be used in which the predetermined set of disparity information sets created by the disparity information set creation unit 131 is sent to the receiving side in a state of being inserted in a different data stream other the image data stream.

Also, a configuration can also be used in which a disparity-vector elimentary stream (disparity vector stream) including a predetermined set of disparity information sets created by the disparity information set creation unit 131 is generated and in which the disparity vector stream is multiplexed with another stream and is transmitted to the receiving side. FIG. 62 illustrates an example configuration of a transmission data generation unit 110E in this case. In FIG. 62, portions corresponding to those in FIG. 22 are assigned the same numerals, and the detailed description thereof is omitted.

Similarly to the transmission data generation unit 110 illustrated in FIG. 2, the transmission data generation unit 110E is configured to include a disparity vector encoder 115. A predetermined set of disparity information sets created by the disparity information set creation unit 131 is sent to the disparity vector encoder 115. Then, in the disparity vector encoder 115, a disparity-vector elimentary stream (disparity vector stream) including the predetermined set of disparity information sets is generated. Then, the disparity vector stream is supplied to the multiplexer 122. In the multiplexer 122, the disparity vector stream is also multiplexed together with other data streams, and bit stream data BSD is generated.

In the transmission data generation unit 110E, the other configuration and operation are similar to those of the transmission data generation unit 110D illustrated in FIG. 22 although the detailed description is omitted. Also in the transmission data generation unit 110E, advantages similar to those of the transmission data generation unit 110D illustrated in FIG. 22 can be obtained.

"Another Example Configuration of Transmission Data Generation Unit"

In the transmission data generation unit 110D illustrated in FIG. 22, it is possible to transmit, as a disparity information set, either or both a general-purpose disparity information set and a specific-service-use disparity information set. However, it is also conceivable that disparity information for restricted use, such as closed caption information or subtitle information, is designed to be transmitted and that a simple data structure capable of being easily coordinated with the existing broadcast standards (such as ATSC and CEA) is used.

Figure 63:
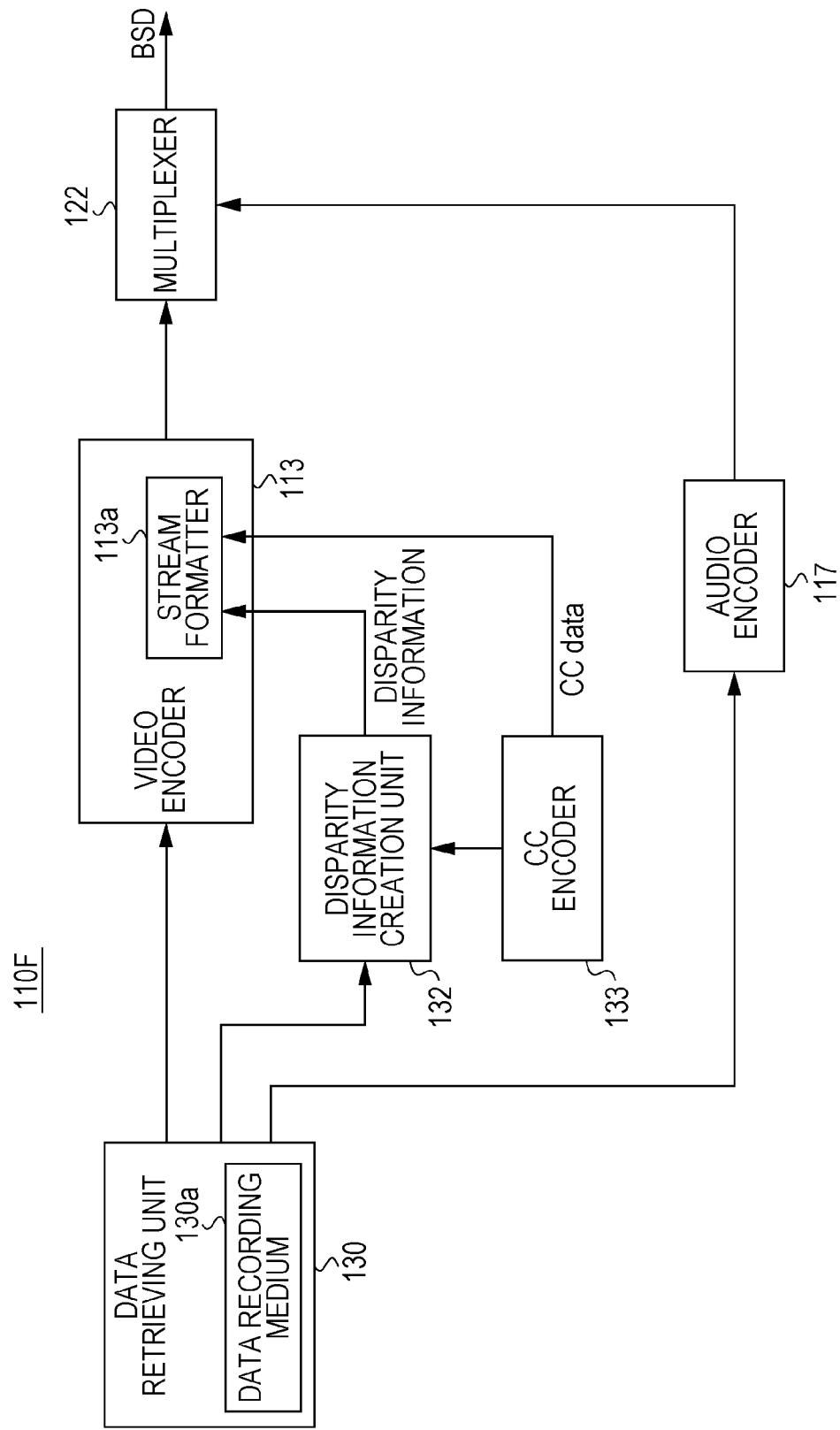
FIG. 63 is a block diagram illustrating another example configuration of the transmission data generation unit in the broadcast station.

FIG. 63 illustrates an example configuration of a transmission data generation unit 110F in this case. The transmission data generation unit 110F is configured to create disparity information whose use is restricted to closed caption information and to transmit the disparity information to the receiving side. In FIG. 63, portions corresponding to those in FIG. 2 are assigned the same numerals, and the detailed description thereof is omitted.

The transmission data generation unit 110F includes a data retrieving unit (archive unit) 130, a disparity information creation unit 131, a CC (Closed Caption) encoder 133, a video encoder 113, an audio encoder 117, and a multiplexer 122.

A data recording medium 130a is attached to the data retrieving unit 130 in, for example, a removable manner. Audio data and disparity vectors (disparity information) are recorded on the data recording medium 130a so as to correspond to each other, together with stereo image data including left-eye image data and right-eye image data. The data retrieving unit 130 retrieves stereo image data, audio data, a disparity vector, and the like from the data recording medium 130a, and outputs them. The data recording medium 130a is a disk-shaped recording medium, a semiconductor memory, or the like.

Here, the stereo image data recorded on the data recording medium 130a is designed to correspond to stereo image data obtained by the video framing unit 112 of the transmission data generation unit 110 illustrated in FIG. 2. Also, the disparity vectors recorded on the data recording medium 130a are, for example, pixel-based disparity vectors forming an image.

The CC encoder 133 is an encoder complying with CEA-708, and outputs CC data (data of closed caption information) for displaying a caption with a closed caption. In this case, the CC encoder 133 sequentially outputs CC data of individual pieces of closed caption information to be displayed in chronological order.

The disparity information creation unit 132 performs a downsizing process on disparity vectors output from the data retrieving unit 130, that is, pixel-based disparity vectors, and outputs disparity information (disparity vector) related with each window ID (Window ID) included in the CC data output from the CC encoder 133. The disparity information has added thereto shift target specification information specifying closed caption information to be shifted on the basis of the disparity information among closed caption information to be superimposed on a left-eye image and closed caption information to be superimposed on a right-eye image.

Here, the disparity information creation unit 132 outputs, in correspondence with the CC data of each piece of closed caption information output from the CC encoder 133, disparity information that is used during a period of a predetermined number of frames during which the closed caption information is displayed. The disparity information is, for example, disparity information that is commonly used in individual frames during a period of a predetermined number of frames during which the closed caption information is displayed, or disparity information that is sequentially updated in the individual frames.

Then, the disparity information has added thereto flag information indicating the disparity information that is commonly used in the individual frames or the disparity information that is sequentially updated in the individual frames. For example, the disparity information set creation unit 132 creates disparity information that is sequentially used in individual frames in a case where the movement of an image is large, and creates disparity information that is commonly used in individual frames in a case where the movement of an image is small.

The disparity information creation unit 132 forms disparity information that is sequentially updated in individual frames, which is composed of, for example, disparity information about the first frame and offset information about the second and subsequent frames with respect to preceding frames. In this manner, disparity information about the second and subsequent frames is formed of offset information with respect to disparity information about the preceding frames, thus allowing suppression of the amount of data of the disparity information and also allowing the smooth perception of update of disparity information in individual frames.

The video encoder 113 performs encoding using MPEG4-AVC, MPEG2, VC-1, or the like on the stereo image data supplied from the data retrieving unit 130 to obtain encoded video data. Also, the video encoder 113 generates, using a stream formatter 113a provided in the rear stage thereof, a video elementary stream including encoded video data in a payload portion.

The CC data output from the CC encoder 133 described above and the disparity information created by the disparity information creation unit 131 described above are supplied to the stream formatter 113a in the video encoder 113. The stream formatter 113a embeds, as user data, the CC data and the disparity information in the video elementary stream. In other words, the stereo image data is included in the payload portion of the video elementary stream, and the CC data and, in addition, the disparity information are included in the user data area of the header portion.

As illustrated in FIG. 41 described above, in the video elementary stream, a sequence header portion including a per-sequence parameter is arranged at the beginning. A picture header including a per-picture parameter and user data is arranged subsequent to the sequence header portion. A payload portion including picture data is arranged subsequent to the picture header portion. Subsequently, the picture header portion and the payload portion are repeatedly arranged.

The CC data and disparity information described above are embedded in, for example, the user data area of the picture header portion. In this case, the CC data and disparity information embedded as user data is designed to be identifiable by user data type codes. In other words, the user data type code added to the disparity information is designed to be different from the user data type code added to the CC data.

The audio encoder 117 performs encoding using MPEG-2 Audio AAC or the like on the audio data supplied from the data retrieving unit 130, and generates an audio elementary stream. The multiplexer 122 multiplexes packetized elementary streams output from the encoders 113 and 117. Then, the multiplexer 122 outputs bit stream data (transport stream) BSD serving as transmission data.

The operation of the transmission data generation unit 110F illustrated in FIG. 63 will be described briefly. Stereo image data output from the data retrieving unit 130 is supplied to the video encoder 113. In the video encoder 113, encoding using MPEG4-AVC, MPEG2, VC-1, or the like is performed on the stereo image data, and a video elementary stream including the encoded video data is generated. The video elementary stream is supplied to the multiplexer 122.

Also, in the CC encoder 133, CC data (data of closed caption information) for displaying a caption with a closed caption is output. In this case, in the CC encoder 133, CC data of individual pieces of closed caption information to be displayed in chronological order is sequentially output.

Also, pixel-based disparity vectors output from the data retrieving unit 130 are supplied to the disparity information creation unit 132. In the disparity information creation unit 132, a downsizing process and the like are performed on the disparity vectors, and disparity information (disparity vector) related with each window ID (Window ID) included in the CC data output from the CC encoder 133 described above is output.

The CC data output from the CC encoder 133 and the disparity information created by the disparity information creation unit 132 are supplied to the stream formatter 113a of the video encoder 113. In the stream formatter 113a, the CC data and the disparity information are embedded in the user data area of the header portion of the video elementary stream in such a manner that the CC data and the disparity information can be identified by user data identification information (user data type codes).

Also, the audio data output from the data retrieving unit 130 is supplied to the audio encoder 117. In the audio encoder 117, encoding using MPEG-2 Audio AAC or the like is performed on the audio data, and an audio elementary stream including the encoded audio data is generated. The audio elementary stream is supplied to the multiplexer 122. In the multiplexer 122, the packets of the elementary streams supplied from the respective encoders are multiplexed, and bit stream data BSD serving as transmission data is obtained.

[Detailed Configuration of User Data Including Disparity Information (caption_disparity_data)]

Next, the detailed configuration of user data including disparity information (caption_disparity_data) will be described. FIG. 64 illustrates an example of the user data. FIG. 65 illustrates the content of each piece of information in the configuration illustrated in FIG. 64. This example is an example in a case where the encoding method is MPEG2. Following 32-bit start code (user_data_start_code), 32-bit code "0x47413934" for identifying the broadcast standard "ATSC" is arranged.

Also, following it, 8-bit user data type code (user_data_type_code) is arranged. When "user_data_type_code=0x07" is set, disparity information (caption_disparity_data) is arranged as the data body that follows. Note that when "user_data_type_code=0x03" is set, CC data (cc_data) is arranged as the data body, and when "user_data_type_code=0x06" is set, bar data (bar_data) is arranged as the data body.

Next, the detailed configuration of disparity information (caption_disparity_data) will be described. FIG. 66 illustrates an example of the disparity information. FIGS. 67 and 68 illustrate the content of each piece of information in the configuration illustrated in FIG. 66. "service_number" is information specifying the channel of a closed caption. The "service_number" is related with the "caption service" in CEA-708. While a plurality of channels such as, for example, English and Japanese are present for closed captions, disparity information for each channel is arranged. Note that "service_number=0" indicates a special mode in which one piece of disparity information (disparity vector) is shared between a plurality of caption windows (Caption Window).

"select_view_shift" is 2-bit information forming shift target specification information. The "select_view_shift" specifies closed caption information to be shifted on the basis of the disparity information among closed caption information to be superimposed on a left-eye image and closed caption information to be superimposed on a right-eye image. For example, "select_view_shift=00" is assumed to represent reserved.

Also, for example, when "select_view_shift=01" is set, it is indicated that only the closed caption information to be superimposed on the left-eye image is shifted in the horizontal direction by the amount corresponding to the disparity information (disparity). Here, when the disparity information (disparity) is a positive value, the closed caption information to be superimposed on the left-eye image is shifted in the right direction. In contrast, when the disparity information (disparity) is a negative value, the closed caption information to be superimposed on the left-eye image is shifted in the left direction.

Also, for example, when "select_view_shift=10" is set, it is indicated that only the closed caption information to be superimposed on the right-eye image is shifted in the horizontal direction by the amount corresponding to the disparity information (disparity). Here, when the disparity information (disparity) is a positive value, the closed caption information to be superimposed on the left-eye image is shifted in the right direction. In contrast, when the disparity information (disparity) is a negative value, the closed caption information to be superimposed on the left-eye image is shifted in the left direction.

Also, for example, when "select_view_shift=11" is set, it is indicated that both the closed caption information to be superimposed on the left-eye image and the closed caption information to be superimposed on the right-eye image are shifted in opposite directions in the horizontal direction. Here, in a case where the disparity information (disparity) is an even value, the closed caption information to be superimposed on the left-eye image is shifted in the right direction by the amount corresponding to "disparity/2" when it is a positive value, and is shifted in the left direction by the amount corresponding to "disparity/2" when it is a negative value. Also, in a case where the disparity information (disparity) is an even value, the closed caption information to be superimposed on the right-eye image is shifted in the left direction by the amount corresponding to "disparity/2" when it is a positive value, and is shifted in the right direction by the amount corresponding to "disparity/2" when it is a negative value.

Also, in a case where the disparity information (disparity) is an odd value, the closed caption information to be superimposed on the left-eye image is shifted in the right direction by the amount corresponding to "(disparity+1)/2" when it is a positive value, and is shifted in the left direction by the amount corresponding to "(disparity+1)/2" when it is a negative value. Also, in a case where the disparity information (disparity) is an odd value, the closed caption information to be superimposed on the right-eye image is shifted in the left direction by the amount corresponding to "(disparity−1)/2" when it is a positive value, and is shifted in the right direction by the amount corresponding to "(disparity−1)/2" when it is a negative value.

"number_of_caption_windows" is 3-bit information indicating the number of caption windows (Caption Window) associated with disparity information (disparity). The number of caption windows is up to eight. Disparity information (disparity) is arranged for each caption window. "caption_window_id" is 3-bit information indicating "caption window[0 . . . 7]" of CEA-708.

"temporal_extension_flag" is 1-bit flag information for disparity information corresponding to a caption window indicated by "caption_window_id". The flag information indicates whether the disparity information is that commonly used in individual frames during a display frame period of the closed caption information, or disparity information that is sequentially updated in the individual frames. When "temporal_extension_flag=1" is set, it is indicated that the value of disparity information is updated in individual frames during a display frame period. Also, when "temporal_extension_flag=0" is set, the same disparity information is used without updating the value of disparity information in individual frames during a display frame period.

"disparity" is 8-bit information indicating the value of disparity information about the first frame during a display frame period, and takes a value ranging from −128 to +127. When the "temporal_extension_flag=0" described above is set, disparity information corresponding to the caption window indicated by "caption_window_id" is only the 8-bit information, i.e., "disparity". In contrast, when the "temporal_extension_flag=1" described above is set, as the disparity information corresponding to the caption window indicated by "caption_window_id", disparity information about the second and subsequent frames is present in addition to disparity information about the first frame of the 8-bit "disparity".

The disparity information about the second and subsequent frames is given as offset information with respect to disparity information about the preceding frames. "number_of_frame_set" is 8-bit information indicating how many units are necessary in a case where the number of second and subsequent frames during the display frame period is sectioned in units of 11 frames. For example, in a case where the display frame period is 30 frames, the number of second and subsequent frames is 29, and the number of units indicated by the "number_of_frame_set" is "3".

"offset_sequence" is 2-bit information serving as offset information with respect to disparity information about the preceding frames. "offset_sequence=00" indicates that the offset value is "0". "offset_sequence=01" indicates that the offset value is "+1". "offset_sequence=10" indicates that the offset value is "−1". Furthermore, "offset_sequence=11" indicates that no offset information is assigned to the frame. In a case where the display frame period described above is 30 frames, in the third unit obtained in a case where the 30 frames are sectioned in units of 11 frames, "offset_sequence_7" and thereafter are set to "offset_sequence=11".

"offset_precision" is 1-bit information indicating the precision of "1" in the offset value indicated by the "offset_sequence" described above, in other words, the number of pixels with "1". When "offset_precision=0" is set, it is indicated that offset value "1" represents one pixel. Also, when "offset_precision=1" is set, offset value "1" represents two pixels.

In the transmission data generation unit 110F illustrated in FIG. 63, stereo image data including left-eye image data and right-eye image data for displaying a stereo image is transmitted in a state of being included in the payload portion of a video elementary stream. Also, CC data and disparity information for giving disparity to closed caption information that is based on the CC data are transmitted in a state of being included in the user data area of the header portion of the video elementary stream so as to be identifiable by user data identification information (user_data_type_code).

Thus, on the receiving side, stereo image data can be acquired from the video elementary stream, and additionally data of superimposition information and disparity information can be easily acquired. Also, on the receiving side, appropriate disparity can be given to the same closed caption information to be superimposed on a left-eye image and a right-eye image using disparity information. Thus, in the display of superimposition information, the consistency in perspective between the superimposition information and each object in an image can be maintained to an optimum state.

Also, in the transmission data generation unit 110F illustrated in FIG. 63, disparity information has added thereto shift target specification information (select_view_shift) specifying closed caption information to be shifted on the basis of the disparity information among left-eye closed caption information to be superimposed on a left-eye image and right-eye closed caption information to be superimposed on a right-eye image. Thus, the shift target specification information makes it possible to shift only the left-eye closed caption information, shift only the right-eye closed caption information, or shift both, as desired.

Also, in the transmission data generation unit 110F illustrated in FIG. 63, either disparity information that is commonly used in a predetermined number of frames in which closed caption information (caption) is displayed or disparity information that is sequentially updated in the predetermined number of frames can be selected as disparity information. The disparity information is added with flag information (temporal_extension_flag) indicating one of them. Thus, it is possible to selectively transmit disparity information that is commonly used in individual frames or disparity information that is sequentially updated in individual frames, in accordance with, for example, the content of the image. That is, in a case where the movement of the image is large, disparity information that is sequentially updated in individual frames is transmitted, and, on the receiving side, disparity to be given to superimposition information can be dynamically changed in accordance with the change in the content of the image.

Also, in a case where the movement of the image is small, disparity information that is commonly used in individual frames is transmitted, thus allowing suppression of the amount of data of the disparity information.

Also, in the transmission data generation unit 110F illustrated in FIG. 63, the disparity information that is sequentially updated in individual frames is designed to include disparity information about the first frame during a period of a predetermined number of frames, and offset information about the second and subsequent frames with respect to disparity information about the preceding frames. Thus, the amount of data of the disparity information can be suppressed.

FIG. 69 illustrates an example of calculation of the amount of data (data size) in the configuration of the disparity information (caption_disparity data) illustrated in FIG. 66. Item (1-1) represents a calculation example in a case where, for each of eight caption windows, one piece of disparity information is commonly used in individual frames during a display period of closed caption information. In this case, the amount of data of the disparity information (caption_disparity_data) is 18 bytes. Also, item (1-2) illustrates a calculation example in a case where one caption window is used or the same disparity information is used for all the caption windows and in a case where one piece of disparity information is commonly used in individual frames during a display period of closed caption information. In this case, the amount of data of the disparity information (caption_disparity_data) is 4 bytes.

Item (2) illustrates a calculation example in a case where disparity information that is sequentially updated in individual frames using a display period of closed caption information is used for each of eight caption windows and in a case where, for example, the display period is 5 seconds (150 frames). In this case, the amount of data of the disparity information (caption_disparity_data) is 362 bytes.

Note that the transmission data generation unit 110F illustrated in FIG. 63 has been illustrated in the context of the transmission of disparity information whose use is restricted to closed caption information, by way of example. Although the detailed description is omitted, for example, a transmission data generation unit that transmits disparity information whose use is restricted to any other superimposition information such as subtitle information can also be configured in a similar manner.

[Description of Set-Top Box]

Referring back to FIG. 1, the set-top box 200 receives bit stream data (transport stream) carried on a broadcast wave and transmitted from the broadcast station 100. The bit stream data contains stereo image data including left-eye image data and right-eye image data, audio data, and superimposition information data, and also contains disparity information (disparity vectors). Here, the superimposition information data is, for example, subtitle data, graphics data, text data (including closed caption data), or the like.

The set-top box 200 includes a bit stream processing unit 201. The bit stream processing unit 201 extracts stereo image data, audio data, superimposition information data, disparity vectors, and the like from the bit stream data. The bit stream processing unit 201 generates data of a left-eye image and a right-eye image on which the superimposition information has been superimposed using the stereo image data, the superimposition information data (subtitle data, the graphics data, the text data), or the like.

Here, in a case where disparity vectors are transmitted as numerical information, left-eye superimposition information and right-eye superimposition information to be superimposed on the left-eye image and the right-eye image, respectively, are generated on the basis of the disparity vectors and the superimposition information data. In this case, the left-eye superimposition information and the right-eye superimposition information are the same superimposition information. However, the superimposed position of, for example, the right-eye superimposition g information in the image is configured to be shifted in the horizontal direction by the horizontal direction component of the disparity vector with respect to the left-eye superimposition information.

FIG. 70(a) illustrates superimposed positions of left-eye graphics information and right-eye graphics information in a case where the transmission method is the second transmission method described above ("Side By Side" method). Right-eye graphics information RGI to be superimposed on a right-eye image IR is configured to be at a position shifted in the horizontal direction by a horizontal direction component VVT of a disparity vector with respect to left-eye graphics information LGI to be superimposed on a left-eye image IL. Note that IT is an idling offset value.

In the bit stream processing unit 201, graphics data is generated so that the pieces of graphics information LGI and RGI are superimposed on the images IL and IR in the manner as illustrated in FIG. 70(a). The bit stream processing unit 201 combines the generated left-eye graphics data and right-eye graphics data with the stereo image data (left-eye image data, right-eye image data) extracted from the bit stream data, and acquires processed stereo image data. According to the stereo image data, as illustrated in FIG. 70(b), a viewer can observe the pieces of graphics information LGI and RGI with disparity, together with the images IL and IR, and is able to also perceive the perspective of the graphics information.

Figure 71:
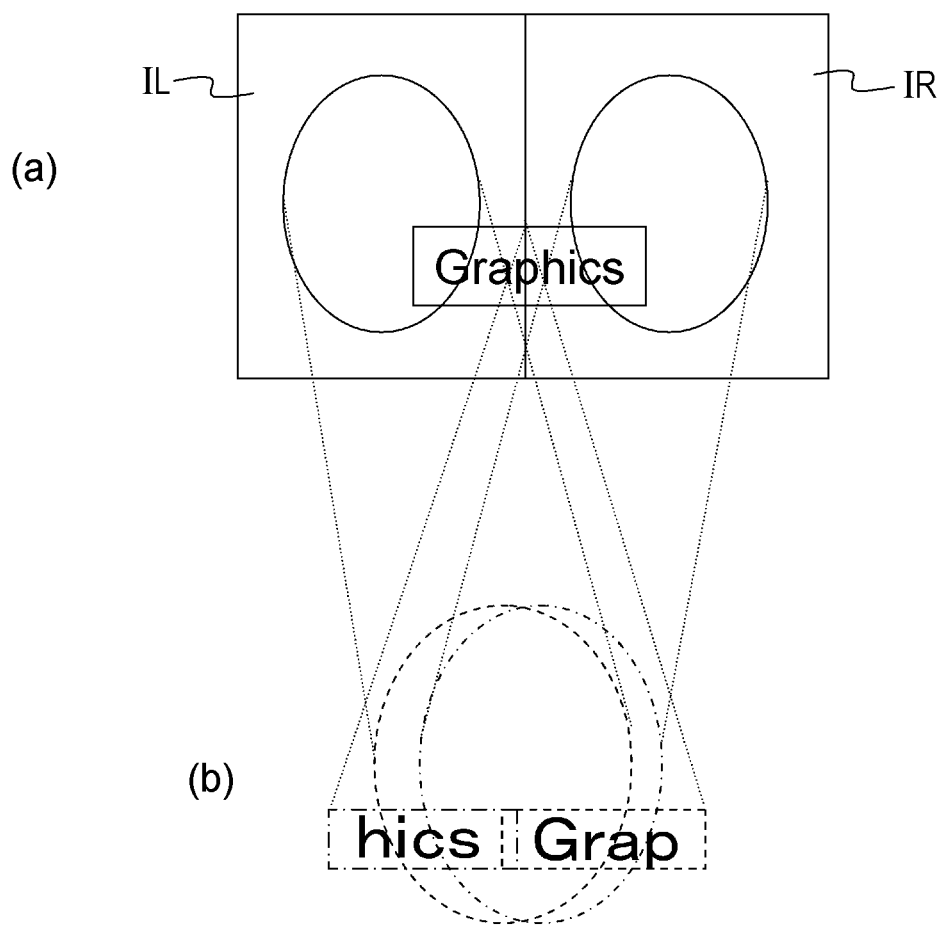
FIG. 71 includes diagrams illustrating a state where a graphics image that is based on graphics data extracted from bit stream data and transmitted using a conventional method is superimposed as it is on a left-eye image and a right-eye image.
Figure 72:
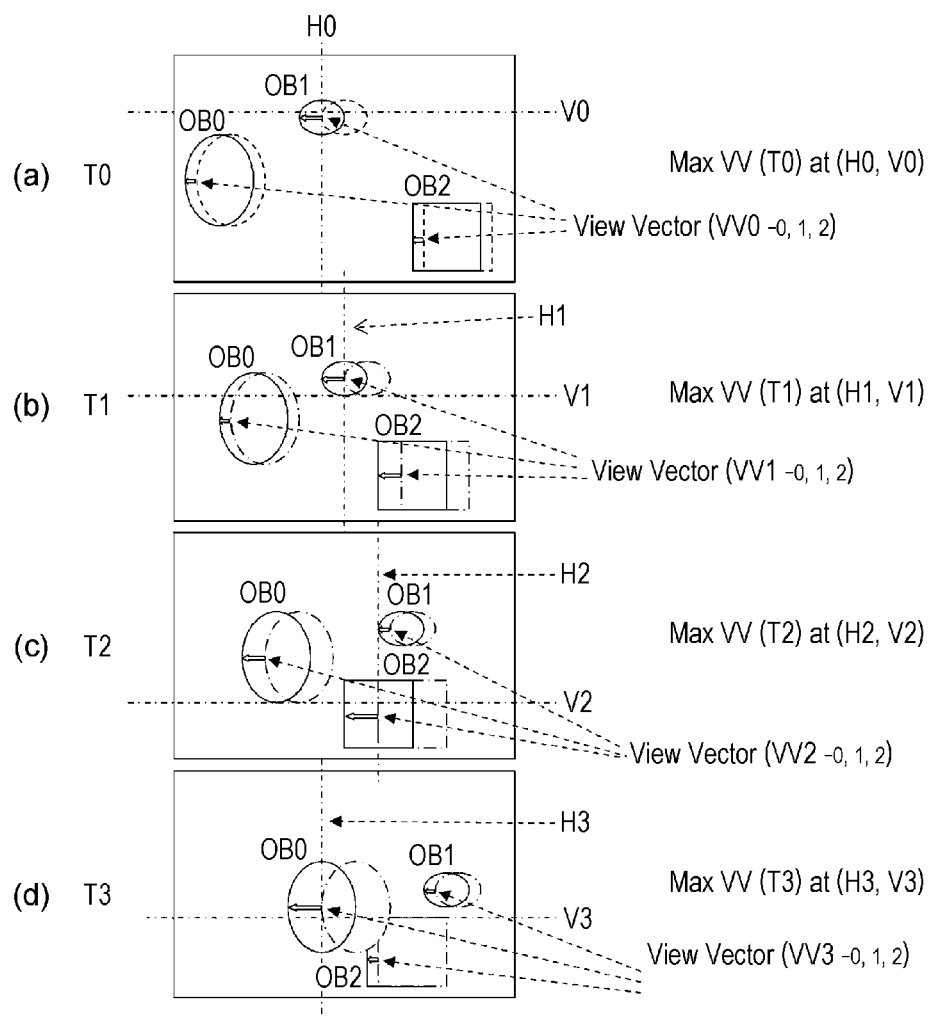
FIG. 72 includes diagrams illustrating disparity vectors (View Vectors) at three object positions at times T0, T1, T2, and T3.

Note that FIG. 71(a) illustrates a state where a graphics image that is based on the graphics data extracted from the bit stream data is superimposed on the images IL and IR as it is. In this case, as illustrated in FIG. 71(b), a viewer observes the left half of the graphics information together with the left-eye image IL and the right half of the graphics information together with the right-eye image IR. Thus, the graphics information is not made correctly recognizable.

Figure 70:
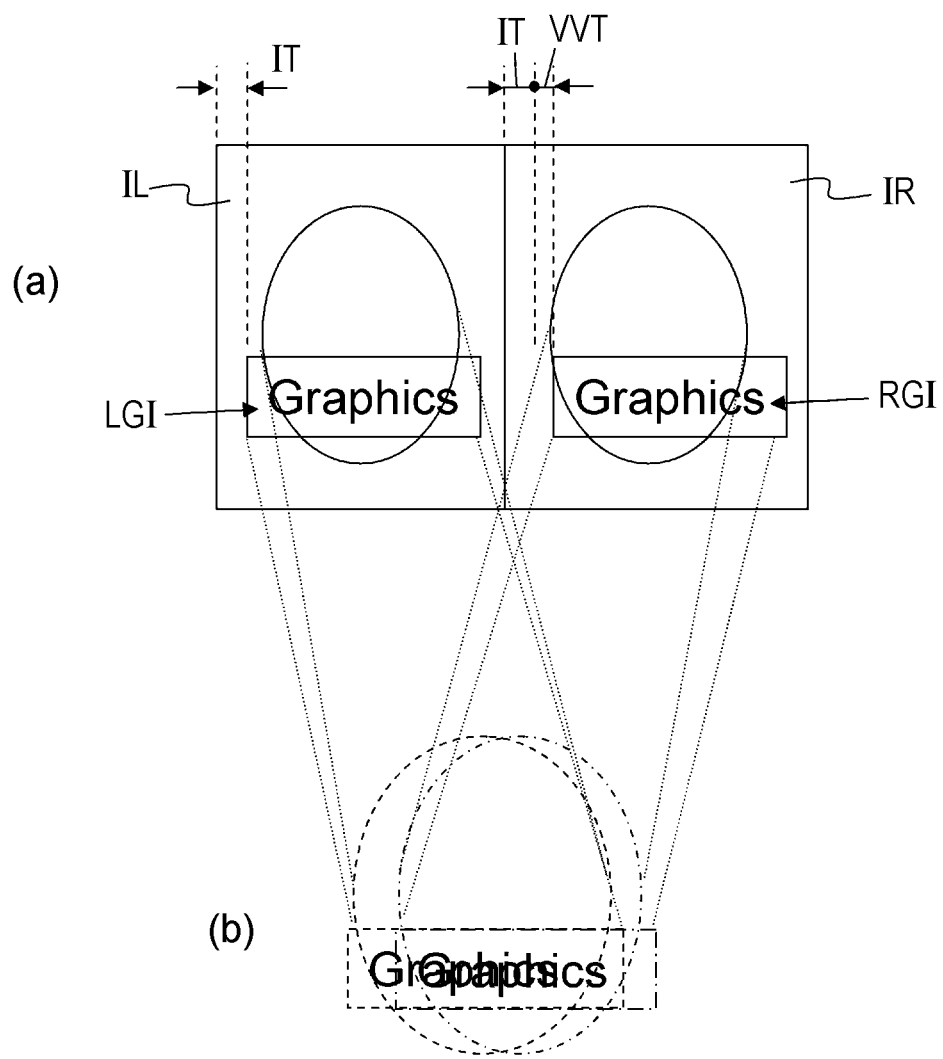
FIG. 70 includes diagrams illustrating superimposed positions of left-eye graphics information and right-eye graphics information in a case where the transmission method is the second transmission method ("Side By Side" method).

While FIG. 70 illustrates the case of graphics information, similarity applies for other superimposition information (such as closed caption information, subtitle information or text information). That is, in a case where disparity vectors are transmitted as numerical information, left-eye superimposition information and right-eye superimposition information to be superimposed on the left-eye image and the right-eye image, respectively, are generated on the basis of the disparity vectors and the superimposition information data data. In this case, the left-eye superimposition information and the right-eye superimposition information are the same superimposition information. However, the superimposed position of, for example, the right-eye superimposition information in the image is configured to be shifted in the horizontal direction by the horizontal direction component of the disparity vector with respect to the left-eye superimposition information.

Here, it is conceivable that the following disparity vectors are used as disparity vectors that give disparity between left-eye superimposition information and right-eye superimposition information. For example, it is conceivable that a disparity vector at the position recognized to be the closest in terms of perspective among disparity vectors detected at a plurality of positions in an image is used as a disparity vector. FIGS. 72(a), 72(b), 72(c), and 72(d) illustrate disparity vectors (View Vectors) at three object positions at times T0, T1, T2, and T3.

At time T0, a disparity vector VV0-1 at the position (H0, V0) corresponding to an object 1 is the maximum disparity vector Max VV(T0). At time T1, a disparity vector VV1-1 at the position (H1, V1) corresponding to the object 1 is the maximum disparity vector Max VV(T1). At time T2, a disparity vector VV2-2 at the position (H2, V2) corresponding to an object 2 is the maximum disparity vector Max VV(T2). At time T3, a disparity vector VV3-0 at the position (H3, V3) corresponding to the object 1 is the maximum disparity vector Max VV(T3).

In this manner, the disparity vector at the position recognized to be the closest in terms of perspective among disparity vectors detected at a plurality of positions in an image is used as a disparity vector, thus allowing superimposition information to be displayed in front of the object closest in the image in terms of perspective.

Figure 73:
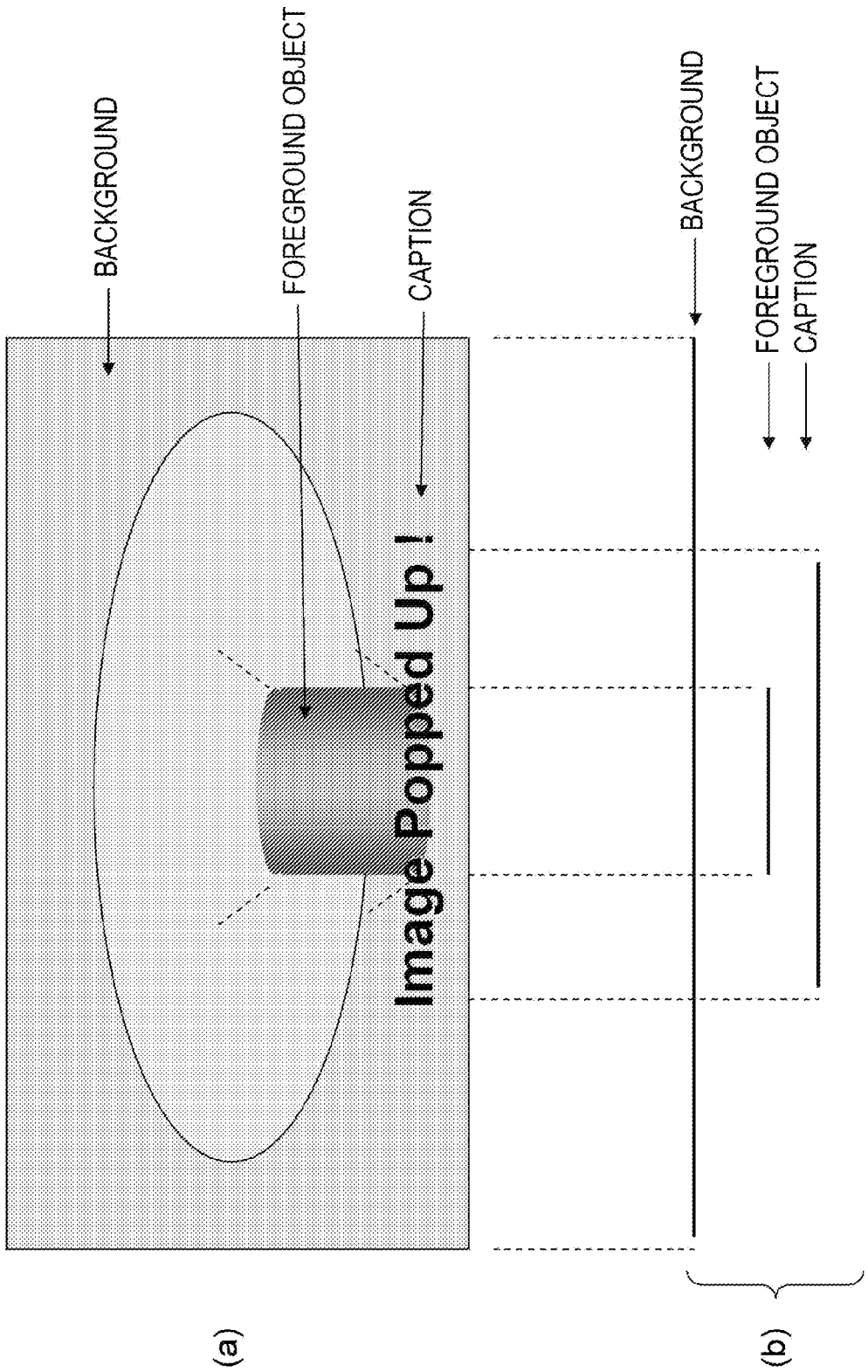
FIG. 73 is a diagram illustrating a display example of a caption (graphics information) on an image, and the perspective of a background, a foreground object, and the caption.

FIG. 73(*a*) illustrates a display example of a caption (for example, closed caption information, subtitle information) on an image. In this display example, a caption is superimposed on an image formed of a background and a foreground object, by way of example. FIG. 73(*b*) illustrates the perspective of the background, the foreground object, and the caption, and illustrates that the caption is recognized to be located closest.

Figure 74:
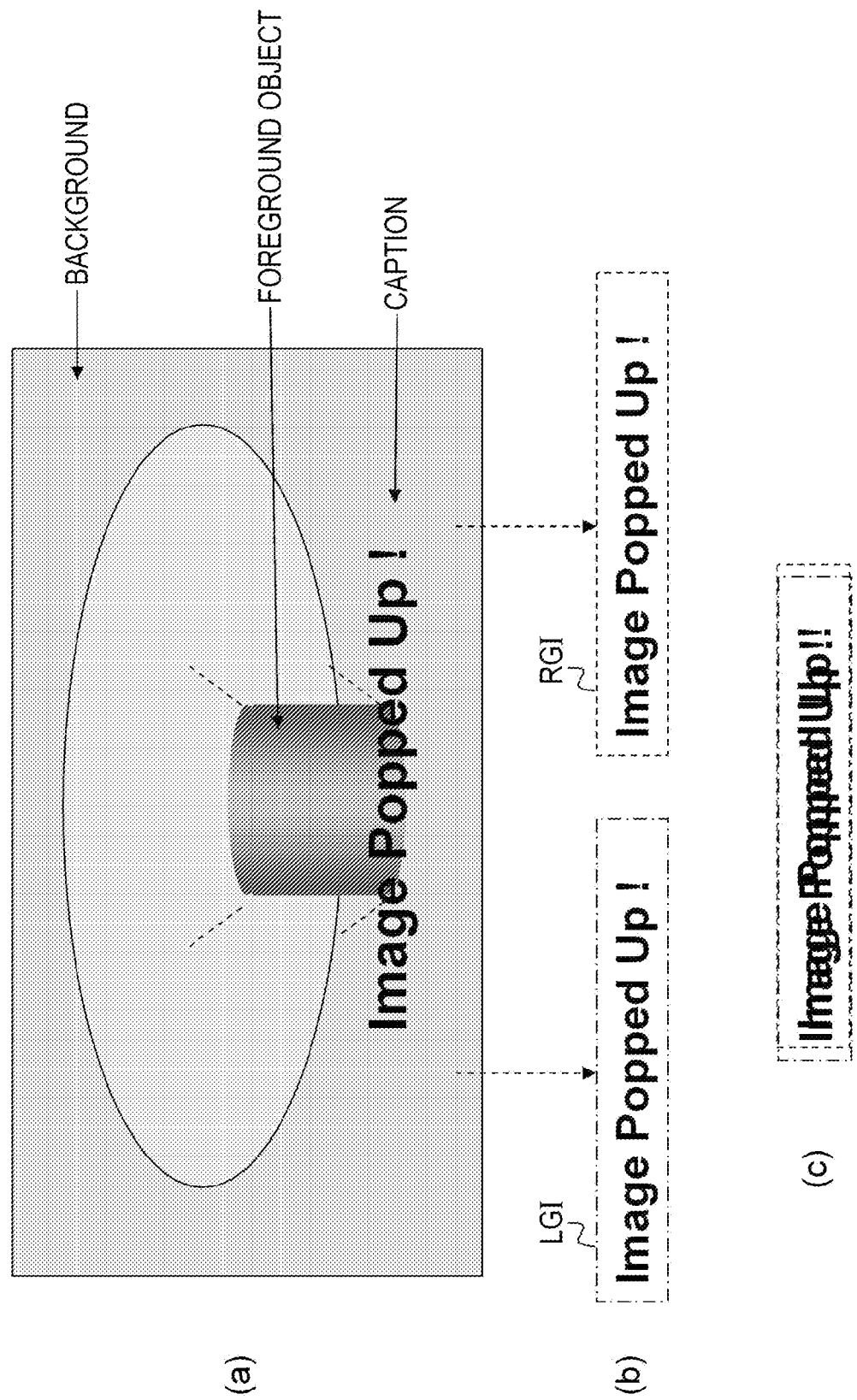
FIG. 74 includes diagrams illustrating a display example of a caption (graphics information) on an image, and left-eye graphics information LGI and right-eye graphics information RGI for displaying the caption.

FIG. 74(*a*) illustrates a display example of a caption (for example, closed caption information, subtitle information) on an image, which is the same as that in FIG. 73(*a*). FIG. 74(*b*) illustrates left-eye subtitle information LGI and right-eye subtitle information RGI for displaying the caption. FIG. 74(*c*) illustrates that disparity is given to the pieces of subtitle information LGI and RGI in order to allow the caption to be recognized to be located closest.

Figure 75:
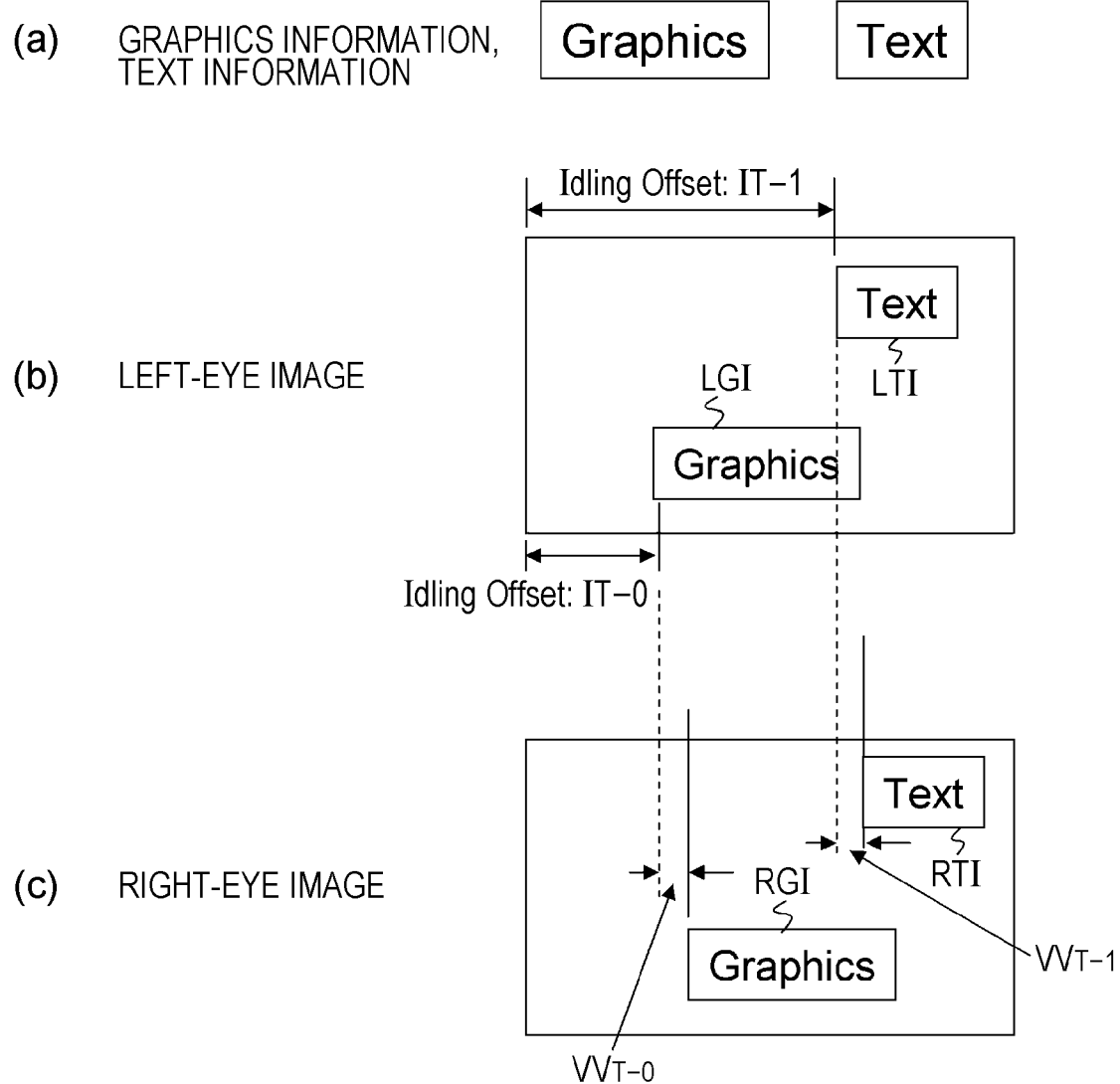
FIG. 75 includes diagrams describing that a disparity vector corresponding to its superimposed position among disparity vectors detected at a plurality of positions in an image is used as a disparity vector.

Also, it is conceivable that a disparity vector corresponding to its superimposed position among disparity vectors (including disparity vectors of respective areas in respective layers included in a disparity information set) detected at a plurality of positions in an image is used as a disparity vector. FIG. 75(*a*) illustrates graphic information that is based on graphic data extracted from bit stream data, and text information that is based on text data extracted from the bit stream data.

FIG. 75(*b*) illustrates a state where left-eye graphics information LGI and left-eye text information LTI have been superimposed on a left-eye image. In this case, the superimposed position of the left-eye graphics information LGI is regulated by an idling offset value (IT-0) in the horizontal direction. Also, the superimposed position of the left-eye text information LTI is regulated by an idling offset value (IT-1) in the horizontal direction.

FIG. 75(*c*) illustrates a state where right-eye graphics information RGI and right-eye text information RTI have been superimposed on a right-eye image. In this case, the superimposed position of the right-eye graphics information RGI is regulated by an idling offset value (IT-0) in the horizontal direction, and is further shifted with respect to the superimposed position of the left-eye graphics information LGI by the horizontal direction component VVT-0 of the disparity vector corresponding to the superimposed position.

Also, the superimposed position of the right-eye text information RTI is regulated by an idling offset value (IT-1) in the horizontal direction, and is further shifted with respect to the superimposed position of the left-eye text information LTI by the horizontal direction component VVT-1 of the disparity vector corresponding to the superimposed position.

Note that in the example of FIG. 75, shifting of the superimposed position of graphics information and text information to be superimposed on a right-eye image with respect to the superimposed position of the same graphics information and text information to be superimposed on a left-eye image is illustrated. That is, in the example of FIG. 75, a process for shifting only the superimposed position of graphics information and text information to be superimposed on a right-eye image is performed. However, it is also conceivable that a process is performed so as to shift both the superimposed positions on the left-eye image and the right-eye image.

Figure 76:
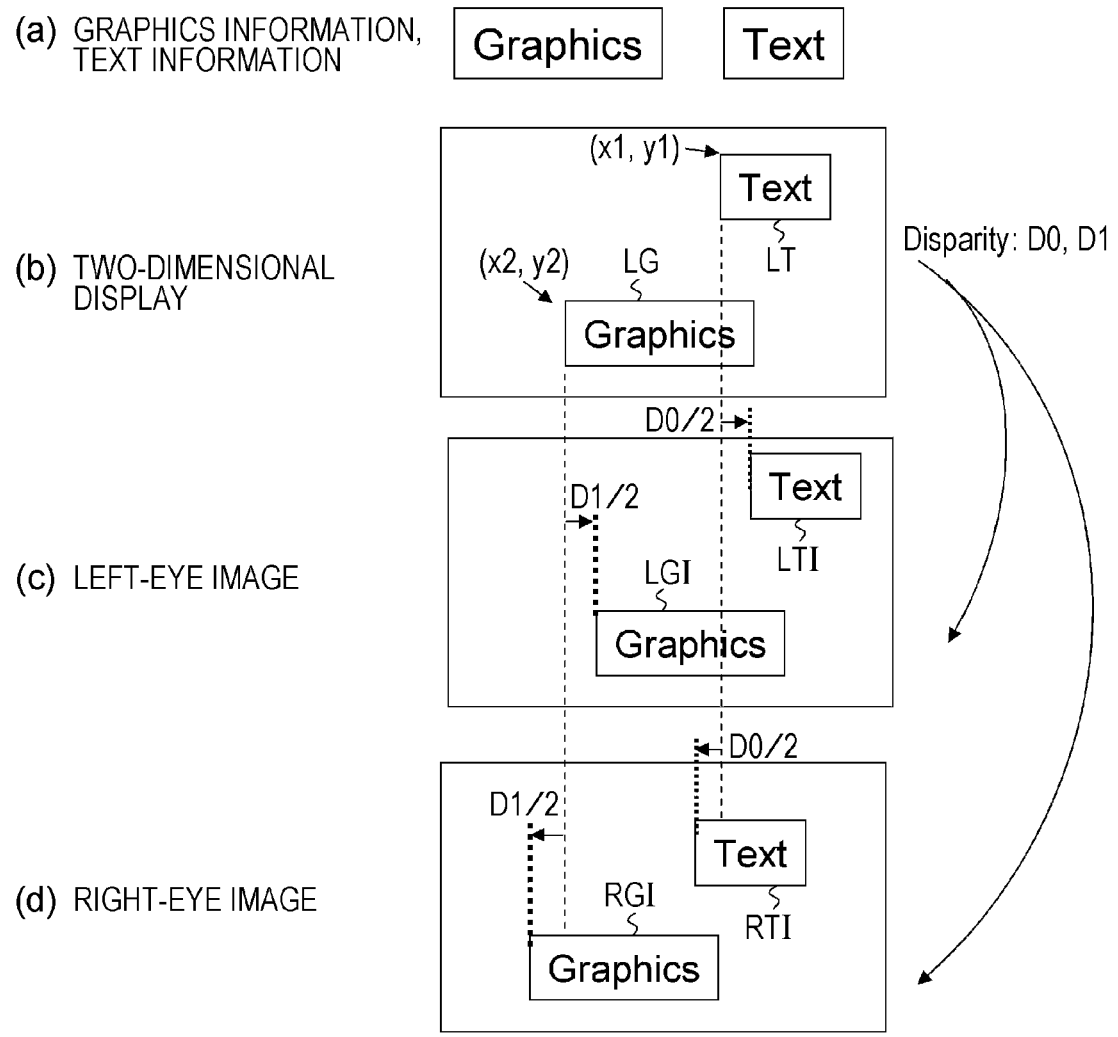
FIG. 76 includes diagrams describing that a disparity vector corresponding to its superimposed position among disparity vectors detected at a plurality of positions in an image is used as a disparity vector.

FIG. 76(*a*) illustrates graphic information that is based on graphic data extracted from bit stream data, and text information that is based on text data extracted from the bit stream data. FIG. 76(*b*) illustrates superimposed positions of graphics information GI and text information TI in two-dimensional display. In this case, the superimposed position of the text information is (x1, y1), and the superimposed position of the graphics information is (x2, y2).

FIG. 76(*c*) illustrates a state where left-eye graphics information LGI and left-eye text information LTI have been superimposed on the left-eye image. In this case, the left-eye graphics information LGI is shifted in the right direction by the amount corresponding to the number of pixels of a disparity vector D1 corresponding to the graphics information GI with respect to the superimposed position of this graphics information in the two-dimensional display. Also, the left-eye text information LTI is shifted in the right direction by the amount corresponding to the number of pixels of a disparity vector D0 corresponding to the text information LT with respect to the superimposed position of this text information in the two-dimensional display.

FIG. 76(*d*) illustrates a state where right-eye graphics information RGI and right-eye text information RTI have been superimposed on the right-eye image. In this case, the right-eye graphics information RGI is shifted in the left direction by the amount corresponding to the number of pixels of the disparity vector D1 corresponding to the graphics information GI with respect to the superimposed position of this graphics information in the two-dimensional display. Also, the right-eye text information RTI is shifted in the left direction by the amount corresponding to the number of pixels of the disparity vector D0 corresponding to the text information LT with respect to the superimposed position of this text information in the two-dimensional display.

Note that in the examples of FIGS. 76(*c*) and 76(*d*), an extension of the offset is applied to each of the left-eye image and right-eye image, and is additionally set to provide shifting by the amount corresponding to the number of pixels of the disparity vector, by way of example. Actually, for example, as illustrated in FIG. 54 described above, an extension of the offset is represented by "Views_offset, and the amount by which superimposition information is to be shifted with respect to a disparity vector is represented by "Disparity_precision".

Also, FIG. 77(*a*) illustrates pieces of closed caption information C1 ("Caption1") and C2 ("Caption2") of two caption windows extracted from the bit stream data. FIG. 77(*b*) illustrates the superimposed positions of the pieces of closed caption information C1 and C2 in the two-dimensional display. In this case, the superimposed position of the closed caption information C1 is (x1, y1), and the superimposed position of the closed caption information C2 is (x2, y2).

FIG. 77(*c*) illustrates a state where the pieces of left-eye closed caption information LC1 and LC2 have been superimposed on a left-eye image. In this case, the left-eye closed caption information LC1 is shifted in the right direction by the amount corresponding to the number of pixels of the disparity vector D0 corresponding to the closed caption information with respect to the superimposed position of the closed caption information C1 in the two-dimensional display. Also, the left-eye closed caption information LC2 is shifted in the right direction by the amount corresponding to the number of pixels of the disparity vector D1 corresponding to the closed caption information with respect to the closed caption information C2 in the two-dimensional display.

FIG. 77(d) illustrates a state where the pieces of right-eye closed caption information RC1 and RC2 have been superimposed on a right-eye image. In this case, the left-eye closed caption information RC1 is shifted in the left direction by the amount corresponding to the number of pixels of the disparity vector D0 corresponding to the closed caption information with respect to the superimposed position of the closed caption information C1 in the two-dimensional display. Also, the right-eye closed caption information RC2 is shifted in the left direction by the amount corresponding to the number of pixels of the disparity vector D1 corresponding to the closed caption information with respect to the closed caption information C2 in the two-dimensional display.

Note that in the examples of FIGS. 77(c) and 77(d), an extension of the offset is applied to each of the left-eye image and the right-eye image, and is additionally set to provide shifting by the amount corresponding to the number of pixels of the disparity vector, by way of example. Actually, for example, as illustrated in FIG. 66 described above, an extension of the offset is represented by, for example, "select_view_shift", and the amount by which superimposition information is to be shifted with respect to a disparity vector is represented by "offset_precision".

The foregoing description has been given of a case where graphics information that is based on graphics data extracted from bit stream data or text information that is based on text data extracted from the bit stream data is superimposed on a left-eye image and a right-eye image. In addition to this, a case is also conceivable where graphics data or text data is produced in the set-top box 200 and where information that is based on the data is superimposed on a left-eye image and a right-eye image.

Even in this case, disparity can be introduced between left-eye graphics information and right-eye graphics information or between left-eye text information and right-eye text information by utilizing a disparity vector at a predetermined position in an image extracted from the bit stream data. Accordingly, appropriate perspective can be given in the display of graphics information or text information in order to maintain the consistency in perspective between the information and each object in the image.

FIG. 78(a) illustrates the presence of objects A, B, and C in an image and the superimposition of text information indicating the annotation of each object at, for example, a position near the object. FIG. 78(b) illustrates that a disparity vector list indicating the correspondence between the positions of the objects A, B, and C and the disparity vectors at the positions, and the respective disparity vectors are utilized in a case where disparity is given to the text information indicating the annotation of the objects A, B, and C. For example, while text information "Text" is superimposed near the object A, the disparity corresponding to a disparity vector VV-a at the position (Ha, Va) of the object A is given between the left-eye text information and the right-eye text information. Note that similarity applies for text information to be superimposed near the objects B and C.

Figure 78:
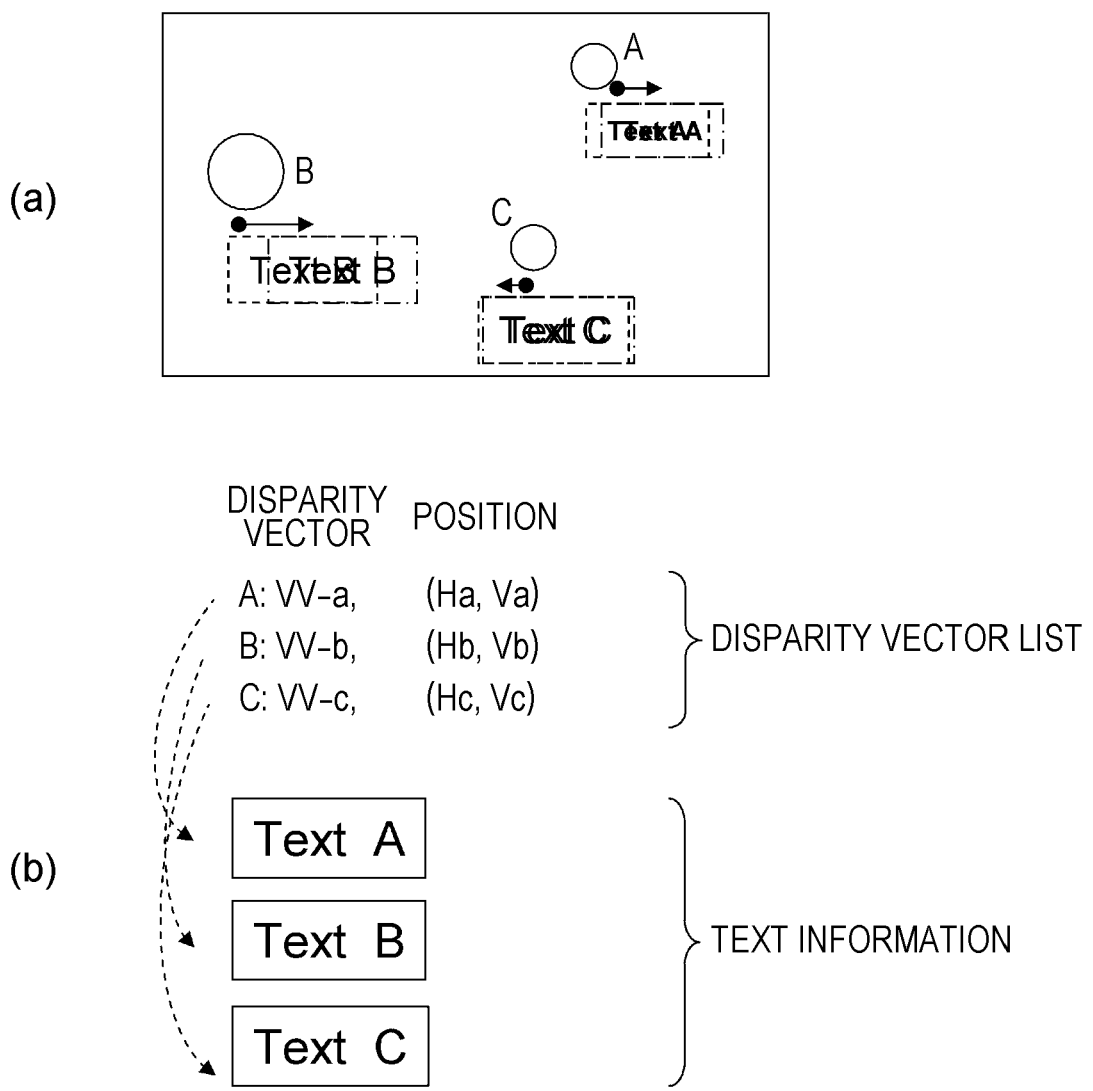
FIG. 78 includes diagrams illustrating that objects A, B, and C are present in an image and that text information indicating the annotation of each object is superimposed at a position near the object.

Note that FIGS. 75 and 76 illustrate a case where the superimposition information includes graphics information and text information. Also, FIG. 77 illustrates a case where the superimposition information is closed caption information. Also, FIG. 78 illustrates a case where the superimposition information is text information. Similarity applies in the case of other superimposition information although the detailed description is omitted.

Next, a case will be described where a disparity vector is transmitted while being reflected in advance in data of superimposition information (such as closed caption information, subtitle information, graphics information, or text information). In this case, superimposition information data extracted from bit stream data contains data of left-eye superimposition information and right-eye superimposition information to which disparity has been given using the disparity vector.

Thus, the bit stream processing unit 201 simply combines the superimposition information data extracted from the bit stream data with stereo image data (left-eye image data, right-eye image data) extracted from the bit stream data, and acquires processed stereo image data. Note that a process such as converting character code into bitmap data is necessary for text data (including closed caption data).

[Example Configuration of Set-Top Box]

Figure 79:
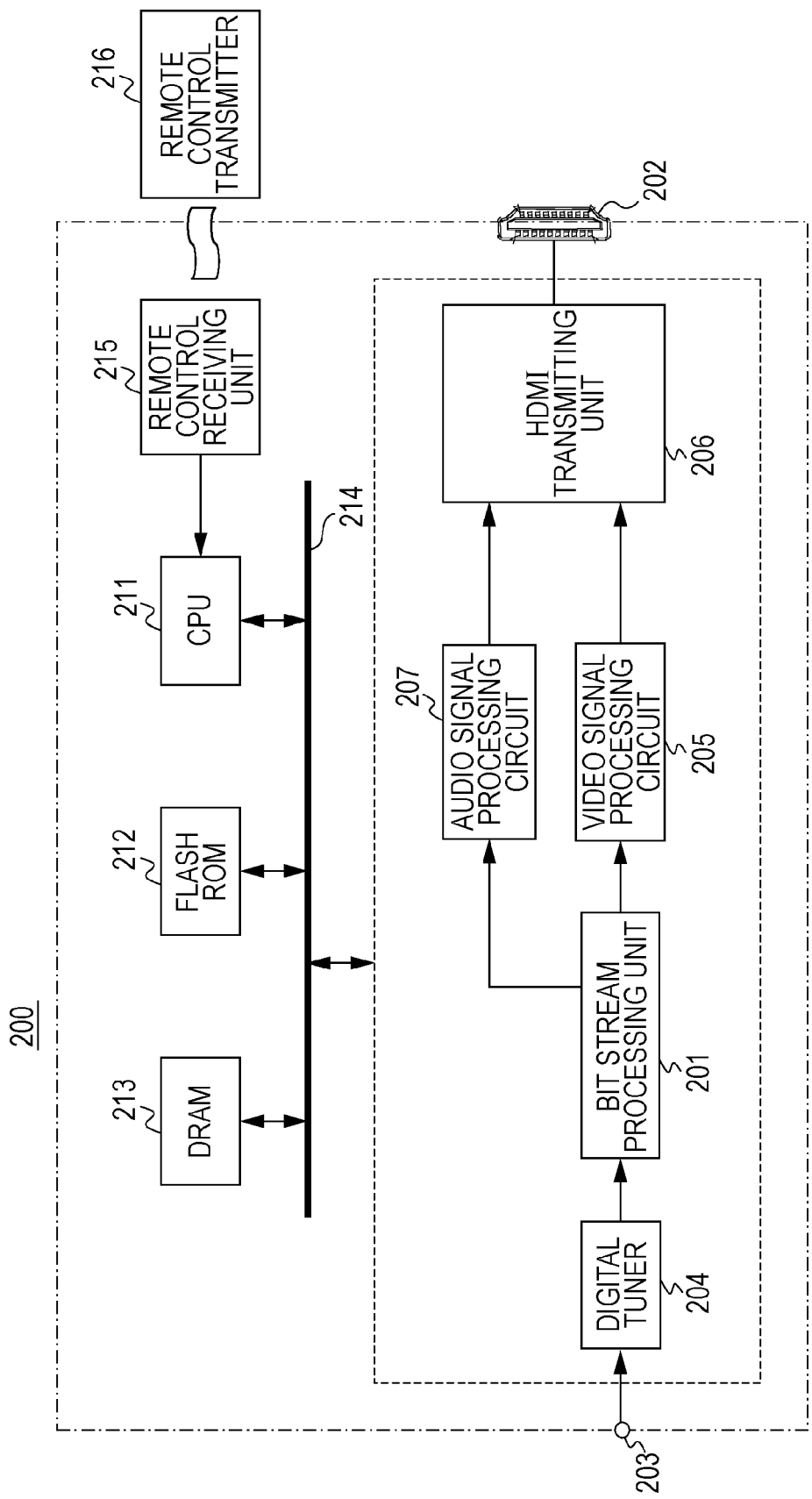
FIG. 79 is a block diagram illustrating an example configuration of a set-top box included in the stereo image display system.

An example configuration of the set-top box 200 will be described. FIG. 79 illustrates an example configuration of the set-top box 200. The set-top box 200 includes a bit stream processing unit 201, an HDMI terminal 202, an antenna terminal 203, a digital tuner 204, a video signal processing circuit 205, an HDMI transmitting unit 206, and an audio signal processing circuit 207. Also, the set-top box 200 includes a CPU 211, a flash ROM 212, a DRAM 213, an internal bus 214, a remote control receiving unit 215, and a remote control transmitter 216.

The antenna terminal 203 is a terminal to which a television broadcast signal received by a receiving antenna (not illustrated) is input. The digital tuner 204 processes the television broadcast signal input to the antenna terminal 203, and outputs predetermined bit stream data (transport stream) corresponding to a channel selected by the user.

As described above, the bit stream processing unit 201 extracts stereo image data (left-eye image data, right-eye image data), audio data, superimposition information data, disparity information (disparity vectors), and the like from the bit stream data. The superimposition information data is subtitle data, graphics data, text data (including closed caption data), or the like. As described above, the bit stream processing unit 201 combines data of superimposition information (such as closed caption information, subtitle information, graphics information, or text information) with the stereo image data, and acquires display stereo image data. Also, the bit stream processing unit 201 outputs audio data. The detailed configuration of the bit stream processing unit 201 will be described below.

The video signal processing circuit 205 performs an image quality adjustment process and the like, in accordance with necessity, on the stereo image data output from the bit stream processing unit 201, and supplies processed stereo image data to the HDMI transmitting unit 206. The audio signal processing circuit 207 performs an audio quality adjustment process and the like, in accordance with necessity, on the audio data output from the bit stream processing unit 201, and supplies processed audio data to the HDMI transmitting unit 206.

The HDMI transmitting unit 206 delivers data of a baseband image (video) and audio from the HDMI terminal 202 using HDMI-compliant communication. In this case, the data of the image and audio is packed, and is output from the HDMI transmitting unit 206 to the HDMI terminal 202 for transmission through an HDMI TMDS channel. The details of the HDMI transmitting unit 206 will be described below.

The CPU 211 controls the operation of each unit of the set-top box 200. The flash ROM 212 stores control software and holds data. The DRAM 213 forms a work area for the CPU 211. The CPU 211 expands the software and data read from the flash ROM 212 onto the DRAM 213 to start the software, and controls each unit of the set-top box 200.

The remote control receiving unit 215 receives a remote control signal (remote control code) transmitted from the remote control transmitter 216, and supplies the remote control signal to the CPU 211. The CPU 211 controls each unit of the set-top box 200 on the basis of the remote control code. The CPU 211, the flash ROM 212, and the DRAM 213 are connected to the internal bus 214.

The operation of the set-top box 200 will be described briefly. The television broadcast signal input to the antenna terminal 203 is supplied to the digital tuner 204. In the digital tuner 204, the television broadcast signal is processed, and predetermined bit stream data (transport stream) corresponding to a channel selected by the user is output.

The bit stream data output from the digital tuner 204 is supplied to the bit stream processing unit 201. In the bit stream processing unit 201, stereo image data (left-eye image data, right-eye image data), audio data, graphics data, text data, disparity vectors, and the like are extracted from the bit stream data. Also, in the bit stream processing unit 201, data of superimposition information (such as closed caption information, subtitle information, graphics information, or text information) is combined with the stereo image data, and display stereo image data is generated.

The display stereo image data generated by the bit stream processing unit 201 is subjected to an image quality adjustment process and the like in accordance with necessity by the video signal processing circuit 205, and is thereafter supplied to the HDMI transmitting unit 206. Also, the audio data obtained by the bit stream processing unit 201 is subjected to an audio quality adjustment process and the like in accordance with necessity by the audio signal processing circuit 207, and is thereafter supplied to the HDMI transmitting unit 206. The stereo image data and audio data supplied to the HDMI transmitting unit 206 are delivered from the HDMI terminal 202 to the HDMI cable 400 through the HDMI TMDS channel.

[Example Configuration of Bit Stream Processing Unit]

Figure 80:
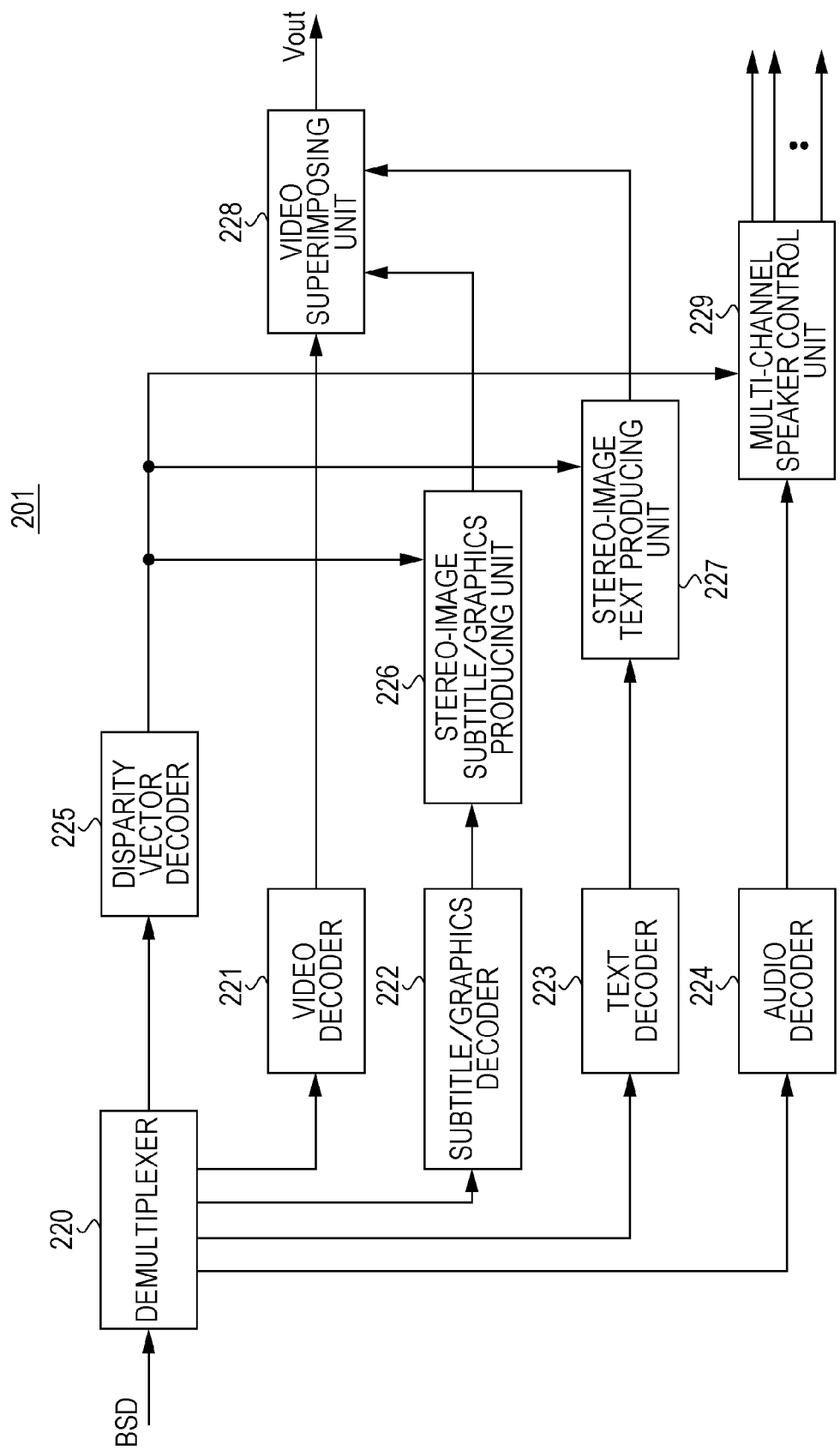
FIG. 80 is a block diagram illustrating an example configuration of a bit stream processing unit included in the set-top box.

FIG. 80 illustrates an example configuration of the bit stream processing unit 201. The bit stream processing unit 201 has a configuration that is made to correspond to that of the transmission data generation units 110 and 110E illustrated in FIGS. 2 and 62 described above. The bit stream processing unit 201 includes a demultiplexer 220, a video decoder 221, a subtitle/graphics decoder 222, a text decoder 223, an audio decoder 224, and a disparity vector decoder 225. Also, the bit stream processing unit 201 includes a stereo-image subtitle/graphics producing unit 226, a stereo-image text producing unit 227, a video superimposing unit 228, and a multi-channel speaker control unit 229.

The demultiplexer 220 extracts packets of video, audio, disparity vectors, subtitle, graphics, text, and the like from bit stream data BSD, and sends the packets to the respective decoders.

The video decoder 221 performs a process reverse to that of the video encoder 113 of the transmission data generation unit 110 described above. That is, the video decoder 221 reconfigures the elementary stream of video from the packets of video extracted by the demultiplexer 220, performs a decoding process, and obtains stereo image data including left-eye image data and right-eye image data. Examples of this transmission method of the stereo image data include the first transmission method ("Top & Bottom" method), the second transmission method ("Side By Side" method), the third transmission method ("Frame Sequential" method), and the like described above (see FIGS. 4(a) to 4(c)).

The subtitle/graphics decoder 222 performs a process reverse to that of the subtitle/graphic encoder 119 of the transmission data generation unit 110 described above. That is, the subtitle/graphics decoder 222 reconfigures the elementary stream of subtitle or graphics from the packets of subtitle or graphics extracted by the demultiplexer 220. Then, the subtitle/graphics decoder 222 further performs a decoding process to obtain subtitle data or graphics data.

The text decoder 223 performs a process reverse to that of the text encoder 121 of the transmission data generation unit 110 described above. That is, the text decoder 223 reconfigures the elementary stream of text from the packets of text extracted by the demultiplexer 220, and performs a decoding process to obtain text data (including closed caption data).

The audio decoder 224 performs a process reverse to that of the audio encoder 117 of the transmission data generation unit 110 described above. That is, the audio decoder 224 reconfigures the elementary stream of audio from the packets of audio extracted by the demultiplexer 220, and performs a decoding process to obtain audio data.

The disparity vector decoder 225 performs a process reverse to that of the disparity vector encoder 115 of the transmission data generation unit 110 described above. That is, the disparity vector decoder 225 reconfigures the elementary stream of disparity vectors from the packets of disparity vectors extracted by the demultiplexer 220, and performs a decoding process to obtain a disparity vector at a predetermined position in an image.

The stereo-image subtitle/graphics producing unit 226 generates left-eye and right-eye subtitle information or graphics information to be superimposed on the left-eye image and the right-eye image, respectively. This generation process is performed on the basis of the subtitle data or graphics data obtained by the decoder 222 and the disparity vectors obtained by the decoder 225. In this case, the left-eye and left-eye subtitle information items or graphics information items are the same information. However, the superimposed position of, for example, the right-eye subtitle information or graphics information in the image is configured to be shifted in the horizontal direction by the horizontal direction component of the disparity vector with respect to the left-eye subtitle information or graphics information. Then, the stereo-image subtitle/graphics producing unit 226 outputs data (bitmap data) of the generated left-eye and left-eye subtitle information or graphics information.

The stereo-image text producing unit 227 generates left-eye text information and right-eye text information to be superimposed on the left-eye image and the right-eye image, respectively, on the basis of the text s data obtained by the decoder 223 and the disparity vectors obtained by the decoder 225. In this case, the left-eye text information and the right-eye text information are the same text information. However, the superimposed position of, for example, the right-eye text information in the image is configured to be shifted in the horizontal direction by the horizontal direction component of the disparity vector with respect to the left-eye text information. Then, the stereo-image text producing unit 227 outputs data (bitmap data) of the generated left-eye text information and right-eye text information.

The video superimposing unit 228 superimposes the data produced by the producing units 226 and 227 on the stereo image data (left-eye image data, right-eye image data) obtained by the video decoder 221, and obtains display stereo image data Vout. Note that the superimposition of the superimposition information data on the stereo image data (left-eye image data, right-eye image data) is started using a time stamp in the system layer.

The multi-channel speaker control unit 229 performs a process for generating audio data of a multi-channel speaker to implement, for example, 5.1-ch surround or the like, a process for giving predetermined sound field characteristics, and the like on the audio data obtained by the audio decoder 224. Also, the multi-channel speaker control unit 229 controls the output of the multi-channel speaker on the basis of the disparity vectors obtained by the decoder 225.

There is an effect that the higher the magnitude of the disparity vector is, the more noticeable the stereoscopic effect is. The output of the multi-channel speaker is controlled in accordance with the stereoscopic degree, thus making feasible further provision of the stereoscopic experience.

Figure 81:
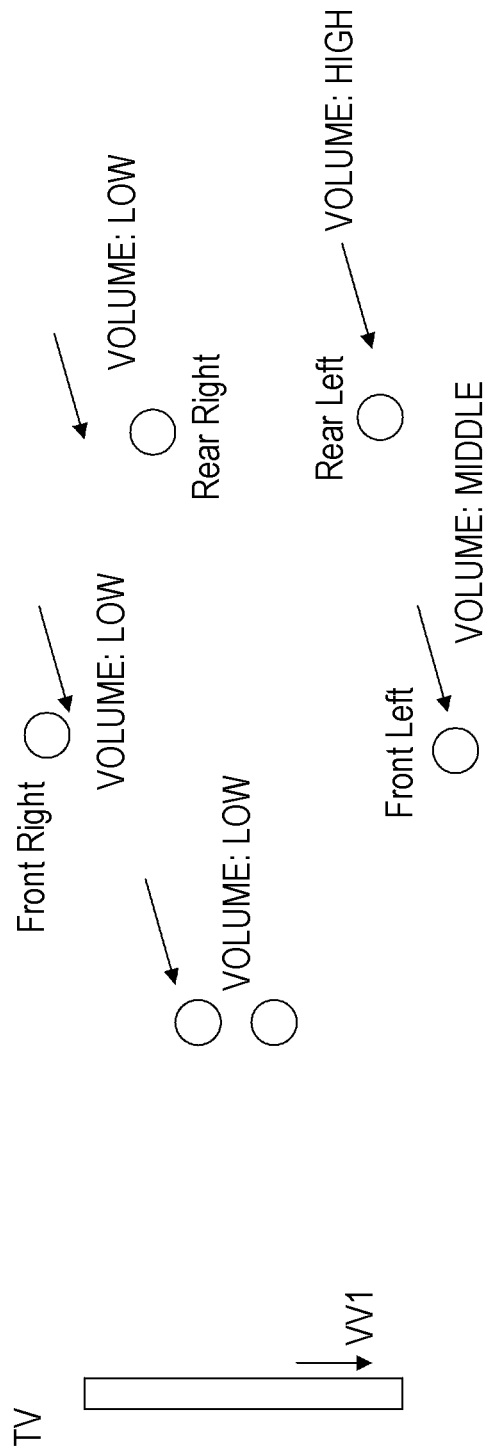
FIG. 81 is a diagram illustrating an example of speaker output control in a case where a video object on the left-hand side when viewed in the direction of a television display has a large disparity vector VV1.

FIG. 81 illustrates an example of speaker output control in a case where a video object on the left-hand side when viewed in the direction of a television display has a large disparity vector VV1. In this control example, the volume of the Rear Left speaker of the multi-channel speaker is set high, the volume of the Front Left speaker is set about middle, and further the volume of the Front Right and Rear Right speakers are set low. In this manner, the disparity vector of video content (stereo image data) is applied to other media data such as audio data on the receiving side, thus making it possible to allow the viewer to experience the overall stereoscopic effect.

The operation of the bit stream processing unit 201 illustrated in FIG. 80 will be described briefly. The bit stream data BSD output from the digital tuner 204 (see FIG. 79) is supplied to the demultiplexer 220. In the demultiplexer 220, TS packets of video, audio, disparity vectors, subtitle or graphics, and text are extracted from the bit stream data BSD, and are supplied to the respective decoders.

In the video decoder 221, an elementary stream of video is reconfigured from the packets of video extracted from the demultiplexer 220, and a decoding process is further performed to obtain stereo image data including left-eye image data and right-eye image data. The stereo image data is supplied to the video superimposing unit 228. Also, in the disparity vector decoder 225, an elementary stream of disparity vectors is reconfigured from the packets of disparity vectors extracted by the demultiplexer 220, and a decoding process is further performed to obtain a disparity vector at a predetermined position in an image (see FIGS. 8, 29, etc.).

In the subtitle/graphics decoder 222, an elementary stream of subtitle or graphics is reconfigured from the packets of subtitle or graphics extracted by the demultiplexer 220. In the subtitle/graphics decoder 222, a decoding process is further performed on the elementary stream of subtitle or graphics, and subtitle data or graphics data is obtained. The subtitle data or graphics data is supplied to the stereo-image subtitle/graphics producing unit 226. The disparity vectors obtained by the disparity vector decoder 225 are also supplied to the stereo-image subtitle/graphics producing unit 226.

In the stereo-image subtitle/graphics producing unit 226, data of left-eye and right-eye subtitle information items or graphics information items to be superimposed on the left-eye image and the right-eye image, respectively, is generated. This generation process is performed on the basis of the subtitle data or graphics data obtained by the decoder 222 and the disparity vectors obtained by the decoder 225.

In this case, the superimposed position of, for example, the right-eye subtitle information or graphics information in the image is configured to be shifted in the horizontal direction by the horizontal direction component of the disparity vector with respect to the left-eye subtitle information or left-eye graphics information. The data (bitmap data) of the generated left-eye and right-eye subtitle information items or graphics information items is output from the stereo-image subtitle/graphics producing unit 226.

Also, in the text decoder 223, an elementary stream of text is reconfigured from the TS packets of text extracted by the demultiplexer 220, and a decoding process is further performed to obtain text data. The text data is supplied to the stereo-image text producing unit 227. The disparity vectors obtained by the disparity vector decoder 225 are also supplied to the stereo-image text producing unit 227.

In the stereo-image text producing unit 227, left-eye text information and right-eye text information to be superimposed on the left-eye image and the right-eye image, respectively, are generated on the basis of the text s data obtained by the decoder 223 and the disparity vectors obtained by the decoder 225. In this case, the left-eye text information and the right-eye text information are the same text information. However, the superimposed position of, for example, the right-eye text information in the image is configured to be shifted in the horizontal direction by the horizontal direction component of the disparity vector with respect to the left-eye text information. The data (bitmap data) of the generated left-eye text information and right-eye text information is output from the stereo-image text producing unit 227.

Note that in a case where disparity vectors obtained by the disparity vector decoder 225 are included in a predetermined set of disparity information sets, a disparity information set suitable for the superimposition information can be used on the basis of identification information (Disparity_Sequence_id). That is, appropriate disparity can be given to superimposition information such as closed caption information or subtitle information using an associated disparity vector.

In addition to the stereo image data (left-eye image data, right-eye image data) from the video decoder 221 described above, the data output from the subtitle/graphics producing unit 226 and the text producing unit 227 is supplied to the video superimposing unit 228. In the video superimposing unit 228, the data produced by the subtitle/graphics producing unit 226 and the text producing unit 227 is superimposed on the stereo image data (left-eye image data, right-eye image data), and display stereo image data Vout is obtained. The display stereo image data Vout is supplied as transmission image data to the HDMI transmitting unit 206 (see FIG. 79) via the video signal processing circuit 205.

Also, in the audio decoder 224, an elementary stream of audio is reconfigured from the TS packets of audio extracted by the demultiplexer 220, and a decoding process is further performed to obtain audio data. The audio data is supplied to the multi-channel speaker control unit 229. In the multi-channel speaker control unit 229, a process for generating audio data of the multi-channel speaker to implement, for example, 5.1-ch surround or the like, a process for giving predetermined sound field characteristics, and the like are performed on the audio data.

The disparity vectors obtained by the disparity vector decoder 225 are also supplied to the multi-channel speaker control unit 229. Then, in the multi-channel speaker control unit 229, the output of the multi-channel speaker is controlled on the basis of the disparity vector. The multi-channel audio data obtained by the multi-channel speaker control unit 229 is supplied as transmission audio data to the HDMI transmitting unit 206 (see FIG. 79) via the audio signal processing circuit 207.

[Giving of Disparity to Superimposition Information]

Here, a further description will be given of the giving of disparity to superimposition information in the stereo-image subtitle/graphics producing unit 226 and the stereo-image text producing unit 227 of the bit stream processing unit 201 illustrated in FIG. 80.

Figure 82:
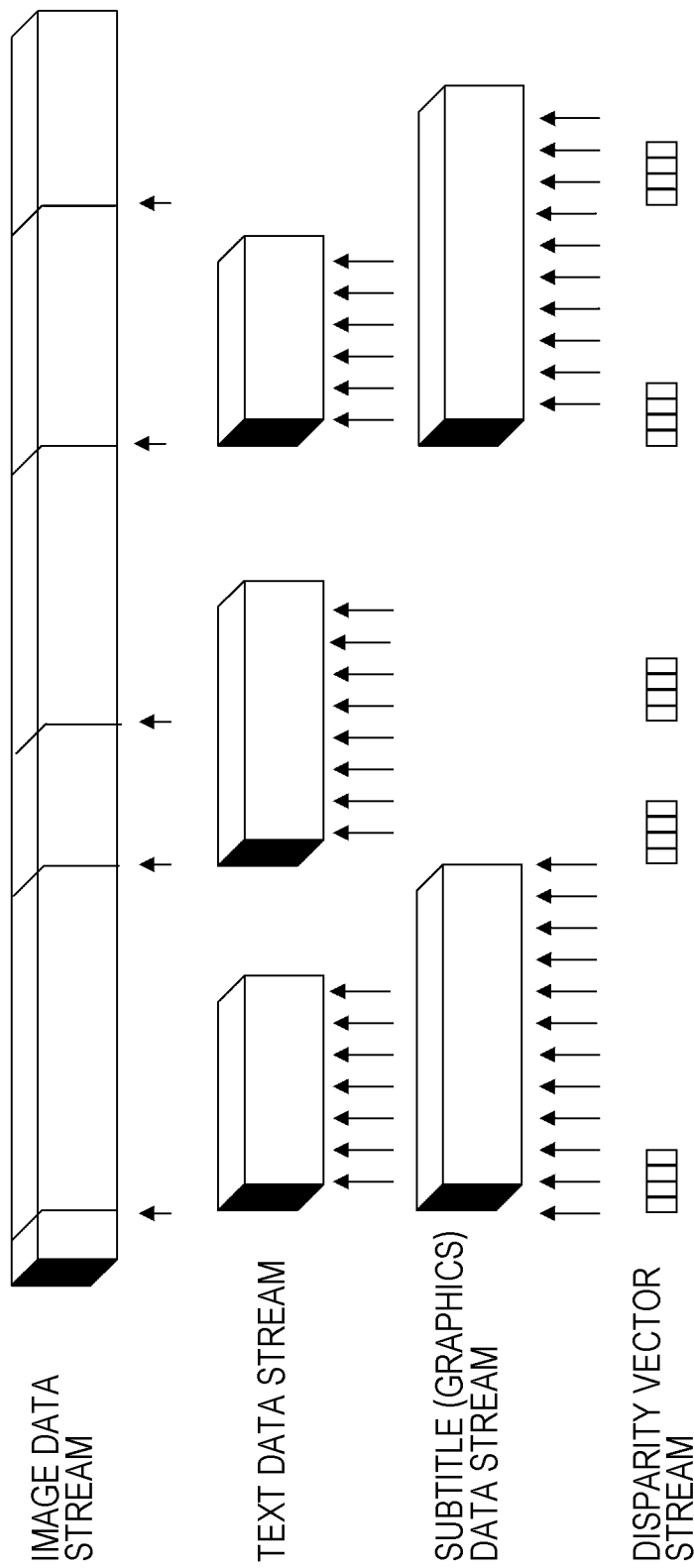
FIG. 82 is a diagram illustrating a correspondence relationship between each data stream sent from the broadcast station and a disparity vector.
Figure 83:
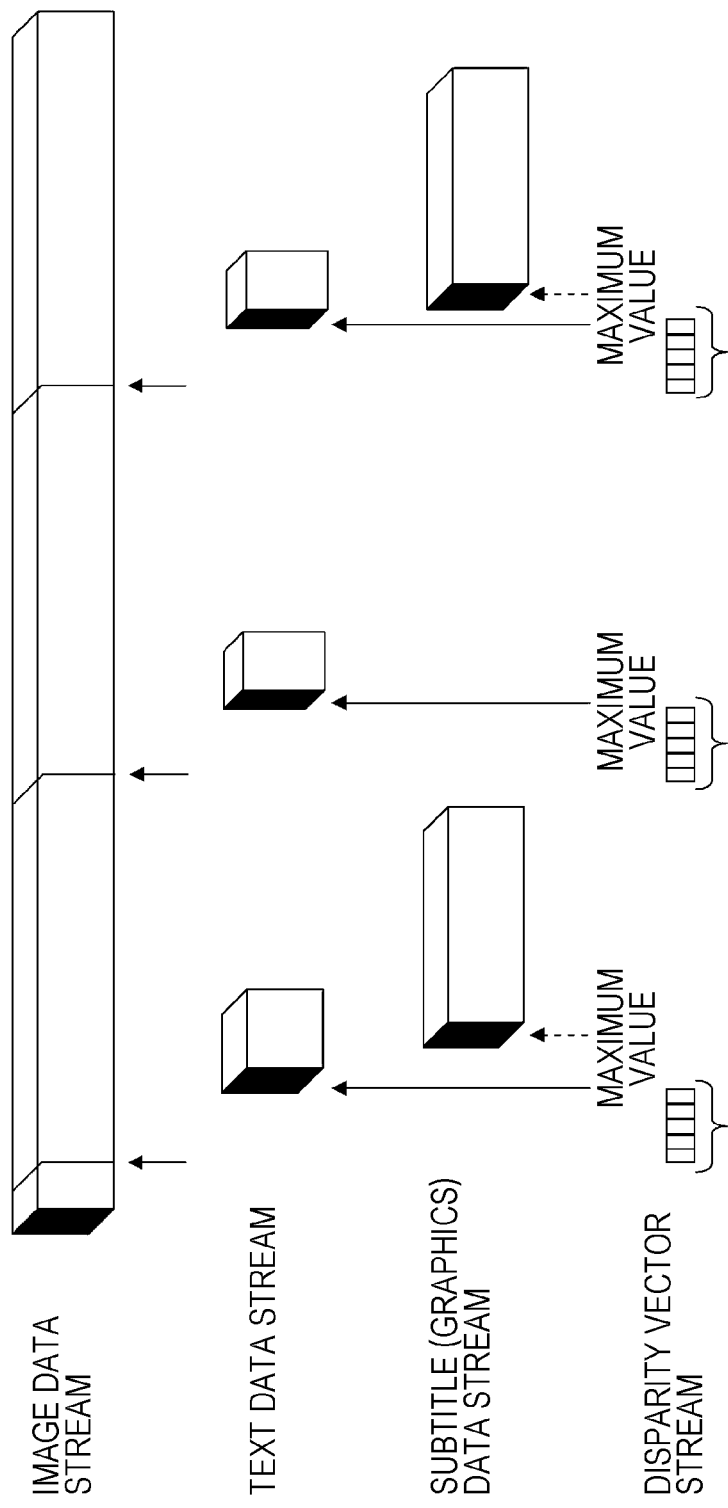
FIG. 83 is a diagram illustrating a correspondence relationship between each data stream sent from the broadcast station and a disparity vector.

As illustrated in, for example, FIGS. 82 and 83, a disparity vector stream including disparity vectors (see FIGS. 8, 29, etc.) is sent, together with an image data stream, a subtitle or graphics data stream, and a text data stream, from the broadcast station 100 (see FIG. 1). In this case, disparity vectors in predetermined units corresponding to each certain period are collectively sent in accordance with the start timing of each certain period such as GOP (Group Of Pictures) of encoded video, I (Intra picture) picture, or scene. It is conceivable that a predetermined unit is, for example, a unit of picture (frame), a unit of an integer multiple of a picture, or the like.

For example, in the stereo-image subtitle/graphics producing unit 226 and the stereo-image text producing unit 227, disparity is given to superimposition information using a corresponding disparity vector (information information) in predetermined units during a superimposition period of superimposition information. An arrow added to a portion of a subtitle (graphics) data stream and a text data stream in FIG. 82 indicates the timing at which disparity is given to superimposition information in predetermined units. With the configuration in which disparity is given to superimposition information in this manner, it is possible to dynamically change the disparity to be given to the superimposition information in accordance with the change in the content of the image.

Also, for example, in the stereo-image subtitle/graphics producing unit 226 and the stereo-image text producing unit 227, during a superimposition period superimposition information, disparity is given to superimposition information in predetermined units using a predetermined disparity vector (disparity information) selected from disparity vectors corresponding to the superimposition period. The predetermined disparity vector is set to, for example, disparity information that exhibits the maximum disparity within the disparity information corresponding to the superimposition period.

In FIG. 83, an arrow added to a portion of the subtitle (graphics) data stream and the text data stream indicates the timing at which disparity is given to superimposition information. In this case, disparity is given to superimposition information at the beginning of the superimposition period, and, subsequently, superimposition information to which the disparity has been given is used as superimposition information to be superimposed on a left-eye image and a right-eye image. With the configuration in which disparity is given to superimposition information in this manner, it is possible to give, for example, the maximum disparity within a superimposition period of superimposition information to the superimposition information regardless of the content of the image.

Figure 84:
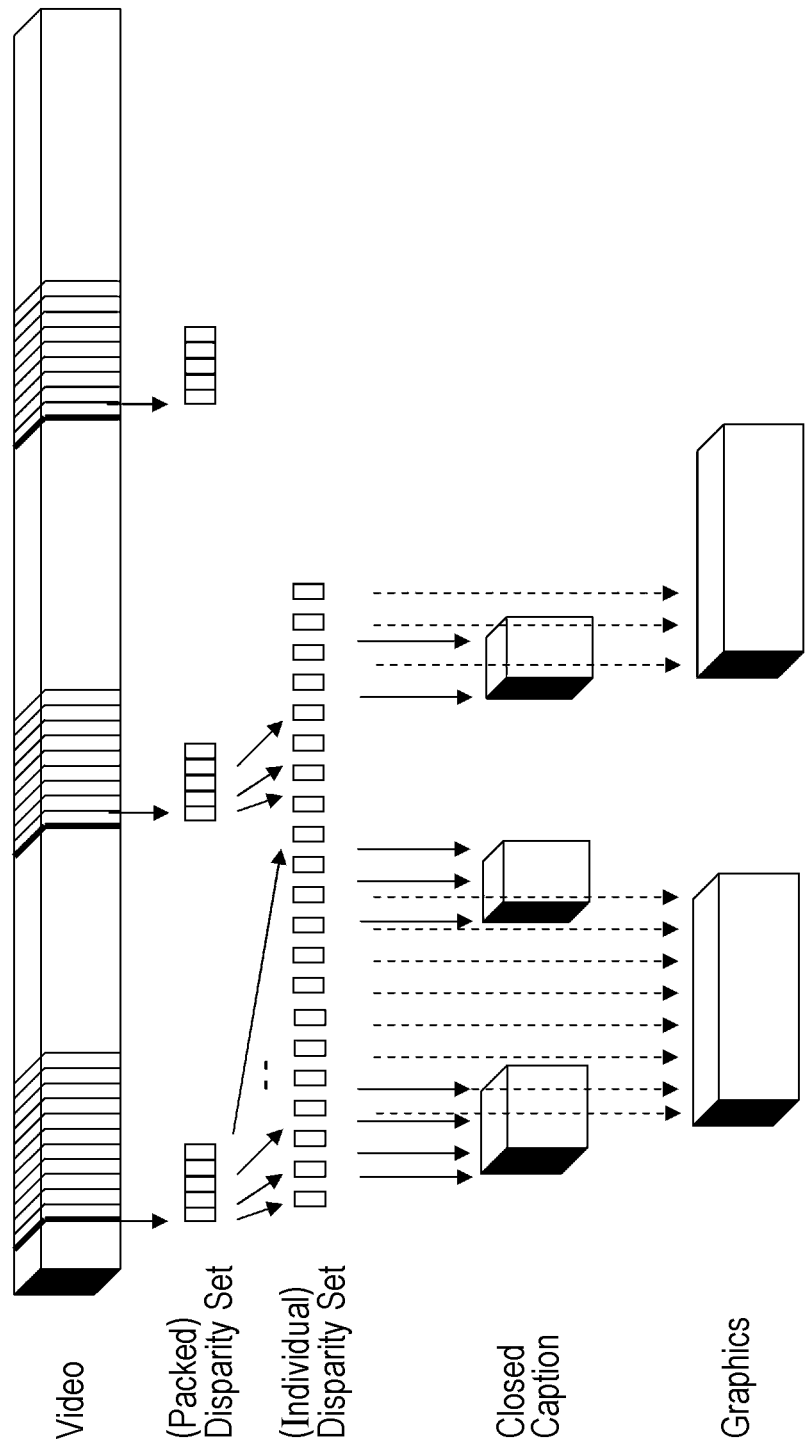
FIG. 84 is a diagram illustrating a correspondence relationship between image data, closed caption data, graphics data, and a disparity information set sent from the broadcast station.

Also, as illustrated in FIG. 84, for example, image data, closed caption data, and graphics data are sent from the broadcast station 100 (see FIG. 1). A disparity information set (see FIGS. 29, 31, 33, and 36) is sent as a disparity vector stream. In this case, disparity information sets in predetermined units corresponding to individual certain periods are collectively sent in accordance with the start timing of each certain period such as a GOP of encoded video, an I picture, or a scene. It is conceivable that a predetermined unit is, for example, a unit of picture (frame), a unit of an integer multiple of a picture, or the like.

For example, in the stereo-image subtitle/graphics producing unit 226 and the stereo-image text producing unit 227, during a superimposition period of superimposition information, in predetermined units, disparity is given to superimposition information using a corresponding disparity vector (information information). In FIG. 84, an arrow added to a portion of closed caption data and graphics data indicates the timing at which disparity is given to superimposition information in predetermined units. With the configuration in which disparity is given to superimposition information in this manner, it is possible to dynamically change the disparity to be given to the superimposition information in accordance with the change in the content of the image superimposition information.

"Another Example Configuration of Bit Stream Processing Unit"

Figure 85:
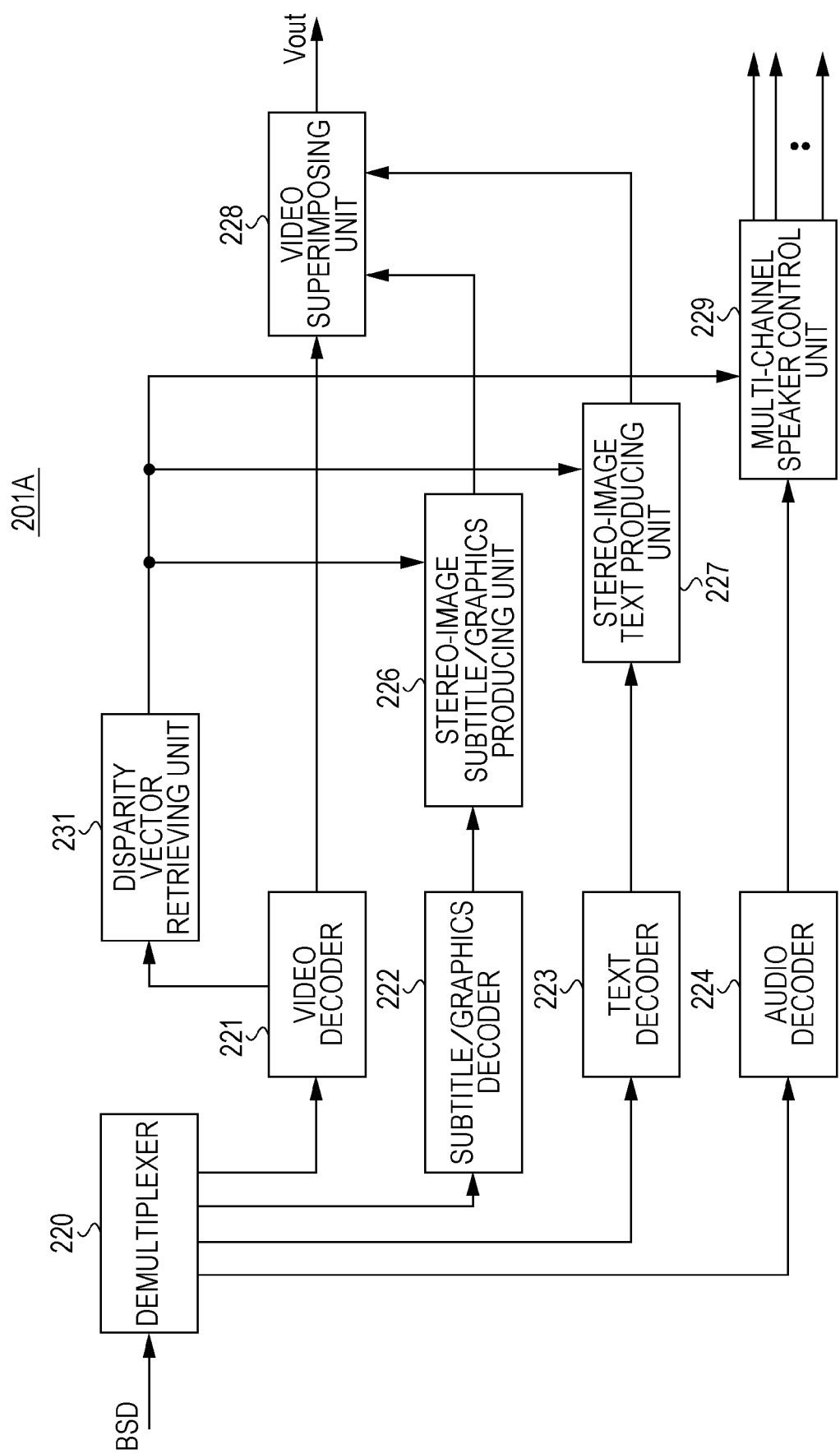
FIG. 85 is a block diagram illustrating another example configuration of the bit stream processing unit included in the set-top box.

A bit stream processing unit 201A illustrated in FIG. 85 has a configuration that is made to correspond to that of the transmission data generation units 110A and 110D described above illustrated in FIGS. 13 and 22. In FIG. 85, portions corresponding to those in FIG. 80 are assigned the same numerals, and the detailed description thereof is omitted.

The bit stream processing unit 201A is provided with a disparity vector retrieving unit 231 in place of the disparity vector decoder 225 of the bit stream processing unit 201 illustrated in FIG. 80. The disparity vector retrieving unit 231 retrieves from the stream of video obtained through the video decoder 221 the disparity vector embedded in the user data area thereof. Then, the disparity vector retrieving unit 231 supplies the retrieved disparity vector to the stereo-image subtitle/graphics producing unit 226, the stereo-image text producing unit 227, and the multi-channel speaker control unit 229.

The other elements of the bit stream processing unit 201A illustrated in FIG. 85 are configured in a manner similar to those of the bit stream processing unit 201 illustrated in FIG. 80, and operate in a similar manner although the detailed description is omitted.

[Giving of Disparity to Superimposition Information]

Here, a further description will be given of the giving of disparity to superimposition information in the stereo-image subtitle/graphics producing unit 226 and the stereo-image text producing unit 227 of the bit stream processing unit 201A illustrated in FIG. 85.

Figure 86:
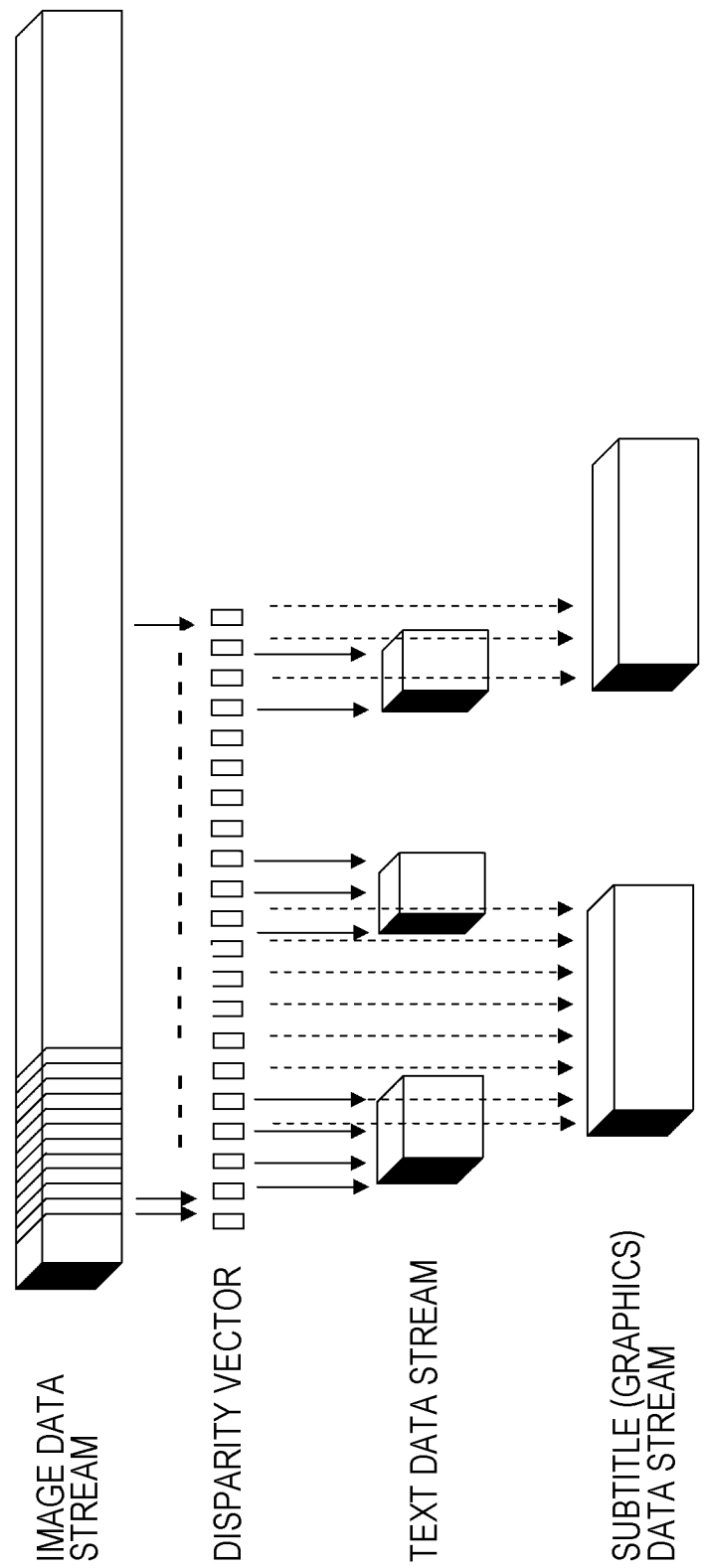
FIG. 86 is a diagram illustrating a correspondence relationship between each data stream sent from the broadcast station and a disparity vector.

As illustrated in, for example, FIG. 86, an image data stream, a subtitle or graphics data stream, and a text data stream are sent from the broadcast station 100 (see FIG. 1). Then, disparity vectors (see FIGS. 8, 29, etc.) are sent in a state of being embedded in the image data stream. In this case, in predetermined units of image data, for example, in units of pictures of encoded video, disparity vectors corresponding to the predetermined units are sent in a state of being embedded in the image data stream.

In the stereo-image subtitle/graphics producing unit 226 and the stereo-image text producing unit 227, during a superimposition period of superimposition information, in predetermined units, disparity is given to superimposition information using a corresponding disparity vector (information information). In FIG. 86, an arrow added to a portion of a subtitle (graphics) data stream and a text data stream indicates the timing at which at which disparity is given to superimposition information in predetermined units. With the configuration in which disparity is given to superimposition information in this manner, it is possible to dynamically change the disparity to be given to the superimposition information in accordance with the change in the content of the image.

Figure 87:
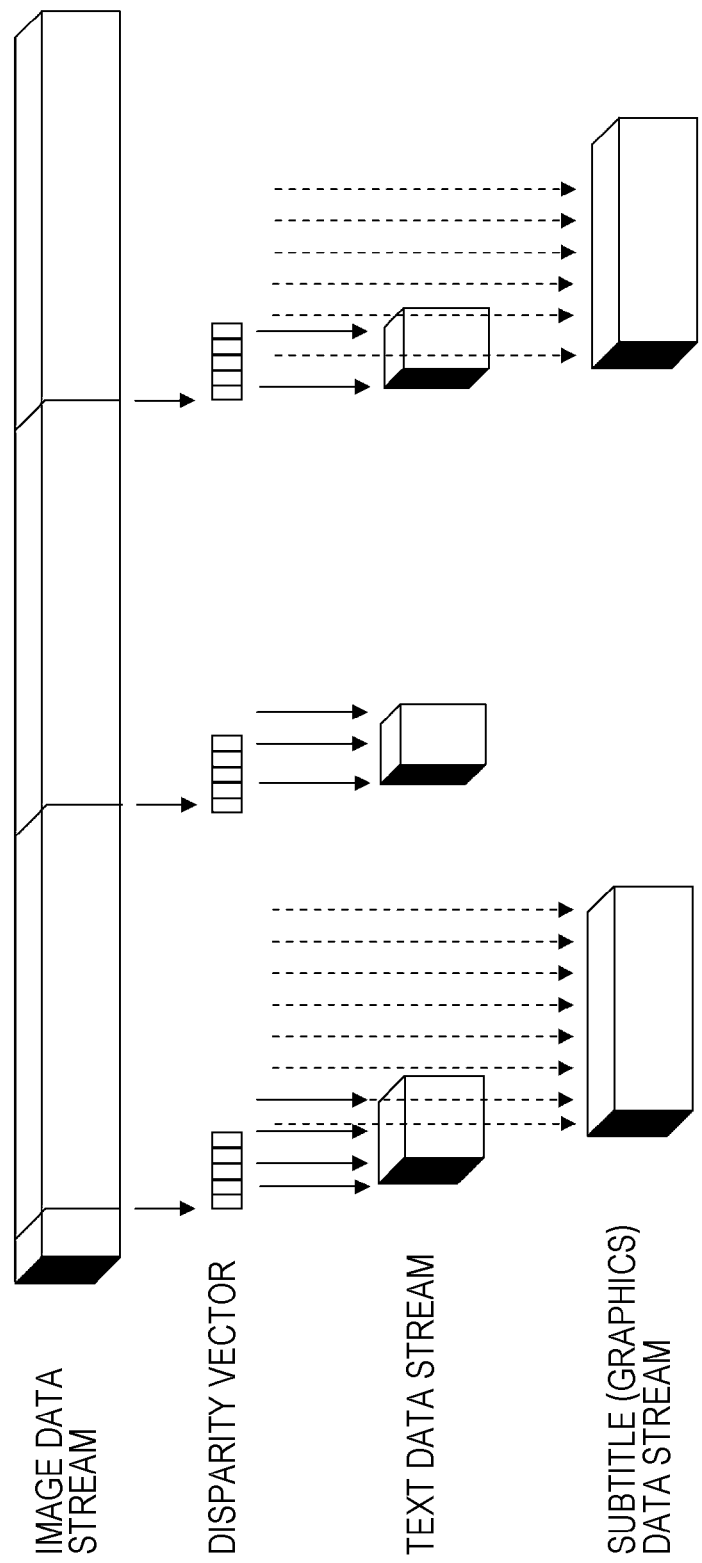
FIG. 87 is a diagram illustrating a correspondence relationship between each data stream sent from the broadcast station and a disparity vector.
Figure 88:
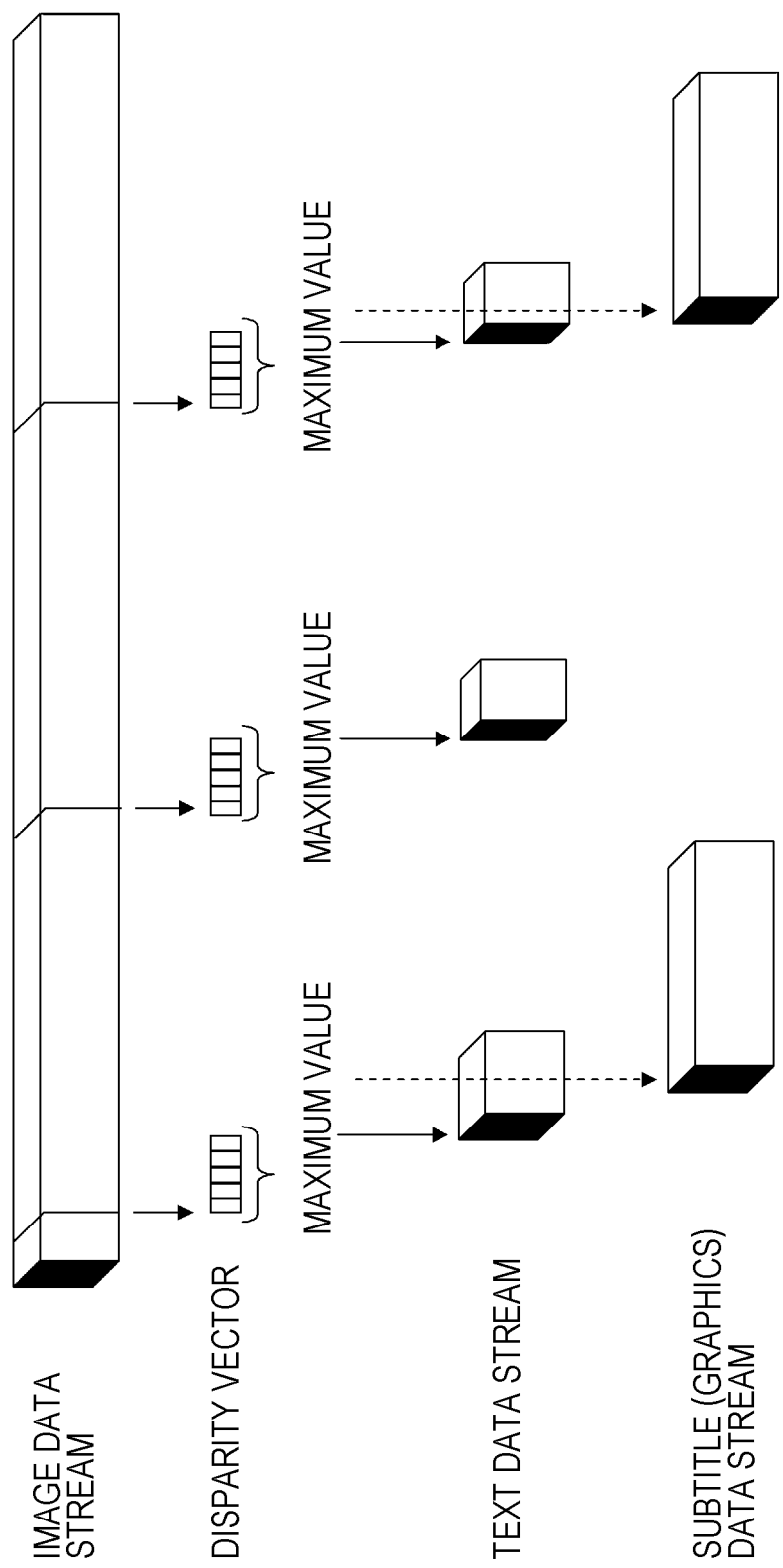
FIG. 88 is a diagram illustrating a correspondence relationship between each data stream sent from the broadcast station and a disparity vector.

Also, as illustrated in, for example, FIGS. 87 and 88, an image data stream, a subtitle or graphics data stream, and a text data stream are sent from the broadcast station 100 (see FIG. 1). Then, disparity vectors (see FIGS. 8, 29, etc.) are sent in a state of being embedded in the image data stream. In this case, disparity vectors for each predetermined units corresponding to individual certain periods are collectively sent in accordance with the start timing of each certain period such as a GOP of encoded video, an I picture, or a scene. It is conceivable that a predetermined unit is, for example, a unit of picture (frame), a unit of an integer multiple of a picture, or the like.

For example, in the stereo-image subtitle/graphics producing unit 226 and the stereo-image text producing unit 227, during a superimposition period of superimposition information, in predetermined units, disparity is given to superimposition information using a corresponding disparity vector (information information). In FIG. 87, an arrow added to a portion of a subtitle (graphics) data stream and a text data stream indicates the timing at which disparity is given to superimposition information in predetermined units. With the configuration in which disparity is given to superimposition information in this manner, it is possible to dynamically change the disparity to be given to the superimposition information in accordance with the change in the content of the image.

Also, for example, in the stereo-image subtitle/graphics producing unit 226 and the stereo-image text producing unit 227, during a superimposition period of superimposition information, in predetermined units, disparity is given to superimposition information using a predetermined disparity vector (disparity information) selected among disparity vectors corresponding to the superimposition period. The predetermined disparity vector is set to, for example, disparity information that exhibits the maximum disparity within the disparity information corresponding to the superimposition period.

In FIG. 88, an arrow added to a portion of a subtitle (graphics) data stream and a text data stream indicates the timing at which disparity is given to superimposition information. In this case, disparity is given to superimposition information at the beginning of the superimposition period, and, subsequently, superimposition information to which the disparity has been given is used as superimposition information to be superimposed on a left-eye image and a right-eye image. With the configuration in which disparity is given to superimposition information in this manner, it is possible to give, for example, the maximum disparity within a superimposition period of superimposition information to the superimposition information regardless of the content of the image.

Figure 89:
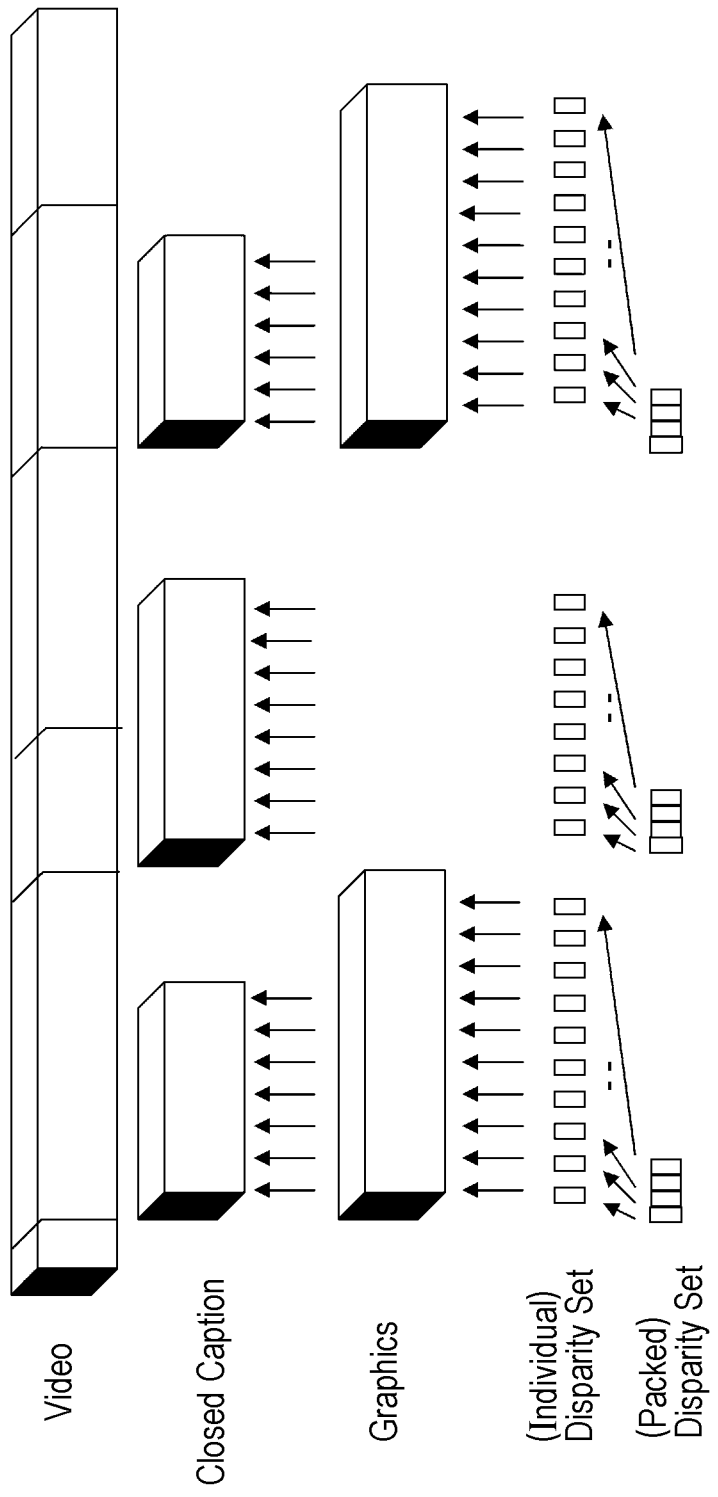
FIG. 89 is a diagram illustrating a correspondence relationship between image data, closed caption data, graphics data, and a disparity information set sent from the broadcast station.

Also, as illustrated in FIG. 89, for example, image data, closed caption data, and graphics data are sent from the broadcast station 100 (see FIG. 1). A disparity information set is (see FIGS. 29, 31, 33, and 36) sent in a state of being embedded in an image data stream. In this case, disparity information sets in predetermined units corresponding to individual certain periods are collectively sent in accordance with the start timing of each certain period such as a GOP of encoded video, an I picture, or a scene. It is conceivable that a predetermined unit is, for example, a unit of picture (frame), a unit of an integer multiple of a picture, or the like.

For example, in the stereo-image subtitle/graphics producing unit 226 and the stereo-image text producing unit 227, during a superimposition period of superimposition information, in predetermined units, disparity is given to superimposition information using a corresponding disparity vector (information information). In FIG. 89, an arrow added to a portion of closed caption data and graphics data indicates the timing at which disparity is given to superimposition information in predetermined units. With the configuration in which disparity is given to superimposition information in this manner, it is possible to dynamically change the disparity to be given to the superimposition information in accordance with the change in the content of the image.

"Another Example Configuration of Bit Stream Processing Unit"

Figure 90:
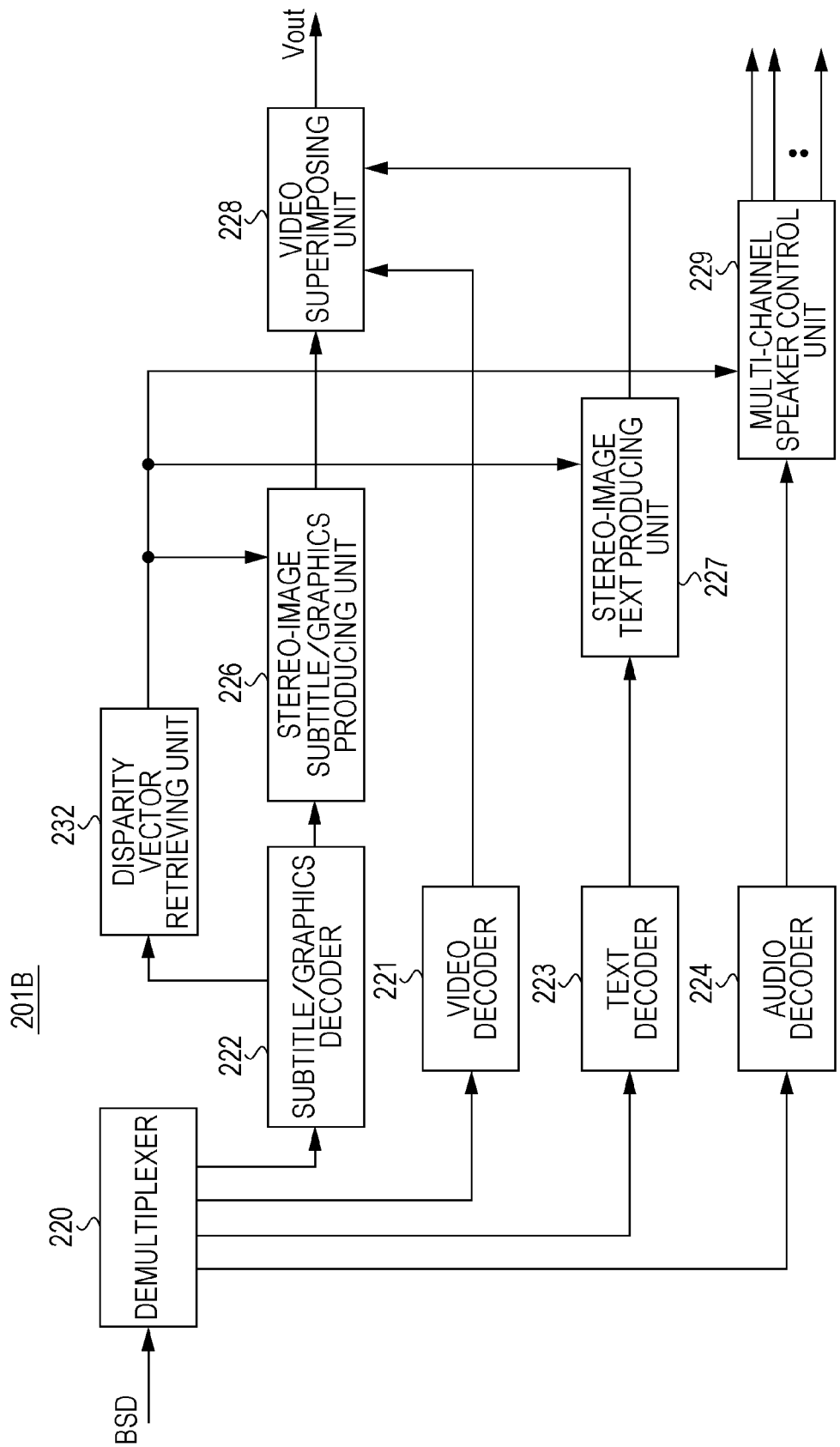
FIG. 90 is a block diagram illustrating another example configuration of the bit stream processing unit included in the set-top box.

A bit stream processing unit 201B illustrated in FIG. 90 has a configuration that is made to correspond to that of the transmission data generation unit 110B described above illustrated in FIG. 15. In FIG. 90, portions corresponding to those in FIG. 80 are assigned the same numerals, and the detailed description thereof is omitted.

The bit stream processing unit 201B is provided with a disparity vector retrieving unit 232 in place of the disparity vector decoder 225 of the bit stream processing unit 201 illustrated in FIG. 80. The disparity vector retrieving unit 232 retrieves from the subtitle or graphics stream obtained through the subtitle/graphics decoder 222 the disparity vector embedded therein. Then, the disparity vector retrieving unit 232 supplies the retrieved disparity vector to the stereo-image subtitle/graphics producing unit 226, the stereo-image text producing unit 227, and the multi-channel speaker control unit 229.

The other elements of the bit stream processing unit 201B illustrated in FIG. 90 are configured in a manner similar to those of the bit stream processing unit 201 illustrated in FIG. 80, and operate in a similar manner although the detailed description is omitted. Note that the giving of disparity to superimposition information in the bit stream processing unit 201B in FIG. 90 is similar to the giving of disparity to superimposition information in the bit stream processing unit 201A in FIG. 85 described above (see FIG. 86 to FIG. 89).

"Another Example Configuration of Bit Stream Processing Unit"

Figure 91:
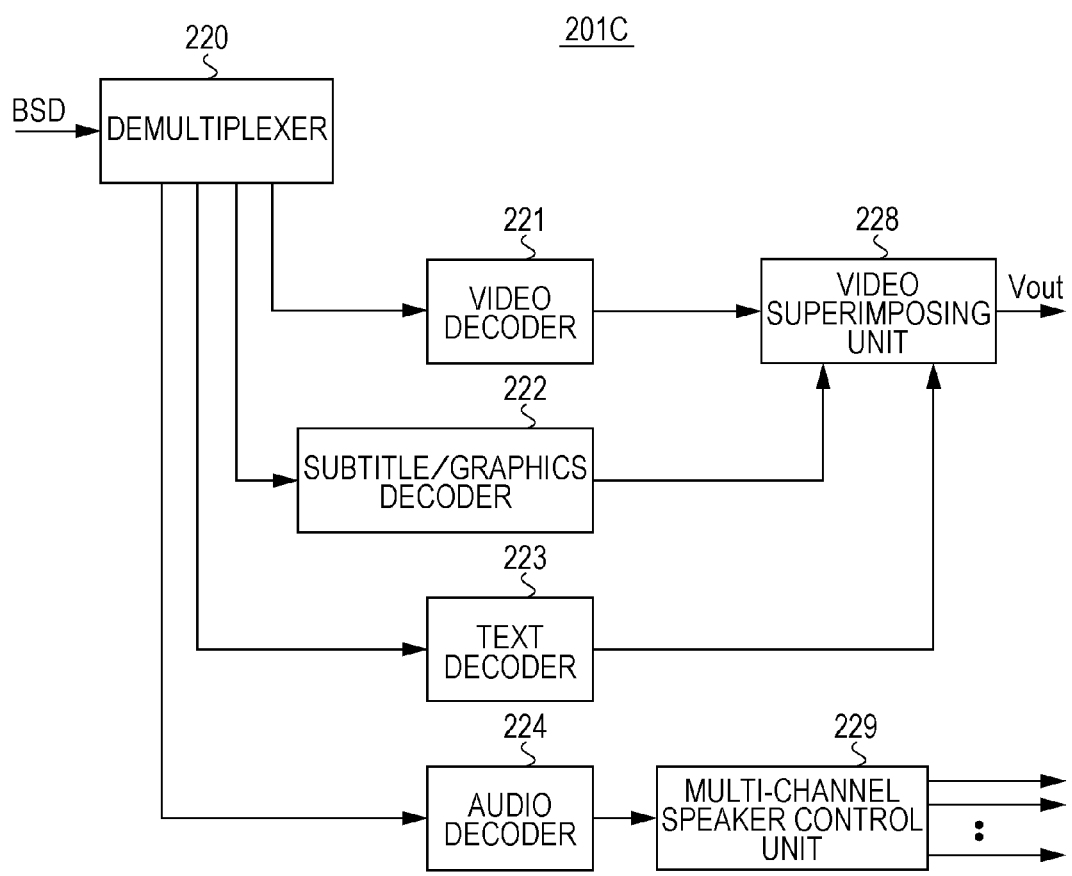
FIG. 91 is a block diagram illustrating another example configuration of the bit stream processing unit included in the set-top box.

A bit stream processing unit 201C illustrated in FIG. 91 has a configuration that is made to correspond to that of the transmission data generation unit 110C described above illustrated in FIG. 21. In FIG. 91, portions corresponding to those in FIG. 80 are assigned the same numerals, and the detailed description thereof is omitted.

The bit stream processing unit 201C is configured such that the disparity vector decoder 225, the stereo-image subtitle/graphics producing unit 226, and the stereo-image text producing unit 227 are removed from the bit stream processing unit 201 illustrated in FIG. 80. In this case, the disparity vector is reflected in advance in the data of the subtitle information, graphics information, and text information.

As described above, the subtitle data or graphics data that is transmitted contains data of left-eye subtitle information or graphics information to be superimposed on the left-eye image, and data of right-eye subtitle information or graphics information to be superimposed on the right-eye image. Similarly, as described above, the text data that is transmitted contains data of left-eye text information to be superimposed on the left-eye image and data of right-eye text information to be superimposed on the right-eye image. Therefore, the disparity vector decoder 225, the stereo-image subtitle/graphics producing unit 226, and the stereo-image text producing unit 227 are not necessary.

Note that since the text data obtained by the text decoder 223 is code data (character code), a process for converting it into bitmap data is necessary. This process is performed in, for example, the last stage of the text decoder 223 or the input stage of the video superimposing unit 228.

"Another Example Configuration of Bit Stream Processing Unit"

Figure 92:
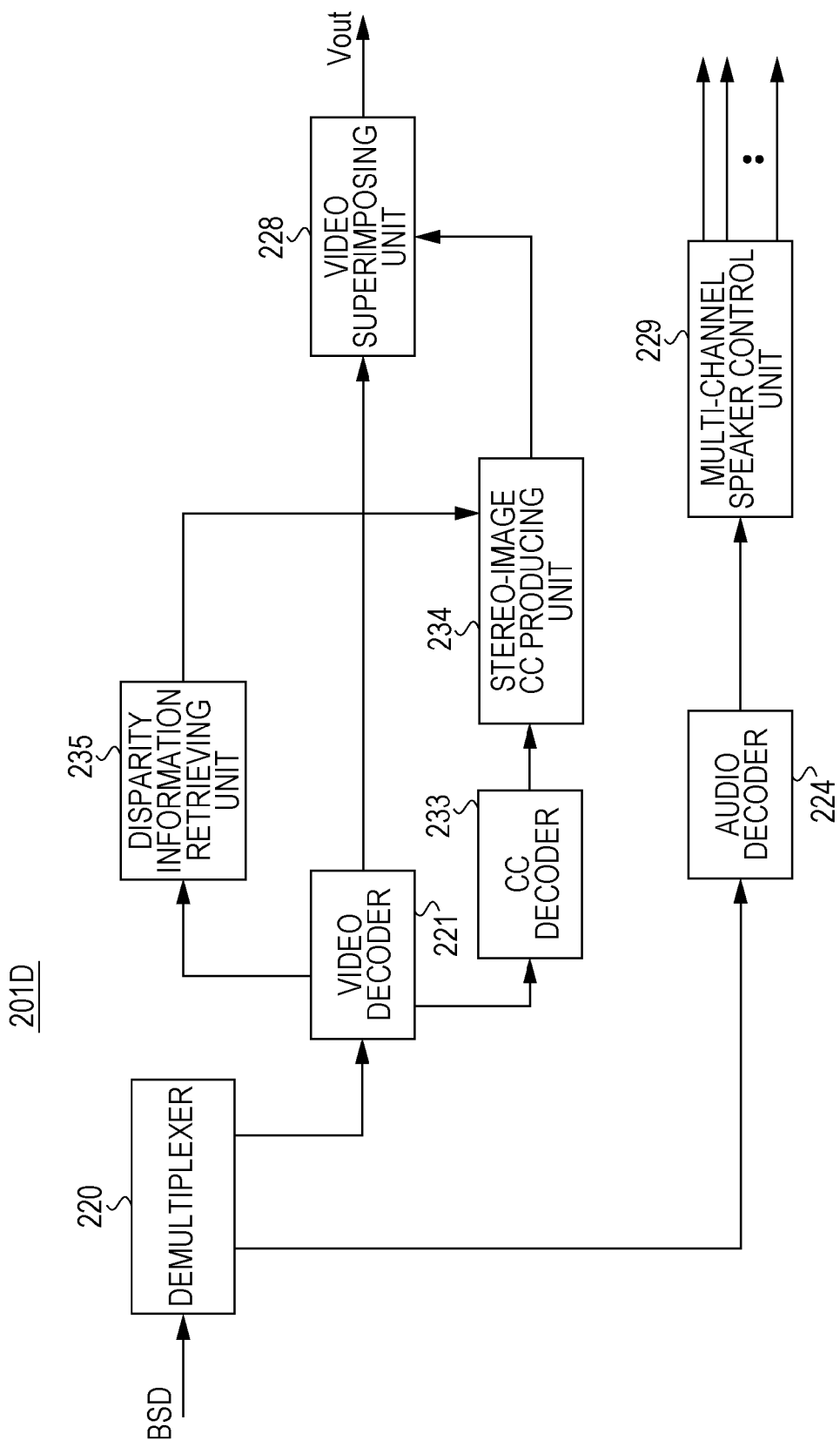
FIG. 92 is a block diagram illustrating another example configuration of the bit stream processing unit included in the set-top box.

A bit stream processing unit 201C illustrated in FIG. 92 has a configuration that is made to correspond to that of the transmission data generation unit 110F described above illustrated in FIG. 63. In FIG. 92, portions corresponding to those in FIG. 80 are assigned the same numerals, and the detailed description thereof is omitted as appropriate.

The bit stream processing unit 201D includes a demultiplexer 220, a video decoder 221, an audio decoder 224, a video superimposing unit 228, and a multi-channel speaker control unit 229. Also, the bit stream processing unit 201D includes a disparity information retrieving unit 235, a CC decoder 233, and a stereo-image CC producing unit 234.

As described above, CC data and disparity information are embedded in the user data area in the header portion of the video elementary stream output from the video encoder 113 of the transmission data generation unit 110F illustrated in FIG. 63 so that the CC data and the disparity information can be identified by user data type code (user data identification information).

The CC decoder 233 retrieves CC data from the video elementary stream obtained through the video decoder 221. Furthermore, the CC decoder 233 acquires, for each caption window (Caption Window), closed caption information (character code of a caption), and further control data for a superimposed position and a display time from the CC data. Then, the CC decoder 233 supplies the closed caption information and the control data for the superimposed position and display time to the stereo-image CC producing unit 234.

The disparity information retrieving unit 235 retrieves disparity information from the video elementary stream obtained through the video decoder 221. The disparity information is related with the closed caption data (character code of a caption) for each caption window (Caption Window), which is acquired by the CC decoder 233 described above. The disparity information has added thereto shift target specification information specifying closed caption information to be shifted on the basis of the disparity information among closed caption information to be superimposed on a left-eye image and closed caption information to be superimposed on a right-eye image.

The disparity information retrieving unit 235 retrieves, in correspondence with closed caption data for each caption window, which is acquired by the CC decoder 233, disparity information to be used in a display frame period of closed caption information that is based on the data. The disparity information is, for example, disparity information that is commonly used in individual frames during a display frame period of closed caption information, or disparity information that is sequentially updated in individual frames. The disparity information has added thereto flag information indicating disparity information that is commonly used in individual frames during a display frame period or disparity information that is sequentially updated in individual frames during a display frame period.

The disparity information retrieving unit 235 retrieves, as disparity information that is sequentially updated in individual frames, disparity information about the first frame and offset information regarding the second and subsequent frames with respect to disparity information about preceding frames. As described above, disparity information about the second and subsequent frames is set as offset information with respect to disparity information about preceding frames. Also, the disparity information retrieving unit 235 retrieves, as a disparity information that is commonly used in individual frames, for example, disparity information about the first frame.

The stereo-image CC producing unit 234 generates, for each caption window (Caption Window), data of left-eye closed caption information (caption) and right-eye closed caption information (caption) to be superimposed on a left-eye image and a right-eye image, respectively. This generation process is performed on the basis of the closed caption data and superimposed position control data obtained by the CC decoder 233 and the disparity information (disparity vector) retrieved by the disparity information retrieving unit 235.

The stereo-image CC producing unit 234 performs a shift process for giving disparity to either or both left-eye closed caption information and right-eye closed caption information on the basis of the shift target specification information. Also, the stereo-image CC producing unit 234 gives disparity to the closed caption information in the following manner depending on whether the disparity information retrieved by the disparity information retrieving unit 235 is disparity information that is commonly used in individual frames or disparity information that is sequentially updated in individual frames.

That is, when the retrieved disparity information is disparity information that is commonly used in individual frames, the stereo-image CC producing unit 234 gives disparity to closed caption information to be superimposed on the left-eye image and the right-eye image on the basis of the common disparity information. In contrast, when the retrieved disparity information is disparity information that is sequentially updated in individual frames, the stereo-image CC producing unit 234 gives disparity to closed caption information to be superimposed on the left-eye image and the right-eye image on the basis of disparity information updated every frame.

As described above, the disparity information that is sequentially updated in individual frames is composed of, for example, disparity information about the frame, and offset information regarding the second and subsequent frames with respect to disparity information of preceding frames. In this case, in the first frame, disparity is given to closed caption information to be superimposed on the left-eye image and the right-eye image on the basis of disparity information about the first frame. Then, in the second and subsequent frames, disparity is further given to closed caption information to be superimposed on the left-eye image and the right-eye image by the amount corresponding to the offset information with reference to the state where the disparity has been given to the preceding frame.

Figure 93:
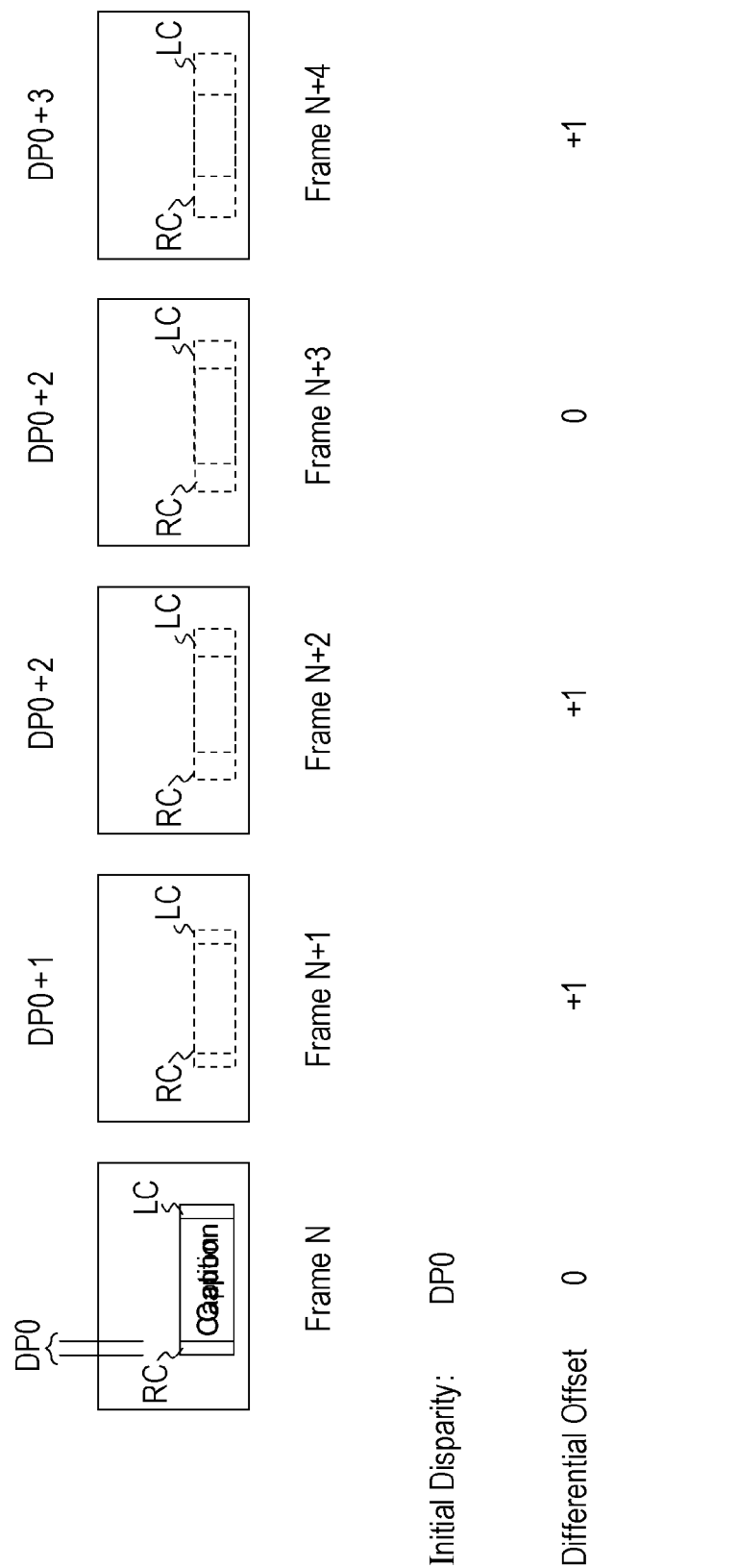
FIG. 93 is a diagram illustrating an example of a process for giving disparity to closed caption information to be superimposed on a left-eye image and a right-eye image on the basis of disparity information that is sequentially updated in individual frames.

FIG. 93 illustrates a process for giving disparity to closed caption information to be superimposed on the left-eye image and the right-eye image on the basis of disparity information that is sequentially updated in individual frames. In the first frame (Frame N), a shift process is performed on the basis of disparity information DP0 about the first frame, and disparity is given to left-eye closed caption information LC and right-eye closed caption information RC. In the next frame (Frame N+1), a shift process is further performed on the pieces of information LC and RC by an amount of "+1" that is offset information (Differential) with respect to the state of the frame (Frame N).

In the next frame (Frame N+2), a shift process is further performed on the pieces of information LC and RC by an amount of "+1" that is offset information with respect to the state of the frame (Frame N+1). In the next frame (Frame N+3), since the offset information is "0", the shifted state of the pieces of information LC and RC is maintained to the same state as that of the frame (Frame N+2). Also, in the next frame (Frame N+3), a shift process is further performed on the pieces of information LC and RC by an amount of "+1" that is offset information with respect to the state of the frame (Frame N+3).

The video superimposing unit 228 superimposes data of the left-eye and right-eye closed caption information items obtained by the stereo-image CC producing unit 234 on the stereo image data (left-eye image data, right-eye image data)

obtained by the video decoder 221, and obtains display stereo image data Vout. Note that the superimposition of the data of the closed caption information on the stereo image data (left-eye image data, right-eye image data) is started using a time stamp in the system layer. Also, the superimposition duration is controlled on the basis of control data for the display time regarding the closed caption information.

The other elements of the bit stream processing unit 201D illustrated in FIG. 92 are configured in a manner similar to those of the bit stream processing unit 201 illustrated in FIG. 80 although the detailed description is omitted.

The operation of the bit stream processing unit 201D illustrated in FIG. 92 will be described briefly. Bit stream data BSD output from the digital tuner 204 (see FIG. 79) is supplied to the demultiplexer 220. In the demultiplexer 220, TS packets of video and audio are extracted from the bit stream data BSD, and are supplied to the respective decoders. In the video decoder 221, an elementary stream of video is reconfigured from the packets of video extracted from the demultiplexer 220, and a decoding process is further performed to obtain stereo image data including left-eye image data and right-eye image data. The stereo image data is supplied to the video superimposing unit 228.

Also, the video video elementary stream reconfigured by the video decoder 221 is supplied to the CC decoder 233. In the CC decoder 233, CC data is retrieved from the video elementary stream. Then, in the CC decoder 233, closed caption information (character code of a caption) and further control data for a superimposed position and a display time for each caption window (Caption Window) are acquired from the CC data. The closed caption information and the control data for the superimposed position and the display time are supplied to the stereo-image CC producing unit 234.

Also, the video video elementary stream reconfigured by the video decoder 221 is supplied to the disparity information retrieving unit 235. In the disparity information retrieving unit 235, disparity information is retrieved from the video elementary stream. The disparity information is related with the closed caption data (character code of a caption) for each caption window (Caption Window) acquired by the CC decoder 233 described above. The disparity information is supplied to the stereo-image CC producing unit 234.

In the stereo-image CC producing unit 234, data of left-eye closed caption information (caption) and right-eye closed caption information (caption) to be superimposed on a left-eye image and a right-eye image, respectively, are generated for each caption window (Caption Window). This generation process is performed on the basis of the closed caption data and superimposed position control data obtained by the CC decoder 233 and on the basis of disparity information (disparity vectors) retrieved by the disparity information retrieving unit 235.

In the stereo-image CC producing unit 234, a shift process for giving disparity to either or both left-eye closed caption information and right-eye closed caption information is performed on the basis of the shift target specification information included in the disparity information. In this case, when the disparity information retrieved by the disparity information retrieving unit 235 is disparity information that is commonly used in individual frames, disparity is given to the closed caption information to be superimposed on the left-eye image and the right-eye image on the basis of the common disparity information. Also, when the disparity information retrieved by the disparity information retrieving unit 235 is disparity information that is sequentially updated in individual frames, disparity is given to the closed caption information to be superimposed on the left-eye image and the right-eye image on the basis of disparity information updated every frame (see FIG. 93).

In this manner, the data (bitmap data) of left-eye and right-eye closed caption information items generated by the stereo-image CC producing unit 234 for each caption window (Caption Window) is supplied to the video superimposing unit 228 together with the control data for the display time. In the video superimposing unit 228, the data of the closed caption information supplied from the stereo-image CC producing unit 234 is superimposed on the stereo image data (left-eye image data, right-eye image data) obtained by the video decoder 221, and display stereo image data Vout is obtained.

Also, in the audio decoder 224, an elementary stream of audio is reconfigured from the TS packets of audio extracted by the demultiplexer 220, and a decoding process is further performed to obtain audio data. The audio data is supplied to the multi-channel speaker control unit 229. In the multi-channel speaker control unit 229, a process for generating audio data of the multi-channel speaker to implement, for example, 5.1-ch surround or the like, a process for giving predetermined sound field characteristics, and the like are performed on the audio data. Then, an output of the multi-channel speaker is obtained from the multi-channel speaker control unit 229.

In the bit stream processing unit 201D illustrated in FIG. 92, stereo image data can be acquired from the payload portion of a video elementary stream, and furthermore, CC data and disparity information can be acquired from the user data area of the header portion. In this case, CC data and disparity information are included in the user data area so that the CC data and the disparity information can be identified by user data identification information (user_data_type_code). Thus, disparity information can be favorably acquired, together with the CC data, from the user data area on the basis of the user data identification information.

Also, in the bit stream processing unit 201D illustrated in FIG. 92, appropriate disparity can be given to closed caption information to be superimposed on a left-eye image and a right-eye image using disparity information suitable for the closed caption information. Therefore, in the display of closed caption information, the consistency in perspective between the information and each object in an image can be maintained to an optimum state.

Also, in the bit stream processing unit 201D illustrated in FIG. 92, shifting of only left-eye closed caption information, shifting of only right-eye closed caption information, or shifting of both can be performed on the basis of the shift target specification information (select_view_shift) added to the disparity information. In other words, disparity reflecting the intension of the transmitting side can be given to left-eye closed caption information and right-eye closed caption information.

Also, in the bit stream processing unit 201D illustrated in FIG. 92, disparity information that is commonly used in individual frames during a display period of closed caption information or disparity information that is sequentially updated in individual frames is received. Which of them has been received can be determined using flag information (temporal_extension_flag). Then, in a case where the received disparity information is disparity information that is sequentially updated in individual frames, disparity to be given to closed caption information can be dynamically changed in accordance with the change in the content of the image. Also, in a case where the received disparity information is disparity information that is commonly used in individual frames, the processing load can be reduced, and also the capacity of a memory that stores the disparity information can be suppressed.

Note that the bit stream processing unit 201D illustrated in FIG. 92 has been illustrated in the context of the reception of disparity information whose use is restricted to closed caption information, by way of example. Although the detailed description is omitted, for example, a bit stream processing unit that receives and processes disparity information whose use is restricted to any other superimposition information such as subtitle information can also be configured in a similar manner.

[Another Example Configuration of Set-Top Box]

Figure 94:
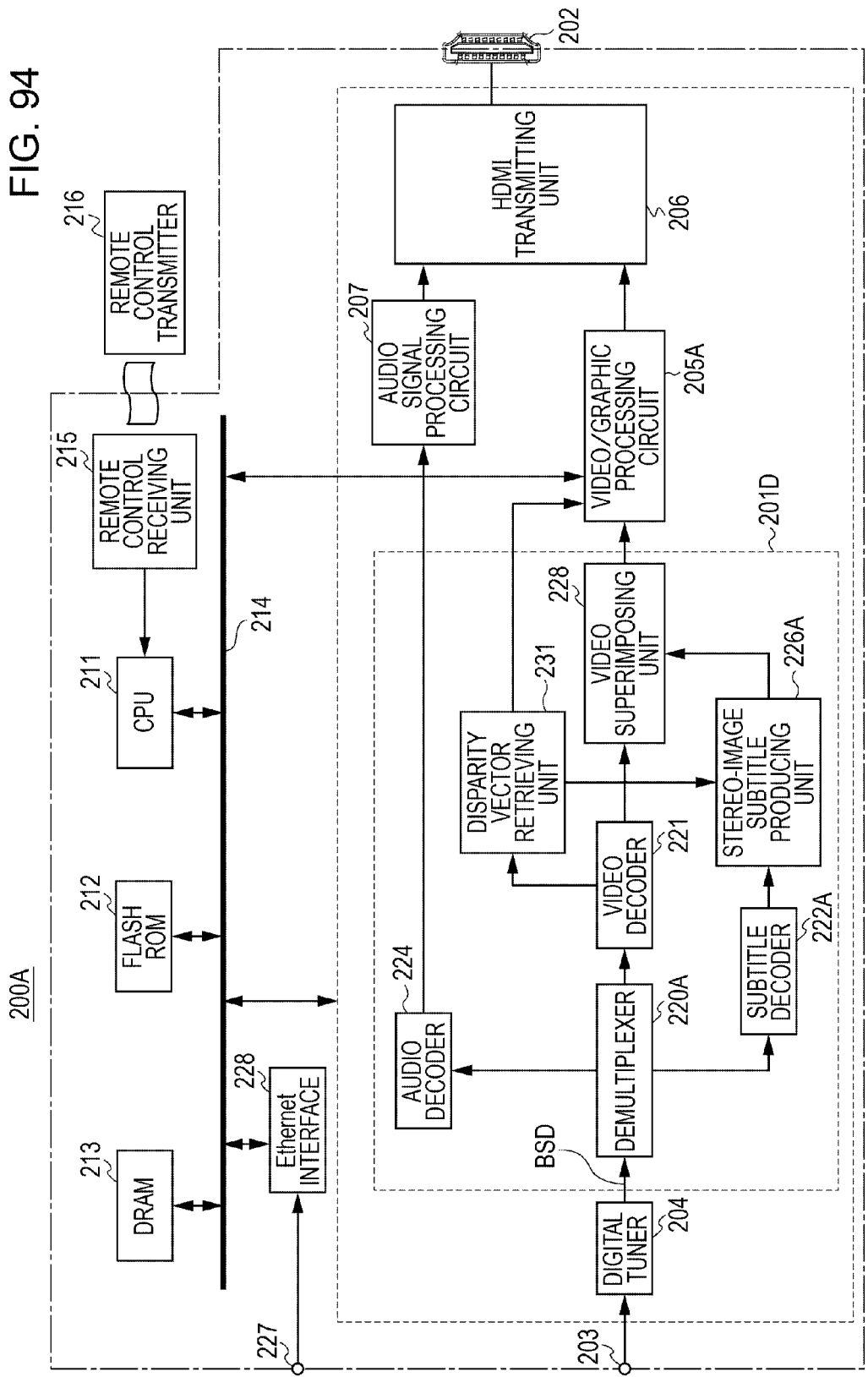
FIG. 94 is a block diagram illustrating another example configuration of the set-top box.

FIG. 94 illustrates another example configuration of a set-top box 200A. In FIG. 94, portions corresponding to those in FIGS. 79 and 85 are assigned the same numerals, and the detailed description thereof is omitted as appropriate. The set-top box 200A includes a bit stream processing unit 201D, an HDMI terminal 202, an antenna terminal 203, a digital tuner 204, a video/graphic processing circuit 205A, an HDMI transmitting unit 206, and an audio signal processing circuit 207.

Also, the set-top box 200A includes a CPU 211, a flash ROM 212, a DRAM 213, an internal bus 214, a remote control receiving unit 215, a remote control transmitter 216, a network terminal 217, and an Ethernet interface 218. Note that "Ethernet" is a trademark.

The bit stream processing unit 201D extracts stereo image data (left-eye image data, right-eye image data), audio data, superimposition information data, disparity information (disparity vectors), and the like from the bit stream data BSD obtained by the digital tuner 204. In this example, superimposition information data is subtitle data. The bit stream processing unit 201D has a configuration substantially similar to that of the bit stream processing unit 201A illustrated in FIG. 77.

The bit stream processing unit 201D includes a demultiplexer 220A, a video decoder 221, a subtitle decoder 222A, and an audio decoder 224. Also, the bit stream processing unit 201D includes a stereo-image subtitle producing unit 226A, a video superimposing unit 228, and a disparity vector retrieving unit 231. The demultiplexer 220A extracts packets of video, audio, and subtitle from the bit stream data BSD, and sends the packets to the respective decoders.

The video decoder 221 reconfigures a elementary stream of video from the packets of video extracted by the demultiplexer 220A, and performs a decoding process to obtain stereo image data including left-eye image data and right-eye image data. The subtitle decoder 222A reconfigures an elementary stream of subtitle from the packets of subtitle extracted by the demultiplexer 220A. Then, the subtitle decoder 222A further performs a decoding process to obtain subtitle data. The audio decoder 224 reconfigures an elementary stream of audio from the packets of audio extracted by the demultiplexer 220A, performs a decoding process to obtain audio data, and outputs the audio data to outside the bit stream processing unit 201.

The disparity vector retrieving unit 231 retrieves, from the video stream obtained through the video decoder 221, disparity vector (disparity information set) embedded in the user data area thereof. Then, the disparity vector retrieving unit 231 supplies the retrieved disparity vector to the stereo-image subtitle producing unit 226, and, additionally, outputs it to outside the bit stream processing unit 201D.

The stereo-image subtitle producing unit 226A generates left-eye and right-eye subtitle information items to be superimposed on a left-eye image and a right-eye image, respectively. This generation process is performed on the basis of the subtitle data obtained by the subtitle decoder 222A and the disparity vector (disparity information set) supplied from the disparity vector retrieving unit 231. In this case, left-eye and left-eye subtitle information items are the same information. However, the superimposed position of, for example, the right-eye subtitle information or graphics information in the image is configured to be shifted in the horizontal direction by the horizontal direction component of the disparity vector with respect to the left-eye subtitle information or graphics information. Then, the stereo-image subtitle producing unit 226A outputs data (bitmap data) of the left-eye and left-eye subtitle information items.

The video superimposing unit 228 superimposes data of the left-eye and left-eye subtitle information items produced by the subtitle producing unit 226A on the stereo image data (left-eye image data, right-eye image data) obtained by the video decoder 221, and obtains display stereo image data. Note that the superimposition of the superimposition information data on the stereo image data (left-eye image data, right-eye image data) is started using a time stamp in the system layer. Then, the video superimposing unit 228 outputs the display stereo image data to outside the bit stream processing unit 201D.

The Ethernet interface 228 is connected to a network that is not illustrated in the figure, such as the Internet, via the network terminal 227. The Ethernet interface 228 can also acquire various information such as weather forecast or stock market information to be subjected to graphics display via a network using, for example, widget (Widget) in accordance with a user operation. The Ethernet interface 228 is connected to the internal bus 214.

The video/graphic processing circuit 205A performs an image quality adjustment process, in accordance with necessity, on the display stereo image data output from the bit stream processing unit 201D. Also, the video/graphic processing circuit 205A superimposes, for example, data of graphics information based on widget (Widget) on the display stereo image data output from the bit stream processing unit 201D.

The disparity vectors (disparity information set) output from the bit stream processing unit 201D described above are supplied to the video/graphic processing circuit 205A. The video/graphic processing circuit 205A gives disparity to the same graphics information to be superimposed on a left-eye image and a right-eye image on the basis of the disparity vector (disparity information set). Accordingly, graphics information that has been subjected to disparity adjustment in accordance with the perspective of each object in an image can be used as the same graphics information to be superimposed on a left-eye image and a right-eye image, and in the display of graphics information, the consistency in perspective between the information and each object in an image is designed to be maintained.

The video/graphic processing circuit 205A supplies the processed display stereo image data to the HDMI transmitting unit 206. The audio signal processing circuit 207 performs an audio quality adjustment process and the like, in accordance with necessity, on the audio data output from the bit stream processing unit 201D, and supplies processed audio data to the HDMI transmitting unit 206. The HDMI transmitting unit 206 delivers data of a baseband image (video) and audio from the HDMI terminal 202 using HDMI-compliant communication. In this case, the HDMI transmitting unit 206 packs the data of an image and audio and outputs the data to the HDMI terminal 202 in order to transmit the data using HDMI TMDS channels.

The other elements of the set-top box 200A illustrated in FIG. 94 are configured in a manner similar to those of the set-top box 200 illustrated in FIG. 79 although the detailed description is omitted.

The operation of the set-top box 200A illustrated in FIG. 94 will be described briefly. The television broadcast signal input to the antenna terminal 203 is supplied to the digital tuner 204. In the digital tuner 204, the television broadcast signal is processed, and predetermined bit stream data BSD supporting a channel selected by a user is obtained. The bit stream data BSD is supplied to the bit stream processing unit 201D.

In the bit stream processing unit 201D, stereo image data (left-eye image data, right-eye image data), audio data, subtitle data, disparity vectors (disparity information set), and the like are extracted from the bit stream data. Also, in the bit stream processing unit 201D, data of subtitle information is combined with the stereo image data, and display stereo image data is generated.

In this case, in the bit stream processing unit 201D, disparity is given to the same subtitle information to be superimposed on a left-eye image and a right-eye image on the basis of disparity vector. Accordingly, subtitle information that has been subjected to disparity adjustment in accordance with the perspective of each obtained in an image can be used as the same subtitle information to be superimposed on a left-eye image and a right-eye image, and in the display of the subtitle information, the consistency in perspective between the information and each object in an image is designed to be maintained.

The display stereo image data generated by the bit stream processing unit 201D is subjected to an image quality adjustment process in accordance with necessity by the video/graphic processing circuit 205A. Also, in the video/graphic processing circuit 205A, data of graphics information based on widget (Widget) is combined with the display stereo image data generated by the bit stream processing unit 201D in accordance with necessity.

In this case, in the video/graphic processing circuit 205A, disparity is given to the same graphics information to be superimposed on a left-eye image and a right-eye image on the basis of disparity vector (disparity information set) supplied from the bit stream processing unit 201D. Accordingly, graphics information that has been subjected to disparity adjustment in accordance with the perspective of each object in an image can be used as the same graphics information to be superimposed on a left-eye image and a right-eye image, in the display of the graphics information, the consistency in perspective between the information and each object in an image is designed be maintained.

The processed display stereo image data obtained from the video/graphic processing circuit 205A is supplied to the HDMI transmitting unit 206. Also, the audio data obtained by the bit stream processing unit 201D is subjected to an audio quality adjustment process and the like in accordance with necessity by the audio signal processing circuit 207, and is thereafter supplied to the HDMI transmitting unit 206. The stereo image data and audio data supplied to the HDMI transmitting unit 206 are delivered from the HDMI terminal 202 to the HDMI cable 400 through the HDMI TMDS channel.

In the set-top box 200A illustrated in FIG. 94, in the bit stream processing unit 201D, disparity is given to the same subtitle information to be superimposed on a left-eye image and a right-eye image on the basis of the disparity vectors (disparity information set) retrieved by the disparity vector retrieving unit 231 of the bit stream processing unit 201D. Also, in the video/graphic processing circuit 205A, disparity is given to the same graphics information to be superimposed on a left-eye image and a right-eye image on the basis of the disparity vectors (disparity information set). Therefore, in the display of not only subtitle information sent from the broadcast station but also graphics information produced in the set-top box 200A, the consistency in perspective between the information and each object in an image can be designed to be maintained.

Figure 95:
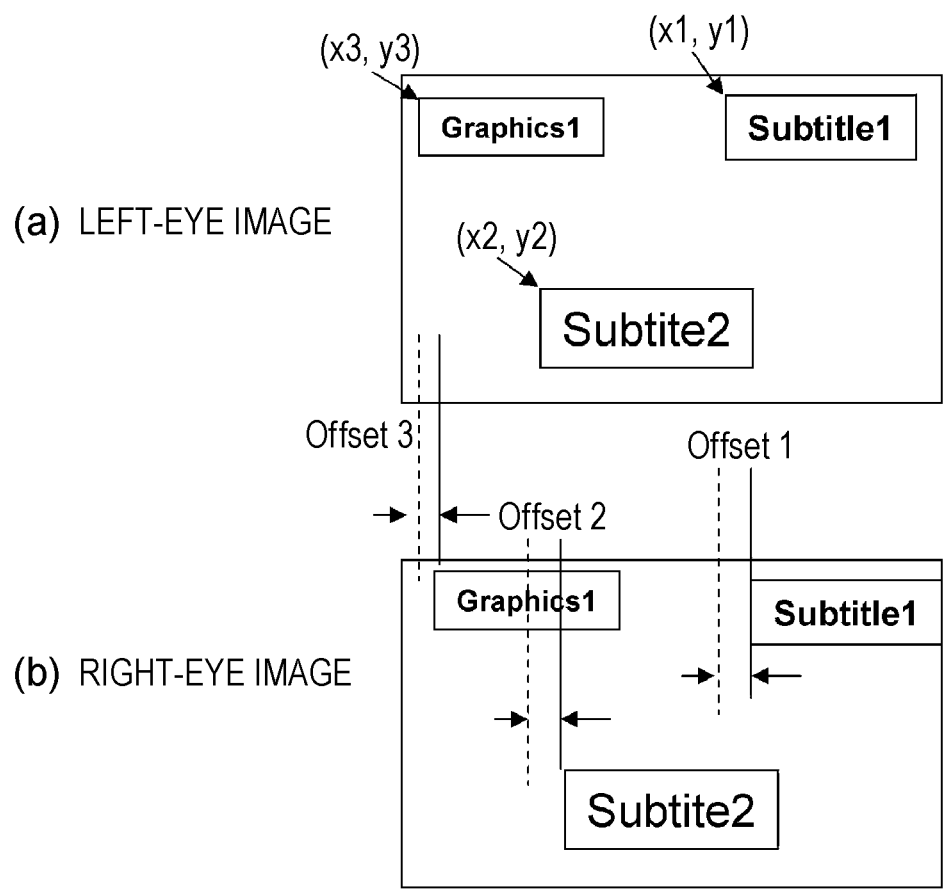
FIG. 95 includes diagrams illustrating an example of superimposition of subtitle information and graphics information on a left-eye image and a right-eye image.

FIG. 95 illustrates an example of the superimposition of subtitle information and graphics information on a left-eye image and a right-eye image in the set-top box 200A illustrated in FIG. 94. FIG. 95(*a*) illustrates a left-eye image. In the bit stream processing unit 201D, subtitle information "Subtitle 1" is superimposed at the position (x1, y1), and subtitle information "Subtitle 1" is superimposed at the position (x2, y2). Also, in the video/graphic processing circuit 205A, graphics information "Graphics 1" is superimposed at the position (x3, y3).

FIG. 95(*b*) illustrates a right-eye image. In the bit stream processing unit 201D, subtitle information "Subtitle 1" is superimposed at a position shifted by the offset 1 (Offset 1) on the basis of the corresponding disparity vector with respect to the superimposed position on the left-eye image. Similarly, in the bit stream processing unit 201D, subtitle information "Subtitle 2" is superimposed at a position shifted by the offset 2 (Offset 2) on the basis of the corresponding disparity vector with respect to the superimposed position on the left-eye image. Also, in the video/graphic processing circuit 205A, the graphics information "Graphics 1" is superimposed at a position shifted by the offset 3 (Offset 3) with respect to the superimposed position on the left-eye image.

Note that in the set-top box 200A illustrated in FIG. 94, the bit stream processing unit 201D handles subtitle information and, in addition, the video/graphic processing unit 205A handles graphic information. However, a device that handles other superimposition information can also be configured in a similar manner.

[Description of Television Receiver]

Referring back to FIG. 1, the television receiver 300 receives stereo image data that is sent from the set-top box 200 via the HDMI cable 400. The television receiver 300 includes a 3D signal processing unit 301. The 3D signal processing unit 301 performs a process (decoding process) corresponding to the transmission method on the stereo image data, and generates left-eye image data and right-eye image data. That is, the 3D signal processing unit 301 performs a process reverse to that of the video framing unit 112 in the transmission data generation units 110, 110A, 110B, and 110C illustrated in FIGS. 2, 13, 15, and 21. Then, the 3D signal processing unit 301 acquires left-eye image data and right-eye image data that form stereo image data.

[Example Configuration of Television Receiver]

Figure 96:
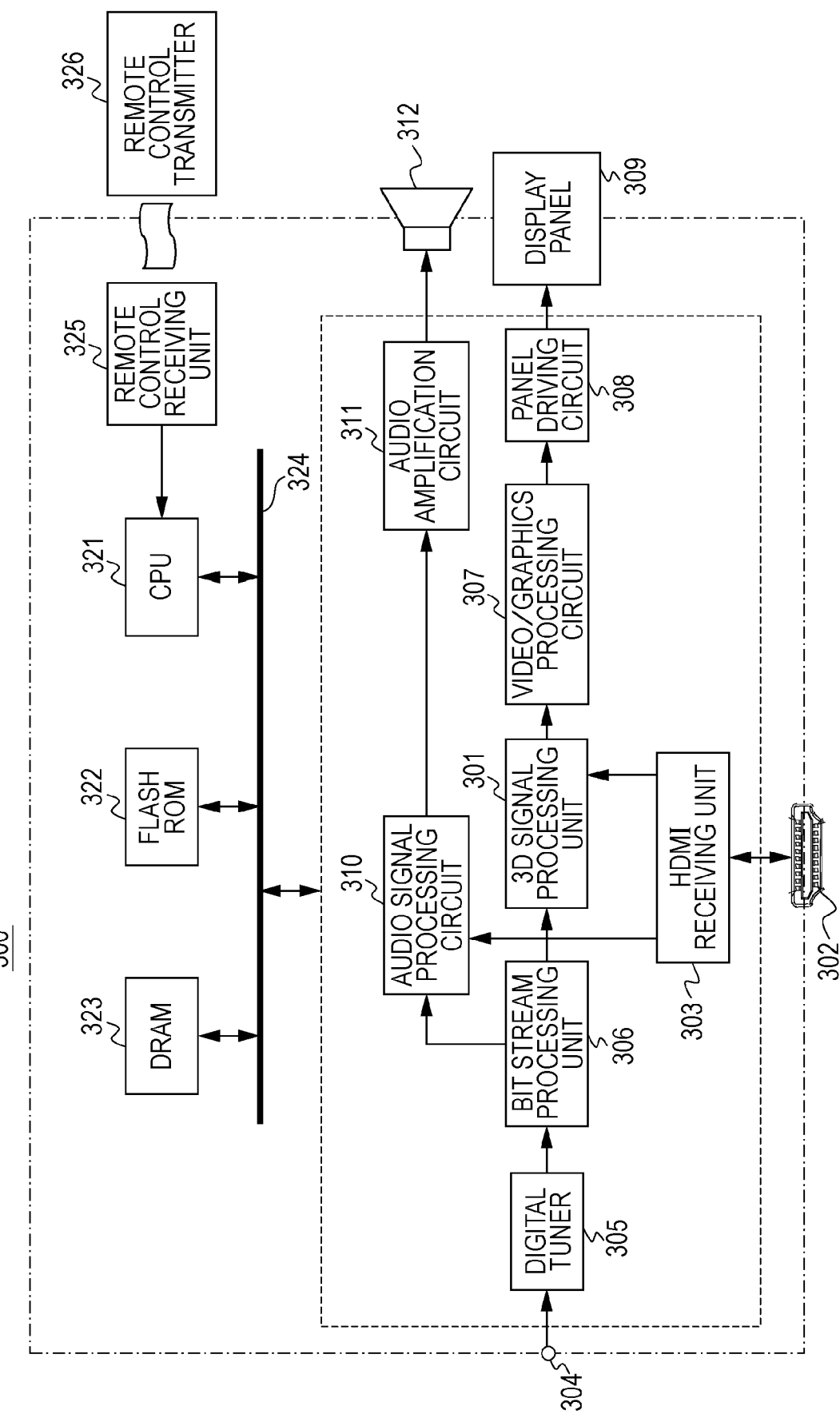
FIG. 96 is a block diagram illustrating an example configuration of a television receiver included in the stereo image display system.

An example configuration of the television receiver 300 will be described. FIG. 96 illustrates an example configuration of the television receiver 300. The television receiver 300 includes a 3D signal processing unit 301, an HDMI terminal 302, an HDMI receiving unit 303, an antenna terminal 304, a digital tuner 305, and a bit stream processing unit 306.

Also, the television receiver 300 includes a video/graphics processing circuit 307, a panel driving circuit 308, a display panel 309, an audio signal processing circuit 310, an audio amplification circuit 311, and a speaker 312. Also, the television receiver 300 includes a CPU 321, a flash ROM 322, a DRAM 323, an internal bus 324, a remote control receiving unit 325, and a remote control transmitter 326.

The antenna terminal 304 is a terminal to which a television broadcast signal received by a receiving antenna (not illustrated) is input. The digital tuner 305 processes the television broadcast signal input to the antenna terminal 304, and outputs predetermined bit stream data (transport stream) corresponding to a channel selected by a user.

The bit stream processing unit 306 is configured to have a configuration similar to that of the bit stream processing unit 201 of the set-top box 200 illustrated in FIG. 79. The bit stream processing unit 306 extracts stereo image data (left-eye image data, right-eye image data), audio data, superimposition information data, disparity vectors (disparity information), and the like from the bit stream data. The superimposition information data includes subtitle data, graphics data, text data (including closed caption data), and the like. The bit stream processing unit 306 combines the superimposition information data with the stereo image data, and acquires display stereo image data. Also, the bit stream processing unit 306 outputs audio data.

The HDMI receiving unit 303 receives uncompressed image data and audio data supplied to the HDMI terminal 302 via the HDMI cable 400 using HDMI-compliant communication. The version of the HDMI receiving unit 303 is assumed to be, for example, HDMI 1.4, and it is possible to handle stereo image data. The details of the HDMI receiving unit 303 will be described below.

The 3D signal processing unit 301 performs a decoding process on the stereo image data received by the HDMI receiving unit 303 or obtained by the bit stream processing unit 306, and generates left-eye image data and right-eye image data. In this case, the 3D signal processing unit 301 performs a decoding process corresponding to the transmission method (see FIG. 4) on the stereo image data obtained by the bit stream processing unit 306. Also, the 3D signal processing unit 301 performs a decoding process corresponding to the TMDS transmission data structure described below on the stereo image data received by the HDMI receiving unit 303.

The video/graphics processing circuit 307 generates image data for displaying a stereo image on the basis of the left-eye image data and right-eye image data generated by the 3D signal processing unit 301. Also, the video/graphics processing circuit 307 performs an image quality adjustment process on the image data in accordance with necessity. Also, the video/graphics processing circuit 307 combines data of superimposition information, such as a menu or a program guide, with image data in accordance with necessity. The panel driving circuit 308 drives the display panel 309 on the basis of the image data output from the video/graphics processing circuit 307. The display panel 309 is composed of, for example, an LCD (Liquid Crystal Display), a PDP (Plasma Display Panel), or the like.

The audio signal processing circuit 310 performs a necessary process such as D/A conversion on the audio data received by the HDMI receiving unit 303 or obtained by the bit stream processing unit 306. The audio amplification circuit 311 amplifies the audio signal output from the audio signal processing circuit 310 and supplies a resulting signal to the speakers 312.

The CPU 321 controls the operation of each unit of the television receiver 300. The flash ROM 322 stores control software and holds data. The DRAM 323 forms a work area for the CPU 321. The CPU 321 expands the software and data read from the flash ROM 322 onto the DRAM 323 to start the software, and controls each unit of the television receiver 300.

The remote control receiving unit 325 receives a remote control signal (remote control code) transmitted from the remote control transmitter 326, and supplies the remote control signal to the CPU 321. The CPU 321 controls each unit of the television receiver 300 on the basis of the remote control code. The CPU 321, the flash ROM 322, and the DRAM 323 are connected to the internal bus 324.

The operation of the television receiver 300 illustrated in FIG. 96 will be described briefly. In the HDMI receiving unit 303, stereo image data and audio data, which are transmitted from the set-top box 200 connected to the HDMI terminal 302 via the HDMI cable 400, are received. The stereo image data received by the HDMI receiving unit 303 is supplied to the 3D signal processing unit 301. Also, the audio data received by the HDMI receiving unit 303 is supplied to the audio signal processing circuit 310.

The television broadcast signal input to the antenna terminal 304 is supplied to the digital tuner 305. In the digital tuner 305, the television broadcast signal is processed, and predetermined bit stream data (transport stream) corresponding to a channel selected by the user is output.

The bit stream data output from the digital tuner 305 is supplied to the bit stream processing unit 306. In the bit stream processing unit 306, stereo image data (left-eye image data, right-eye image data), audio data, superimposition information data, disparity vectors (disparity information), and the like are extracted from the bit stream data. Also, in the bit stream processing unit 306, data of superimposition information (closed caption information, subtitle information, graphics information, text information) is combined with the stereo image data, and display stereo image data is generated.

The display stereo image data generated by the bit stream processing unit 306 is supplied to the 3D signal processing unit 301. Also, the audio data obtained by the bit stream processing unit 306 is supplied to the audio signal processing circuit 310.

In the 3D signal processing unit 301, a decoding process is performed on the stereo image data received by the HDMI receiving unit 303 or obtained by the bit stream processing unit 306, and left-eye image data and right-eye image data are generated. The left-eye image data and the right-eye image data are supplied to the video/graphics processing circuit 307. In the video/graphics processing circuit 307, image data for displaying a stereo image is generated on the basis of left-eye image data and right-eye image data, and an image quality adjustment process and a process for combining superimposition information data are also performed in accordance with necessity.

The image data obtained by the video/graphics processing circuit 307 is supplied to the panel driving circuit 308. Thus, a stereo image is displayed by using the display panel 309. For example, a left-eye image that is based on left-eye image data and a right-eye image that is based on right-eye image data are displayed alternately in a time-division manner on the display panel 309. By wearing shutter glasses having a left-eye shutter and a right-eye shutter that alternately open in synchronization with the display on display panel 309, a viewer can view only a left-eye image with the left eye and view only a right-eye image with the right eye, and can perceive a stereo image.

Also, in the audio signal processing circuit 310, a necessary process such as D/A conversion is performed on the audio data received by the HDMI receiving unit 303 or obtained by the bit stream processing unit 306. The audio data is amplified by the audio amplification circuit 311, and is thereafter supplied to the speaker 312. Thus, audio is output from the speaker 312.

Example Configuration of HDMI Transmitting Unit and HDMI Receiving Unit

Figure 97:
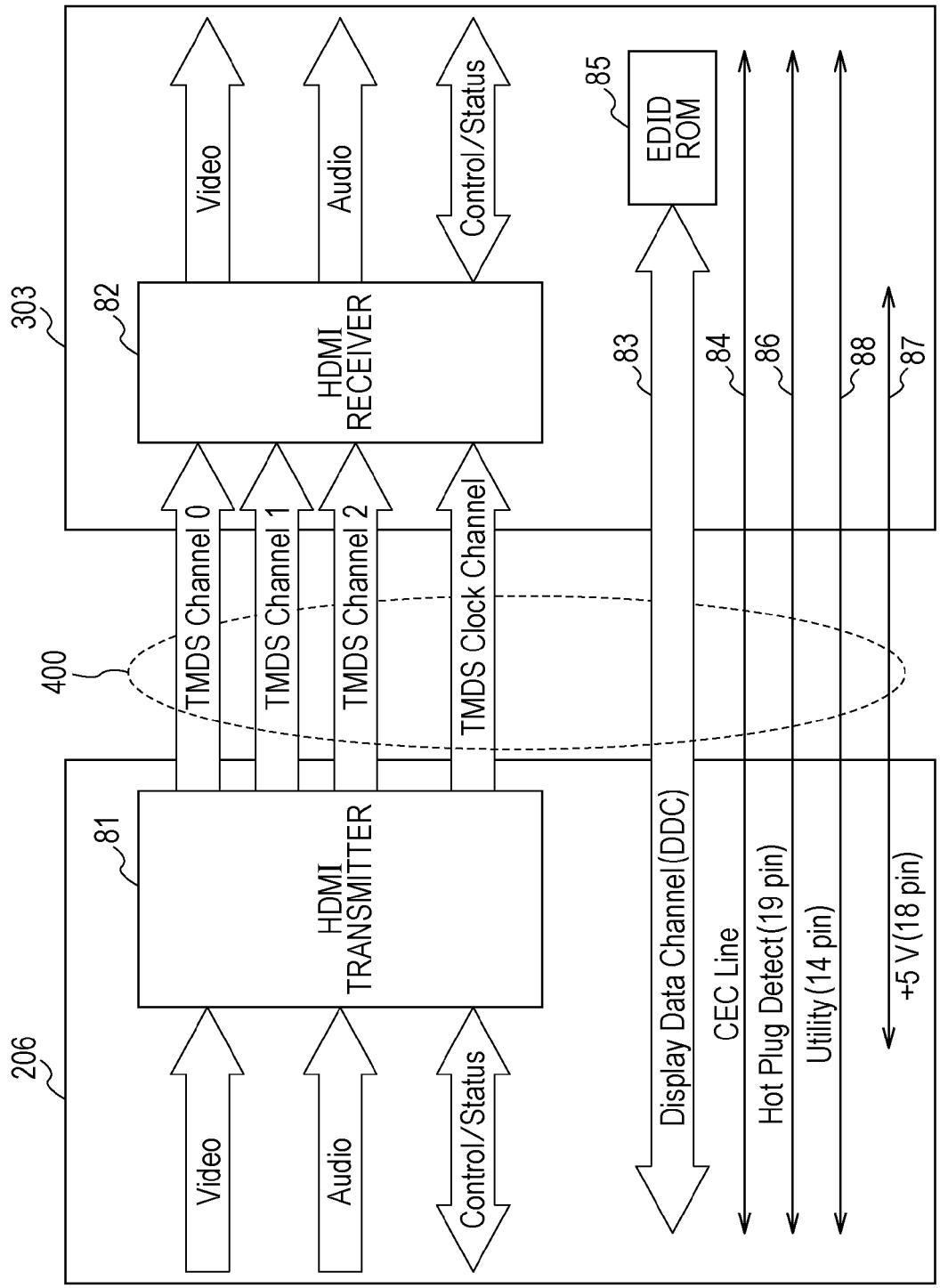
FIG. 97 is a block diagram illustrating an example configuration of an HDMI transmitting unit (HDMI source) and an HDMI receiving unit (HDMI sink).

FIG. 97 illustrates an example configuration of the HDMI transmitting unit (HDMI source) 206 of the set-top box 200 and the HDMI receiving unit (HDMI sink) 303 of the television receiver 300 in the stereo image display system 10 in FIG. 1.

In an effective image period (hereinafter, also referred to as an active video period, as appropriate), the HDMI transmitting unit 206 transmits a differential signal corresponding to pixel data of an uncompressed image for one screen to the HDMI receiving unit 303 one-way through a plurality of channels. Here, the effective image period is the period from one vertical synchronization signal to the next vertical synchronization signal from which a horizontal blanking period and a vertical blanking period are removed. Also, in the horizontal blanking period or the vertical blanking period, the HDMI transmitting unit 206 transmits a differential signal corresponding to at least audio data to be attached to an image, control data, other auxiliary data, and the like to the HDMI receiving unit 303 one-way through a plurality of channels.

Transmission channels of an HDMI system formed of the HDMI transmitting unit 206 and the HDMI receiving unit 303 include the following transmission channels. That is, there are three TMDS channels #0 to #2 serving as transmission channels for one-way serial transmission of pixel data and audio data from the HDMI transmitting unit 206 to the HDMI receiving unit 303 in synchronization with pixel clocks. Also, there is a TMDS clock channel serving as a transmission channel that transmits a pixel clock.

The HDMI transmitting unit 206 includes an HDMI transmitter 81. The transmitter 81 converts, for example, pixel data of an uncompressed image into a corresponding differential signal, and serially transmits the differential signal one-way to the HDMI receiving unit 303, which is connected via the HDMI cable 400, through the three TMDS channels #0, #1, and #2 that are a plurality of channels.

Also, the transmitter 81 converts audio data to be attached to the uncompressed image and also necessary data, other auxiliary data, and the like to corresponding differential signals, and serially transmits the differential signals one-way to the HDMI receiving unit 303 through the three TMDS channels #0, #1, and #2.

Furthermore, the transmitter 81 transmits a pixel clock synchronized with the pixel data to be transmitted through the three TMDS channels #0, #1, and #2 to the HDMI receiving unit 303, which is connected via the HDMI cable 400, through the TMDS clock channel. Here, 10-bit pixel data is transmitted through one TMDS channel #i (i=0, 1, 2) during one clock of the pixel clocks.

The HDMI receiving unit 303 receives a differential signal corresponding to pixel data that is transmitted one-way from the HDMI transmitting unit 206 through a plurality of channels in the active video period. Also, the HDMI receiving unit 303 receives a differential signal corresponding to audio data or control data that is transmitted one-way from the HDMI transmitting unit 206 through a plurality of channels in the horizontal blanking period or the vertical blanking period.

That is, the HDMI receiving unit 303 includes an HDMI receiver 82. The HDMI receiver 82 receives a differential signal corresponding to pixel data and a differential signal corresponding to audio data or control data, which are transmitted one-way from the HDMI transmitting unit 206 through the TMDS channels #0, #1, and #2. In this case, the differential signals are received in synchronization with the pixel clocks transmitted from the HDMI transmitting unit 206 through the TMDS clock channel.

Transmission channels of an HDMI system include, in addition to the TMDS channels #0 to #2 and TMDS clock channel described above, transmission channels called a DDC (Display Data Channel) 83 and a CEC line 84. The DDC 83 is formed of two signal lines that are not illustrated in the figure, which are included in the HDMI cable 400. The DDC 83 is used for the HDMI transmitting unit 206 to read E-EDID (Enhanced Extended Display Identification Data) from the HDMI receiving unit 303.

That is, the HDMI receiving unit 303 includes, in addition to the HDMI receiver 81, an EDID ROM (Read Only Memory) 85 having stored therein E-EDID that is performance information regarding the performance thereof (Configuration/capability). The HDMI transmitting unit 206 reads the E-EDID via the DDC 83 from the HDMI receiving unit 303 connected via the HDMI cable 400, in accordance with, for example, a request from the CPU 211 (see FIG. 79).

The HDMI transmitting unit 206 sends the read E-EDID to the CPU 211. The CPU 211 stores the E-EDID in the flash ROM 212 or the DRAM 213. The CPU 211 can recognize the setting of the performance of the HDMI receiving unit 303 on the basis of the E-EDID. For example, the CPU 211 recognizes whether the television receiver 300 including the HDMI receiving unit 303 is capable of handling stereo image data or not, and, in a case where the television receiver 300 is capable of doing so, further recognizes what TMDS transmission data structure the television receiver 300 can support.

The CEC line 84 is formed of one signal line that is not illustrated in the figure, which is included in the HDMI cable 400, and is used for two-way communication of control-use data between the HDMI transmitting unit 206 and the HDMI receiving unit 303. The CEC line 84 forms a control data line.

Also, the HDMI cable 400 contains a line (HPD line) 86 to be connected to a pin called HPD (Hot Plug Detect). A source device can detect the connection of a sink device by utilizing the line 86. Note that the HPD line 86 is also used as an HEAC− line forming a two-way communication path. Also, the HDMI cable 400 contains a line (power line) 87 that is used for supplying power from the source device to the sink device. Furthermore, the HDMI cable 400 contains a utility line 88. The utility line 88 is also used as HEAC+ line forming a two-way communication path.

Figure 98:
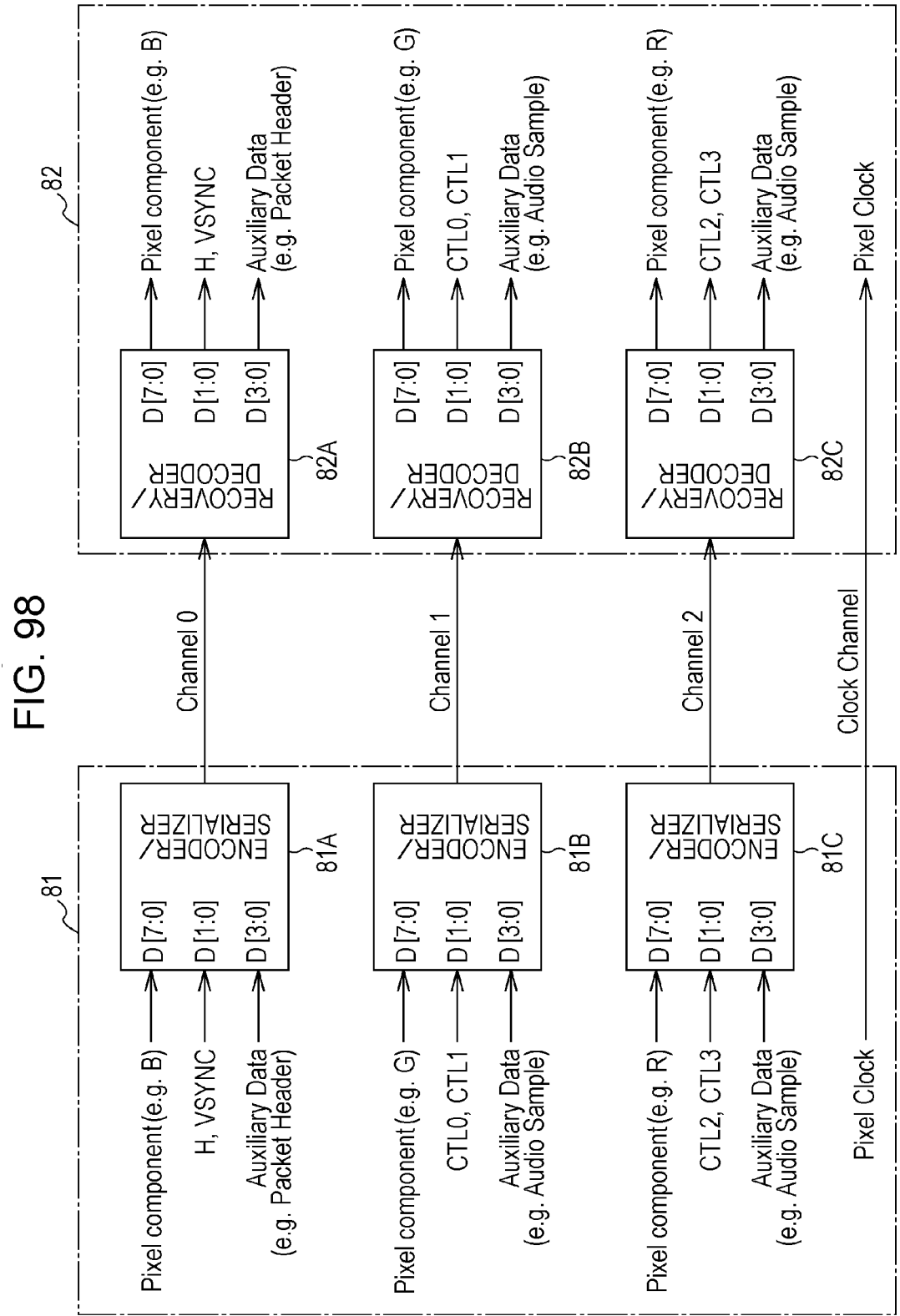
FIG. 98 is a block diagram illustrating an example configuration of an HDMI transmitter included in the HDMI transmitting unit and an HDMI receiver included in the HDMI receiving unit.

FIG. 98 illustrates an example configuration of the HDMI transmitter 81 and the HDMI receiver 82 in FIG. 97. The HDMI transmitter 81 includes three encoders/serializers 81A, 81B, and 81C corresponding to the three TMDS channels #0, #1, and #2, respectively. Then, each of the encoders/serializers 81A, 81B, and 81C encodes image data, auxiliary data, and control data supplied thereto, converts them from parallel data to serial data, and transmits resulting data using a differential signal. Here, in a case where the image data includes, for example, three R, G, and B components, the B component is supplied to the encoder/serializer 81A, the G component is supplied to the encoder/serializer 81B, and the R component is supplied to the encoder/serializer 81C.

Also, examples of the auxiliary data include audio data and a control packet. For example, the control packet is supplied to the encoder/serializer 81A, and the audio data is supplied to the encoders/serializers 81B and 81C. Furthermore, the control data includes a 1-bit vertical synchronization signal (VSYNC), a 1-bit horizontal synchronization signal (HSYNC), and 1-bit control bits CTL0, CTL1, CTL2, and CTL3. The vertical synchronization signal and the horizontal synchronization signal are supplied to the encoder/serializer 81A. The control bits CTL0 and CTL1 are supplied to the encoder/serializer 81B, and the control bits CTL2 and CTL3 are supplied to the encoder/serializer 81C.

The encoder/serializer 81A transmits the B component of the image data, the vertical synchronization signal, the horizontal synchronization signal, and the auxiliary data, which are supplied thereto, in a time division manner. That is, the encoder/serializer 81A sets the B component of the image data supplied thereto as parallel data in a units of 8 bits, which is a fixed number of bits. Furthermore, the encoder/serializer 81A encodes the parallel data, converts it into serial data, and transmits the serial data through the TMDS channel #0.

Also, the encoder/serializer 81A encodes the vertical synchronization signal and horizontal synchronization signal, i.e., 2-bit parallel data, which are supplied thereto, converts the data into serial data, and transmits the serial data through the TMDS channel #0. Furthermore, the encoder/serializer 81A sets the auxiliary data supplied thereto as parallel data in a units of 4 bits. Then, the encoder/serializer 81A encodes the parallel data, converts it into serial data, and transmits the serial data through the TMDS channel #0.

The encoder/serializer 81B transmits the G component of the image data, the control bits CTL0 and CTL1, and the auxiliary data, which are supplied thereto, in a time division manner. That is, the encoder/serializer 81B sets the G component of the image data supplied thereto as parallel data in a units of 8 bits, which is a fixed number of bits. Furthermore, the encoder/serializer 81B encodes the parallel data, converts it into serial data, and transmits the serial data through the TMDS channel #1.

Also, the encoder/serializer 81B encodes the control bits CTL0 and CTL1, i.e., 2-bit parallel data, which are supplied thereto, converts the data into serial data, and transmits the serial data through the TMDS channel #1. Furthermore, the encoder/serializer 81B sets the auxiliary data supplied thereto as parallel data in a units of 4 bits. Then, the encoder/serializer 81B encodes the parallel data, converts it into serial data, and transmits the serial data through the TMDS channel #1.

The encoder/serializer 81C transmits the R component of the image data, the control bits CTL2 and CTL3, and the auxiliary data, which are supplied thereto, in a time division manner. That is, the encoder/serializer 81C sets the R component of the image data supplied thereto as parallel data in a units of 8 bits, which is a fixed number of bits. Furthermore, the encoder/serializer 81C encodes the parallel data, converts it into serial data, and transmits the serial data through the TMDS channel #2.

Also, the encoder/serializer 81C encodes the control bits CTL2 and CTL3, i.e., 2-bit parallel data, which are supplied thereto, converts the data into serial data, and transmits the serial data through the TMDS channel #2. Furthermore, the encoder/serializer 81C sets the auxiliary data supplied thereto as parallel data in a units of 4 bits. Then, the encoder/serializer 81C encodes the parallel data into serial data, and transmits the serial data through the TMDS channel #2.

The HDMI receiver 82 includes three recovery/decoders 82A, 82B, and 82C corresponding to the three TMDS channels #0, #1, and #2, respectively. Then, each of the recovery/decoders 82A, 82B, and 82C receives the image data, the auxiliary data, and the control data which are transmitted using a differential signal through the corresponding one of the TMDS channels #0, #1, and #2. Furthermore, each of the recovery/decoders 82A, 82B, and 82C converts the image data, the auxiliary data, and the control data from serial data to parallel data, and further decodes and outputs them.

That is, the recovery/decoder 82A receives the B component of the image data, the vertical synchronization signal, the horizontal synchronization signal, and the auxiliary data, which are transmitted using a differential signal through the TMDS channel #0. Then, the recovery/decoder 82A converts the B component of the image data, the vertical synchronization signal, the horizontal synchronization signal, and the auxiliary data from serial data to parallel data, and decodes and outputs them.

The recovery/decoder 82B receives the G component of the image data, the control bits CTL0 and CTL1, and the auxiliary data, which are transmitted using a differential signal through the TMDS channel #1. Then, the recovery/decoder 82B converts the G component of the image data, the control bits CTL0 and CTL1, and the auxiliary data from serial data to parallel data, and decodes and outputs them.

The recovery/decoder 82C receives the R component of the image data, the control bits CTL2 and CTL3, and the auxiliary data, which are transmitted using a differential signal through the TMDS channel #2. Then, the recovery/decoder 82C converts the R component of the image data, the control bits CTL2 and CTL3, and the auxiliary data from serial data to parallel data, and decodes and outputs them.

FIG. 99 illustrates an example structure of TMDS transmission data. FIG. 99 illustrates various transmission data periods in a case where image data having 1920 pixels in the horizontal direction and 1080 lines in the vertical direction is transmitted through TMDS channels #0, #1, and #2.

A video field (Video Field) in which transmission data is transmitted through three TMDS channels #0, #1, and #2 of HDMI includes three types of periods in accordance with the type of transmission data. The three types of periods are a video data period (Video Data period), a data island period (Data Island period), and a control period (Control period).

Here, a video field period is a period from the rising edge (active edge) of a certain vertical synchronization signal to the rising edge of the next vertical synchronization signal. This video field period can be separated into a horizontal blanking period (horizontal blanking), a vertical blanking period (vertical blanking), and an active video period (Active Video). The active video period is a period obtained by removing the horizontal blanking period and the vertical blanking period from the video field period.

The video data period is assigned in the active video period. In the video data period, data of effective pixels (Active pixels) having 1920 pixels×1080 lines, which form uncompressed image data for one screen, is transmitted.

The data island period and the control period are assigned in the horizontal blanking period and the vertical blanking period. In the data island period and the control period, auxiliary data (Auxiliary data) is transmitted. That is, the data island period is assigned in a portion of the horizontal blanking period and the vertical blanking period. In the data island period, data that is not related to control within the auxiliary data, such as, for example, packets of audio data, is transmitted.

The control period is assigned in the other portion of the horizontal blanking period and the vertical blanking period. In the control period, data that is related to control within the auxiliary data, such as, for example, the vertical synchronization signal, the horizontal synchronization signal, and the control packet, is transmitted.

FIG. 100 illustrates an example pin array of HDMI terminals. The pin array illustrated in FIG. 100 is called type A (type-A). TMDS Data#i+ and TMDS Data#i−, which are differential signals on TMDS channel #i, are transmitted using two lines that are differential lines. The two lines are connected to the pins (the pins with pin numbers 1, 4, and 7) to which the TMDS Data#i+ is assigned, and the pins (the pins with pin numbers 3, 6, and 9) to which the TMDS Data#i− is assigned.

Also, the CEC line 84 via which a CEC signal that is control-use data is transmitted is connected to the pin with pin number 13. Also, a line via which an SDA (Serial Data) signal such as E-EDID is transmitted is connected to the pin with pin number 16. A line via which an SCL (Serial Clock) signal that is a clock signal used for synchronization during transmission and reception of the SDA signal is transmitted is connected to the pin with pin number 15. The DDC 83 described above is composed of a line via which the SDA signal is transmitted and a line via which the SCL signal is transmitted.

Also, as described above, the HPD line (HEAC− line) 86 used by the source device to detect the connection of the sink device is connected to the pin with pin number 19. Also, the utility line (HEAC+line) 88 is connected to the pin with pin number 14. Also, as described above, the line 87 via which power is supplied is connected to the pin with pin number 18.

[E-EDID Structure]

As described above, the HDMI transmitting unit 206 reads the E-EDID via the DDC 83 from the HDMI receiving unit 303 connected via the HDMI cable 400, in accordance with, for example, a request from the CPU 211 (see FIG. 79). Then, the CPU 211 recognizes, on the basis of the E-EDID, the setting of the performance of the HDMI receiving unit 303, for example, whether the HDMI receiving unit 303 is capable of handling stereo image data or not.

Figure 101:
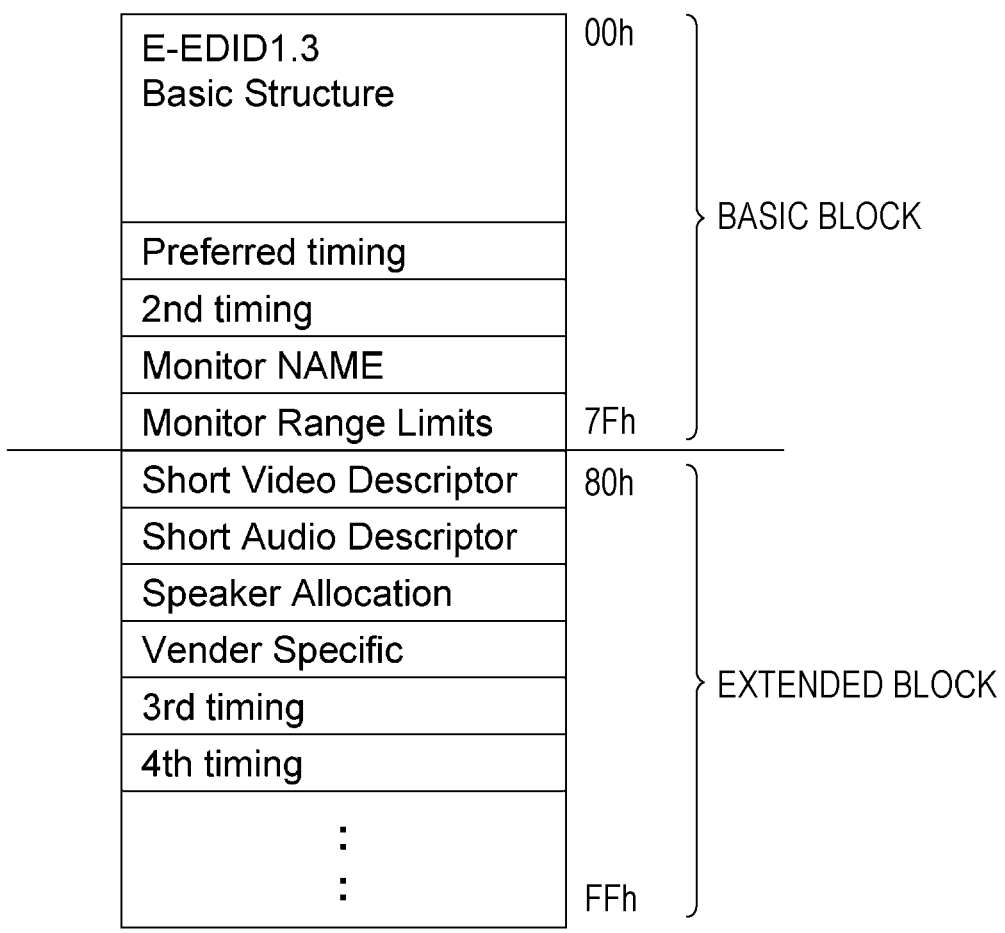
FIG. 101 is a diagram illustrating an example data structure of E-EDID.

FIG. 101 illustrates an example data structure of E-EDID. The E-EDID is formed of a basic block and an extended block. In the basic block, data defined in the E-EDID1.3 standard represented by "E-EDID1.3 Basic Structure" is arranged at the beginning. In the basic block, timing information for ensuring the compatibility with conventional EDID represented by "Preferred timing" is subsequently arranged. Also, in the basic block, subsequently, timing information for ensuring the compatibility with conventional EDID represented by "2nd timing", which is different from "Preferred timing", is arranged.

Also, in the basic block, information indicating the name of a display apparatus represented by "Monitor NAME" is arranged subsequent to "2nd timing". In the basic block, subsequently, information indicating the number of pixels displayable in a case where the aspect ratio is 4:3 and 16:9, which is represented by "Monitor Range Limits".

At the beginning of the extended block, "Short Video Descriptor" is arranged. This is information indicating whether displayable image size (resolution), frame rate, and interlaced or progressive. Subsequently, "Short Audio Descriptor" is arranged. This is information such as reproducible audio codec method, sampling frequency, cut-off band, the number of codec bits. Subsequently, information regarding left and right speaker, which is indicated by "Speaker Allocation", is arranged.

Also, in the extended block, subsequently to the "Speaker Allocation", data defined uniquely for each vendor, which is represented by "Vender Specific", is arranged. In the extended block, subsequently, timing information for ensuring the compatibility with conventional EDID represented by "3rd timing" is arranged. In the extended block, further subsequently, timing information for ensuring the compatibility with conventional EDID represented by "4th timing" is arranged.

FIG. 102 illustrates an example data structure of Vender Specific area (HDMI Vendor Specific Data Block). In the Vender Specific area, the 0th block to the N-th block that are 1-byte blocks are provided.

In the 0th block, a header representing the data area of the data "Vender Specific", which is represented by "Vendor-Specific tag code (=3)", is arranged. Also, in the 0th block, information indicating the length of the data "Vender Specific", which is represented by "Length (=N)", is arranged.

Also, in the first to third blocks, information indicating number "0x000003" registered for HDMI (R), which is represented by "24 bit IEEE Registration Identifier(0x000C03) LSB first", is arranged. Furthermore, in the fourth and fifth blocks, information indicating the 24-bit physical addresses of the sink devices, which are represented by "A", "B", "C", and "D".

In the sixth block, a flag indicating the functionality corresponding to the sink devices, which is represented by "Supports-AI", is arranged. Also, in the sixth block, pieces of information specifying the number of bits per pixel, which are represented by "DC-48 bit", "DC-36 bit", and "DC-30 bit", are arranged. Also, in the sixth block, a flag indicating whether the sink device supports the transmission of an image of YCbCr 4:4:4, which are represented by "DC-Y444", is arranged. Furthermore, in the sixth block, a flag indicating whether the sink device supports dual DVI (Digital Visual Interface), which is represented by "DVI-Dual", is arranged.

Also, in the seventh block, information indicating the maximum frequency of the TMDS pixel clock, which is represented by the "Max-TMDS-Clock", is arranged. Also, in the sixth bit and the seventh bit in the eighth block, a flag indicating the presence/absence of delay information for video and audio, which is represented by "Latency", is arranged. Also, in the fifth bit in the eighth block, a flag indicating whether or not handling of additional HDMI video format (3D, 4 k×2 k) is enabled, which is represented by "HDMI_Video_present", is arranged.

Also, in the ninth block, delay time data of progressive video, which is represented by "Video Latency", is arranged, and, in the tenth block, delay time data of audio accompanying the progressive video, which is represented by "Audio Latency", is arranged. Also, in the eleventh block, delay time data of interlaced video, which is represented by "Interlaced Video Latency", is arranged. Furthermore, in the twelfth block, delay time data of audio accompanying the interlaced video, which is represented by "Interlaced Audio Latency", is arranged.

Also, in the seventh bit in the thirteenth block, a flag indicating whether or not handling of 3D image data is enabled, which is represented by "3D_present", is arranged. Also, in the seventh to fifth bits in the fourteenth block, size information of the block indicating the data structure that can be handled in addition to the mandatory 3D data structure arranged in the fifteenth block (not illustrated in the figure) or after that, which is represented by "HDMI_VIC_LEN", is arranged. Also, in the fourth to zeroth bits in the fourteenth block, size information of the block indicating a video format of 4 k×2 k that can be handled in the fifteenth block (not illustrated in the figure) or after that, which is represented by "HDMI_3D_LEN", is arranged.

[TMDS Transmission Data Structure of Stereo Image Data]

Figure 103:
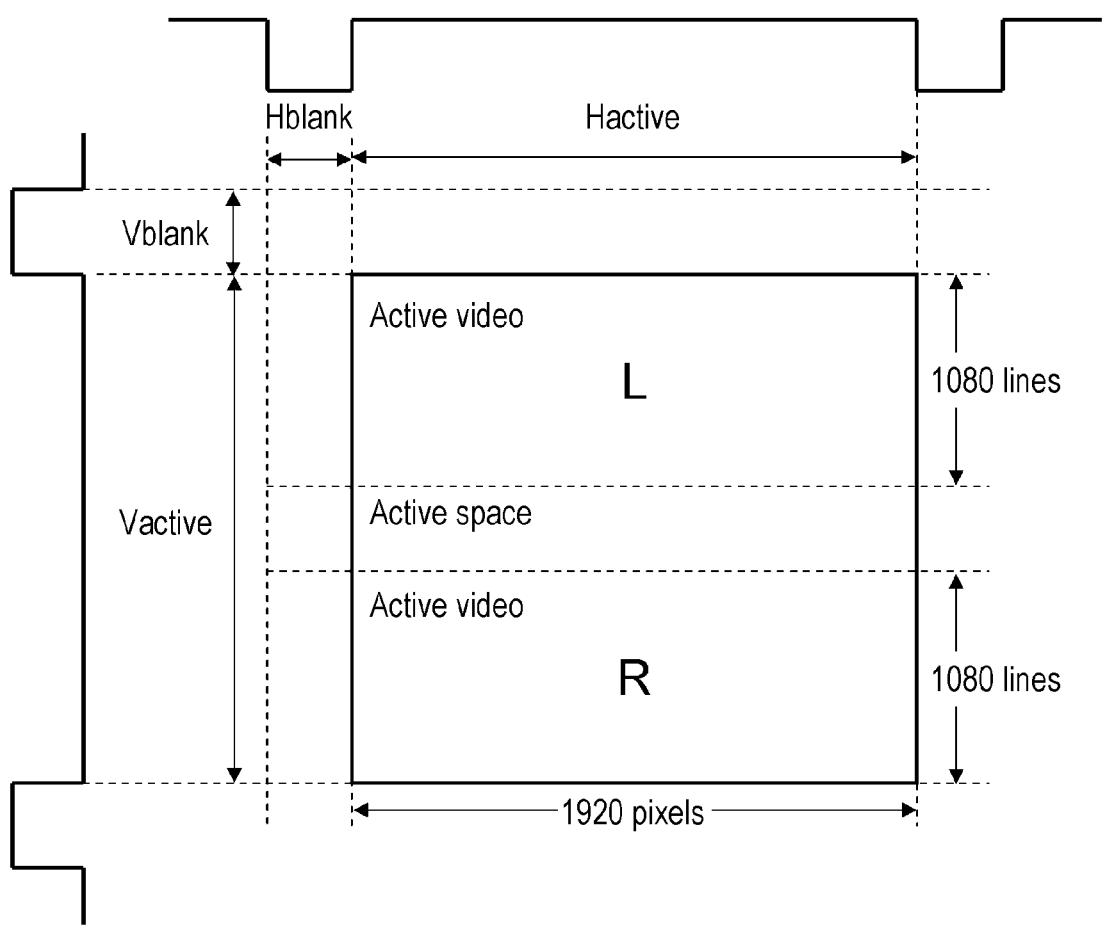
FIG. 103 is a diagram illustrating the 3D video format of the Frame Packing method that is one TMDS transmission data structure of stereo image data.

FIG. 103 illustrates a 3D video format (3D Video Format) in the frame packing (Frame packing) method that is one TMDS transmission data structure of stereo image data. The 3D video format is a format for transmitting progressive left-eye (L) and right-eye (R) image data as stereo image data.

In the 3D video format, image data in a 1920×1080p or 1080×720p pixel format is transmitted as left-eye (L) and right-eye (R) image data. Note that in FIG. 93, an example in which left-eye (L) image data and right-eye (R) image data each having 1920 lines×1080 pixels is illustrated.

With the 3D video format, transmission data in which a video field period including a horizontal blanking period (Hblank), a vertical blanking period (Vblank), and an active video period (Hactive×Vactive) is used as a unit, which is sectioned by a vertical synchronization signal, is generated. In the 3D video format, the active video period has two active video areas (Active video) and one active space area (Active space) therebetween. Left-eye (L) image data is placed in the first active video area, and right-eye (R) image data is placed in the second active video area.

Figure 104:
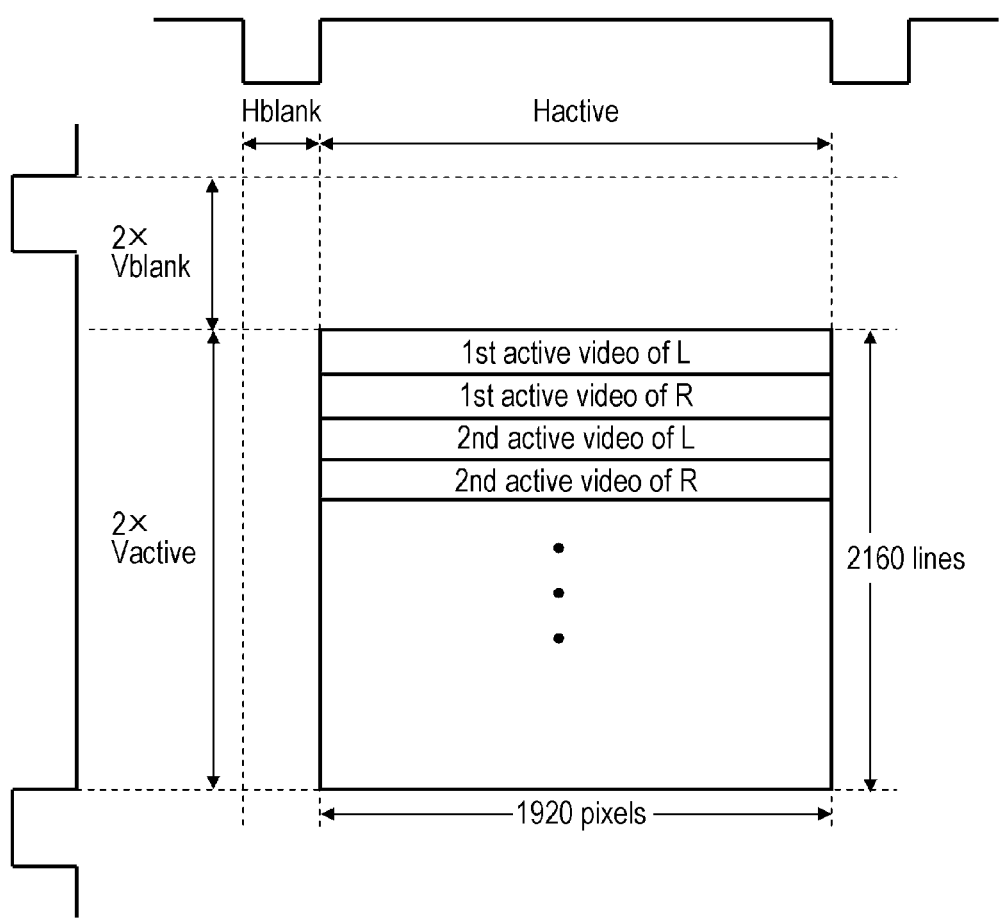
FIG. 104 is a diagram illustrating the 3D video format of the Line Alternative method that is one TMDS transmission data structure of stereo image data.

FIG. 104 illustrates a 3D video format (3D Video Format) in the line alternative (Line alternative) method that is one TMDS transmission data structure of stereo image data. The 3D video format is a format for transmitting progressive left-eye (L) and right-eye (R) image data as stereo image data. In the 3D video format, image data in a 1920×1080p pixel format is transmitted as left-eye (L) and right-eye (R) image data.

With the 3D video format, transmission data in which a video field period including a horizontal blanking period (Hblank), a vertical blanking period (2×Vblank) and an active video period ((Hactive×2Vactive) is used as a unit, which is sectioned by a vertical synchronization signal, is generated. In the 3D video format, in the active video period, one line of left-eye image data and one line of right-eye image data are alternately arranged.

Figure 105:
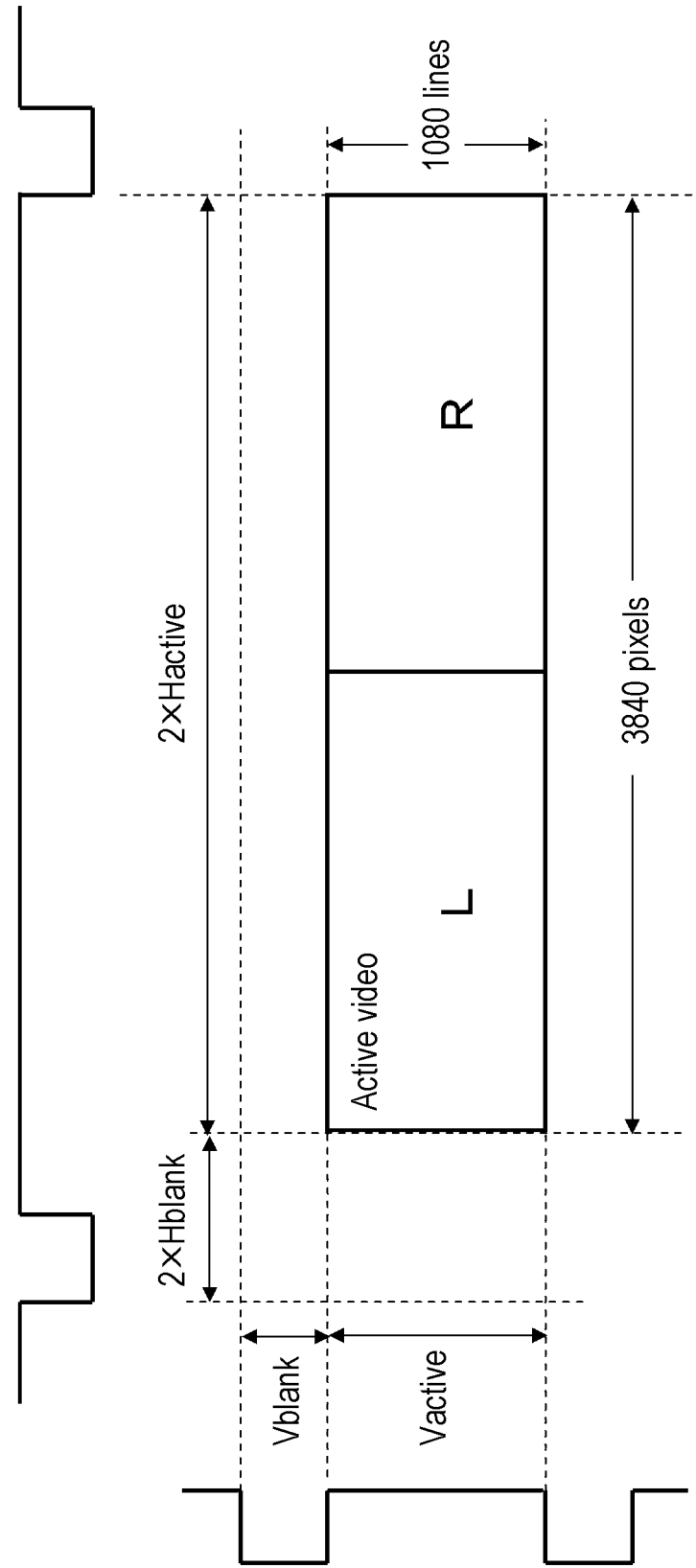
FIG. 105 is a diagram illustrating the 3D video format of the Side-by-Side (Full) method that is one TMDS transmission data structure of stereo image data.

FIG. 105 illustrates a 3D video format (3D Video Format) in the side-by-side (side-bay-side) (Full) method that is one TMDS transmission data structure of stereo image data. The 3D video format is a format for transmitting progressive left-eye (L) and right-eye (R) image data as stereo image data. In the 3D video format, image data in a 1920×1080p pixel format is transmitted as left-eye (L) and right-eye (R) image data.

With the 3D video format, transmission data in which a video field period including a horizontal blanking period (2×Hblank), a vertical blanking period (Vblank) and an active video period ((2Hactive×Vactive) is used as a unit, which is section by a vertical synchronization signal, is generated. In the 3D video format, in the active video period, left-eye (L) image data is placed in the first half in the horizontal direction, and right-eye (R) image data is placed in the second half in the horizontal direction.

Note that, in HDMI1.4, in addition to the 3D video format illustrated in FIGS. 103 to 105 described above, a 3D video format serving as a TMDS transmission data structure of stereo image data is defined, although the detailed description is omitted. For example, the frame packing (Frame packing for interlaced format) method, the field alternative (Field alternative) method, the side-by-side (side-bay-side) (Half) method, and the like are defined.

As described above, in the stereo image display system 10 illustrated in FIG. 1, disparity is given to the same superimposition information (such as closed caption information, subtitle information, graphics information, or text information) to be superimposed on a left-eye image and a right-eye image on the basis of disparity information about one of the left-eye image and the right-eye image with respect to the other. Thus, superimposition information that has been subjected to disparity adjustment in accordance with the perspective of each object in an image can be used as the same superimposition information to be superimposed on the left-eye image and the right-eye image, and it is possible to maintain the consistency in perspective, in the display of the superimposition information, between the superimposition information and each object in the image.

2. Example Modifications

Note that in the foregoing embodiment, information "number_of_mutiple_link" is arranged in the DHI (FIG. 54, FIG. 55) in order to associate a plurality of disparity vectors with one component element ID. With the "number_of_multiple_link", the number of disparity vectors to be associated with a component element ID is specified in advance. However, for example, a method is also conceivable in which a connect flag (Connect_flag) is added to a partition position ID (Partition_position_id) and in which a plurality of disparity vectors are associated with one component element ID.

Figure 106:
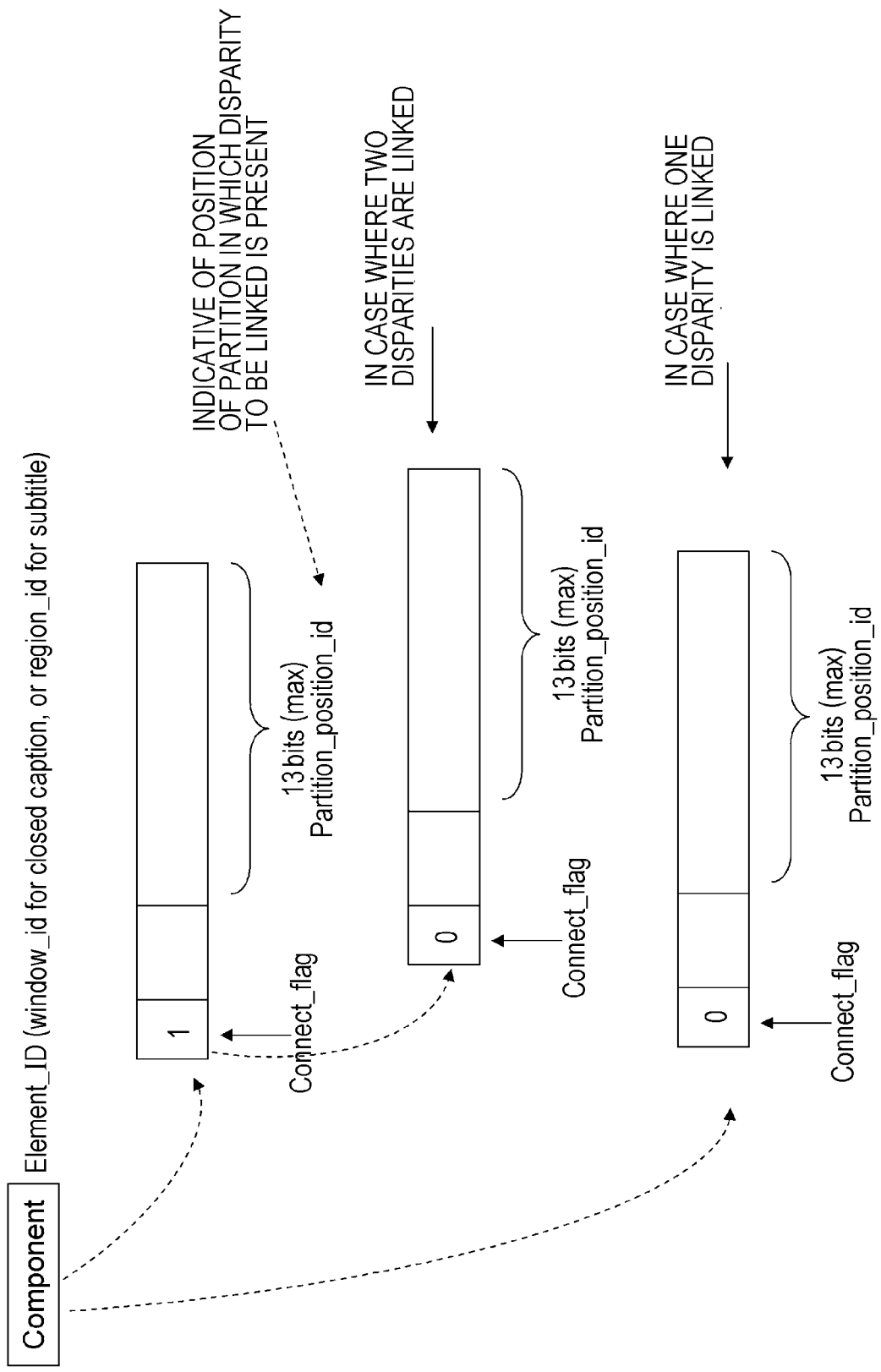
FIG. 106 is a diagram describing another method for associating a disparity vector with a component element ID.

FIG. 106 illustrates an example of a method for associating a disparity vector with a component element ID. Here, the component element ID of closed caption information is a window ID (window_id). Also, the component element ID of subtitle information is a region ID (region_id). In order to associate a disparity vector with a component element ID, for example, a partition position ID of up to 13 bits indicating a screen area to which the disparity vector belongs is related with the component element ID.

The partition position ID has added thereto a 1-bit connect flag (Connect_flag). In a case where one disparity vector is related with one component element ID, as illustrated in FIG. 106, one partition position ID is associated with the component element ID. In this case, the connect flag added to the one partition position ID is set to "0", which indicates that no subsequent partition position IDs are related therewith.

Also, in a case where two disparity vectors are associated with one component element ID, as illustrated in FIG. 106, two partition position IDs are related with the component element ID. In this case, the connect flag added to the first partition position ID is set to "1", which indicates that a subsequent partition position ID is further related therewith. Then, the connect flag added to the second partition position ID is set to "0", which indicates that no subsequent partition position IDs are related therewith.

Note that although not illustrated in FIG. 106, in a case where three or more disparity vectors are to be associated with one component element ID, a process similar to that in the case described above where two disparity vectors are associated with one component element ID. The connect flags added to the partition position IDs up to the partition position ID previous to the last are set to "1", and only the connect flag added to the last partition position ID is set to "0"."

Figure 107:
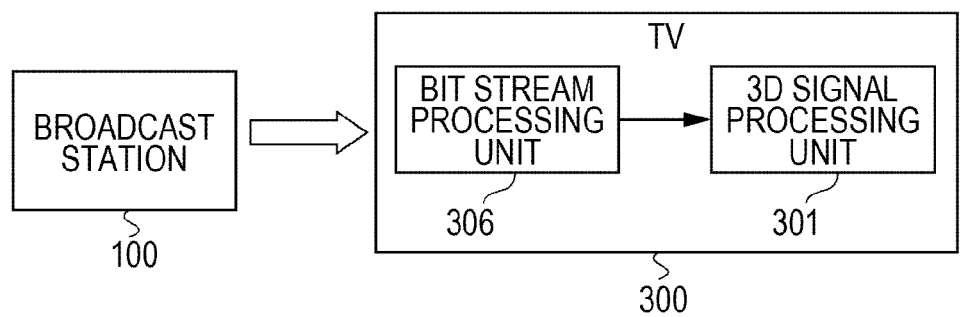
FIG. 107 is a diagram illustrating another example configuration of the stereo image display system.
Figure 108:
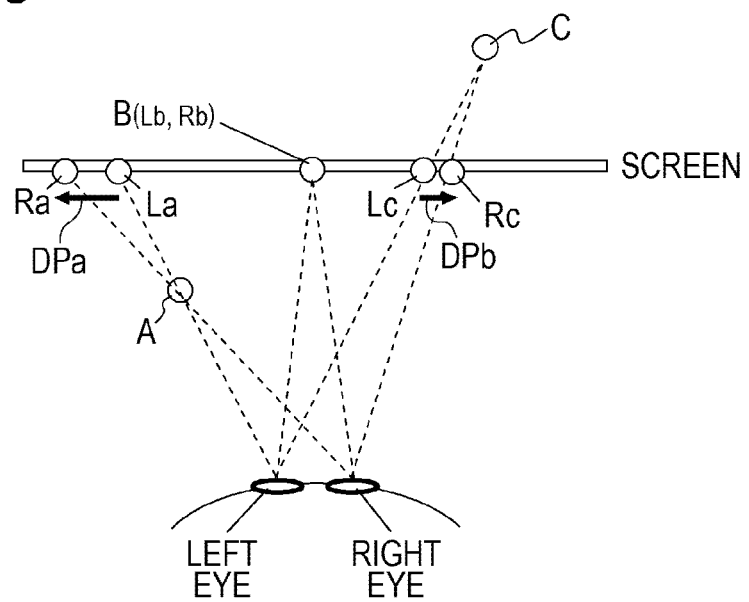
FIG. 108 is a diagram illustrating a relationship in stereo image display utilizing binocular disparity between display positions of left and right images of an object on a screen and a reproduction position of a stereoscopic image.

Also, in the foregoing embodiment, the stereo image display system 10 that is composed of the broadcast station 100, the set-top box 200, and the television receiver 300 has been illustrated. However, as illustrated in FIG. 96, the television receiver 300 includes the bit stream processing unit 201 that functions in a manner equivalent to that of the bit stream processing unit 201 in the set-top box 200. Therefore, as illustrated in FIG. 107, a stereo image display system 10A composed of a broadcast station 100 and a television receiver 300 is also conceivable.

Also, the foregoing embodiment, an example in which a data stream (bit stream data) including stereo image data is broadcast from the broadcast station 100 has been illustrated. However, of course, the present invention can also be similarly applied to a system having a configuration in which the data stream is distributed to a receiving terminal by utilizing a network such as the Internet.

Also, in the foregoing embodiment, the connection between the set-top box 200 and the television receiver 300 via an HDMI digital interface is illustrated. However, of course, the present invention can be applied even in a case where they are connected to each other via a digital interface (including wireless in addition to wired) similar to the HDMI digital interface.

Note that this application refers to Japanese Patent Application No. 2009-153686.

INDUSTRIAL APPLICABILITY

The present invention can be applied to a stereo image display system or the like that superimposes superimposition information such as closed caption information, subtitle information, graphics information, or text information on an image and that displays a resulting image.

REFERENCE SIGNS LIST 10, 10A stereo image display system, 100 broadcast station, 110, 110A to 110F transmission data generation unit, 111L, 111R camera, 112 video framing unit, 113 video encoder, 113a stream formatter, 114 disparity vector detection unit, 115 disparity vector encoder, 116 microphone, 117 audio encoder, 118 subtitle/graphics producing unit, 119 subtitle/graphics encoder, 119a stream formatter, 120 text producing unit, 121 text encoder, 122 multiplexer, 124 subtitle/graphics processing unit, 125 text processing unit, 130 data retrieving unit, 130a data recording medium, 131 disparity information set creation unit, 132 disparity information creation unit, 133 CC encoder, 200,200A set-top box, 201, 201A, 201B, 201C, 201D bit stream processing unit, 202 HDMI terminal, 203 antenna terminal, 204 digital tuner, 205 video signal processing circuit, 205A video/graphic processing unit, 206 HDMI transmitting unit, 207 audio signal processing circuit, 211 CPU, 212 flash ROM, 213 DRAM, 214 internal bus, 215 remote control receiving unit, 216 remote control transmitter, 220,220A demultiplexer, 221 video decoder, 222 subtitle/graphics decoder, 222A 223 text decoder, 224 audio decoder, 225 subtitle decoder, disparity vector decoder, 226 stereo-image subtitle/graphics producing unit, 226A stereo-image subtitle producing unit, 227 stereo-image text producing unit, 228 video superimposing unit, 229 multi-channel speaker control unit, 231 disparity vector extraction unit, 232 disparity vector retrieving unit, 233 CC decoder, 234 stereo-image CC producing unit, 235 disparity information retrieving unit, 300 television receiver, 301 3D signal processing unit, 302 HDMI terminal, 303 HDMI receiving unit, 304 antenna terminal, 305 digital tuner, 306 bit stream processing unit, 307 video/graphics processing circuit, 308 panel driving circuit, 309 display panel, 310 audio signal processing circuit, 311 audio amplification circuit, 312 speaker, 321 CPU, 322 flash ROM, 323 DRAM, 324 internal bus, 325 remote control receiving unit, 326 remote control transmitter, 400 HDMI cable.

The invention claimed is:

1. A stereo image data transmitting apparatus, comprising:
a stereo image data output unit that outputs stereo image data including left-eye image data and right-eye image data;
a superimposition information data output unit that outputs data of superimposition information to be superimposed on an image that is based on the left-eye image data and the right-eye image data;
a disparity information output unit that outputs disparity information for giving disparity by shifting the superimposition information to be superimposed on the image that is based on the left-eye image data and the right-eye image data; and
a transmitting unit that transmits a video elementary stream including, in a payload portion, the stereo image data output from the stereo image data output unit and including, in a user data area of a header portion, the data of the superimposition information output from the superimposition information data output unit and the disparity information output from the disparity information output unit,
wherein the data of the superimposition information and the disparity information included in the user data area of the header portion of the video elementary stream is configured to be identifiable by user data identification information,
wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks.

2. The stereo image data transmitting apparatus according to claim 1, wherein the disparity information is disparity information that is sequentially updated in individual frames during a period of a predetermined number of frames during which the superimposition information is displayed.

3. The stereo image data transmitting apparatus according to claim 2, wherein the disparity information includes disparity information about the first frame during the period of the predetermined number of frames, and offset information about the second and subsequent frames with respect to disparity information about preceding frames.

4. The stereo image data transmitting apparatus according to claim 1, wherein the disparity information is disparity information that is commonly used in individual frames during a period of a predetermined number of frames during which the superimposition information is displayed.

5. The stereo image data transmitting apparatus according to claim 1, wherein the disparity information is disparity information that is commonly used in individual frames during a period of a predetermined number of frames during which the superimposition information is displayed, or disparity information that is sequentially updated in individual frames in a period of a predetermined number of frames during which the superimposition information is displayed, and wherein the disparity information has added thereto flag information indicating the disparity information that is commonly used in the individual frames or the disparity information that is sequentially updated in the individual frames.

6. A stereo image data receiving apparatus, comprising:
a receiving unit that receives a video elementary stream, the video elementary stream including, in a payload portion, stereo image data including left-eye image data and right-eye image data and including, in a user data area of a header portion, data of superimposition information to be superimposed on an image that is based on the left-eye image data and the right-eye image data and disparity information for giving disparity by shifting the superimposition information to be superimposed on the an image that is based on the left-eye image data and the right-eye image data, the data of the superimposition information and the disparity information included in the user data area of the header portion being configured to be identifiable by user data identification information;
a stereo image data acquisition unit that acquires the stereo image data from the payload portion of the video elementary stream received by the receiving unit;
a superimposition information data acquisition unit that acquires the data of the superimposition information from the user data area of the header portion of the video elementary stream received by the receiving unit;

a disparity information acquisition unit that acquires the disparity information from the user data area of the header portion of the video elementary stream received by the receiving unit; and an image data processing unit that gives disparity to the same superimposition information to be superimposed on a left-eye image and a right-eye image using the left-eye image data and the right-eye image data included in the stereo image data acquired by the stereo image data acquisition unit, the data of the superimposition information acquired by the superimposition information data acquisition unit, and the disparity information acquired by the disparity information acquisition unit, and that obtains data of the left-eye image on which the superimposition information has been superimposed and data of the right-eye image on which the superimposition information has been superimposed, wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks.

7. A stereo image data receiving apparatus, comprising:

a receiving unit that receives stereo image data including left-eye image data and right-eye image data, and disparity information for giving disparity by shifting superimposition information to be superimposed on an image that is based on the left-eye image data and the right-eye image data, the disparity information having added thereto shift target specification information specifying superimposition information to be shifted on the basis of the disparity information among superimposition information to be superimposed on an image that is based on the left-eye image data and superimposition information to be superimposed on an image that is based on the right-eye image data, wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks; and an image data processing unit that gives disparity to the same superimposition information to be superimposed on a left-eye image and a right-eye image using the left-eye image data and the right-eye image data included in the stereo image data received by the receiving unit, the disparity information received by the receiving unit, and the shift target specification information added to the disparity information, and that obtains data of the left-eye image on which the superimposition information has been superimposed and data of the right-eye image on which the superimposition information has been superimposed.

8. A stereo image data transmitting apparatus, comprising:

a stereo image data output unit that outputs stereo image data including left-eye image data and right-eye image data;

a disparity information output unit that outputs disparity information for giving disparity by shifting superimposition information to be superimposed on an image that is based on the left-eye image data and the right-eye image data; and a transmitting unit that transmits the stereo image data output from the stereo image data output unit and the disparity information output from the disparity information output unit, wherein the disparity information is disparity information that is sequentially updated in individual frames during a period of a predetermined number of frames during which the superimposition information is displayed, wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks.

9. The stereo image data transmitting apparatus according to claim 8, wherein the disparity information includes disparity information about the first frame during the period of the predetermined number of frames, and offset information about the second and subsequent frames with respect to disparity information of preceding frames.

10. A stereo image data receiving apparatus, comprising:

a receiving unit that receives stereo image data including left-eye image data and right-eye image data, and disparity information for giving disparity by shifting superimposition information to be superimposed on an image that is based on the left-eye image data and the right-eye image data, the disparity information being disparity information that is sequentially updated in individual frames during a period of a predetermined number of frames during which the superimposition information is displayed, wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks; and an image data processing unit that gives disparity to the same superimposition information to be superimposed on a left-eye image and a right-eye image using the left-eye image data and the right-eye image data included in the stereo image data received by the receiving unit and the disparity information received by the receiving unit, and that obtains data of the left-eye image on which the superimposition information has been superimposed and data of the right-eye image on which the superimposition information has been superimposed.

11. A stereo image data transmitting apparatus, comprising:

a stereo image data output unit that outputs stereo image data including left-eye image data and right-eye image data;

a disparity information output unit that outputs disparity information for giving disparity by shifting superimposition information to be superimposed on an image that is based on the left-eye image data and the right-eye image data; and a transmitting unit that transmits the stereo image data output from the stereo image data output unit and the disparity information output from the disparity information output unit, wherein the disparity information is disparity information that is commonly used in individual frames during a period of a predetermined number of frames during which the superimposition information is displayed, the disparity information has added thereto information indicating the disparity information that is commonly used in the individual frames or the disparity information that is sequentially updated in the individual frames, wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks.

12. A stereo image data receiving apparatus, comprising:

a receiving unit that receives stereo image data including left-eye image data and right-eye image data, and disparity information for giving disparity by shifting superimposition information to be superimposed on an image that is based on the left-eye image data and the right-eye image data, the disparity information being disparity information that is commonly used in individual frames during a period of a predetermined number of frames during which the superimposition information is displayed, wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks; and an image data processing unit that gives disparity to the same superimposition information to be superimposed on a left-eye image and a right-eye image using the left-eye image data and the right-eye image data included in the stereo image data received by the receiving unit and the disparity information received by the receiving unit, and that obtains data of the left-eye image on which the superimposition information has been superimposed and data of the right-eye image on which the superimposition information has been superimposed.

13. A stereo image data transmitting apparatus, comprising:

a stereo image data output unit that outputs stereo image data including left-eye image data and right-eye image data;

a disparity information output unit that outputs disparity information by shifting superimposition information to be superimposed on an image that is based on the left-eye image data and the right-eye image data; and a transmitting unit that transmits the stereo image data output from the stereo image data output unit and the disparity information output from the disparity information output unit, wherein the disparity information is disparity information that is commonly used in individual frames during a period of a predetermined number of frames during which the superimposition information is displayed, or disparity information that is sequentially updated in individual frames during a period of a predetermined number of frames during which the superimposition information is displayed, and the disparity information has added thereto flag information indicating the disparity information that is commonly used in the individual frames or the disparity information that is sequentially updated in the individual frames, wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks.

14. A stereo image data receiving apparatus, comprising:

a receiving unit that receives stereo image data including left-eye image data and right-eye image data, and disparity information for giving disparity by shifting superimposition information to be superimposed on an image that is based on the left-eye image data and the right-eye image data, the disparity information being disparity information that is commonly used in individual frames during a period of a predetermined number of frames during which the superimposition information is displayed, or disparity information that is sequentially updated in individual frames during a period of a predetermined number of frames during which the superimposition information is displayed, the disparity information having added thereto flag information indicating the disparity information that is commonly used in the individual frames or the disparity information that is sequentially updated in the individual frames, wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks; and an image data processing unit that gives disparity to the same superimposition information to be superimposed on a left-eye image and a right-eye image using the left-eye image data and the right-eye image data included in the stereo image data received by the receiving unit, the disparity information received by the receiving unit, and the flag information added to the disparity information, and that obtains data of the left-eye image on which the superimposition information has been superimposed and data of the right-eye image on which the superimposition information has been superimposed.

* * * * *